US012752452B2

(12) United States Patent
Crystal et al.

(10) Patent No.: US 12,752,452 B2
(45) Date of Patent: Oct. 6, 2026

(54) FOODSTUFF CRAFTING APPARATUS, COMPONENTS, ASSEMBLY, AND METHOD FOR UTILIZING THE SAME

(71) Applicant: Cricut, Inc., South Jordan, UT (US)

(72) Inventors: Jeremy Burton Crystal, Springville, UT (US); Rebecca Sego, Spanish Fork, UT (US); Jeffery V. Gubler, Orem, UT (US); James T. Davis, II, Springville, UT (US)

(73) Assignee: Cricut, Inc., South Jordan, UT (US)

(*) Notice: Subject to any disclaimer, the term of this patent is extended or adjusted under 35 U.S.C. 154(b) by 634 days.

(21) Appl. No.: 17/656,833

(22) Filed: Mar. 28, 2022

(65) Prior Publication Data

US 2022/0211071 A1 Jul. 7, 2022

Related U.S. Application Data

(62) Division of application No. 15/261,600, filed on Sep. 9, 2016, now Pat. No. 11,311,024, which is a division (Continued)

(51) Int. Cl.

| | |
|---|---|
| ***B26D 7/26*** | (2006.01) |
| ***A21C 15/00*** | (2006.01) |
| ***A23G 3/28*** | (2006.01) |
| ***A23P 20/20*** | (2016.01) |
| ***A23P 30/00*** | (2016.01) |

(Continued)

(52) U.S. Cl.

CPC .............. *B26D 7/26* (2013.01); *A21C 15/002* (2013.01); *A23G 3/28* (2013.01); *A23P 20/20* (2016.08); *A23P 30/00* (2016.08); *A23P 30/10* (2016.08); *B26D 1/0006* (2013.01); *B26D 1/045* (2013.01); *B26D 5/005* (2013.01); *B26D 7/088* (2013.01); *B26D 7/10* (2013.01); *B26F 1/3806* (2013.01); *A23P 2020/253* (2016.08);

(Continued)

(58) Field of Classification Search

CPC .... B26D 7/10; B26D 7/26; B26D 2007/2678; B26D 5/02; B26D 7/0006; B26F 1/382

See application file for complete search history.

(56) References Cited

U.S. PATENT DOCUMENTS

| | | | |
|---|---|---|---|
| 1,375,721 | A | 4/1921 | Nichols |
| 2,477,986 | A | 8/1949 | Kennerly |

(Continued)

FOREIGN PATENT DOCUMENTS

| | | | |
|---|---|---|---|
| CN | 201432326 | Y | 3/2010 |
| EP | 1557246 | A2 | 7/2005 |

(Continued)

OTHER PUBLICATIONS

U.S. Appl. No. 60/627,179, filed Nov. 15, 2004.

(Continued)

*Primary Examiner* — Jennifer S Matthews

(74) *Attorney, Agent, or Firm* — Honigman LLP; Grant Griffith

(57) ABSTRACT

A crafting apparatus that performs work on a workpiece is disclosed. The workpiece includes, for example, an edible foodstuff material. In an embodiment, the edible foodstuff material includes nutritional value and is consumable by, for example, human beings, animals or the like.

15 Claims, 95 Drawing Sheets

Related U.S. Application Data of application No. 12/977,898, filed on Dec. 23, 2010, now abandoned.

(60) Provisional application No. 61/327,246, filed on Apr. 23, 2010, provisional application No. 61/297,230, filed on Jan. 21, 2010, provisional application No. 61/289,920, filed on Dec. 23, 2009.

(51) Int. Cl.

| | |
|---|---|
| ***A23P 30/10*** | (2016.01) |
| ***B26D 1/00*** | (2006.01) |
| ***B26D 1/04*** | (2006.01) |
| ***B26D 5/00*** | (2006.01) |
| ***B26D 7/08*** | (2006.01) |
| ***B26D 7/10*** | (2006.01) |
| ***B26F 1/38*** | (2006.01) |
| *A23P 20/25* | (2016.01) |
| *B26F 1/44* | (2006.01) |

(52) U.S. Cl.

CPC .................. *B26D 2001/006* (2013.01); *B26D 2007/2678* (2013.01); *B26D 2210/02* (2013.01); *B26F 2001/4418* (2013.01)

(56) References Cited

U.S. PATENT DOCUMENTS

| | | | | |
|---|---|---|---|---|
| 2,483,750 | A | | 10/1949 | Bratrud |
| 2,702,496 | A | | 2/1955 | Davis et al. |
| 2,941,511 | A | | 6/1960 | Cieremans |
| 3,130,622 | A | | 4/1964 | Eno |
| 3,166,844 | A | | 1/1965 | Pascoe et al. |
| 3,166,846 | A | | 1/1965 | Pascoe et al. |
| 3,413,985 | A | | 12/1968 | Dlouhy et al. |
| 3,477,322 | A | | 11/1969 | Gerber et al. |
| 3,511,124 | A | | 5/1970 | Bruns |
| 3,569,683 | A | | 3/1971 | Pugh |
| 3,716,716 | A | | 2/1973 | Marantette et al. |
| 3,772,949 | A | | 11/1973 | Pavone et al. |
| 3,776,072 | A | | 12/1973 | Gerber et al. |
| 3,777,616 | A | | 12/1973 | Mueller |
| 3,803,960 | A | | 4/1974 | Pearl et al. |
| 3,805,650 | A | | 4/1974 | Pearl |
| 3,864,997 | A | | 2/1975 | Pear et al. |
| 3,895,358 | A | | 7/1975 | Pearl |
| 3,951,252 | A | | 4/1976 | Selke et al. |
| 4,002,366 | A | | 1/1977 | Hammes |
| 4,047,457 | A | | 9/1977 | Stubbings |
| 4,060,016 | A | | 11/1977 | Gerber |
| 4,075,465 | A | | 2/1978 | Funk et al. |
| 4,103,580 | A | | 8/1978 | Sauer et al. |
| 4,116,426 | A | | 9/1978 | Kessler |
| 4,133,233 | A | | 1/1979 | Pearl |
| 4,133,234 | A | | 1/1979 | Gerber |
| 4,152,962 | A | | 5/1979 | Hendrischk |
| 4,178,820 | A | | 12/1979 | Gerber |
| 4,192,618 | A | | 3/1980 | Kondur, Jr. et al. |
| 4,211,498 | A | | 7/1980 | Shimizu et al. |
| 4,302,119 | A | | 11/1981 | Siegenthaler |
| 4,331,051 | A | | 5/1982 | Gerber et al. |
| 4,337,576 | A | | 7/1982 | Drost et al. |
| D267,725 | S | | 1/1983 | Sidrak |
| 4,367,588 | A | | 1/1983 | Herbert |
| 4,373,412 | A | * | 2/1983 | Gerber .................. B26D 7/015 83/28 |
| 4,392,404 | A | | 7/1983 | Schwarzenberg et al. |
| 4,393,450 | A | | 7/1983 | Jerard |
| 4,393,587 | A | | 7/1983 | Kloosterman |
| 4,419,913 | A | | 12/1983 | Schutt et al. |
| 4,430,718 | A | | 2/1984 | Hendren |
| 4,436,013 | A | | 3/1984 | Gerber |
| 4,451,167 | A | | 5/1984 | Honma et al. |
| 4,467,525 | A | | 8/1984 | Logan et al. |
| 4,493,573 | A | | 1/1985 | Hashimoto et al. |
| 4,505,174 | A | | 3/1985 | Carithers, Jr. |
| 4,512,839 | A | | 4/1985 | Gerber |
| 4,524,894 | A | | 6/1985 | Leblond |
| 4,537,582 | A | | 8/1985 | Liu |
| 4,544,293 | A | | 10/1985 | Cranston et al. |
| 4,577,539 | A | | 3/1986 | Bonacci |
| 4,592,669 | A | | 6/1986 | Lohse et al. |
| 4,604,632 | A | | 8/1986 | Matsumoto |
| 4,608,891 | A | | 9/1986 | Frisby et al. |
| 4,626,635 | A | | 12/1986 | Mahon |
| 4,630,071 | A | | 12/1986 | Nakazawa |
| 4,635,511 | A | | 1/1987 | Shirasu |
| 4,641,556 | A | | 2/1987 | Vigneron et al. |
| 4,653,362 | A | * | 3/1987 | Gerber .................... B26F 1/382 83/16 |
| 4,675,825 | A | | 6/1987 | DeMenthon |
| 4,682,401 | A | | 7/1987 | Tadashi et al. |
| 4,709,483 | A | | 12/1987 | Hembree et al. |
| 4,713,886 | A | | 12/1987 | Ikeda |
| 4,721,058 | A | | 1/1988 | Hayamizu et al. |
| 4,793,033 | A | | 12/1988 | Schneider et al. |
| 4,794,698 | A | | 1/1989 | Fassett, II |
| 4,841,822 | A | | 6/1989 | Gerber |
| 4,854,205 | A | | 8/1989 | Anderka |
| 4,856,197 | A | | 8/1989 | Auer et al. |
| 4,868,761 | A | | 9/1989 | Hayashi |
| 4,882,836 | A | | 11/1989 | Higuchi et al. |
| 4,882,837 | A | | 11/1989 | Higuchi et al. |
| 4,909,884 | A | | 3/1990 | Wormser |
| 4,920,495 | A | | 4/1990 | Pilkington |
| 4,934,236 | A | * | 6/1990 | Gordon .................... B26D 5/06 83/563 |
| 4,949,466 | A | | 8/1990 | Auer et al. |
| 4,996,651 | A | * | 2/1991 | Wells ...................... B44B 3/009 358/1.3 |
| 5,031,483 | A | | 7/1991 | Weaver |
| 5,038,654 | A | | 8/1991 | Mackey |
| 5,042,338 | A | | 8/1991 | Gerber |
| 5,042,339 | A | | 8/1991 | Gerber |
| 5,074,178 | A | | 12/1991 | Shetley et al. |
| 5,089,971 | A | | 2/1992 | Gerber |
| 5,094,134 | A | | 3/1992 | Mizukoshi |
| 5,119,704 | A | | 6/1992 | Wolfson |
| 5,131,303 | A | | 7/1992 | Wilson et al. |
| 5,134,911 | A | | 8/1992 | Busky et al. |
| 5,138,341 | A | | 8/1992 | Kobayashi |
| 5,163,675 | A | | 11/1992 | Sunohara |
| 5,163,759 | A | | 11/1992 | Jambor et al. |
| 5,172,871 | A | | 12/1992 | Schutt et al. |
| 5,175,689 | A | | 12/1992 | Matsushita et al. |
| 5,188,009 | A | | 2/1993 | Sunohara et al. |
| 5,197,198 | A | | 3/1993 | Onozato |
| 5,214,590 | A | | 5/1993 | Schnetzer |
| 5,216,614 | A | | 6/1993 | Kuchta et al. |
| 5,230,764 | A | | 7/1993 | Moll et al. |
| 5,253,176 | A | | 10/1993 | ToDoroki et al. |
| 5,277,736 | A | | 1/1994 | Logan |
| 5,296,872 | A | | 3/1994 | Caamano |
| 5,303,624 | A | | 4/1994 | Ventham et al. |
| 5,353,232 | A | | 10/1994 | Vollmayr |
| 5,353,335 | A | | 10/1994 | Takagi et al. |
| 5,355,791 | A | | 10/1994 | Benedetto et al. |
| 5,363,123 | A | | 11/1994 | Petersen et al. |
| 5,386,654 | A | | 2/1995 | Kroenke |
| 5,388,488 | A | | 2/1995 | Geidl et al. |
| 5,396,160 | A | | 3/1995 | Chen |
| 5,398,579 | A | | 3/1995 | Bando |
| 5,407,415 | A | | 4/1995 | Spishak |
| 5,438,896 | A | | 8/1995 | Carroll |
| 5,443,194 | A | | 8/1995 | Takahashi et al. |
| 5,454,287 | A | | 10/1995 | Fuchigami et al. |
| 5,466,501 | A | | 11/1995 | Logan et al. |
| 5,482,389 | A | | 1/1996 | Bickoff et al. |
| 5,495,671 | A | | 3/1996 | Shun-Yi |
| 5,517,407 | A | | 5/1996 | Weiner |
| 5,524,996 | A | | 6/1996 | Carpenter et al. |
| 5,534,388 | A | | 7/1996 | Grasshoff et al. |
| 5,537,135 | A | | 7/1996 | Hevenor et al. |

(56) References Cited

U.S. PATENT DOCUMENTS

| | | | | |
|---|---|---|---|---|
| 5,537,904 | A | 7/1996 | Albin | |
| 5,547,003 | A | 8/1996 | Susnjara et al. | |
| 5,551,786 | A | 9/1996 | Webster et al. | |
| 5,561,601 | A | 10/1996 | Inoue et al. | |
| D377,368 | S | 1/1997 | Rellinger | |
| 5,595,560 | A | 1/1997 | Kamada | |
| 5,605,165 | A | 2/1997 | Sessions et al. | |
| 5,609,082 | A * | 3/1997 | Kuchta | B26D 7/088 83/13 |
| 5,613,788 | A | 3/1997 | Dobring | |
| 5,634,388 | A | 6/1997 | Fuchigami et al. | |
| 5,666,261 | A | 9/1997 | Aguilera | |
| 5,669,866 | A | 9/1997 | Julian et al. | |
| 5,671,065 | A | 9/1997 | Lee | |
| 5,673,490 | A | 10/1997 | Hill | |
| 5,701,251 | A | 12/1997 | Yoshimura | |
| 5,701,790 | A | 12/1997 | Saito et al. | |
| 5,727,433 | A | 3/1998 | Pomerleau et al. | |
| 5,727,889 | A | 3/1998 | Koyabu | |
| 5,777,880 | A | 7/1998 | Bowen et al. | |
| 5,778,733 | A | 7/1998 | Stringer | |
| 5,791,215 | A | 8/1998 | Morrison et al. | |
| 5,806,390 | A | 9/1998 | Pomerleau et al. | |
| 5,829,897 | A | 11/1998 | Murai | |
| 5,832,801 | A | 11/1998 | Bando | |
| 5,833,380 | A | 11/1998 | Hosomi et al. | |
| 5,836,224 | A * | 11/1998 | Gerber | B26D 7/04 83/451 |
| 5,847,956 | A | 12/1998 | Bronfeld et al. | |
| 5,855,149 | A | 1/1999 | Islam et al. | |
| 5,857,398 | A | 1/1999 | Bando | |
| 5,867,392 | A | 2/1999 | Bousquet et al. | |
| 5,868,056 | A | 2/1999 | Pfarr et al. | |
| 5,876,131 | A | 3/1999 | Parker et al. | |
| 5,881,624 | A | 3/1999 | Brugue et al. | |
| 5,882,128 | A | 3/1999 | Hinojosa | |
| 5,938,354 | A | 8/1999 | Yasui et al. | |
| 5,971,639 | A | 10/1999 | Park | |
| 5,993,093 | A | 11/1999 | Schoennauer et al. | |
| 6,018,687 | A | 1/2000 | Tabor | |
| 6,021,572 | A | 2/2000 | Smith | |
| 6,050,164 | A | 4/2000 | Kuchta | |
| 6,053,495 | A | 4/2000 | Hara et al. | |
| 6,089,136 | A | 7/2000 | Hinojosa et al. | |
| 6,109,745 | A | 8/2000 | Wen | |
| 6,112,630 | A | 9/2000 | Miura | |
| 6,113,293 | A | 9/2000 | Schanke et al. | |
| 6,117,061 | A | 9/2000 | Popat et al. | |
| 6,121,889 | A | 9/2000 | Janda et al. | |
| 6,144,554 | A | 11/2000 | Mok | |
| 6,146,035 | A | 11/2000 | Ishigouoka et al. | |
| 6,151,037 | A | 11/2000 | Kaufman et al. | |
| 6,152,619 | A | 11/2000 | Silverbrook | |
| D435,064 | S | 12/2000 | Nicholson | |
| 6,164,177 | A * | 12/2000 | Galan | B26F 1/382 83/823 |
| 6,173,211 | B1 | 1/2001 | Williams et al. | |
| 6,178,859 | B1 | 1/2001 | Pomerleau et al. | |
| 6,192,777 | B1 | 2/2001 | Williams et al. | |
| 6,209,435 | B1 | 4/2001 | Miyazaki et al. | |
| 6,237,240 | B1 | 5/2001 | Nelson et al. | |
| 6,260,457 | B1 | 7/2001 | Hakkaku | |
| 6,266,572 | B1 | 7/2001 | Yamazaki et al. | |
| 6,270,269 | B1 | 8/2001 | Watanabe et al. | |
| 6,281,981 | B1 | 8/2001 | Yasui et al. | |
| 6,283,001 | B1 | 9/2001 | Schultes et al. | |
| 6,302,602 | B1 | 10/2001 | Kiyohara et al. | |
| 6,315,474 | B1 | 11/2001 | Giles et al. | |
| 6,339,982 | B1 | 1/2002 | Angel et al. | |
| 6,341,548 | B1 | 1/2002 | Hirahata et al. | |
| 6,343,884 | B1 | 2/2002 | Watanabe et al. | |
| 6,347,896 | B1 | 2/2002 | Robinson | |
| 6,352,381 | B1 | 3/2002 | Gonmori et al. | |
| 6,361,231 | B1 | 3/2002 | Sato et al. | |
| 6,363,298 | B1 | 3/2002 | Shin et al. | |
| 6,382,744 | B1 | 5/2002 | Xiao et al. | |
| 6,408,727 | B1 | 6/2002 | Harris et al. | |
| 6,408,750 | B1 | 6/2002 | Goto et al. | |
| 6,434,444 | B2 | 8/2002 | Herman, Jr. | |
| 6,441,338 | B1 | 8/2002 | Rabinovich | |
| 6,443,645 | B1 | 9/2002 | Takei et al. | |
| 6,447,187 | B1 | 9/2002 | Robinson | |
| 6,459,952 | B1 | 10/2002 | Dundorf | |
| 6,462,839 | B1 | 10/2002 | Short | |
| 6,491,361 | B1 | 12/2002 | Spann | |
| 6,494,633 | B1 | 12/2002 | Crosby et al. | |
| 6,499,840 | B2 | 12/2002 | Day et al. | |
| 6,502,489 | B2 | 1/2003 | Gerent et al. | |
| 6,506,475 | B1 | 1/2003 | Hill | |
| 6,520,056 | B1 | 2/2003 | Nemeth et al. | |
| 6,520,701 | B2 | 2/2003 | Kaya | |
| 6,536,115 | B2 | 3/2003 | Tabbi et al. | |
| 6,547,098 | B1 | 4/2003 | Kaye | |
| 6,554,163 | B1 | 4/2003 | Kaye | |
| 6,554,511 | B2 | 4/2003 | Kwasny et al. | |
| D474,806 | S | 5/2003 | Yamano et al. | |
| 6,557,730 | B1 | 5/2003 | Kaye | |
| 6,560,499 | B1 | 5/2003 | Demmer | |
| 6,563,904 | B2 | 5/2003 | Wijts et al. | |
| 6,572,291 | B1 | 6/2003 | Ho et al. | |
| 6,585,438 | B2 | 7/2003 | Hosokawa et al. | |
| 6,599,044 | B2 | 7/2003 | Paris | |
| 6,608,618 | B2 | 8/2003 | Woods et al. | |
| D479,264 | S | 9/2003 | Suzuki et al. | |
| 6,612,215 | B2 | 9/2003 | Takeuchi | |
| 6,616,360 | B2 | 9/2003 | Lehmkuhl | |
| 6,619,166 | B2 | 9/2003 | Miyazaki et al. | |
| 6,619,167 | B2 | 9/2003 | Mikkelsen et al. | |
| 6,619,168 | B2 | 9/2003 | Alsten et al. | |
| RE38,286 | E | 10/2003 | Flowers | |
| 6,635,001 | B2 | 10/2003 | Lynch et al. | |
| 6,641,401 | B2 | 11/2003 | Wood et al. | |
| 6,648,533 | B2 | 11/2003 | Lo et al. | |
| 6,655,436 | B1 | 12/2003 | Venditti et al. | |
| 6,659,454 | B1 | 12/2003 | Smith et al. | |
| 6,668,156 | B2 | 12/2003 | Lynch et al. | |
| 6,675,059 | B2 | 1/2004 | Scott | |
| 6,676,318 | B2 | 1/2004 | Hwang et al. | |
| 6,684,514 | B2 | 2/2004 | Welch | |
| 6,718,854 | B2 | 4/2004 | Bedi et al. | |
| D489,754 | S | 5/2004 | Akahane et al. | |
| 6,729,035 | B1 | 5/2004 | Carrillo | |
| 6,732,619 | B2 | 5/2004 | Carriere et al. | |
| 6,739,777 | B2 | 5/2004 | Kobayashi et al. | |
| 6,749,352 | B2 | 6/2004 | Yamada et al. | |
| 6,750,978 | B1 | 6/2004 | Marggraff et al. | |
| 6,781,821 | B2 | 8/2004 | Tsubai et al. | |
| 6,786,125 | B2 | 9/2004 | Imai | |
| 6,793,424 | B2 | 9/2004 | Yamada et al. | |
| 6,810,781 | B2 | 11/2004 | Peters et al. | |
| 6,814,516 | B2 | 11/2004 | Tsuchiya et al. | |
| 6,814,517 | B2 | 11/2004 | Fisher et al. | |
| 6,830,304 | B2 | 12/2004 | Suzuki et al. | |
| 6,848,847 | B2 | 2/2005 | Murakoshi et al. | |
| 6,862,823 | B2 | 3/2005 | deCarteret | |
| 6,887,003 | B2 | 5/2005 | Someno | |
| 6,905,269 | B2 | 6/2005 | Hansburg | |
| 6,908,190 | B2 | 6/2005 | Iwatsuki et al. | |
| D514,699 | S | 2/2006 | Beckwith | |
| 7,054,708 | B1 | 5/2006 | Aamodt et al. | |
| 7,059,793 | B2 | 6/2006 | Mori et al. | |
| D533,898 | S | 12/2006 | Cox et al. | |
| 7,163,287 | B2 | 1/2007 | Silverbrook et al. | |
| 7,164,490 | B2 | 1/2007 | Manico et al. | |
| 7,217,051 | B2 | 5/2007 | Silverbrook et al. | |
| 7,261,477 | B2 | 8/2007 | Silverbrook et al. | |
| 7,267,500 | B2 | 9/2007 | Tsuchiya et al. | |
| 7,380,907 | B2 | 6/2008 | Nunokawa | |
| 7,393,096 | B2 | 7/2008 | Takagi | |
| D675,259 | S | 1/2013 | Chang | |
| 9,624,612 | B2 | 4/2017 | Works | |
| D806,096 | S | 12/2017 | Schiffman et al. | |
| 10,619,990 | B2 | 4/2020 | Chen | |
| D989,183 | S | 6/2023 | Bronnikov | |

(56) References Cited

U.S. PATENT DOCUMENTS

| | | | |
|---|---|---|---|
| 2001/0045148 A1 | 11/2001 | Gerent et al. | |
| 2002/0066344 A1 | 6/2002 | Ewing et al. | |
| 2002/0092389 A1 | 7/2002 | Feldman et al. | |
| 2002/0093570 A1 | 7/2002 | Silverbrook et al. | |
| 2002/0134213 A1 | 9/2002 | Causse et al. | |
| 2002/0139230 A1 | 10/2002 | Kojima et al. | |
| 2002/0187285 A1 | 12/2002 | Mitchell et al. | |
| 2002/0192003 A1 | 12/2002 | Koike et al. | |
| 2003/0012454 A1 | 1/2003 | Manico et al. | |
| 2003/0049353 A1 | 3/2003 | Lauen et al. | |
| 2003/0066401 A1 | 4/2003 | Becan et al. | |
| 2003/0103793 A1 | 6/2003 | Murakoshi et al. | |
| 2003/0118229 A1 | 6/2003 | Andrews et al. | |
| 2003/0146943 A1 | 8/2003 | Lehmkuhl et al. | |
| 2003/0168148 A1 | 9/2003 | Gerber et al. | |
| 2003/0183056 A1 | 10/2003 | Kersch et al. | |
| 2003/0206211 A1 | 11/2003 | Baron | |
| 2003/0226372 A1 | 12/2003 | Bigwood et al. | |
| 2003/0226433 A1 | 12/2003 | Passant | |
| 2003/0228349 A1 | 12/2003 | Singh et al. | |
| 2004/0043365 A1 | 3/2004 | Kelley et al. | |
| 2004/0094003 A1 | 5/2004 | Bar-Erez | |
| 2004/0101337 A1 | 5/2004 | Woodman et al. | |
| 2004/0120008 A1 | 6/2004 | Morgan | |
| 2005/0021172 A1 | 1/2005 | Winter et al. | |
| 2005/0123336 A1 | 6/2005 | Oshida et al. | |
| 2005/0156954 A1 | 7/2005 | Silverbrook et al. | |
| 2005/0157141 A1 | 7/2005 | Silverbrook et al. | |
| 2005/0186010 A1 | 8/2005 | Shibata et al. | |
| 2005/0193568 A1 | 9/2005 | Peyrot et al. | |
| 2006/0117922 A1 | 6/2006 | Causse et al. | |
| 2006/0200267 A1 | 9/2006 | Aamodt et al. | |
| 2006/0228151 A1 | 10/2006 | Vogel | |
| 2006/0288832 A1 | 12/2006 | Sandberg | |
| 2006/0288833 A1 | 12/2006 | Lachance | |
| 2007/0013959 A1 | 1/2007 | Miwa | |
| 2007/0017332 A1* | 1/2007 | Workman | B26F 1/3813 83/76.3 |
| 2007/0056415 A1 | 3/2007 | Causse et al. | |
| 2007/0076178 A1 | 4/2007 | Ueda et al. | |
| 2007/0126786 A1 | 6/2007 | Ohmori et al. | |
| 2007/0189831 A1 | 8/2007 | Silverbrook et al. | |
| 2007/0193049 A1 | 8/2007 | Vetromila | |
| 2007/0227332 A1 | 10/2007 | Causse et al. | |
| 2008/0013853 A1 | 1/2008 | Albiez et al. | |
| 2008/0117455 A1 | 5/2008 | Tomono et al. | |
| 2008/0120071 A1 | 5/2008 | Minatogawa et al. | |
| 2008/0282859 A2 | 11/2008 | Causse et al. | |
| 2010/0024737 A1 | 2/2010 | Asimou et al. | |
| 2015/0196166 A1 | 7/2015 | Chen | |

FOREIGN PATENT DOCUMENTS

| | | | |
|---|---|---|---|
| GB | 2295584 | A | 6/1996 |
| JP | S59206904 | A | 11/1984 |
| JP | S60179804 | A | 9/1985 |
| JP | S614647 | A | 1/1986 |
| JP | S62169209 | A | 7/1987 |
| JP | H01295718 | A | 11/1989 |
| JP | H02205975 | A | 8/1990 |
| JP | H02278675 | A | 11/1990 |
| JP | H02287803 | A | 11/1990 |
| JP | H0466232 | A | 3/1992 |
| JP | H04293000 | A | 10/1992 |
| JP | H05168773 | A | 7/1993 |
| JP | H05305599 | A | 11/1993 |
| JP | H0852685 | A | 2/1996 |
| JP | H0866894 | A | 3/1996 |
| JP | H0871980 | A | 3/1996 |
| JP | H09323296 | A | 12/1997 |
| JP | H1034589 | A | 2/1998 |
| JP | 2003-316407 | | 11/2003 |
| JP | 2004323543 | A | 11/2004 |
| KR | 3020120001389 | | 10/2012 |
| KR | 3020120001390 | | 10/2012 |
| WO | WO-9204164 | A1 * | 3/1992 |
| WO | 05004051 | A1 | 1/2005 |

OTHER PUBLICATIONS

"CraftRobo: Graphtec." (Title page). CraftRoboGraphtec, p. 1. The Wayback Machine—<https://web.archive.org/web/20081022123152/http://www.graphteccorp.com:80/craftrobo/.> Accessed May 4, 2026.

"Software: CraftRobo—Graphtec." CraftRoboGraphtec. pp. 1-2. The Wayback Machine—https://web.archive.org/web/20080430171634/http://www.graphteccorp.com/craftrobo/things/software.html, accessed May 4, 2026.

"Things to know: CraftRobo—Graphtec." CraftRoboGraphtec, p. 1. The Wayback Machine—https://web.archive.org/web/20080516105653/http://www.graphteccorp.com/craftrobo/things/index.html, accessed May 4, 2026.

"What is Craft ROBO? : CraftRobo—Graphtec." CraftRoboGraphtec, pp. 1-2. The Wayback Machine, <https://web.archive.org/web/20080527183316/http://www.graphteccorp.com/craftrobo/about.html,> accessed May 4, 2026.

What's New at MagiCut. MagiCut International Ltd., pp. 1-2. Wayback Machine—<https://web.archive.org/web/20080516131018/http://www.magicut.com/news/index.htm,> accessed May 4, 2026.

U.S. Appl. No. 60/627,179, filed Nov. 15, 2004, all enclosed pages cited.

U.S. Appl. No. 60/517,550, filed Nov. 5, 2003, all enclosed pages cited.

"How PC's work". "PC Parts", Wayback Machine https://web.archive.org/web/20081109015600/http://computer.howstuffworks.com/pc1.htm, accessed May 4, 2026.

"CraftRobo:Graphtec." (Title page). CraftRoboGraphtec, 1 page. Wayback machine—https://web.archive.org/web/20061208081540/http://www.graphteccorp.com/craftrobo/, accessed May 4, 2026.

"Software: CraftRobo—Graphtec." CraftRoboGraphtec, pp. 1-2. Wayback Machine—https://web.archive.org/web/20061021075520/http://www.graphteccorp.com/craftrobo/things/software.html accessed May 4, 2026.

"Things to know: CraftRobo—Graphtec." CraftRoboGraphtec, pp. 1-2. Wayback Machine—https://web.archive.org/web/20061103141820/http://www.graphteccorp.com/craftrobo/things/index.html, accessed May 4, 2026.

"What is Craft ROBO?: CraftRobo—Graphtec." CraftRoboGraphtec, pp. 1-3. Wayback Machine—https://web.archive.org/web/20061016032249/http://www.graphteccorp.com/craftrobo/about.html, accessed May 4, 2026.

"What's new at MagiCut." MagiCut International Ltd., pp. 1-2. Wayback Machine—https://web.archive.org/web/20061110223611/http://www.magicut.com/news/index.htm accessed May 4, 2026.

Artist Supply Source_Cutting Mat 14.25 × 14.25 Inches, Wayback Machine—https://web.archive.org/web/20241010161147/https://www.artistsupplysource.com/product/29588506/cutting-mat-1425-x-1425-inches/, accessed May 4, 2026.

HTVRONT Variety Cutting Mats for Cricut_Amazon, www.amazon.com/HTVRONT-LightGrip-StandardGrip-Replacement-Accessories/dp/B09X36MLP9?th=1. Accessed May 4, 2026, all enclosed pages cited.

Worklion 12×12 Cutting Mat for Cricut_ Amazon,https://www.amazon.com/WORKLION-12x12-Cutting-Mat-Cricut/dp/B08R9H73SV?th=1, accessed May 4, 2026, all enclosed pages cited.

Welebar Cutting Mats_Amazon, https://www.amazon.com/StandardGrip-LightGrip-StrongGrip-FabricGrip-Replacement/dp/B09QCC6715?th=1, accessed May 4, 2026, all enclosed pages cited.

Nicapa Light Grip Cutting Mat for Cricut Maker 3_Amazon, https://www.amazon.com/Nicapa-Light-Grip-Cutting-12x12/dp/B07QFZF759?th=1, accessed May 4, 2026, all enclosed pages cited.

* cited by examiner

FIG. 49A
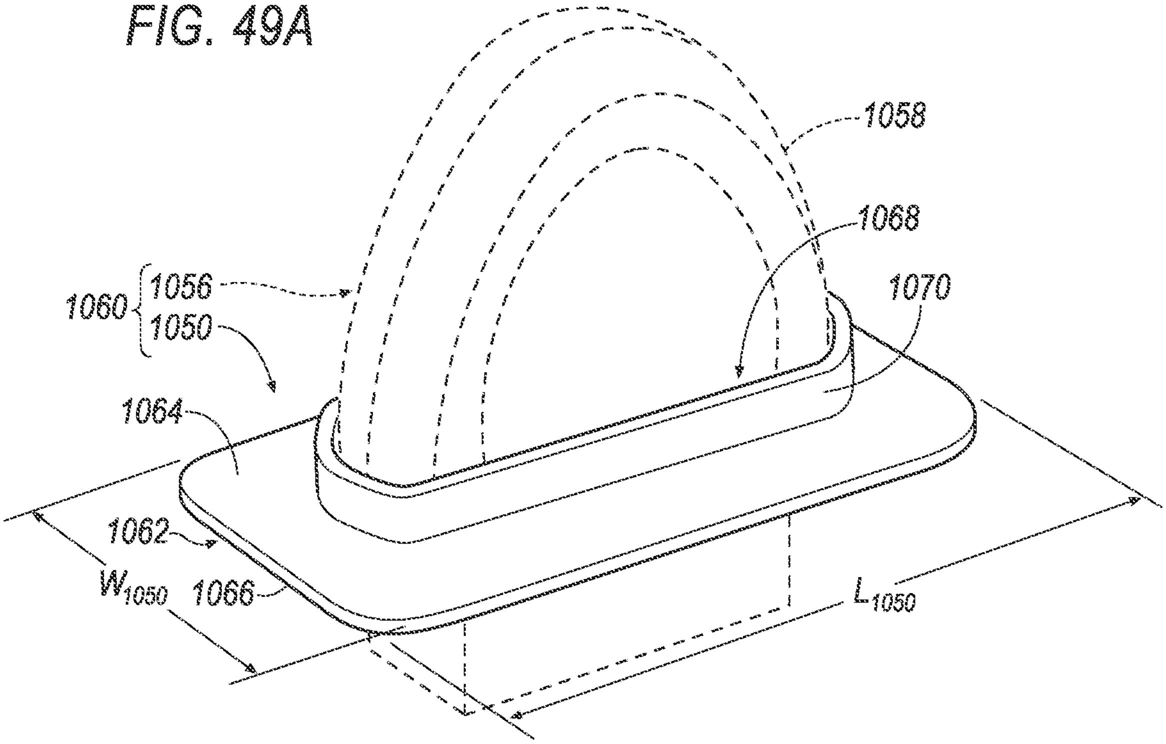
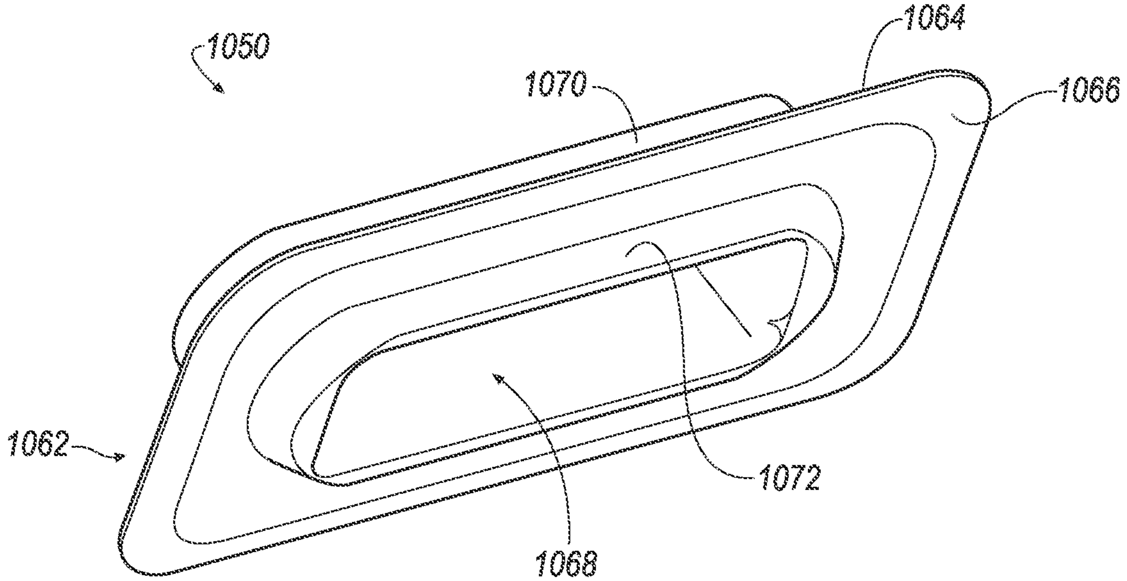
FIG. 49B

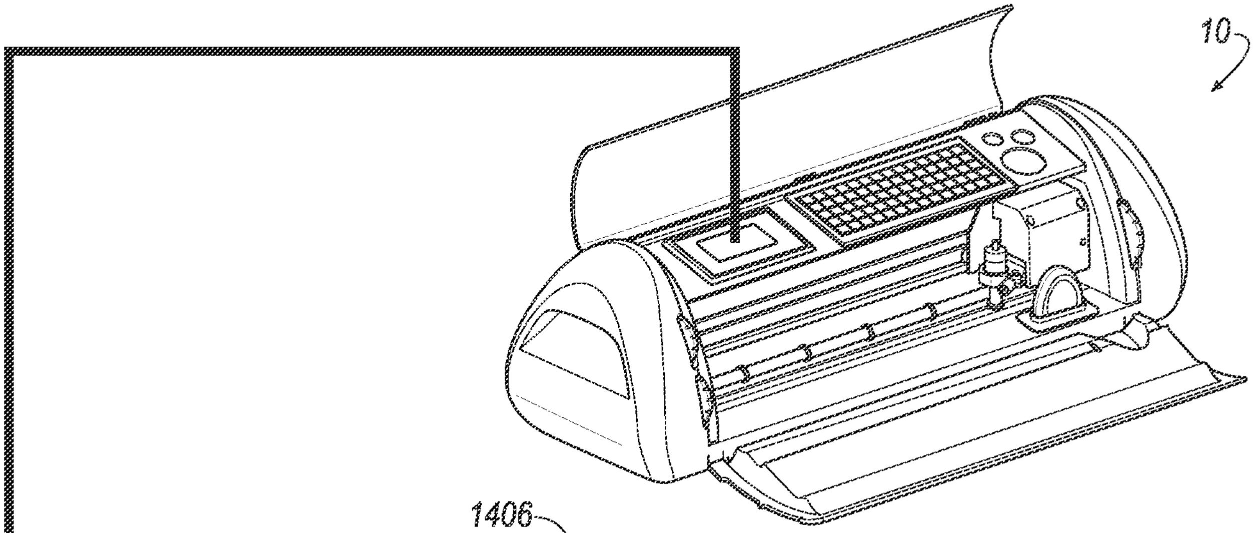

FIG. 57E

What type of foodstuff will you be crafting?

- fondant
- gum paste
- sheet icing
- liquorices
- dried fruit
- fruit leather
- tortillas
- cheese

1406

| FOODSTUFF USER INPUT | BLADE TEMPERATURE | BLADE CUTTING SPEED | BLADE STYLE | CUTTING TIME BETWEEN SUBMERSION | CUTTING DISTANCE BETWEEN SUBMERSION |
|---|---|---|---|---|---|
| fondant | x1° | x1 inch/sec | x1 Geometry | x1 Seconds | x1 Inches |
| gum paste | x2° | x2 inch/sec | x2 Geometry | x2 Seconds | x2 Inches |
| sheet icing | x3° | x3 inch/sec | x3 Geometry | x3 Seconds | x3 Inches |
| liquorices | x4° | x4 inch/sec | x4 Geometry | x4 Seconds | x4 Inches |
| dried fruit | x5° | x5 inch/sec | x5 Geometry | x5 Seconds | x5 Inches |
| fruit leather | x6° | x6 inch/sec | x6 Geometry | x6 Seconds | x6 Inches |
| tortillas | x7° | x7 inch/sec | x7 Geometry | x7 Seconds | x7 Inches |
| cheese | x8° | x8 inch/sec | x8 Geometry | x8 Seconds | x8 Inches |

FOODSTUFF CRAFTING APPARATUS, COMPONENTS, ASSEMBLY, AND METHOD FOR UTILIZING THE SAME

CROSS REFERENCE TO PRIOR APPLICATIONS

This U.S. patent application is a divisional of, and claims priority under 35 U.S.C. § 121 from, U.S. patent application Ser. No. 15/261,600, filed on Sep. 9, 2016, which is a divisional of U.S. patent application Ser. No. 12/977,898, filed on Dec. 23, 2010, which claims priority under 35 U.S.C. § 119(e) to U.S. Provisional Application No. 61/289,920, filed on Dec. 23, 2009, U.S. Provisional Application No. 61/297,230, filed on Jan. 21, 2010, and U.S. Provisional Application No. 61/327,246, filed on Apr. 23, 2010. The disclosures of these prior applications are considered part of the disclosure of this application and are hereby incorporated by reference in their entireties.

TECHNICAL FIELD

The disclosure relates to a foodstuff crafting apparatus, components, assembly, and method for utilizing the same.

DESCRIPTION OF THE RELATED ART

Throughout history, it has been known that individuals have found a sense of personal fulfillment/achievement/satisfaction/expression by creating art. In recent times, during the late 19$^{th}$ century, an art reform & social movement led by skilled tradesmen was slowly starting to be recognized by many people across America, Canada, Great Britain and Australia. This movement has often been referred to as the "Arts-and-Crafts Movement."

The so-called "Arts-and-Crafts Movement" that began many years ago has continued to evolve today by many persons that may not necessarily be skilled in a particular trade. As such, it may be said that non-skilled persons may be involved in the "arts-and-crafts" as a social activity or hobby. In some circumstances, the activity or hobby may be practiced for any number of reasons ranging from, for example: economic gain, gifting, or simply to pass time while finding a sense of personal fulfillment/achievement/satisfaction/expression.

With advances in modern technology, the "Arts-and-Crafts Movement" that began many years ago is nevertheless susceptible to further advancements that may enhance or improve, for example, the way a skilled or non-skilled person may contribute to the arts-and-crafts. Therefore, a need exists for the development of improved components, devices and the like that advance the art.

DESCRIPTION OF DRAWINGS

The disclosure will now be described, by way of example, with reference to the accompanying drawings, in which:

FIG. 38C" is a cross-section view according to arrow 38C of FIG. 38B showing the crafting apparatus in a second orientation with an access door in a closed position in accordance with an exemplary embodiment of the invention.

FIG. 38C''' is a cross-section view according to arrow 38C of FIG. 38B showing the crafting apparatus in the second orientation with the access door in an open position in accordance with an exemplary embodiment of the invention.

FIG. 49A is a top perspective view of a removable covering for a memory cartridge in accordance with an exemplary embodiment of the invention.

FIG. 49B is a bottom perspective view of the removable covering for a memory cartridge of FIG. 49A in accordance with an exemplary embodiment of the invention.

FIG. 57E illustrates a look-up table provided by a controller of a foodstuff crafting apparatus in accordance with an exemplary embodiment of the invention.

FIG. 69 illustrates a side view of a blade in accordance with an exemplary embodiment of the invention.

FIG. 70 illustrates a side view of a blade and a system for rotating one or more portions of the blade in accordance with an exemplary embodiment of the invention.

FIG. 71 is a perspective view of a sub-structure of a crafting apparatus including the blade of FIG. 69 in accordance with an exemplary embodiment of the invention.

FIG. 72 is a perspective view of a sub-structure of a crafting apparatus including the blade of FIG. 70 in accordance with an exemplary embodiment of the invention.

DETAILED DESCRIPTION

The Figures illustrate an exemplary embodiment of a foodstuff crafting apparatus, components, assembly, and method for utilizing the same. Based on the foregoing, it is to be generally understood that the nomenclature used herein is simply for convenience and the terms used to describe the invention should be given the broadest meaning by one of ordinary skill in the art.

Figure 1:
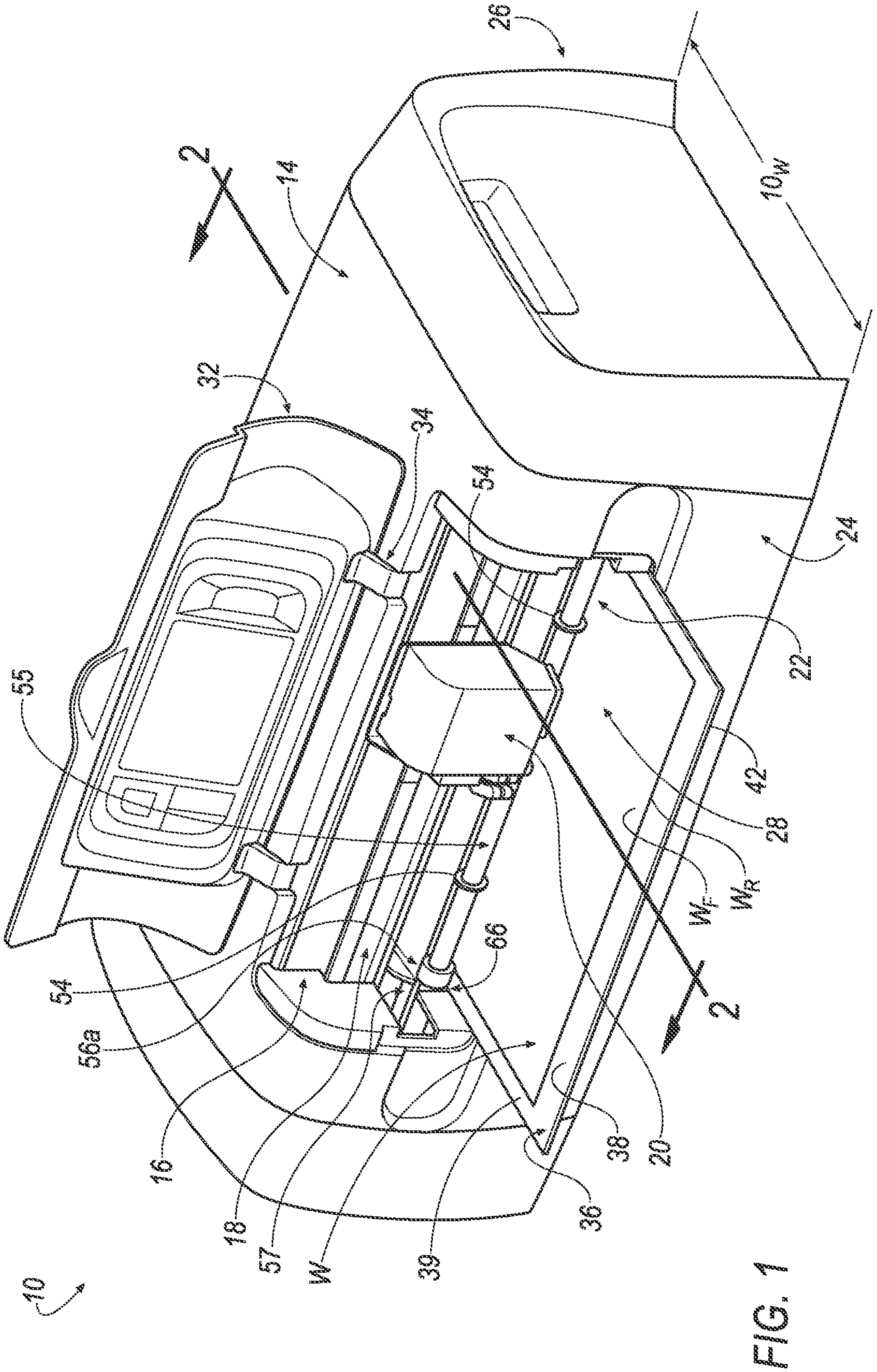
FIG. 1 is a perspective view of a crafting apparatus in accordance with an exemplary embodiment of the invention.

Referring to FIG. 1, a crafting apparatus 10 is shown according to an embodiment of the invention. In an embodiment, the crafting apparatus 10 may conduct "work" upon a workpiece, W (see also, e.g., FIGS. 22A-22E).

In an embodiment, the term "work" that is conducted upon the workpiece, W, may include, but is not limited to, any number of tasks/functions. In an embodiment, the "work" may include, for example, a "cutting operation" that functionally includes contact of a blade 12*a* (see, e.g., FIGS. 3A-9B) of the crafting apparatus 10 with the workpiece, W. In an embodiment, the blade 12*a* may partially or fully penetrate a thickness, $W_T$ (see, e.g., FIGS. 22A-22E), of the workpiece, W. In an embodiment, the thickness, $W_T$, of the workpiece, W, may be said to be bound by the first, front surface, $W_F$, and the second, rear surface, $W_R$.

Further, in an embodiment, the "work" may include, for example, a "printing operation." The printing operation functionally includes the use of a nozzle 12*b* (see, e.g., FIGS. 3A-9B) of the crafting apparatus 10 that deposits ink, I (see, e.g., FIG. 22A), upon one or more of a first, front surface, $W_F$, of the workpiece, W, and a second, rear surface, $W_R$, of the workpiece, W. Ink, I, can be any liquid marking medium including foodstuff inks, foodstuff dyes, foodstuff coloring or the like; accordingly, in an embodiment, the ink, I, may alternatively be referred to as a "foodstuff ink."

In an embodiment, if the "work" is to include the "cutting operation," which includes contact of the blade 12*a* with the workpiece, W, the contact of the blade 12*a* with the workpiece, W, may result in the workpiece, W, being scored, S1 (see, e.g., FIG. 22B), such that the blade 12*a* does not entirely penetrate through the thickness, $W_T$, of the workpiece, W. In another embodiment, the contact of the blade 12*a* with the workpiece, W, may result in the workpiece, W, be formed to include one or more slits, S2 (see, e.g., FIG. 22C), such that the blade 12*a* may be permitted to penetrate through the thickness, $W_T$, of the workpiece, W; in an embodiment, the one or more slits, S2, may form the workpiece, W, to include one or more openings or passages. In another embodiment, the contact of the blade 12*a* with the workpiece, W, may result in the workpiece, W, being cut (see, e.g., FIG. 22D), such that the workpiece, W, may be separated into two or more parts, P1, P2, in order to alter the workpiece, W, to include one or more designs, shapes, geometries or configurations. In another embodiment, the contact of the blade 12*a* with the workpiece, W, may result in the workpiece, W, including a plurality of small slits, S3 (see, e.g., FIG. 22E), to form the workpiece, W, to include a line, predetermined pattern or the like such that the workpiece, W, may be said to include one or more perforations or perforated designs, shapes, geometries or configurations.

In an embodiment, the workpiece, W, may include any desirable shape, size, geometry or material composition. In an embodiment, the shape/geometry may include, for example, a square or rectangular shape. Alternatively, in an embodiment, shape may include non-square or non-rectangular shapes, such as, for example, circular shapes, triangular shapes or the like.

In an embodiment, the workpiece, W, may include any desirable material composition. In an embodiment, the material composition may include, for example, a sheet of paper. In an embodiment, the material composition may include, for example, paperboard, such as, for example, cardboard. In an embodiment, the material composition may include, for example, a non-paper-based product, such as, for example, cushioning foam, plywood, veneer, metal, cork or the like.

It will be appreciated, however, that although the above-described material compositions are directed to paper- or foam-based products, the material composition of the workpiece, W, is not limited to a particular embodiment. For example, in an embodiment, the workpiece, W, may alternatively include, for example, an edible foodstuff material. In an embodiment, the edible foodstuff material, W, may include, for example, any type of material that is consumable by animalia (e.g., human beings, animals or the like) that provides nutritional value to the animalia. Exemplary foodstuff workpieces may include, but are not limited to, for example: fondant, gum paste, sheet icing, liquorices, dried fruit, fruit leather (FRUIT ROLL-UPS®, FRUIT WINDERS®, FRUIT BY THE FOOT®), tortillas, cheese or the like. Fondant may alternatively be referred to as "rolled fondant," "fondant icing" or "poured fondant." Accordingly, in an embodiment, a user may utilize the crafting apparatus 10 in order to conduct work upon (e.g., print editable ink [e.g., food coloring] upon and/or cut), for example, "rolled fondant," W. Thus, the worked-on "rolled fondant," W, may then be discharged/removed from the crafting apparatus 10 and applied to, for example, a baked good, such as, for example, a confectionary, cake, pastry, candy or the like.

Referring to FIG. 1, the workpiece, W, is shown to be at least partially disposed within the crafting apparatus 10 in order to permit the crafting apparatus 10 to conduct work on the workpiece, W. In an embodiment, the crafting apparatus 10 may be utilized in a variety of environments when conducting work on the workpiece, W. In an embodiment, for example, the crafting apparatus 10 may be located within one's home and may be connected to an external computer system (e.g., a desktop computer, a laptop computer, or the like) such that a user may utilize software that may be run by the external computer system in order for the crafting apparatus 10 to conduct work on the workpiece, W.

Alternatively, in an embodiment, the crafting apparatus 10 may be referred to as a "stand alone system" that integrally includes, for example, one or more of an on-board monitor, an on-board keyboard, an on-board processor and the like (not shown). Because the crafting apparatus 10 may integrally include one or more of an on-board monitor, on-board keyboard and on-board processor, the crafting apparatus 10 may operate independently of and does not need to be connected to an external computer system (not shown) in order to permit the crafting apparatus 10 to conduct work on the workpiece, W.

Further, in an embodiment, it will be appreciated that the crafting apparatus 10 may include any desirable size, shape or configuration. In an embodiment, the crafting apparatus 10 may be sized to work on a relatively large workpiece, W (e.g., a large workpiece, W, may include, for example, plotting paper). Alternatively, in an embodiment, the crafting apparatus 10 may work on a relatively small workpiece, W; accordingly, in an embodiment, because the crafting apparatus 10 may operate independently of an external computer system, and may be sized to work on relatively small workpieces, the crafting apparatus 10 may be said to be a "portable" crafting apparatus 10. Thus, because the crafting apparatus 10 may be said to be "portable," it will be appreciated that the crafting apparatus 10 may be sized to form a relatively compact shape/size/geometry that permits a user to easily carry/move the crafting apparatus 10 from, for example, one's home to, for example, a friend's home where the friend may be hosting, for example, a "scrapbooking party."

In an embodiment, as seen in FIG. 1, the crafting apparatus 10 includes a body 14. In an embodiment, the body 14 may form an interior compartment 16 that houses one or more assemblies 18 including one or more working components 20 that perform work (e.g., printing and/or cutting) upon/into the workpiece, W. Further, in an embodiment, the interior compartment 16 may form a passage 22 that may extend through a width, 10w, of the crafting apparatus 10 from a front side 24 to a rear side 26 of the crafting apparatus 10. Functionally, the passage 22 permits the workpiece, W, to be at least partially disposed within the crafting apparatus 10; when at least partially disposed within the crafting apparatus 10, the workpiece, W, may be arranged in a substantially opposing relationship with respect to the one or more working components 20.

With further reference to FIG. 1, the crafting apparatus 10 is further described to include a first opening 28. In an embodiment, the first opening 28 is formed in the front side 24 of the crafting apparatus 10. In an embodiment, the first opening 28 permits access to one or more of the interior compartment 16 and passage 22.

In an embodiment, the crafting apparatus 10 may also include a second opening 30 (see, e.g., FIGS. 3A-9B) formed in the rear side 26 of the crafting apparatus 10. The second opening 30 may be substantially similar in shape/size as the first opening 28. The second opening 30 may similarly permit access to one or more of the interior compartment 16 and passage 22.

In an embodiment, the first opening 28 may be referred to as an "insertion opening," and, the second opening 30 may be referred to as a "discharge opening." Accordingly, it will be appreciated that the workpiece, W, may be inserted into the crafting apparatus 10 by way of the insertion opening 28 and be discharged from the crafting apparatus 10 by way of the discharge opening 30 once, for example, the crafting apparatus 10 has worked on the workpiece, W. Although the openings 28, 30 may be described to be insertion/discharge openings, it will be appreciated that the crafting apparatus 10 may be designed to operate in any desirable manner such that a workpiece, W, may be inserted into the opening 30 and discharged from the opening 28.

In an embodiment, the crafting apparatus 10 may further comprise a first door 32 and a second door (not shown). The first door 32 may be pivotably-connected to the crafting apparatus 10 by a hinged connection 34 in order to permit or deny access to one or more of the interior compartment 16 and passage 22 by way of the insertion opening 28. Similarly, the second door may be pivotably-connected to the crafting apparatus 10 by a hinged connection (not shown) in order to permit or deny access to one or more of the interior compartment 16 and passage 22 by way of the discharge opening 30.

In an embodiment, the crafting apparatus 10 may or may not operate in conjunction with a mat, 36. In an embodiment, the crafting apparatus 10 and the mat 36 may be referred to as a scrapbooking kit. As will be described in the foregoing disclosure, the mat 36 supports the workpiece, W, as the workpiece, W, is advanced through the crafting apparatus 10. However, it will be appreciated that the workpiece, W, may be advanced through the crafting apparatus 10 without the utilization of the mat 36.

In an embodiment, one of the first, front surface, $W_F$, and the second, rear surface, $W_R$, of the workpiece, W, may be disposed substantially adjacent an upper support surface 38 of the mat 36. In an embodiment, the mat 36 may functionally support the workpiece, W, before/during/after the period of time that the crafting apparatus 10 works on the workpiece, W. Further, in an embodiment, the mat 36 may be formed from a material, such as, for example, a plastic material, that resists deformation by the blade 12*a* when the blade 12*a*, penetrates through the thickness, $W_T$, of the workpiece, W; further, it will be appreciated that the upper support surface 38 of mat 36 may include, for example, a tacky surface that permits the workpiece, W, to be removably-coupled to the mat 36.

Figure 2:
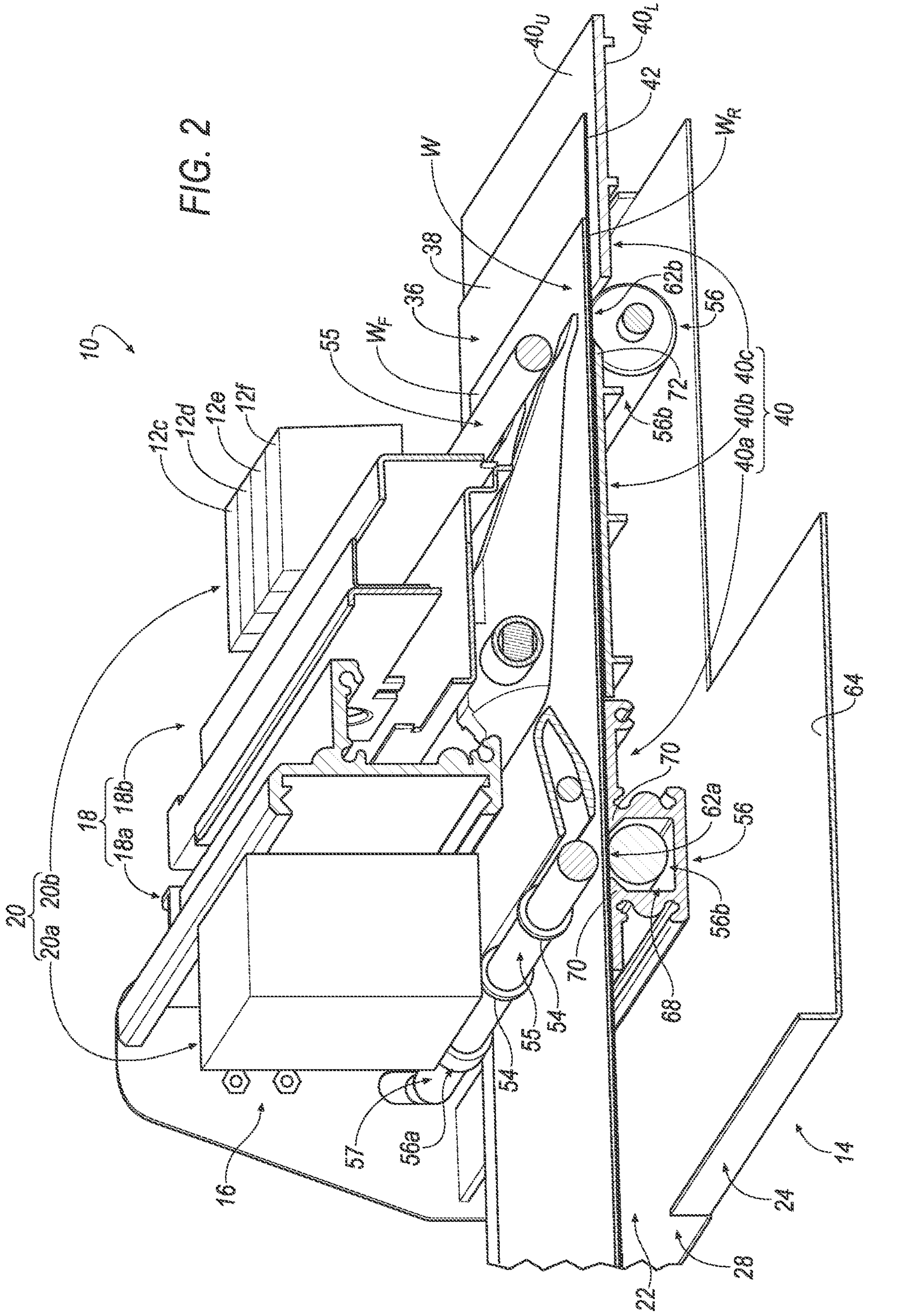
FIG. 2 is a partial, cut-away, cross-sectional view of the crafting apparatus according to line 2-2 of FIG. 1 in accordance with an exemplary embodiment of the invention.

Referring to FIG. 2, a partial, cut-away view of the body 14 of the crafting apparatus 10 is shown in order to provide a view of an embodiment of the one or more assemblies 18 including one or more working components 20 housed within interior compartment 16. Further, in an embodiment, as seen in FIG. 2, the crafting apparatus 10 further comprises a support assembly 40.

In an embodiment, the support assembly 40 may include a first support portion 40*a*, a second support portion 40*b* and a third support portion 40*c*. Although the cross-sectional hatching of the support assembly 40 indicates that the first, second and third support portions 40*a*-40*c* are unique segments, which may be formed from different materials, it will be appreciated that the first, second and third support portions 40*a*-40*c* may include the same material and may be formed from a single body that may be demarcated to form the support assembly 40 into three unique segments.

In an embodiment, the support assembly 40 may include a first, upper support surface $\mathbf{40}_U$ and a second, lower surface $\mathbf{40}_L$. In an embodiment, it will be appreciated that each of the first, second and third support portions 40*a*-40*c* form a segment of the first, upper support surface $\mathbf{40}_U$ and the second, lower surface $\mathbf{40}_L$. Further, in an embodiment, it will be appreciated that each segment of the first, upper support surface $\mathbf{40}_U$ and the second, lower surface $\mathbf{40}_L$ formed by each of the first, second and third support portions 40*a*-40*c* may not be co-planar with one another.

In an embodiment, the first, upper support surface $\mathbf{40}_U$ supports one or more of the mat 36 and workpiece, W. In an embodiment, one or more of a lower support surface 42 of the mat 36 and the second, rear surface, $W_R$, of the workpiece, W, may be disposed substantially adjacent the first, upper support surface $\mathbf{40}_U$ of the support assembly 40.

In an embodiment, the one or more working assemblies 18 include a first working assembly 18*a* and a second working assembly 18*b*. In an embodiment, the first working assembly 18*a* may include a first working component 20*a*. In an embodiment, the second working assembly 18*b* may include a second working component 20*b*.

Referring to FIGS. 3A-6B, in an embodiment, the first working component 20*a* includes the blade 12*a*. Accordingly, in an embodiment, the first working assembly 18*a* may be referred to as a "cutting head."

With continued reference to FIGS. 3A-6B, in an embodiment, the second working component 20*b* includes the nozzle 12*b*. Accordingly, in an embodiment, the second working assembly 18*b* may be referred to as a "printing head." In an embodiment, as seen in FIG. 2, the printing head 18*b* may further comprise one or more cartridges 12*c*-12*f* that contain one or more colors of ink, I, that are in fluid communication with the nozzle 12*b*.

Although it has been described above that the crafting apparatus 10 may include one or more working assemblies 18 including a first working assembly 18*a* and a second working assembly 18*b* each respectively including a first working component 20*a* and a second working component 20*b*, it will be appreciated that the crafting apparatus 10 is not limited to such an embodiment. For example, as seen in FIGS. 7A-9B, in an embodiment, the crafting apparatus 10 may include one working assembly 18' that includes one working component 20'. In an embodiment, the one working component 20' may be referred to as a hybrid working component 20' that includes both of the blade 12*a* and the nozzle 12*b*.

As described above, the workpiece, W, is not limited to a particular size, shape, geometry or configuration. Accordingly, it will be appreciated that the crafting apparatus 10 may work on a variety of different workpieces, W, that may each include a different thickness, WT. For example, as seen in FIGS. 3A, 4A, 5A, 6A, 7A, 8A, 9A, a workpiece, W, includes a thickness, $W_T$, that may be comparatively less than a thickness, $W_T$, of a workpiece, W, that is shown in FIGS. 3B, 4B, 5B, 6B, 7B, 8B, 9B. Accordingly, in an embodiment, for example, a thickness, $W_T$, of a workpiece, W, may depend upon, for example, the type of material composition/use of the workpiece, W (i.e., the thickness, $W_T$, of a sheet of paper, W, may be substantially less than that of the thickness, $W_T$, of a sheet of cardboard, W). Thus, it will be appreciated that because the thickness, $W_T$, of a workpiece, W, is typically not the same for all workpieces, W, the crafting apparatus 10 may include an adjustment assembly 50'-50"" (see, e.g., FIGS. 3A-9B) that may permit one of workpiece, W, and the one or more components (e.g., the blade 12*a*/the nozzle 12*b*) of the assemblies 18, 18' to be spaced away from the other of the workpiece, W, and the one or more components of the assemblies 18, 18'.

In an embodiment, the spaced distance between workpiece, W, and the one or more components of the assemblies 18, 18' is shown generally at D1 and D2 in FIGS. 3A-9B. In an embodiment, the spaced distance, D1, may be generally referenced from a distal end 44 of the blade 12*a* of the cutting head 18*a* and the first, upper surface, $W_F$, of the workpiece, W. In an embodiment, the spaced distance, D2, may be generally referenced from a distal end 46 of the nozzle 12*b* of the printing head 18*b* and the first, upper surface, $W_F$, of the workpiece, W.

Although it has been described above that the workpiece, W, is not limited to a particular size, shape, geometry or configuration, it will be appreciated that, in some circumstances, the thickness, $W_T$, of the workpiece, W, may be limited according to a length, $12a_L$, of the blade 12*a* (i.e., in some circumstances, if it is desired to cut the workpiece, W, into two parts, P1, P2, the length, $12a_L$, of the blade 12*a* may have to be sized to include a length that may be approximately equal to that of the thickness, $W_T$, of the workpiece, W). However, it will be appreciated that this perceived limitation may be overcome by permitting the blade 12*a* to be selectively extended away from a blade-retaining body 48 of the first working component 20*a* in order to selectively increase the length, $12a_L$, of the blade 12*a;* accordingly, if the length, $12a_L$, of the blade 12*a* may be permitted to be lengthened, the crafting apparatus 10 may be generally permitted to work on a workpiece, W, having any particular thickness, $W_T$.

With continued reference to FIGS. 3A-9B, prior to operating the adjustment assembly 50'-50"", one or more of the workpiece, W, and the mat 36 may be inserted into the crafting apparatus 10 by way of one of the first opening 28 and the second opening 30. Once inserted through one of the first and second openings 28, 30, one or more of the workpiece, W, and mat 36 may be retained to the crafting apparatus 10 by one or more tensioning devices 52.

In an embodiment, the one or more tensioning devices 52 may include, for example, one or more workpiece-engaging rollers 54, one or more mat-engaging rollers 56 and one or more spring members 58. In an embodiment, the one or more workpiece-engaging rollers 54 may be arranged proximate the first, upper support surface $40_U$ of the support assembly 40 whereas the one or more mat-engaging rollers 56 may include a first, upper mat-engaging roller 56*a* and a second, lower mat-engaging roller 56*b* that are respectively arranged in an opposing relationship proximate each of the first, upper support surface $40_U$ and the second, lower surface $40_L$ of the support assembly 40.

In an embodiment, the spring 58 couples the first, upper mat-engaging roller 56*a* to the second, lower mat-engaging roller 56*b* of the one or more mat-engaging rollers 56. In an embodiment, the spring member 58 may be orientated in one of an expanded state (see, e.g., FIGS. 3A-9B) and a non-expanded state (see, e.g., FIGS. 10A-10B). In an embodiment, as seen in FIGS. 10A-10B, when the spring member 58 is arranged in the non-expanded state, the first and second mat-engaging rollers 56*a,* 56*b* may contact and directly engage one another. However, as seen in FIGS. 3A-9B, when at least the mat 36 is interveningly-disposed between the first upper mat-engaging roller 56*a* and the second lower mat-engaging roller 56*b,* the spring member 58 may be said to be arranged in an expanded state.

Accordingly, in an embodiment, it will be appreciated that in addition to coupling the first upper mat-engaging roller 56*a* and the second lower mat-engaging roller 56*b,* the spring member 58 may also provide the function of biasing the first upper mat-engaging roller 56*a* and the second lower mat-engaging roller 56*b* to be located in an orientation such that the first upper mat-engaging roller 56*a* may be substantially directly engaged with the second lower mat-engaging roller 56*b,* as seen in FIGS. 10A-10B. As such, it will be appreciated that the bias imparted by the spring member 58 may cause the first upper mat-engaging roller 56*a* and the second lower mat-engaging roller 56*b* to retain/"pinch" at least the mat 36 when one or more of the workpiece, W, and the mat 36 is/are inserted through the passage 22.

Referring to FIG. 1, in an embodiment, the one or more workpiece-engaging rollers 54 may be arranged about a tube, rod or substantially cylindrical shaft 55. In an embodiment, at least one first upper mat-engaging roller 56*a* may be secured proximate a terminal end 57 of the substantially cylindrical shaft 55. Functionally, in an embodiment, the one or more workpiece-engaging rollers 54 engage the first, upper surface, $W_F$, of the workpiece, W, in order to further secure the workpiece, W, to the mat 36. Functionally, in an embodiment, the first upper mat-engaging roller 56*a* engages the upper support surface 38 proximate a lateral edge 39 of the mat 36 whereas the second lower mat-engaging roller 56*b* engages the lower surface 42 of the mat 36; in an embodiment, as will be explained in the forgoing disclosure, rotation of the second lower mat-engaging roller 56*b* may result in the advancement of the mat 36 through the passage 22. Accordingly, because the workpiece, W, may be removably-secured to the mat 36, the workpiece, W, may be moved through the passage 22 upon movement of the mat 36 in response to rotation of the rollers 56*a*, 56*b*.

Referring to FIGS. 3A-9B, in an embodiment, the one or more tensioning devices 52 may further comprise a driving member 60 and a pulley 61. In an embodiment, the pulley 61 couples the driving member 60 to the second lower mat-engaging roller 56*b*. In an embodiment, when the driving member 60 is rotated, movement is imparted to the pulley 61 in order to cause the pulley 61 to cause rotation of the second lower mat-engaging roller 56*b*.

In an embodiment, the driving member 60 may be grounded to structure 64 of the body 14 within the interior compartment 16. In an embodiment, the driving member 60 may include a prime mover, such as, for example, a motor.

Referring to FIG. 1, the substantially cylindrical shaft 55 may extend through a trough 66 formed by the body 14 for substantially retaining an axis of rotation of the substantially cylindrical shaft 55 in a laterally-fixed orientation relative the width, $10_W$, of the crafting apparatus 10. Similarly, in an embodiment, as seen in FIGS. 3A-9B, the second lower mat-engaging roller 56*b* of at least a first tensioning device 52*a* of the one or more tensioning devices 52 may extend through a trough 68, which may be formed by, for example, the first support portion 40*a* for substantially retaining the axis of rotation of the second lower mat-engaging roller 56*b* in a laterally-fixed orientation relative the width, $10_W$, of the crafting apparatus 10.

As seen in FIGS. 3A-9B, the support assembly 40 may form one or more passages 62. In an embodiment, the one or more passages 62 may permit the first upper mat-engaging roller 56*a* to be in direct/indirect communication with the second lower mat-engaging roller 56*b* as described above.

In an embodiment, a first passage 62*a* of the one or more passages 62 may be formed by the first support portion 40*a* of the support assembly 40. In an embodiment, a first tensioning device 52*a* of the one or more tensioning devices 52 may be arranged relative the first passage 62*a*.

In an embodiment, the first support portion 40*a* may include a pair of inwardly-projecting flanges 70 located proximate the trough 68 that further define a cross-sectional geometry of first passage 62*a*. In an embodiment, the pair of inwardly-projecting flanges 70 form the first passage 62*a* to include a dimension that is less than a dimension (i.e., a diameter) of the second lower mat-engaging roller 56*b* of the first tensioning device 52*a*; accordingly, when no workpiece, W, and/or mat 36 is disposed between the first upper mat-engaging roller 56*a* and the second lower mat-engaging roller 56*b* of the first tensioning device 52*a*, the pair of inwardly-projecting flanges 70 may prevent the second lower mat-engaging roller 56*b* from being moved past the second, lower surface $40_L$ and through the first passage 62*a*.

In an embodiment, a second passage 62*b* of the one or more passages 62 may be formed by a spaced-apart relationship of the second support portion 40*b* and the third support portion 40*c*. In an embodiment, a second tensioning device 52*b* of the one or more tensioning devices 52 may be arranged relative the second passage 62*b*.

In an embodiment, one or more of the second and third support portions 40*b*, 40*c* may include an inwardly-projecting flange 72 that further define a cross-sectional geometry of the second passage 62*b*. In an embodiment, the inwardly-projecting flange 72 forms the second passage 62*b* to include a dimension that is less than a dimension (i.e., a diameter) of the second lower mat-engaging roller 56*b* of the second tensioning device 52*b*; accordingly, when no workpiece, W, and/or mat 36 is disposed between the first upper mat-engaging roller 56*a* and the second lower mat-engaging roller 56*b* of the second tensioning device 52*b*, the inwardly-projecting flange 72 may prevent the second lower mat-engaging roller 56*b* from being moved past the second, lower surface $40_L$ and through the second passage 62*b*.

Figure 11:
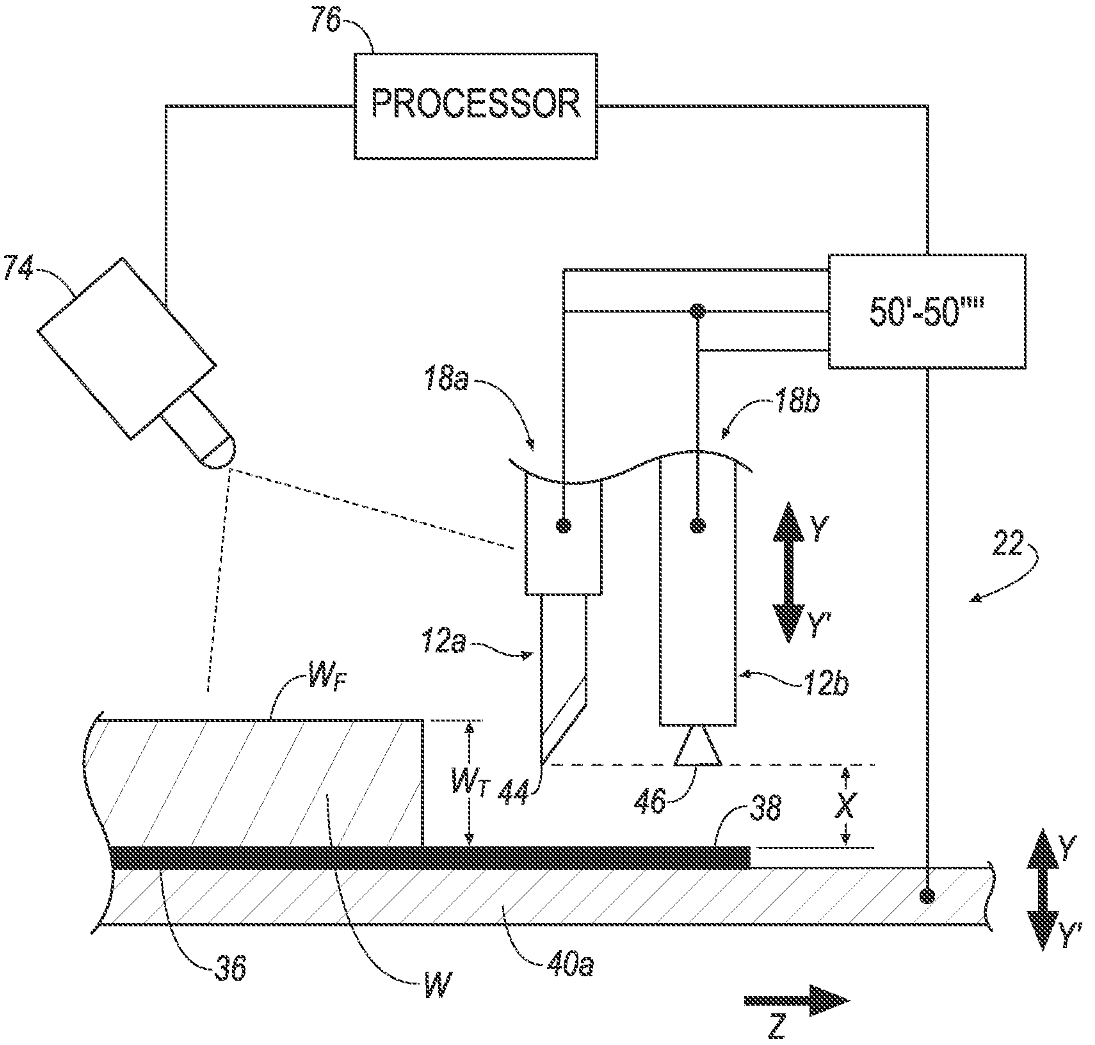
FIG. 11 is a schematic view of the crafting apparatus of FIGS. 3A-9B in accordance with an exemplary embodiment of the invention.

Referring to FIG. 11, an operation of the adjustment assembly 50'-50"" is described in accordance with an embodiment of the invention. In an embodiment, the actuation of the adjustment assembly 50'-50"" may include the utilization of one or more of a sensing device 74 and a processor 76. For example, in an embodiment, one or more of the sensing device 74 and the processor 76 may sense and/or be initially provided with an initial distance/spacing, X, of the distal end 44/46 of the blade 12*a*/nozzle 12*b* relative the upper support surface 38 of the mat 36. Then, as the mat 36 (which, in the illustrated embodiment, includes the workpiece, W, attached thereto) is initially inserted into the passage 22 according to the direction of the arrow, Z, the sensing device 74 may sense/determine the thickness, $W_T$, of the workpiece, W; accordingly, the processor 76 may subsequently receive the information pertaining to the sensed/determined thickness, $W_T$, from the sensing device 74 in order to compare the thickness, $W_T$, of the workpiece, W, with that of the initial distance/spacing, X, of the distal end 44/46 of the blade 12*a*/nozzle 12*b* relative the upper support surface 38 of the mat 36.

In an embodiment, if the processor 76 determines that the thickness, $W_T$, of the workpiece, W, is greater than the initial distance/spacing, X, the processor 76 may actuate the adjustment assembly 50'-50"" to move one or both of the blade 12*a*/nozzle 12*b* and the workpiece, W, away from one another according to the direction of the arrows, Y, Y'. In an embodiment, the movement according to the directions of the arrows, Y, Y', is described in the foregoing disclosure at FIGS. 3A-9B. Accordingly, upon moving one or both of the blade 12*a*/nozzle 12*b* and the workpiece, W, away from one another, Y, Y', a clearance or spacing between the distal end 44/46 of the blade 12*a*/nozzle 12*b* and the first, front surface, $W_F$, of the workpiece, W, may be realized; in an embodiment, the clearance or spacing is shown generally at D1, D2 in FIGS. 3A-9B in accordance with an embodiment of the invention.

Although FIG. 11 discusses an embodiment of the invention that considers a situation where the thickness, $W_T$, is greater than the distance/spacing, X, it will be appreciated that the invention may also operate under a different circumstance where the spaced distance, D1, D2, may be determined by one or more of the sensing device 74 and the processor 76 to be too great/large. In an embodiment, it will be appreciated that if, for example, the spaced distance, D1, is too large, the blade 12*a* may not be able to penetrate the entire thickness, $W_T$, of the workpiece, W. Further, in an embodiment, it will be appreciated that if, for example, the spaced distance, D2, is too large, the ink, I, dispensed from the nozzle 12*b* onto the workpiece, W, may produce an inferior image (e.g., the resolution of the image may be of poor quality). Accordingly, in some circumstances as described above, it will be appreciated that one or more of the sensing device 74 and the processor 76 may move at least a portion of one or both of the one or more working assemblies 18 and the workpiece, W, toward/from one another in order to, for example, permit the blade 12*a* to penetrate the entire thickness, $W_T$, of the workpiece, W, and/or, to permit the nozzle 12*b* to deposit ink, I, onto the workpiece, W, in manner that produces an image having an acceptable resolution.

In an embodiment, the adjustment assembly 50'-50"" may include, but is not limited to any particular component(s) that may cause a movement according to the direction of arrows, Y, Y', as described above. For example, in an embodiment, the adjustment assembly 50'-50"" may include, for example, a hydraulic arm, a solenoid, a motor, or the like. Further, in an embodiment, it will be appreciated that although the schematic diagram of FIG. 11 is directed to the adjustment assembly 50'-50"" being coupled to one or more of the blade 12*a* and the nozzle 12*b*, it will be appreciated that the adjustment assembly 50'-50"" may be coupled to one or more of the working assembly 18 and working component 20 in order to cause movement according to the direction of the arrows, Y, Y', of one or more of the blade 12*a* and the nozzle 12*b*.

Referring now to FIGS. 3A-9B, the actuation of the operation of each adjustment assembly 50'-50"" is described in accordance with an embodiment of the invention. Although four unique adjustment assemblies 50'-50"" are shown, it will be appreciated that the invention is not limited to the four designs and that other equivalents may be utilized.

Figure 3A:
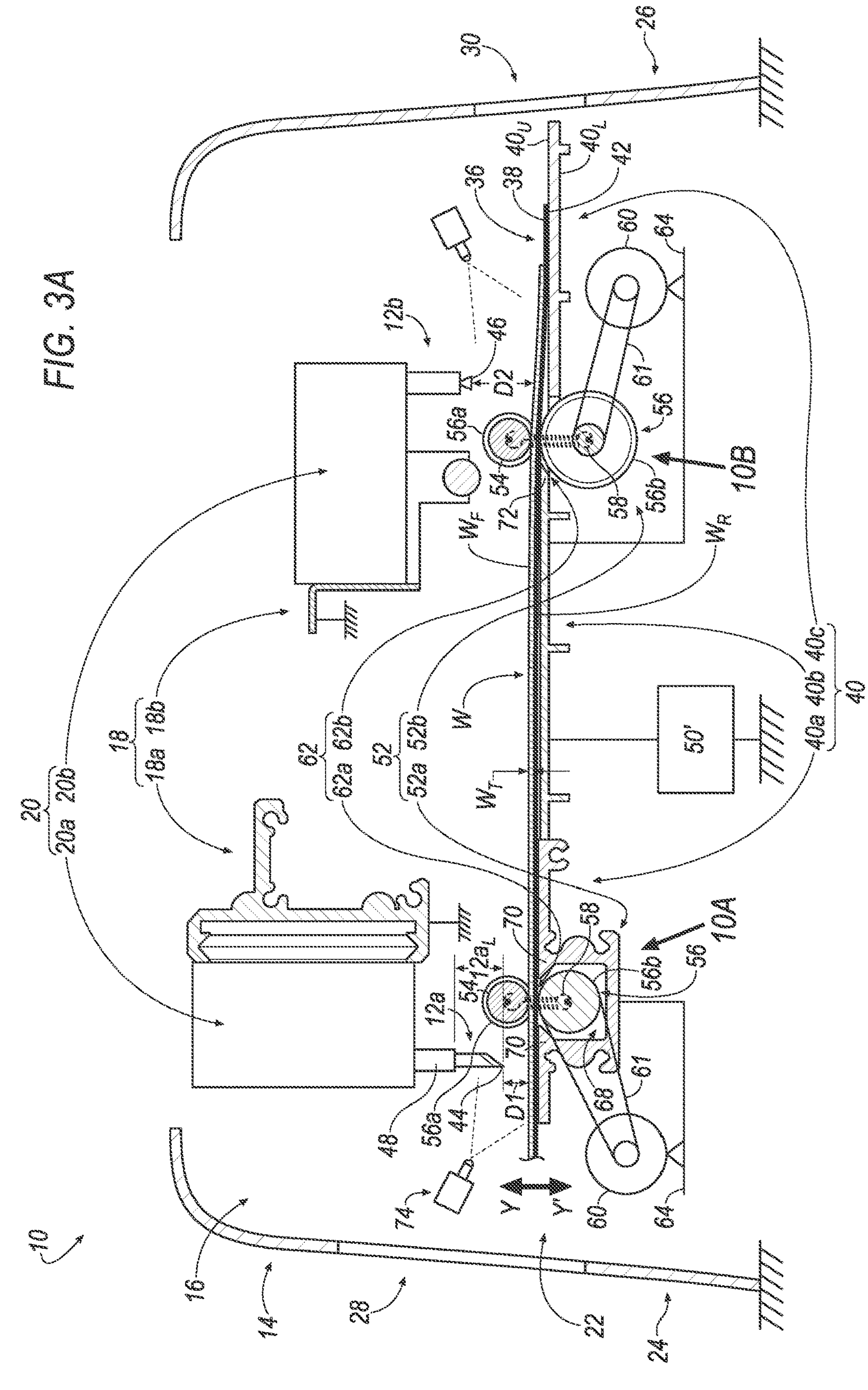
FIGS. 3A-3B illustrate a partial, cross-sectional view of a crafting apparatus in accordance with an exemplary embodiment of the invention.
Figure 3B:
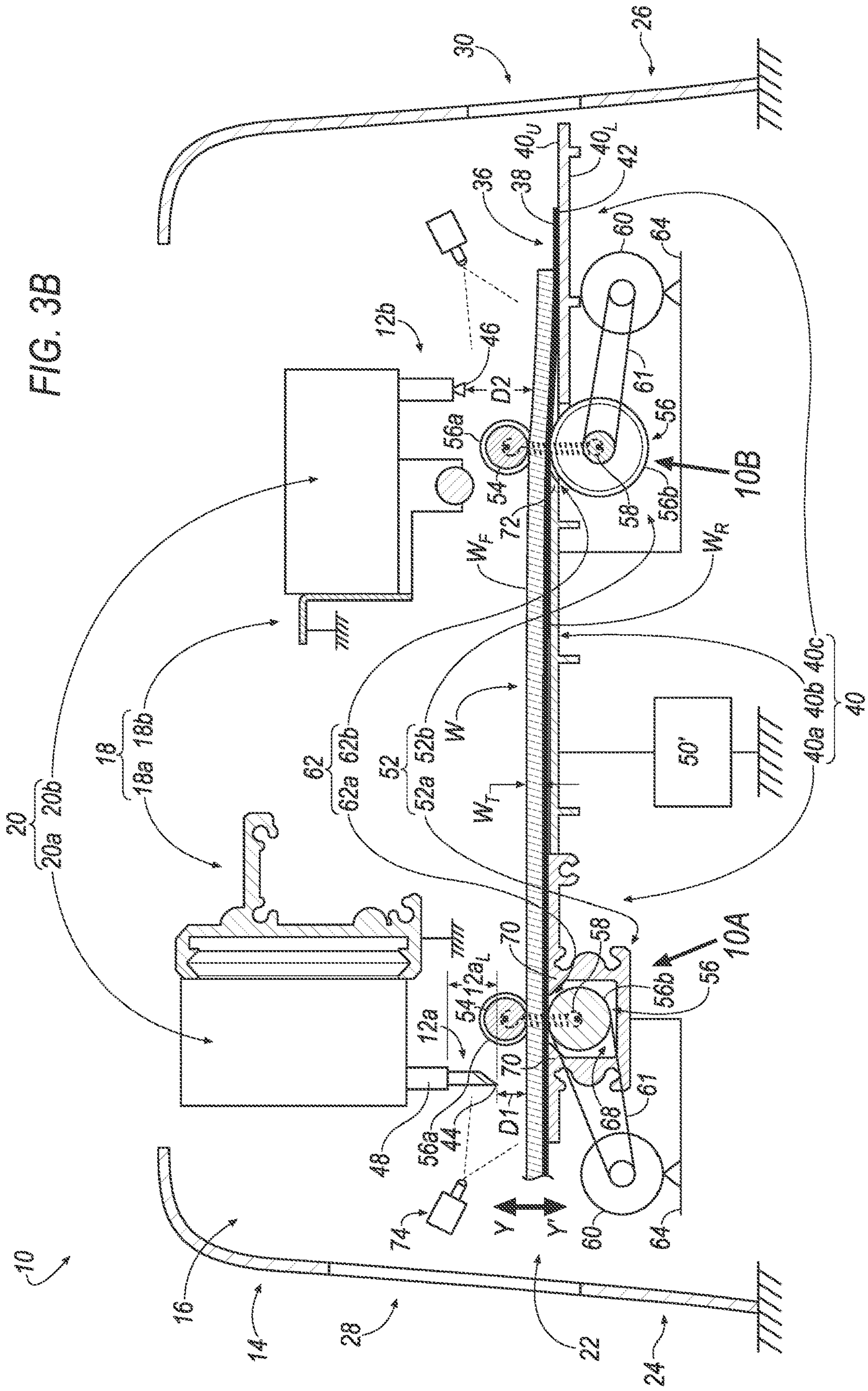

Referring to FIGS. 3A-3B, an adjustment assembly 50' is shown according to an embodiment of the invention. In an embodiment, it will be appreciated that each of the first working assembly 18*a* and the second working assembly 18*b* of the one or more working assemblies 18 are arranged within the body 14 of the crafting apparatus 10 in a fixed (e.g., mechanically grounded) orientation while the support assembly 40 may be arranged within the body 14 of the crafting apparatus 10 in a non-fixed orientation. In an embodiment, the adjustment assembly 50' may be connected to the support assembly 40 in order to move the non-fixed support assembly 40 relative the fixed one or more working assemblies 18 in one of the directions Y, Y' in order to provide a desired spaced distance, D1, D2.

Figure 4A:
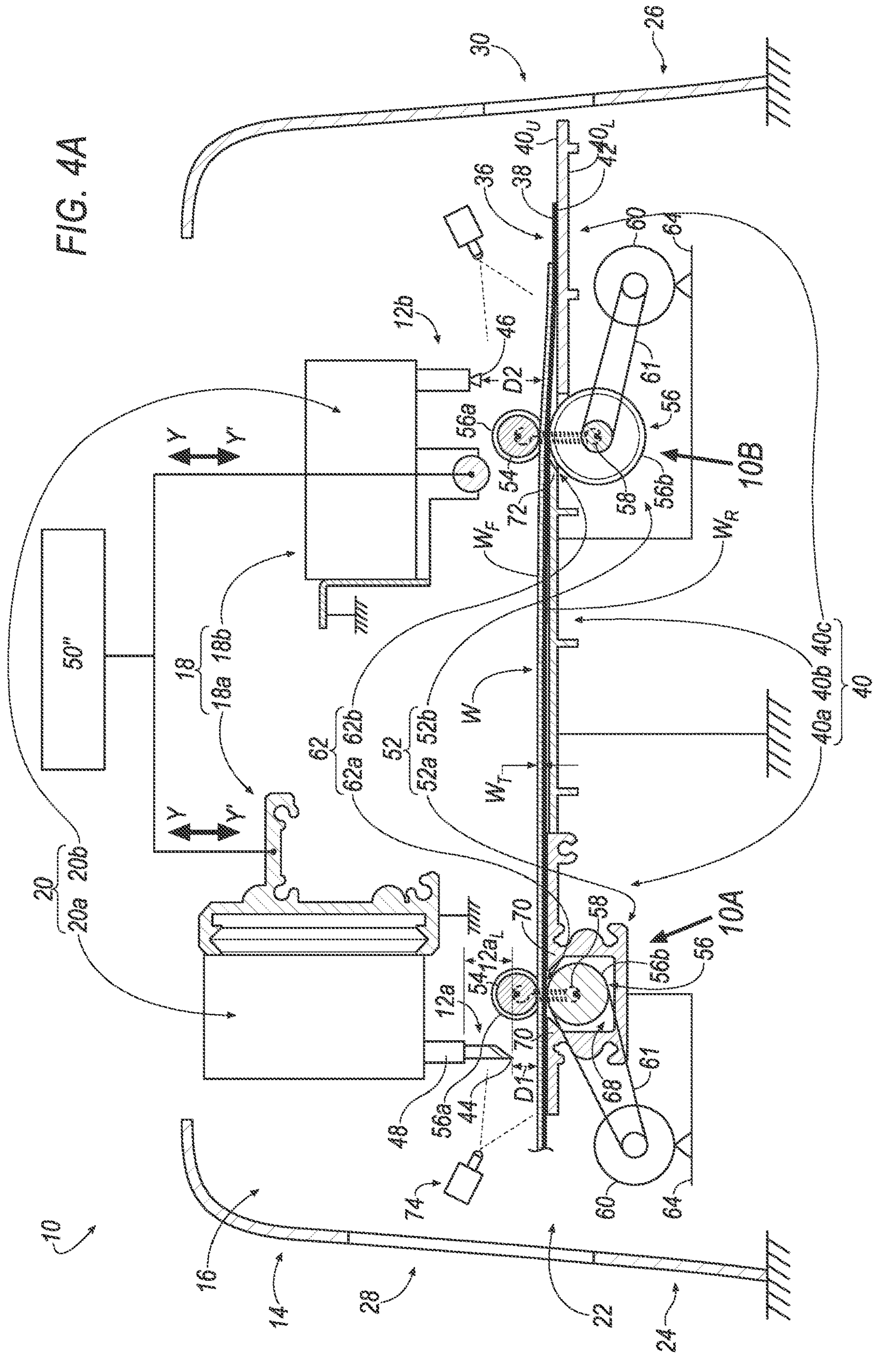
FIGS. 4A-4B illustrate a partial, cross-sectional view of a crafting apparatus in accordance with an exemplary embodiment of the invention.
Figure 4B:
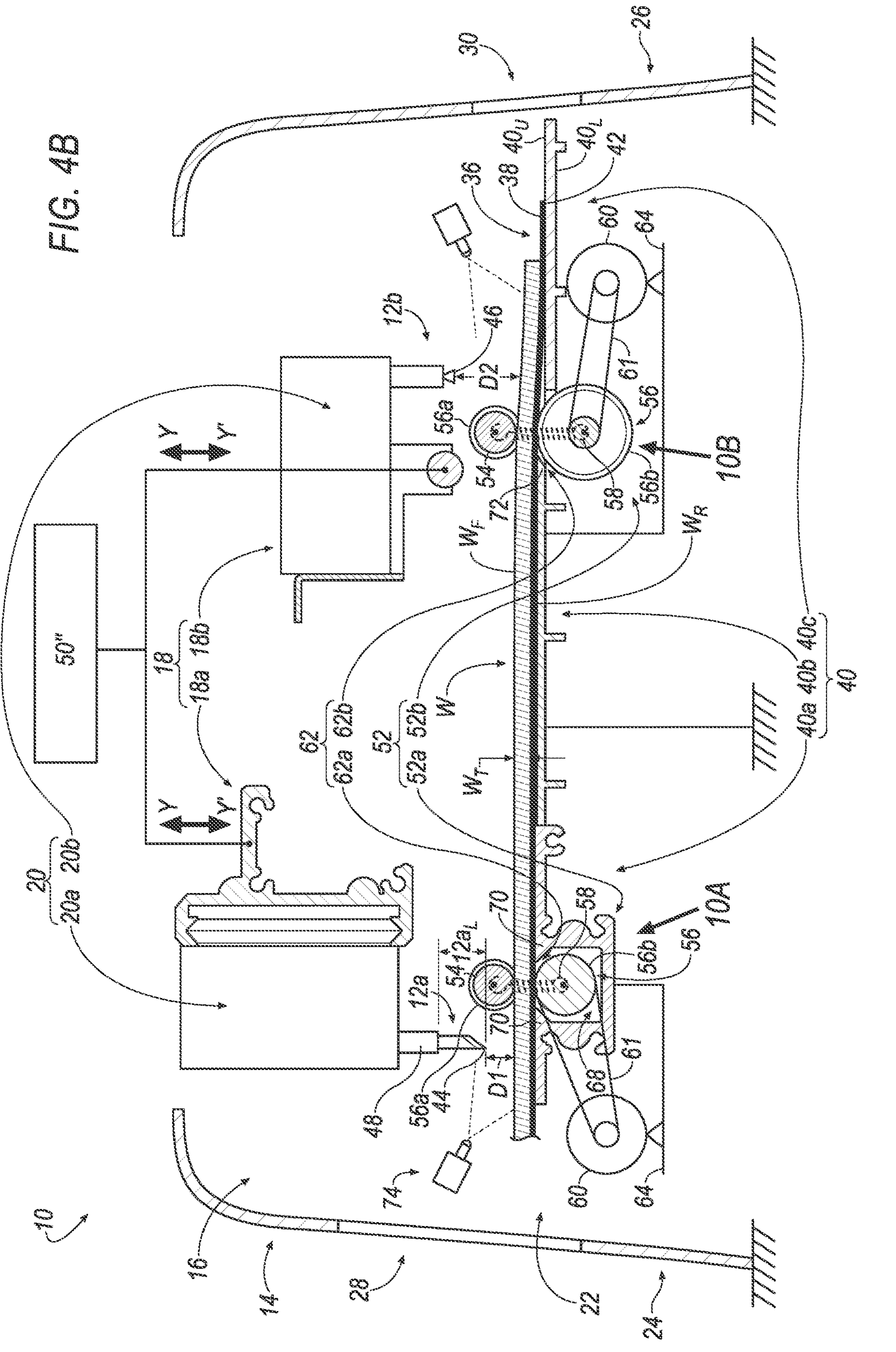

Referring to FIGS. 4A-4B, an adjustment assembly 50" is shown according to an embodiment of the invention. In an embodiment, it will be appreciated that each of the first working assembly 18*a* and the second working assembly 18*b* of the one or more working assemblies 18 are arranged within the body 14 of the crafting apparatus 10 in a non-fixed orientation while the support assembly 40 may be arranged within the body 14 of the crafting apparatus 10 in a fixed orientation. In an embodiment, the adjustment assembly 50" may be commonly connected to both of the first and second working assemblies 18*a*, 18*b* in order to simultaneously move the non-fixed first and second working assemblies 18*a*, 18*b* relative the fixed support assembly 40 in one of the directions Y, Y' in order to provide a desired spaced distance, D1, D2.

Figure 5A:
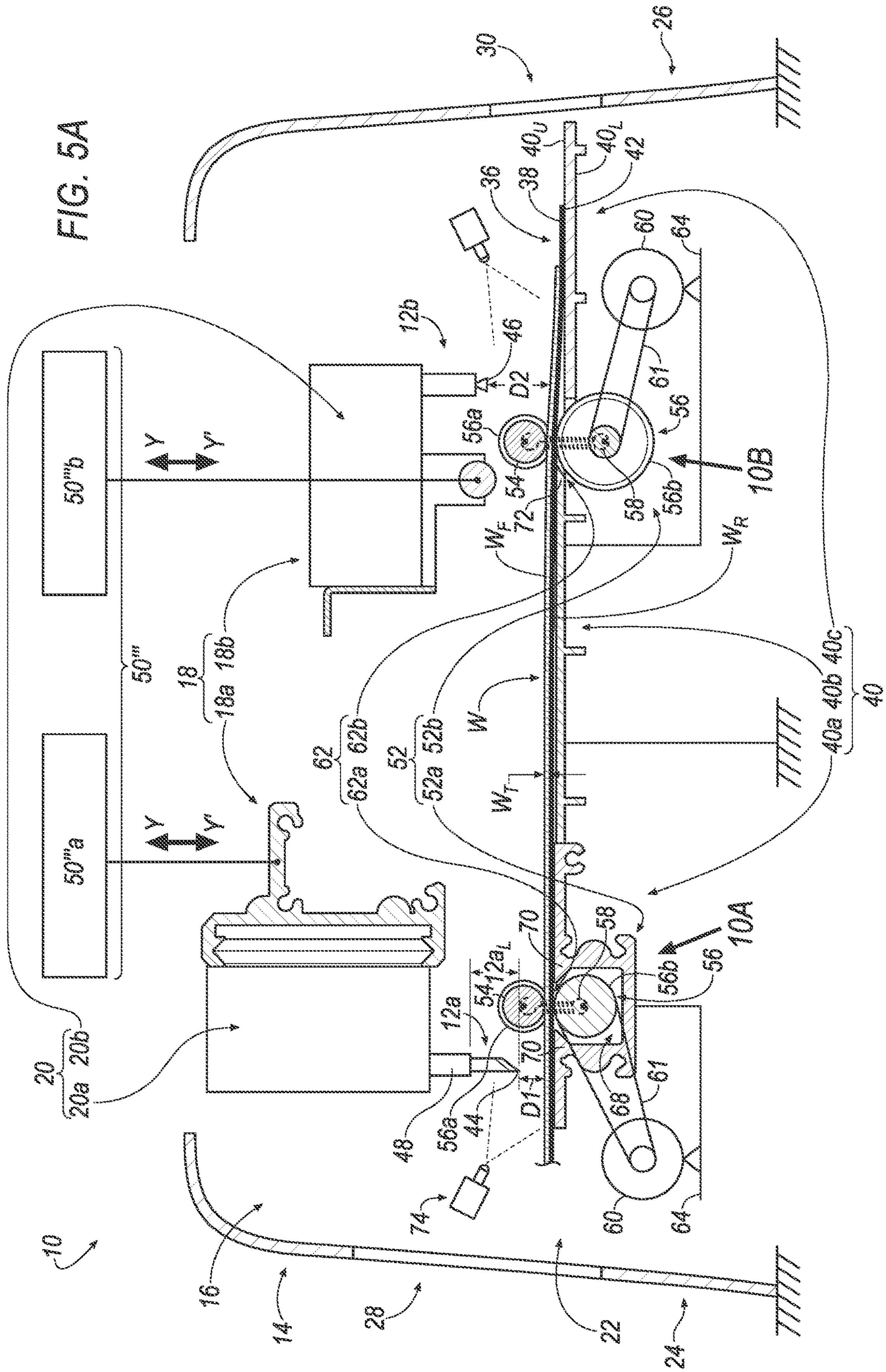
FIGS. 5A-5B illustrate a partial, cross-sectional view of a crafting apparatus in accordance with an exemplary embodiment of the invention.
Figure 5B:
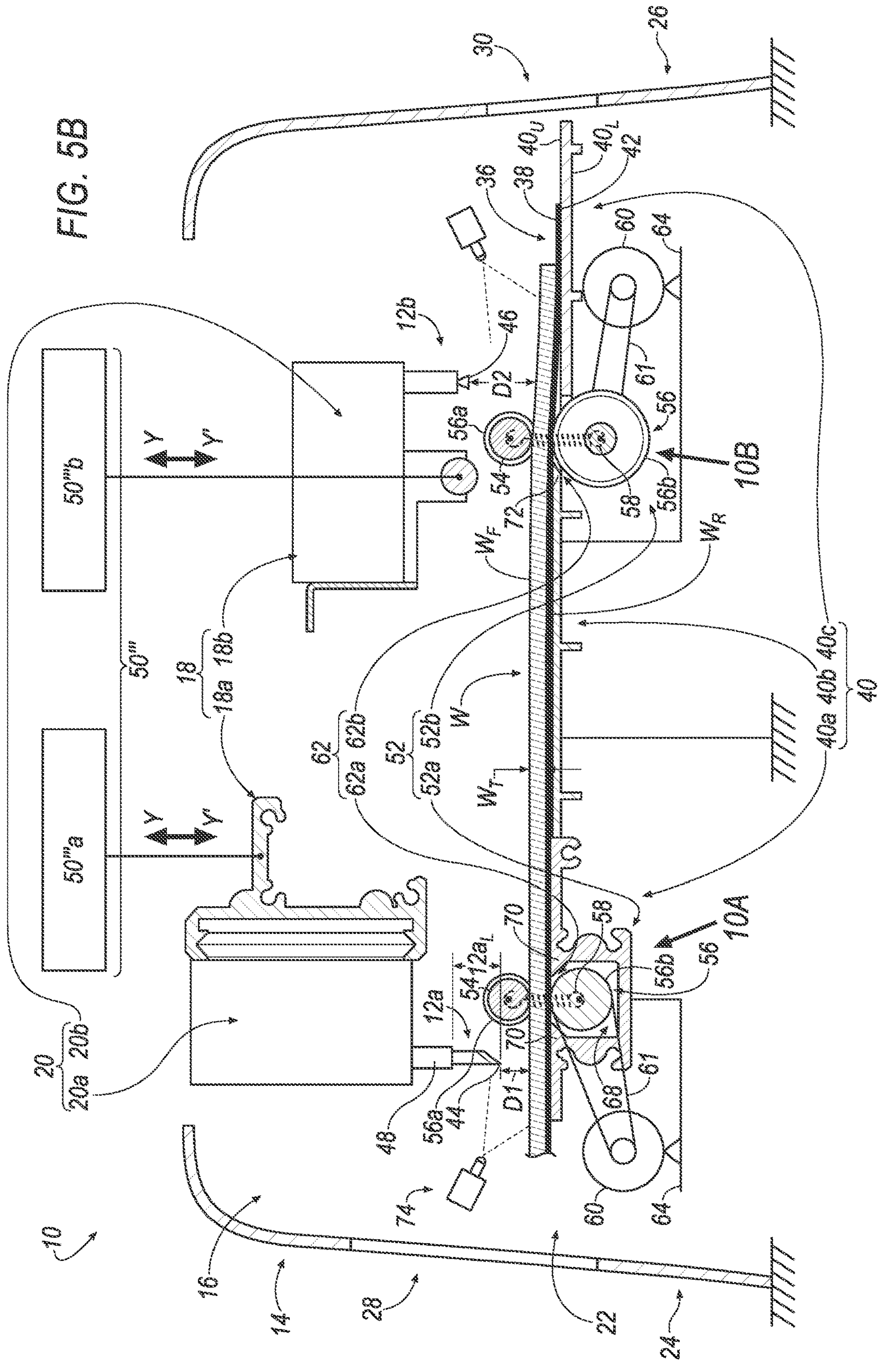

Referring to FIGS. 5A-5B, an adjustment assembly 50''' is shown according to an embodiment of the invention. In an embodiment, it will be appreciated that each of the first working assembly 18*a* and the second working assembly 18*b* of the one or more working assemblies 18 are arranged within the body 14 of the crafting apparatus 10 in a non-fixed orientation while the support assembly 40 may be arranged within the body 14 of the crafting apparatus 10 in a fixed orientation. In an embodiment, the adjustment assembly 50''' may be substantially similar to the adjustment assembly 50" in that the adjustment assembly 50''' may be connected to the first and second working assemblies 18*a*, 18*b*; however, the first working assembly 18*a* may be independently connected to an adjustment sub-assembly 50'''*a* of the adjustment assembly 50''' as the second working assembly 18*b* may be independently connected to an adjustment sub-assembly 50'''*b* of the adjustment assembly 50'''. Because the first and second working assemblies 18*a*, 18*b* are independently connected to the adjustment sub-assemblies 50'''*a*, 50'''*b*, it will be appreciated that each of the first and second working assemblies 18*a*, 18*b* may be independently moved relative the fixed support assembly 40 in one of the directions Y, Y' in order to provide a desired spaced distance, D1, D2.

Figure 6A:
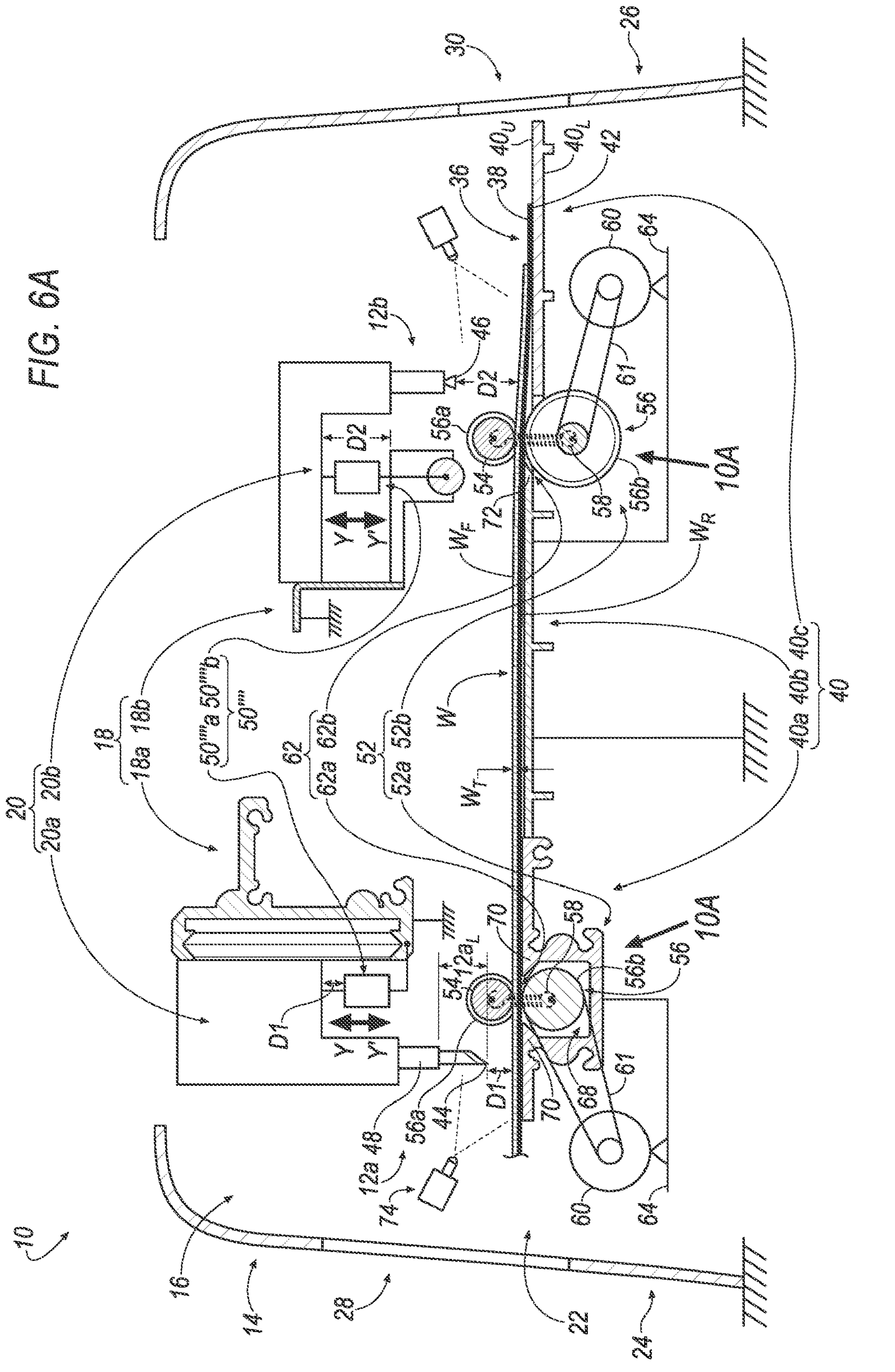
FIGS. 6A-6B illustrate a partial, cross-sectional view of a crafting apparatus in accordance with an exemplary embodiment of the invention.
Figure 6B:
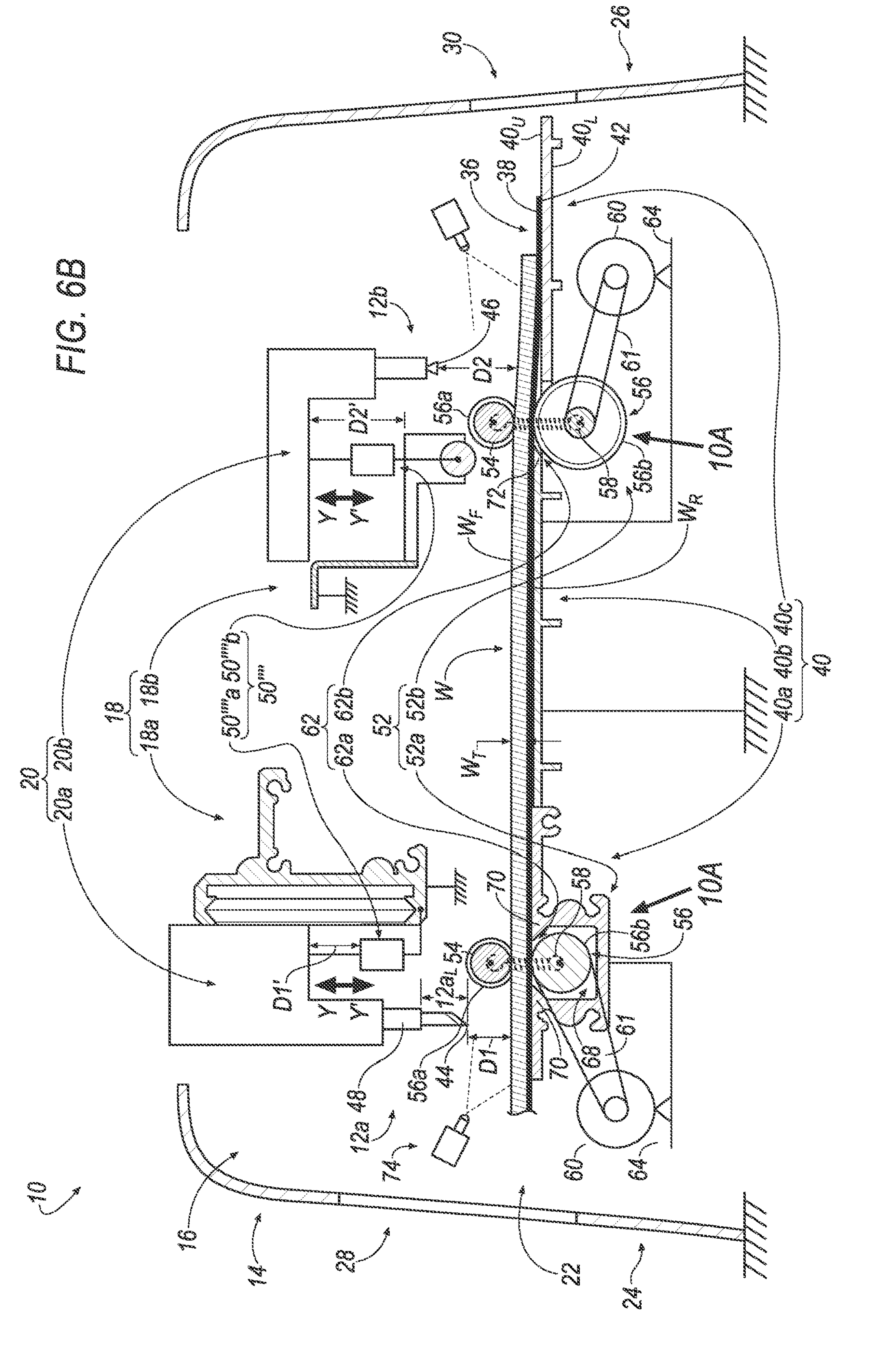

Referring to FIGS. 6A-6B, an adjustment assembly 50"" is shown according to an embodiment of the invention. In an embodiment, it will be appreciated that the first working component 20*a* and the second working component 20*b* are arranged within the body 14 of the crafting apparatus 10 in a non-fixed orientation while the first working assembly 18*a*, the second working assembly 18*b* and the support assembly 40 may be arranged within the body 14 of the crafting apparatus 10 in a fixed orientation. In an embodiment, the first working component 20*a* may be movably-coupled relative the fixed, first working assembly 18*a* by way of, for example, an adjustment sub-assembly 50""*a* of the adjustment assembly 50"", and, in an embodiment, the second working component 20*b* may be movably-coupled relative the fixed, second working assembly 18*b* by way of, for example an adjustment sub-assembly 50""*b* of the adjustment assembly 50"". Because the first and second working components 20*a*, 20*b* are independently movable, it will be appreciated that each of the first and second working components 20*a*, 20*b* may be independently moved relative the fixed first working assembly 18*a*, the fixed second working assembly 18*b* and the fixed support assembly 40 in one of the directions Y, Y' in order to provide a desired spaced distance, D1, D2.

Referring now to FIGS. 7A-9B, the crafting apparatus 10 is shown to include the one working assembly 18' having the hybrid working component 20' that includes both of the blade 12*a* and the nozzle 12*b*. Because a first working assembly 18*a* and a second working assembly 18*b* are not included in the design of the crafting apparatus 10 shown at FIGS. 7A-9B, it will be appreciated that some of the adjustment assemblies 50'-50"" may be modified from what is shown and described above at FIGS. 3A-6B.

Figure 7A:
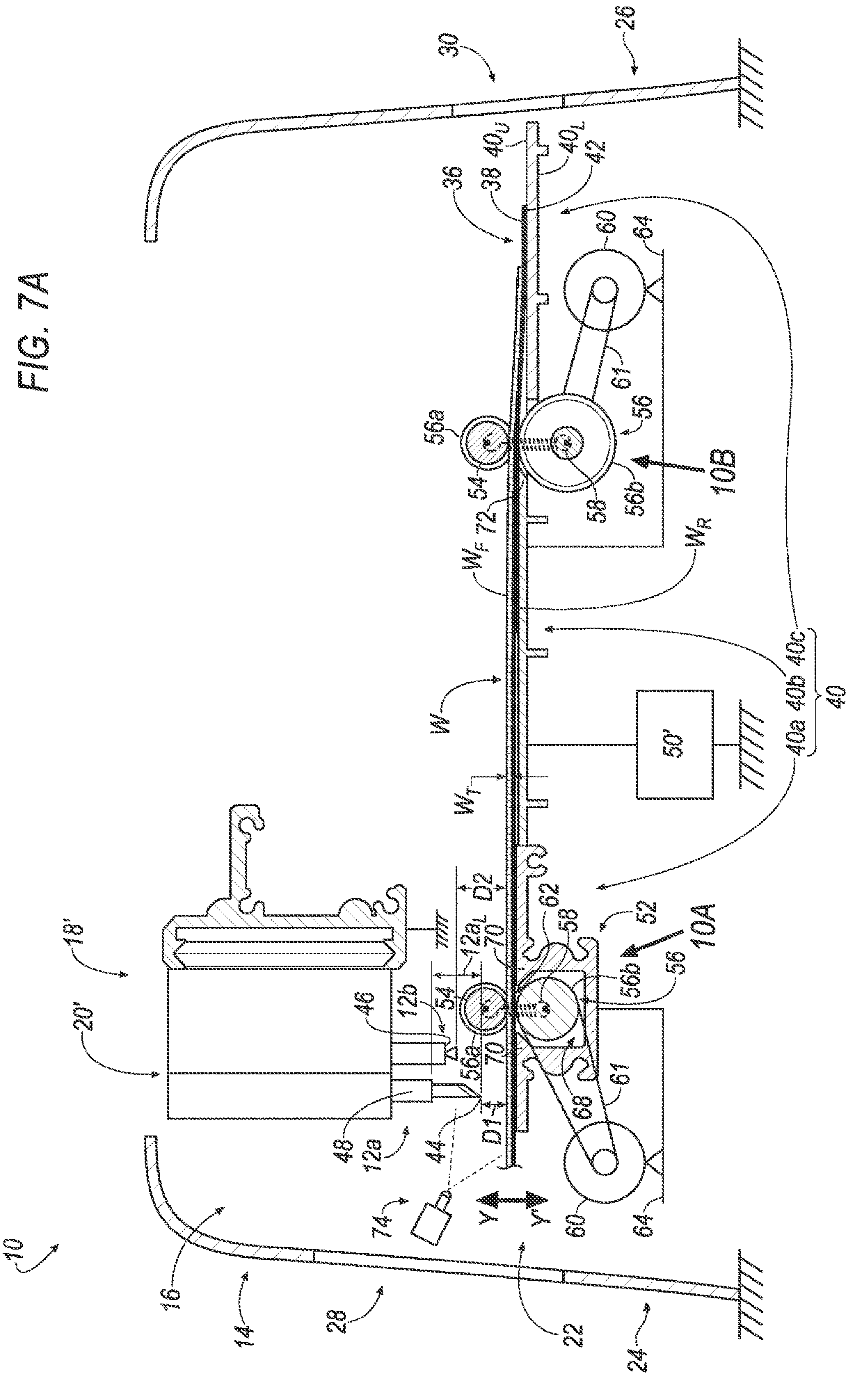
FIGS. 7A-7B illustrate a partial, cross-sectional view of a crafting apparatus in accordance with an exemplary embodiment of the invention.
Figure 7B:
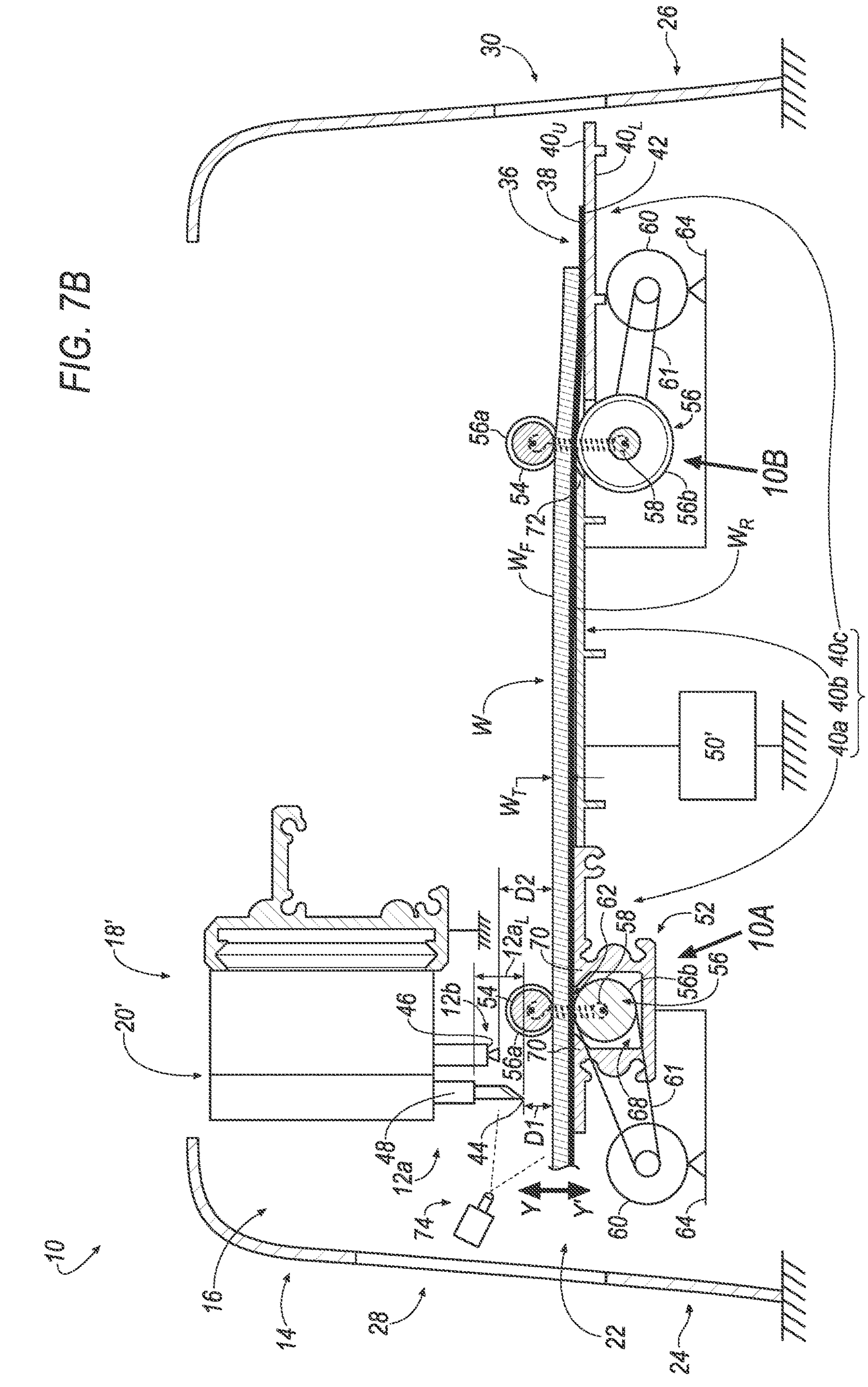

Referring to FIGS. 7A-7B, the crafting apparatus 10 is shown to include the one working assembly 18' having the hybrid working component 20' and the adjustment assembly 50'. In an embodiment, the one working assembly 18' may be arranged within the body 14 of the crafting apparatus 10 in a fixed (e.g., mechanically grounded) orientation while the support assembly 40 may be arranged within the body 14 of the crafting apparatus 10 in a non-fixed orientation. In an embodiment, the adjustment assembly 50' operates substantially similarly as described above in FIGS. 3A-3B; as such, in an embodiment, the working assembly 50' may be said to be connected to the support assembly 40 in order to move the non-fixed support assembly 40 relative the fixed one working assembly 18' in one of the directions Y, Y' in order to provide a desired spaced distance, D1, D2.

Figure 8A:
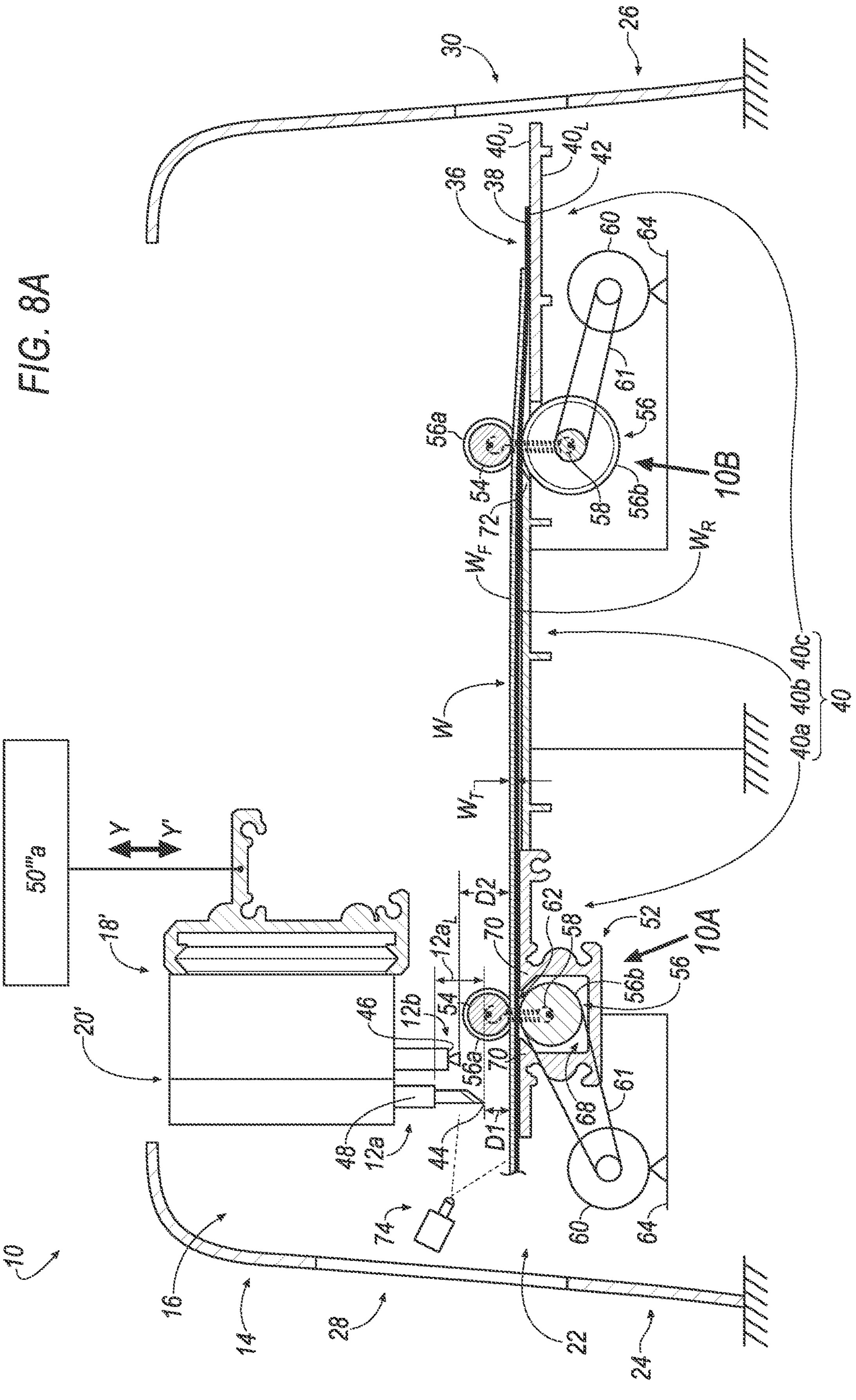
FIGS. 8A-8B illustrate a partial, cross-sectional view of a crafting apparatus in accordance with an exemplary embodiment of the invention.
Figure 8B:
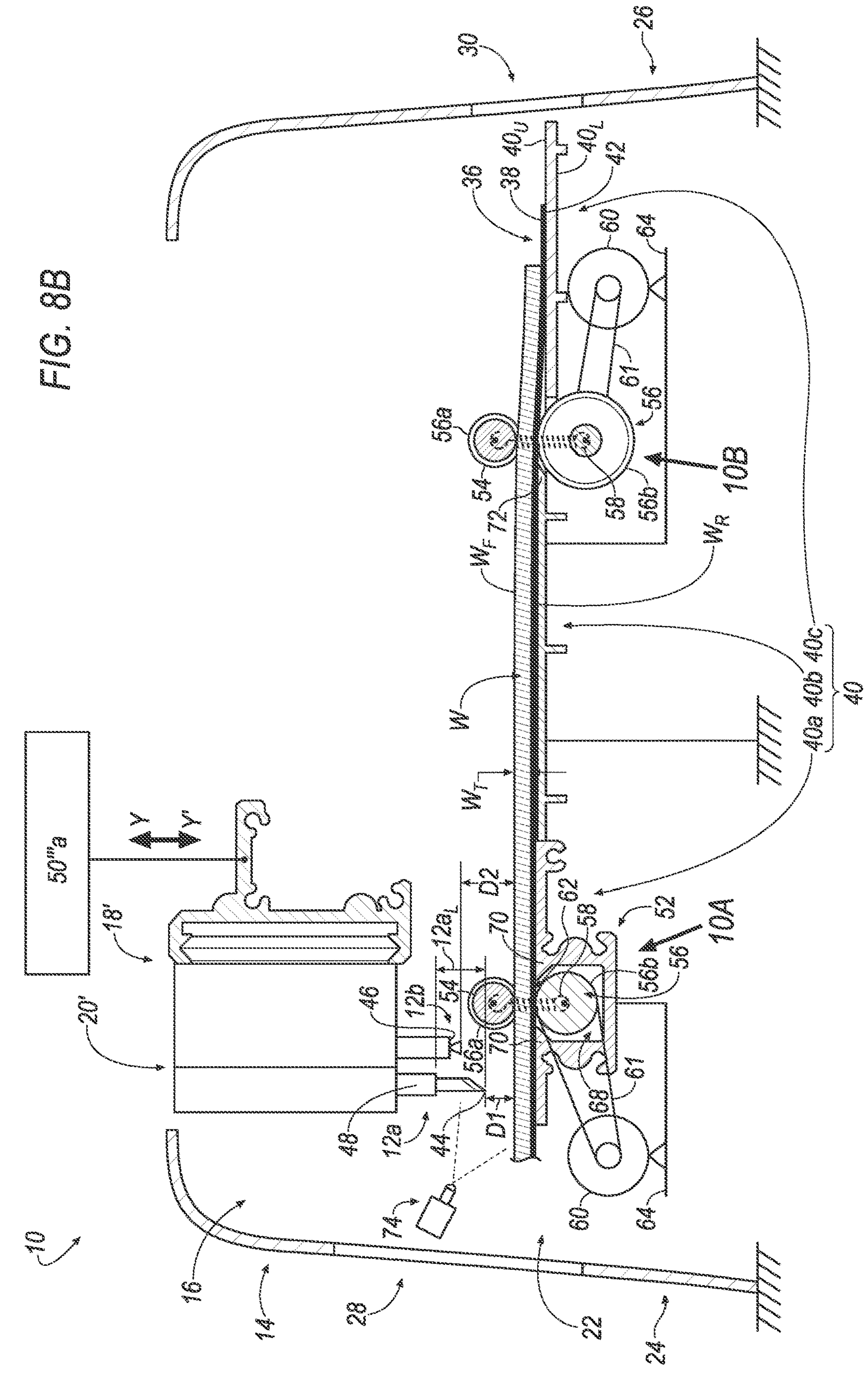

Referring to FIGS. 8A-8B, the crafting apparatus 10 is shown to include the one working assembly 18' having the hybrid working component 20' and the adjustment sub-assembly 50'''*a,* which may be substantially similar to that of the adjustment assembly 50''' of FIGS. 5A-5B, in accordance with an embodiment of the invention. In an embodiment, it will be appreciated that the one working assembly 18' may be arranged within the body 14 of the crafting apparatus 10 in a non-fixed orientation while the support assembly 40 may be arranged within the body 14 of the crafting apparatus 10 in a fixed orientation. In an embodiment, the one working assembly 18' may be connected to the adjustment sub-assembly 50'''*a* in order to permit the one working assembly 18' to move relative the fixed support assembly 40 in one of the directions Y, Y' in order to provide a desired spaced distance, D1, D2.

Figure 9A:
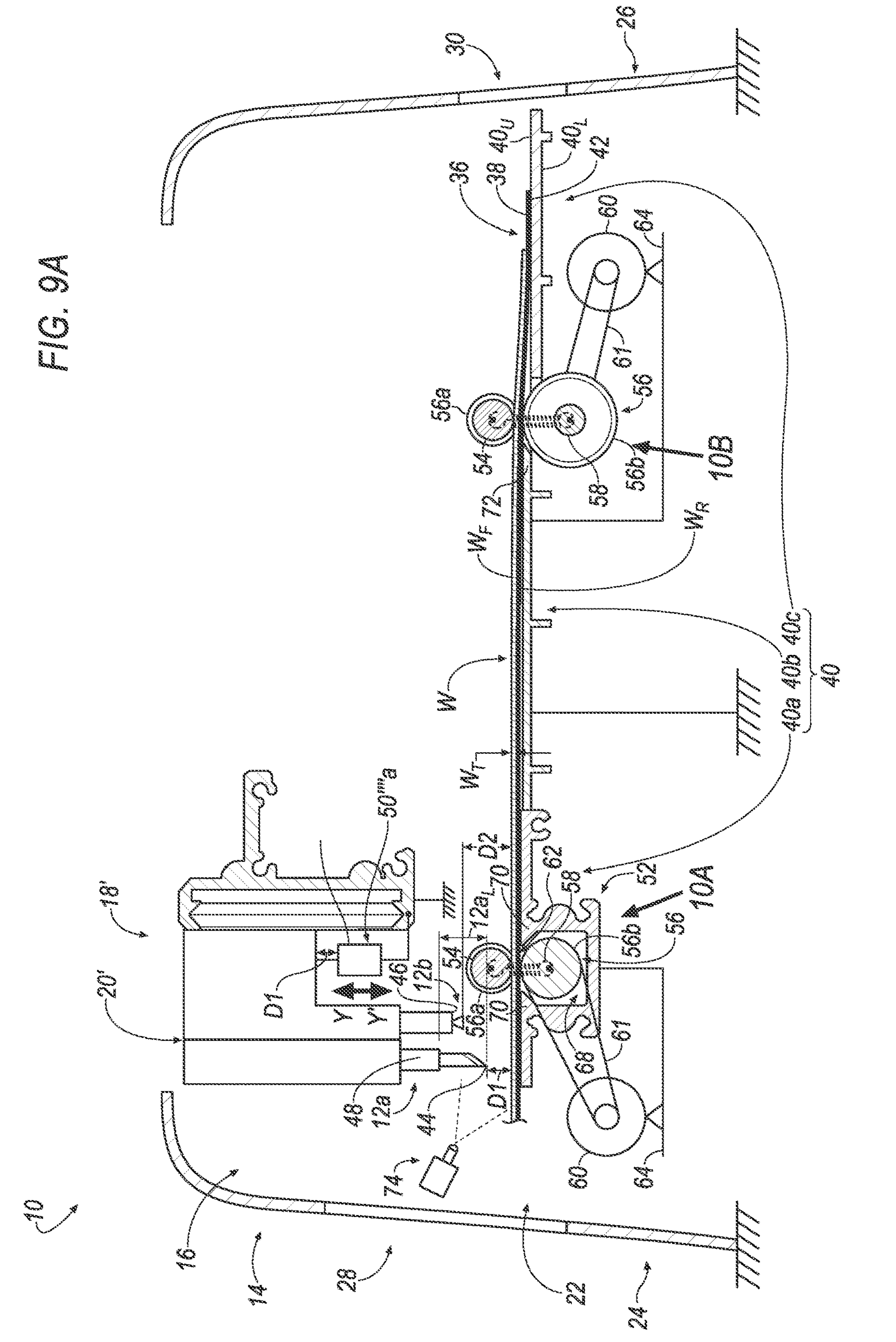
FIGS. 9A-9B illustrate a partial, cross-sectional view of a crafting apparatus in accordance with an exemplary embodiment of the invention.
Figure 9B:
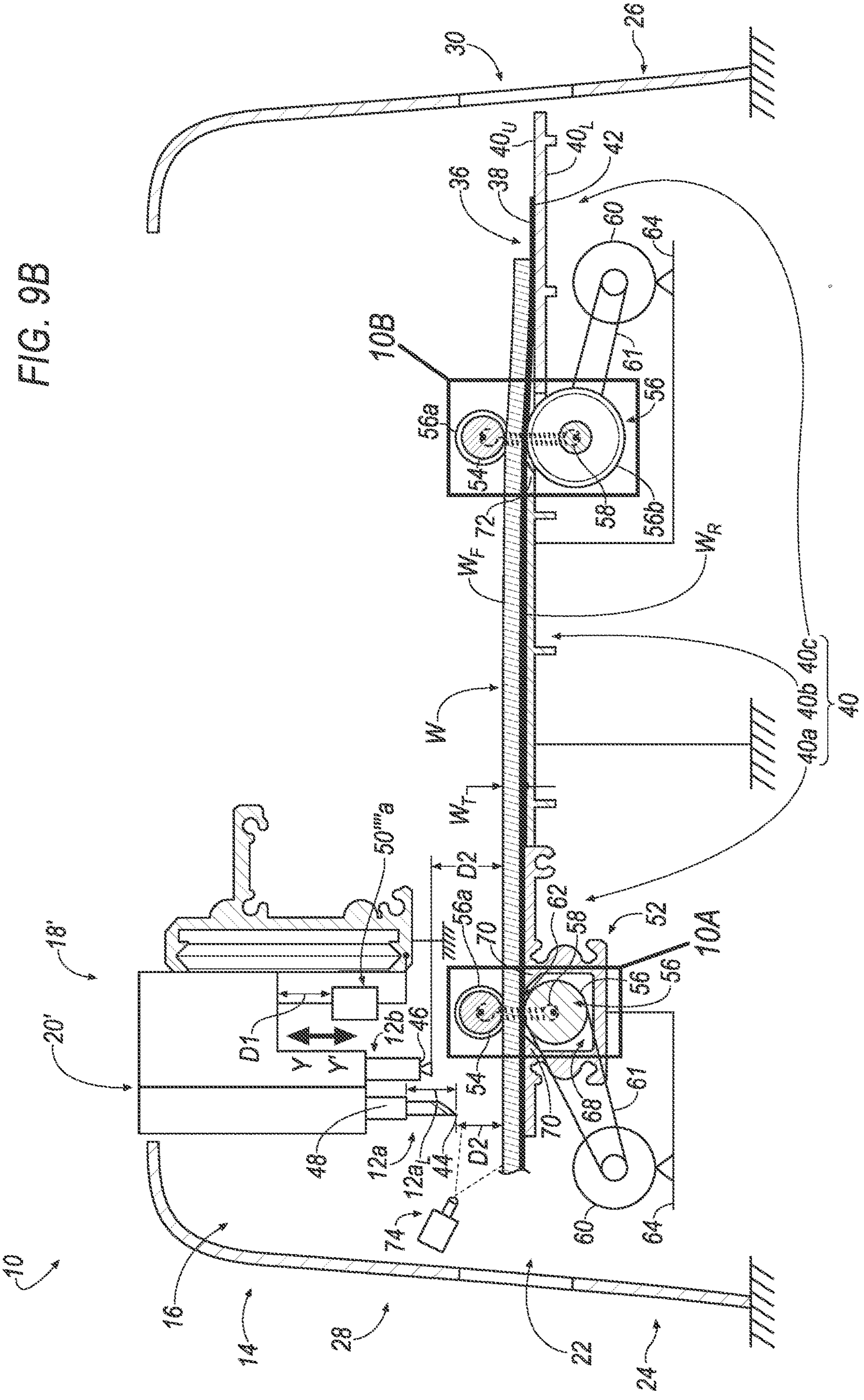
Figures 10A, 10B:
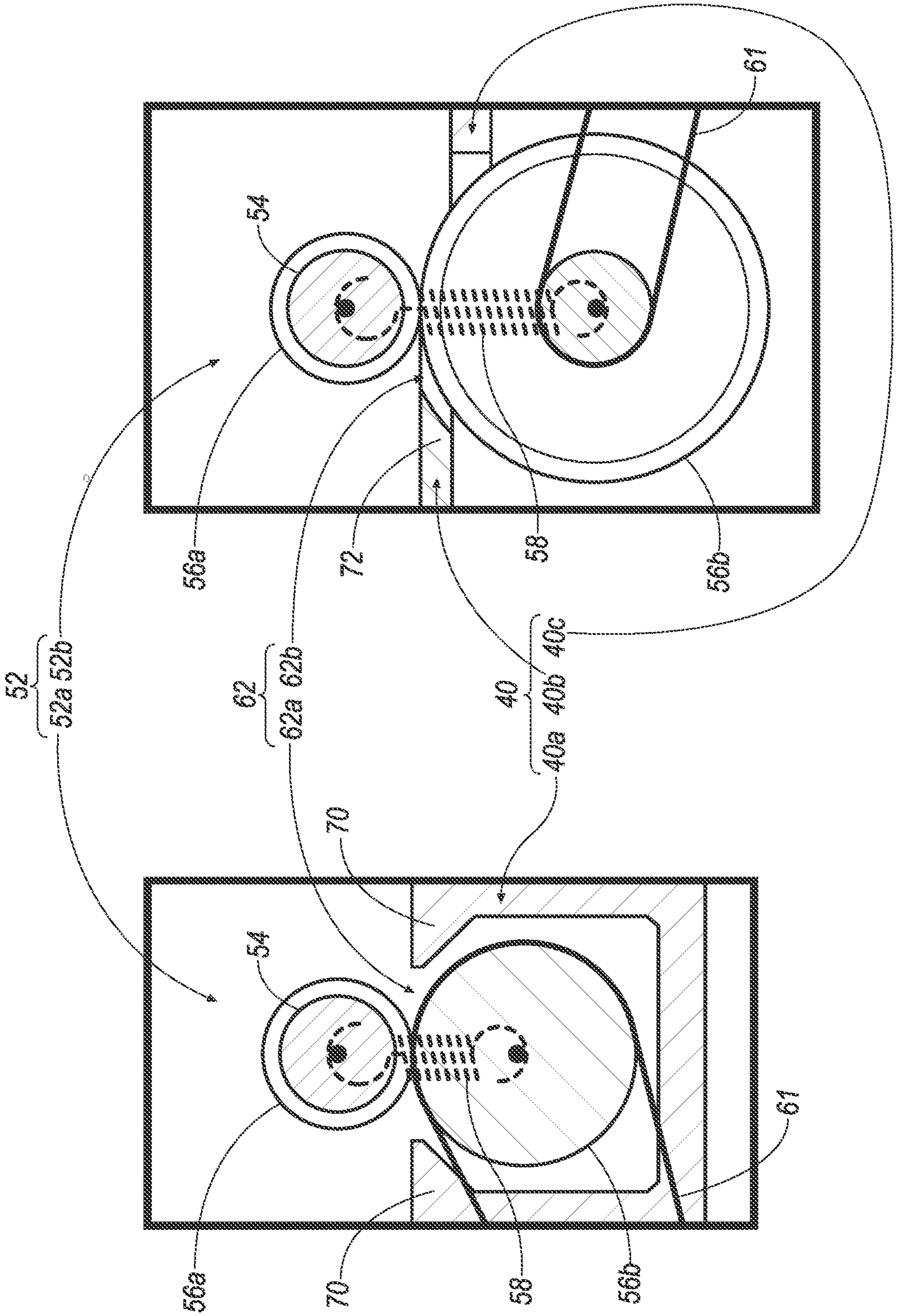
FIG. 10A is an enlarged view of the crafting apparatus of FIGS. 3A-9B according to line 10A in accordance with an exemplary embodiment of the invention.
FIG. 10B is an enlarged view of the crafting apparatus of FIGS. 3A-9B according to line 10B in accordance with an exemplary embodiment of the invention.

Referring to FIGS. 9A-9B, the crafting apparatus 10 is shown to include the one working assembly 18' having the hybrid working component 20' and the adjustment sub-assembly 50''''*a,* which may be substantially similar to that of the adjustment assembly 50'''' of FIGS. 6A-6B, in accordance with an embodiment of the invention. In an embodiment, it will be appreciated that the hybrid working component 20' may be arranged within the body 14 of the crafting apparatus 10 in a non-fixed orientation while the one working assembly 18' and the support assembly 40 are arranged within the body 14 of the crafting apparatus 10 in a fixed orientation. In an embodiment, the hybrid working component 20' may be movably-coupled relative the one working assembly 18' by way of, for example, the adjustment sub-assembly 50''''*a*. In an embodiment, the hybrid working component 20' may be movable relative the one working assembly 18' and the fixed support assembly 40 in one of the directions Y, Y' in order to provide a desired spaced distance, D1, D2.

Referring to FIGS. 13-16, an embodiment of a sub-structure 100 of a crafting apparatus 10 is shown according to an embodiment of the invention. The sub-structure 100 includes a substantially cylindrical shaft 155, a first upper mat-engaging roller 156*a* (see, e.g., FIGS. 14-16) and a second lower mat-engaging roller 156*b* (see, e.g., FIG. 16). In an embodiment, the first upper mat-engaging roller 156*a* and the second lower mat-engaging roller 156*b* of the sub-structure 100 may be substantially similar to that as the first upper mat-engaging roller 56*a* and the second lower mat-engaging roller 56*b* as shown and described in FIGS. 3A-9B in order to retain/"pinch" at least the mat 36 when one or more of the workpiece, W, and the mat 36 is/are inserted through the passage 22. However, it will be appreciated that the sub-structure 100 is different in that the first upper mat-engaging roller 156*a* may not be secured to the substantially cylindrical shaft 155, proximate a terminal end 157 (see, e.g., FIG. 14) of the substantially cylindrical shaft 155; rather, the first upper mat-engaging roller 156*a* may be formed separate from the substantially cylindrical shaft 155 such that the first upper mat-engaging roller 156*a* may be moved independently of the substantially cylindrical shaft 155.

Figure 12C:
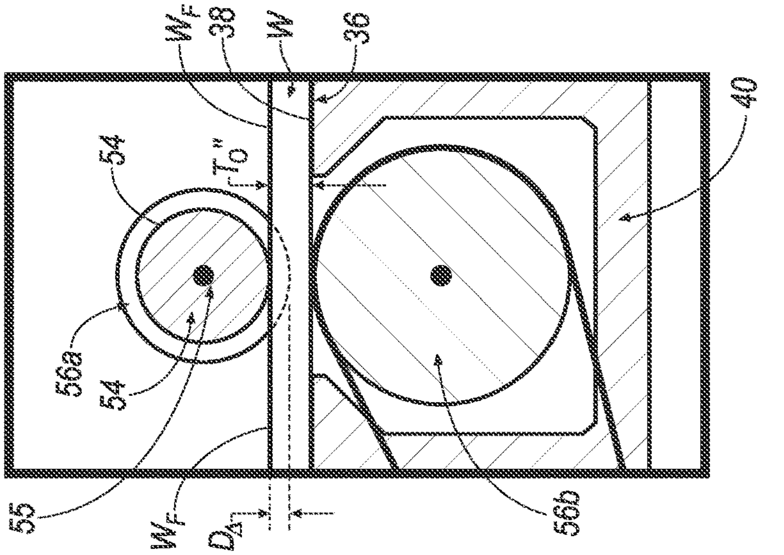
FIG. 12C illustrates an enlarged view of a portion of the crafting apparatus of FIGS. 3A-9B with a workpiece and a mat having a second overall thickness that is greater than the first overall thickness in accordance with an exemplary embodiment of the invention.

In an embodiment, it will be appreciated in the foregoing disclosure that the structural configuration of the sub-structure 100 may provide several advantages over the embodiment shown and described in FIGS. 3A-9B. For example, referring to FIG. 12A, each of the one or more workpiece-engaging rollers 54 may include a diameter, $D_1$, that may be less than a diameter, $D_2$, of the first upper mat-engaging roller 56*a,* which results in a difference in diameter, $D_\Delta$, due to the fact that the rollers 54, 56*a* are co-axially secured to the substantially cylindrical shaft 55. Because a contact surface of the first upper mat-engaging roller 56*a* may be substantially tangential to a plane, P, that may be aligned with the upper surface $\mathbf{40}_U$ of the support assembly 40, the difference in diameter, $D_\Delta$, forms a clearance, C, between a contact surface of the one or more workpiece-engaging rollers 54 and the plane, P, that may be aligned with the upper surface $\mathbf{40}_U$ of the support assembly 40.

Figure 12B:
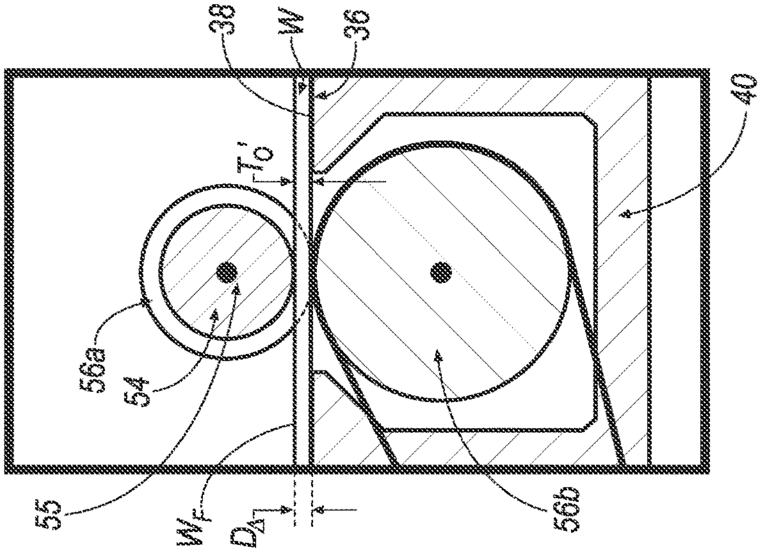
FIG. 12B illustrates an enlarged view of a portion of the crafting apparatus of FIGS. 3A-9B with a workpiece and a mat having a first overall thickness in accordance with an exemplary embodiment of the invention.
Figure 12A:
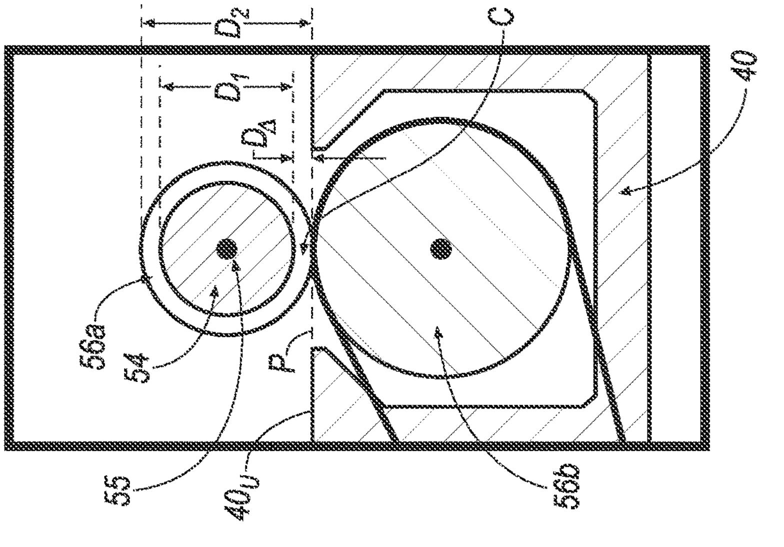
FIG. 12A illustrates an enlarged view of a portion of the crafting apparatus of FIGS. 3A-9B without a workpiece and a mat in accordance with an exemplary embodiment of the invention.

Accordingly, referring to FIG. 12B (and also to FIGS. 3A, 4A, 5A, 6A, 7A, 8A, 9A), if an overall thickness, $T_O'$, of one or more of mat 36 and a workpiece, W, may be less than or approximately equal to the difference in diameter, $D_\Delta$, the contact surface of the first upper mat-engaging roller 56*a* may be permitted to engage the upper surface 38 of the mat 36. However, referring FIG. 12C (and also to FIGS. 3B, 4B, 5B, 6B, 7B, 8B, 9B), if an overall thickness, $T_O''$, of one or more of mat 36 and a workpiece, W, may be greater than the difference in diameter, $D_\Delta$, the first, front surface, $W_F$, of the workpiece, W, engages the contact surface of the one or more workpiece-engaging rollers 54 and moves the substantially cylindrical shaft 55 away from the upper surface 38 of the mat 36 such that the contact surface of the first upper mat-engaging roller 56*a* may not be permitted to engage the upper surface 38 of the mat 36.

In view of what is shown and described in FIG. 12C, it will be appreciated that, in some circumstances, if the overall thickness, $T_O''$, of one or more of mat 36 and a workpiece, W, may be greater than the difference in diameter, $D_\Delta$, the second lower mat-engaging roller 56*b* advances the mat 36 through the passage 22 without the assistance of the first upper mat-engaging roller 56*a.* Accordingly, it will be appreciated that because the first upper mat-engaging roller 156*a* of the sub-structure 100 may be formed separate from the substantially cylindrical shaft 155, the contact surface of first upper mat-engaging roller 156*a* always remains in contact with the upper surface 38 of the mat 36, irrespective of the overall thickness, $T_O'/T_O''$, of one or more of mat 36 and a workpiece, W.

Referring to FIGS. 13-16, in an embodiment, it will be appreciated that the sub-structure 100 does not include a spring that is comparable to the spring 58, which is shown and described above; in an embodiment, as described above, the spring 58 couples the first upper mat-engaging roller 56*a* and the second lower mat-engaging roller 56*b.* In regards to the sub-structure 100, rather than utilizing a spring to couple the rollers 156*a,* 156*b,* each of the first upper mat-engaging roller 156*a* and the second lower mat-engaging roller 156*b* are coupled to an end bracket 102.

Figure 14:
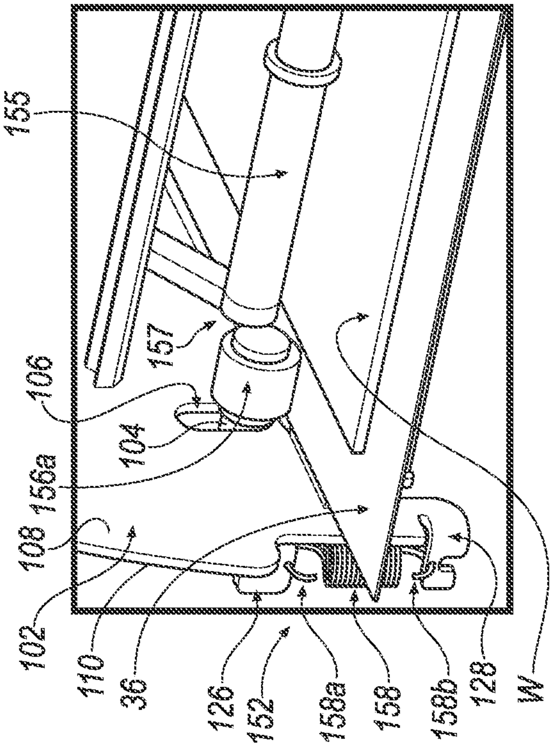
FIG. 14 illustrates a view of the sub-structure according to line 14 of FIG. 13 in accordance with an exemplary embodiment of the invention.
Figure 15:
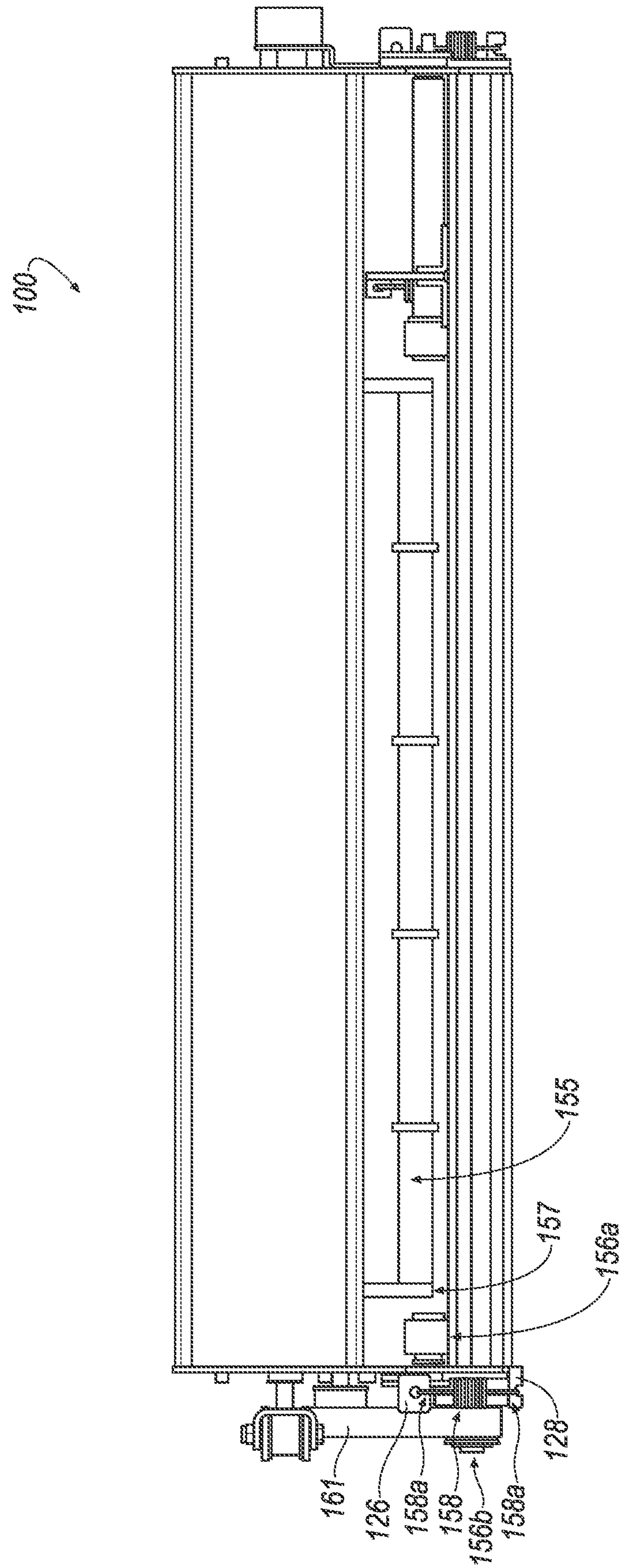
FIG. 15 illustrates a view of the sub-structure according to line 15 of FIG. 13 in accordance with an exemplary embodiment of the invention.

Referring to FIG. 14, in an embodiment, the first upper mat-engaging roller 156*a* includes an outwardly-projecting flange 104 that extends through a passage 106 formed by the bracket 102. The passage 106 extends through the bracket 102 from an inner side surface 108 of the bracket 102 to an outer side surface 110 of the bracket 102.

Figure 16:
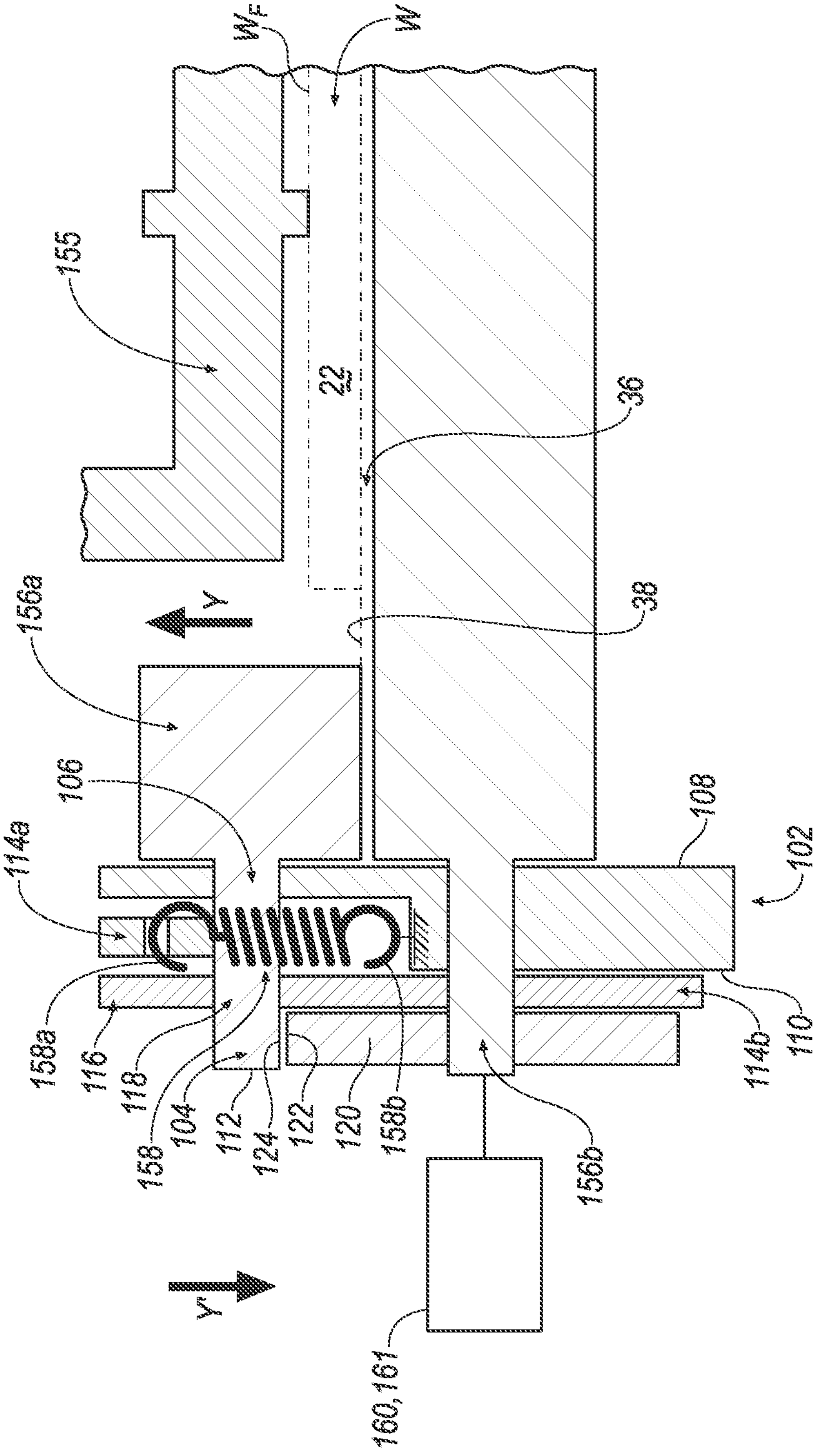
FIG. 16 illustrates a cross-sectional view of the sub-structure according to line 16-16 or FIG. 13 in accordance with an exemplary embodiment of the invention.

Referring to FIG. 16, in an embodiment, a distal end 112 of the outwardly-projecting flange 104 may extend past the outer side surface 110 of the bracket 102 and beyond a first retaining bracket 114*a* and a second retaining bracket 114*b* that are also secured to the outer side surface 110 of the bracket 102.

Figure 13:
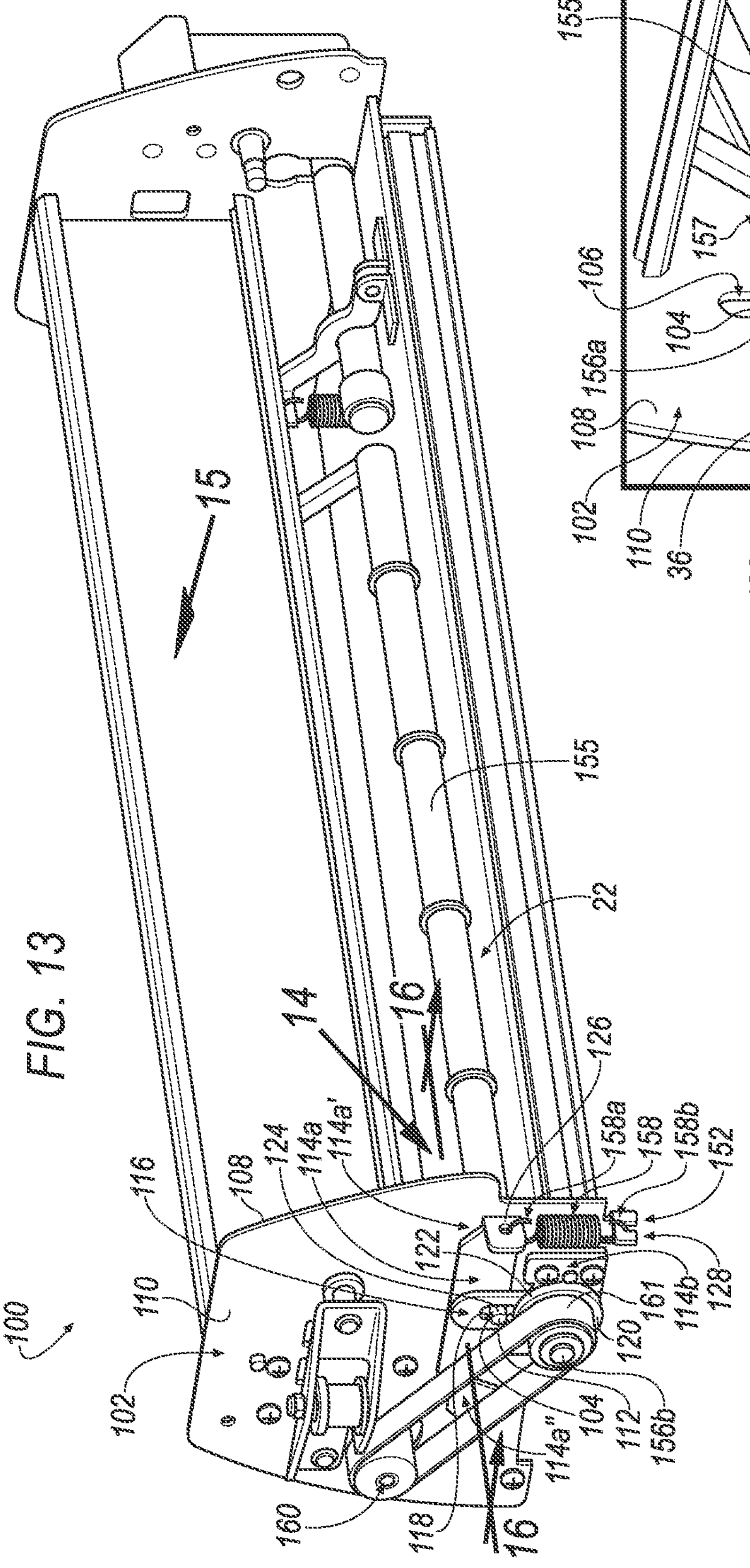
FIG. 13 illustrates a perspective view of a sub-structure of a crafting apparatus in accordance with an exemplary embodiment of the invention.

Referring to FIG. 13, in an embodiment, the second retaining bracket 114*b* may form a U-shaped body 116, forming a passage 118. Referring to FIG. 16, in an embodiment, the distal end 112 of the outwardly-projecting flange 104 may also extend through passage 118 and beyond the U-shaped body 116.

In an embodiment, referring to FIGS. 13-16, a spring 158 and the first and second retaining brackets 114*a,* 114*b* may form a tensioning device 152 of the sub-structure 100. Further, in an embodiment, the tensioning device 152 may include a contact washer 120 that may be arranged about the second lower mat-engaging roller 156*b*. In an embodiment, the contact washer 120 may be arranged between the second retaining bracket 114*b* and a pulley 161 that may also be arranged about the second lower mat-engaging roller 156*b*. In an embodiment, the pulley 161 may be coupled to a driving member 160 that, when rotated, imparts movement to the pulley 161 in order to cause the pulley 161 to cause rotation of the second lower mat-engaging roller 156*b*.

Referring to FIG. 16, in an embodiment, the contact washer 120 includes an outer, circumferential contact surface 122; similarly, the outwardly-projecting flange 104 includes an outer, circumferential contact surface 124. In an embodiment, the distal end 112 of the outwardly-projecting flange 104 extends beyond the U-shaped body 116 such that the outer, circumferential contact surface 124 of the outwardly-projecting flange 102 may be located in a substantially opposing relationship with the outer, circumferential contact surface 122 of the contact washer 120.

Referring to FIG. 13, in an embodiment, a first end 158*a* of the spring 158 may be coupled to a support flange 126 of the first retaining bracket 114*a*. In an embodiment, the support flange 126 extends from a first end 114*a*' of the first retaining bracket 114*a*. In an embodiment, the support flange 126 projects from the first end 114*a*' of the first retaining bracket 114*a* in a direction away from the outer side surface 110 of the bracket 102. In an embodiment, a second end 114*a*" of the first retaining bracket 114*a* may be pivotably-coupled to the outer side surface 110 of the bracket 102.

In an embodiment, a second end 158*b* of the spring 158 may be coupled to a support flange 128 of the bracket 102. In an embodiment, the support flange 128 extends away from the outer side surface 110 of the bracket 102.

Referring to FIG. 16, in an embodiment, the spring 158 biases the first retaining bracket 114*a* in a "down" position (according to the direction of the arrow, Y') such that the outer, circumferential contact surface 124 of the outwardly-projecting flange 104 may contact the outer, circumferential contact surface 122 of the contact washer 120. In an embodiment, when one or more of the workpiece, W, and the mat 36 is/are inserted through the passage 22, the first upper mat-engaging roller 156*a* maintains contact with the upper surface 38 of the mat 36. Further, it will be appreciated that an increase in thickness of the mat 36 may cause the first upper mat-engaging roller 156*a* and outwardly-projecting flange 104 to rise (according to the direction of the arrow, Y), thereby causing the outer, circumferential contact surface 124 of the outwardly-projecting flange 104 to no longer be in contact with the outer, circumferential contact surface 122 of the contact washer 120 as a result of a corresponding expansion of the spring 158; however, it will be appreciated that upon removal of the mat 36 from the passage 22, the first end 158*a* of the spring 158 will pull the first retaining bracket 114*a* downwardly according to the direction of the arrow Y' such that the first retaining bracket 114*a* may cause the outer, circumferential contact surface 124 of the outwardly-projecting flange 104 to be in contact with the outer, circumferential contact surface 122 of the contact washer 120.

Although the above-described movement according to the direction of the arrow, Y, is associated with an increased thickness of the mat 36, it will be appreciated that, if, for example, the workpiece, W, includes a greater width such that the workpiece, W, contacts the upper mat engaging roller 156*a,* the workpiece, W, may cause the above-described movement according to the direction of the arrow, Y. Further, it will be appreciated that the workpiece, W, may be inserted through the passage without the mat 36; as such, the workpiece, W, may cause the above-described movements independently and without cooperation of the mat 36.

As the outwardly-projecting flange 104 rises, Y,/lowers, Y', as described above, the outer, circumferential contact surface 124 of the outwardly-projecting flange 104 remains engaged with the first retaining bracket 114*a*. Further, as the outwardly-projecting flange 104 rises, Y, the outer, circumferential contact surface 124 of the outwardly-projecting flange 104 exerts a force to the first retaining bracket 114*a* that may cause the bias of the spring 158 to be overcome such that the first retaining bracket 114*a* may be permitted to pivot (about the second end 114*a*" of the first retaining bracket 114*a*) away from the biased "down" position to an "up" position.

Accordingly, in an embodiment, it will be appreciated that although the spring member 158 permits the outwardly-projecting flange 104 and the first upper mat-engaging roller 156*a* to be pivoted to an "up" position, according to the direction of the arrow, Y, the spring 158 also provides a continuous bias that results in the first upper mat-engaging roller 156*a* to be located in an orientation such that the first upper mat-engaging roller 156*a* continuously remains engaged with the upper surface 38 of the mat 36. As such, it will be appreciated that the bias imparted by the spring member 158 may cause the first upper mat-engaging roller 156*a* to constantly retain/"pinch" at least the mat 36 when one or more of the workpiece, W, and the mat 36 is/are inserted through the passage 22.

Figure 17:
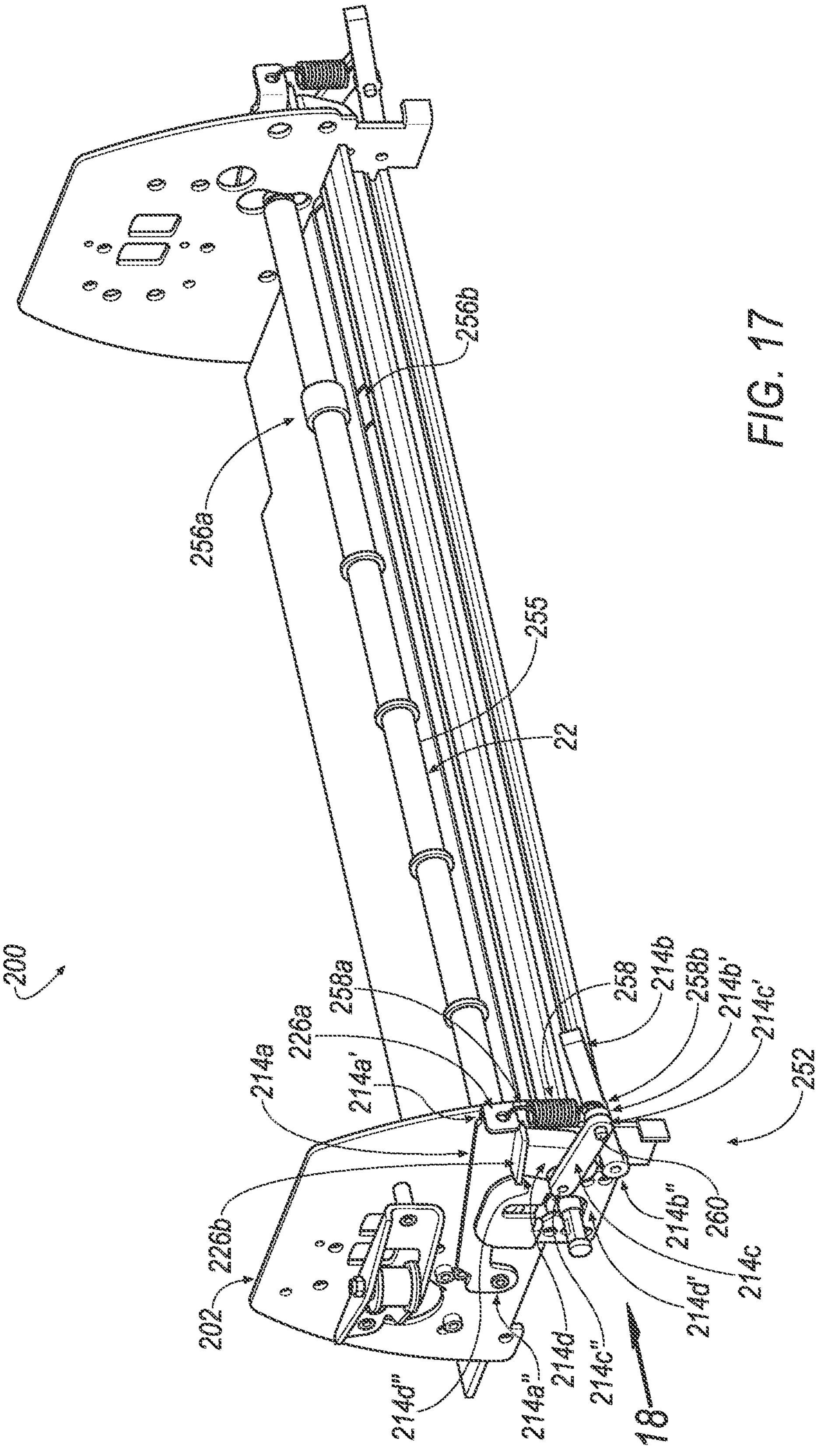
FIG. 17 illustrates a perspective view of a sub-structure of a crafting apparatus in accordance with an exemplary embodiment of the invention.
Figure 18A:
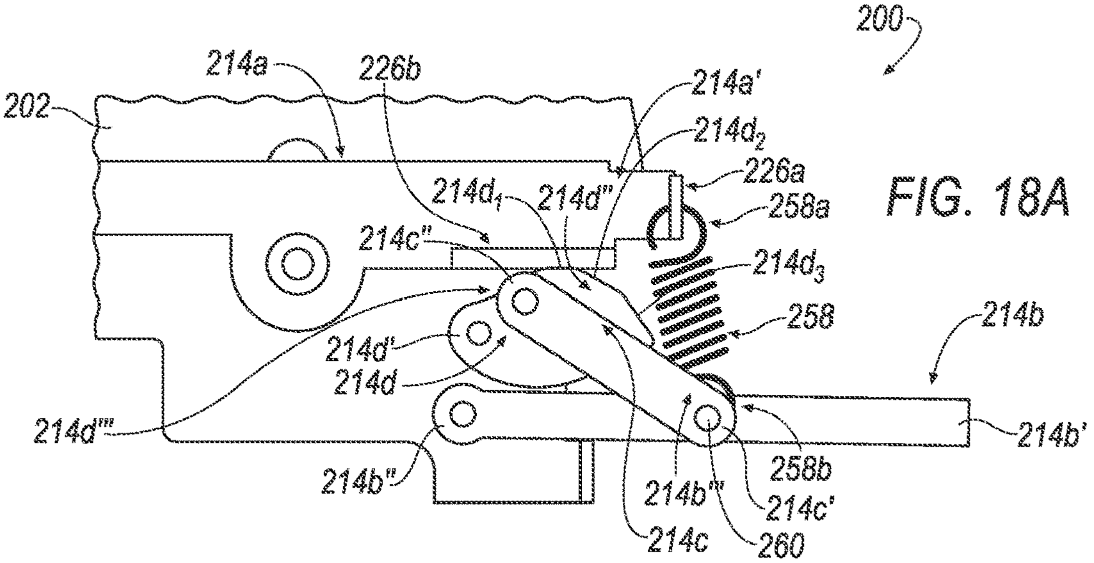
FIGS. 18A-18C illustrate a view of the sub-structure according to line 18 of FIG. 17 in accordance with an exemplary embodiment of the invention.
Figure 18B:
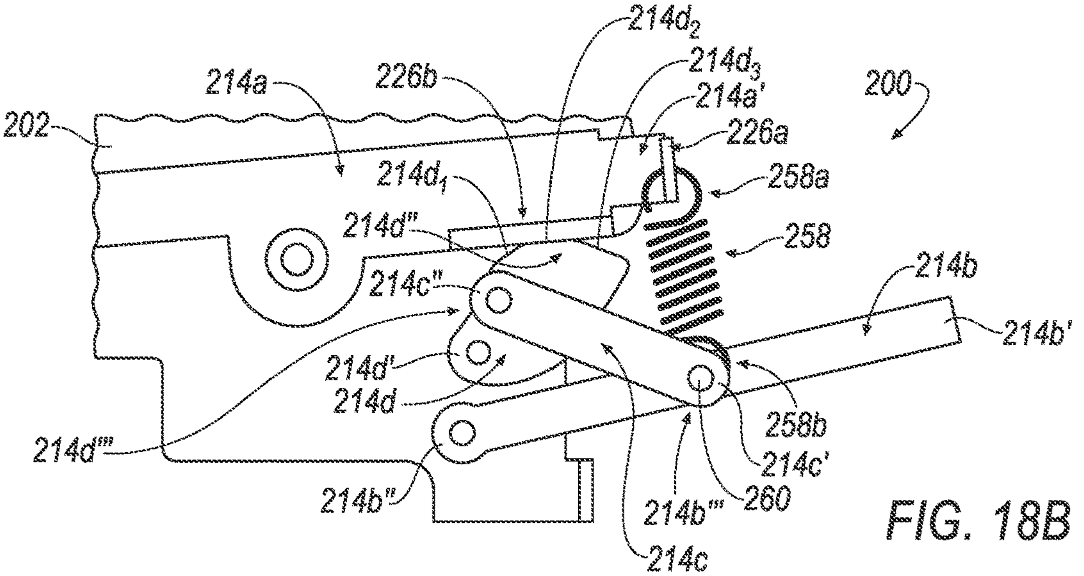
Figure 18C:
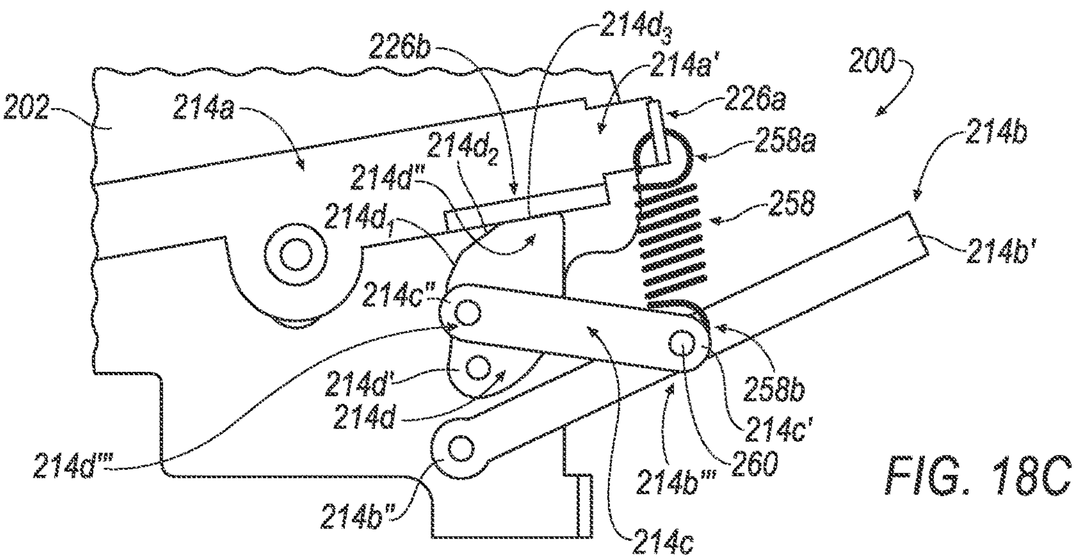

Referring to FIGS. 17-18C, an embodiment of a sub-structure 200 of a crafting apparatus 10 is shown according to an embodiment of the invention. The sub-structure 200 may be similar to the sub-structure 100 in that the sub-structure includes a tensioning device 252 having a substantially cylindrical shaft 255, a first upper mat-engaging roller 256*a,* a second lower mat-engaging roller 256*b* and a spring member 258 (which are substantially similar to the substantially cylindrical shaft 155, a first upper mat-engaging roller 156*a,* a second lower mat-engaging roller 156*b* and a spring member 158). However, the movement of the first upper mat-engaging roller 256*a* to one of an up position, Y, and a down position, Y', is not governed by insertion of one or more of a mat 36 and a workpiece, W, into the passage 22; rather, the movement of the first upper mat-engaging roller 256*a,* which may be formed with/located upon the substantially cylindrical shaft 255 (and not formed separate therefrom), may be manually controlled by way of a movement of a user-actuated lever 214*b,* as will be described in the foregoing disclosure.

In an embodiment, the sub-structure 200 includes a first retaining bracket 214*a* that may be substantially similar to the first retaining bracket 114*a*. The spring 258 includes a first end 258*a* that may be connected to a first support flange 226*a* that extends from a first end 214*a*' of the first retaining bracket 214*a*. A second end 258*b* of the spring 258 may be directly or indirectly coupled to one or more of the user-actuated lever 214*b* and an intermediate bracket 214*c*.

In an embodiment, the second end 258*b* of the spring 258 may be connected to a pin 260 that couples the user-actuated lever 214*b* to the intermediate bracket 214*c* such that the spring 258 may be indirectly coupled to the user-actuated lever 214*b* and intermediate bracket 214*c*. In an embodiment, as seen in FIGS. 18A-18C, the pin 260 couples a first end 214c' of the intermediate bracket 214c to an intermediate portion 214b''' of the user-actuated lever 214b.

In an embodiment, the sub-structure 200 also includes an end bracket 202, which may be substantially similar to the end bracket 102 of the sub-structure 100. In an embodiment, a second end 214a" of the first retaining bracket 214a may be pivotably coupled to the end bracket 202. In an embodiment, a second end 214b" of the user-actuated lever 214b may be pivotably coupled to the end bracket 202.

In an embodiment, a first end 214d' of a stop bracket 214d may be pivotably coupled to the end bracket 202. As will be described in the foregoing disclosure, a second end 214d" of the stop bracket 214d may be interfaced with a second support flange 226b that extends from a first end 214a' of the first retaining bracket 214a.

Referring to FIGS. 18A-18C, in an embodiment, a second end 214c" of the intermediate bracket 214c may be coupled to an intermediate portion 214d''' of the stop bracket 214d. In an embodiment, when a user pivotably changes the orientation of the user-actuated lever 214b, the connection of the intermediate bracket 214c to the user-actuated lever 214b by the pin 260 results in the intermediate bracket 214c causing a corresponding pivotal movement of the stop bracket 214d.

Referring to FIGS. 18A-18C, in an embodiment, the user-actuated lever 214b may be located in one of a down position (see, e.g., FIG. 18A), an intermediate position (see, e.g., FIG. 18B) and an up position (see, e.g., FIG. 18C). When a user selectively changes the orientation of the user-actuated lever 214b to be located in one of the positions described above, the brackets 214a, 214c, 214d are moved in order to cause the upper first upper mat-engaging roller 256a to be correspondingly moved to one of a down, intermediate or up position for accommodating different thicknesses of one or more of the mat 36 and workpiece, W, that are inserted into the passage 22.

In an embodiment, the positioning of the upper first upper mat-engaging roller 256a in one of the down, intermediate or up positions may be retained by way of the interfacing of the second end 214d" of the stop bracket 214d with the second support flange 226b that extends from a first end 214a' of the first retaining bracket 214a. In an embodiment, the second end 214d" of the stop bracket 214d includes several stop surfaces 214$d_1$, 214$d_2$ and 214$d_3$. When then user-actuated lever 214b may be moved as described above, one of the stop surfaces 214$d_1$-214$d_3$ engages the second support flange 226b in order to maintain the first upper mat-engaging roller 256a in a selectively-fixed orientation.

In an embodiment, as seen in FIG. 18A, contact of the stop surface 214$d_1$ with the second support flange 226b corresponds to the user-actuated lever 214b and first upper mat-engaging roller 256a being located in the down position. In an embodiment, as seen in FIG. 18B, contact of the stop surface 214$d_2$ with the second support flange 226b corresponds to the user-actuated lever 214b and first upper mat-engaging roller 256a being located in the intermediate position. In an embodiment, as seen in FIG. 18C, contact of the stop surface 214$d_3$ with the second support flange 226b corresponds to the user-actuated lever 214b and first upper mat-engaging roller 256a being located in the up position. Although the second end 214d" is shown to include three stop surfaces 214$d_1$-214$d_3$ that corresponds to three positions (i.e., down, intermediate and up) of the user-actuated lever 214b and first upper mat-engaging roller 256a, it will be appreciated that the second end 214d" may include more than three stop surfaces 214$d_1$-214$d_3$ in order to further refine the positioning of the user-actuated lever 214b and first upper mat-engaging roller 256a.

Referring to FIGS. 19-21B, an embodiment of a sub-structure 300 of a crafting apparatus 10 is shown according to an embodiment of the invention. The sub-structure 300 may be directed to a manual adjustment device that may contribute to the adjustment of the spaced distance, D1, D2, between workpiece, W, and the one or more components of the assemblies 18/18a/18b/18'. As will be explained in the foregoing disclosure, the sub-structure 300 may also include an adjustment assembly 50'-50'''' that includes, for example, a hydraulic arm, a solenoid, a motor, in order to further contribute to the adjustment of the spaced distance, D1, D2.

In an embodiment, the sub-structure 300 includes a fixed base bracket 302, a vertically adjustable plunging bracket 304 and an adjuster 306 that may be coupled to one or more of the fixed base bracket 302 and the vertically adjustable plunging bracket 304. In an embodiment, the vertically adjustable plunging bracket 304 may be coupled to one or more of an assembly 18/18a/18b/18' and an adjustment assembly 50'-50''''. In an embodiment, the sub-structure 300 is shown to include a first working assembly 18a and an adjustment sub-assembly 50'''a, which may be components of an assembly 18 and an adjustment assembly 50", that corresponds generally to that as shown and described above in FIGS. 5A-5B.

In an embodiment, the fixed base bracket 302 may be disposed within the interior compartment 16 and grounded to the body 14 of the crafting apparatus 10 by one or more fasteners 308. In an embodiment, the one or more fasteners 308 are inserted through passages 310, 312 formed in each of the vertically adjustable plunging bracket 304 and the fixed base bracket 302 in order to affix the sub-substructure 300 to the body 14 of the crafting apparatus 14. In an embodiment, the passages 312 of the fixed base bracket 302 include a geometry that corresponds to the geometry of the one or more fasteners 308 whereas the passages 310 formed by the vertically adjustable plunging bracket 304 includes a geometry that may be greater than the geometry of the one or more fasteners 308 in order to define vertical adjustment slots. In an embodiment, the vertical adjustment slots 310 permit the vertically adjustable plunging bracket 304 to move relative a fixed orientation of the one or more fasteners 308, which are fixedly-secured to the fixed base bracket 302.

In an embodiment, each of the fixed base bracket 302 and the vertically adjustable plunging bracket 304 includes a support ledge 314, 316. In an embodiment, each support ledge 314, 316 forms a passage 318, 320 that are aligned with one another when the fixed base bracket 302 and the vertically adjustable plunging bracket 304 are connected by the one or more fasteners 308.

In an embodiment, the adjuster 306 includes a threaded stem 322, a collar 324 and a head portion 326. In an embodiment, the head portion 326 may be fixed to a first distal end 328 of the threaded stem 322. In an embodiment, the threaded stem 322 extends through and may be threadedly-coupled to a threaded passage 330 formed by the collar 324. In an embodiment, the collar 324 may be secured to the support ledge 314 of the fixed base bracket 302.

In an embodiment, the threaded stem 322 extends through each of the following: the support ledge 314 of the fixed base bracket 302, a first threaded nut 332, the support ledge 316 of the vertically adjustable plunging bracket 304 and a second threaded nut 334. In an embodiment, the first threaded nut 332 includes an upper surface 332a and a lower surface 332b. In an embodiment, the lower surface 332b of the first threaded nut 332 may be disposed adjacent an upper surface 316a of the support ledge 316. Similarly, in an embodiment, the second threaded nut 334 includes an upper surface 334*a* and a lower surface 334*b*. In an embodiment, the upper surface 334*a* of the second threaded nut 334 may be disposed adjacent a lower surface 316*b* of the support ledge 316.

Figure 20B:
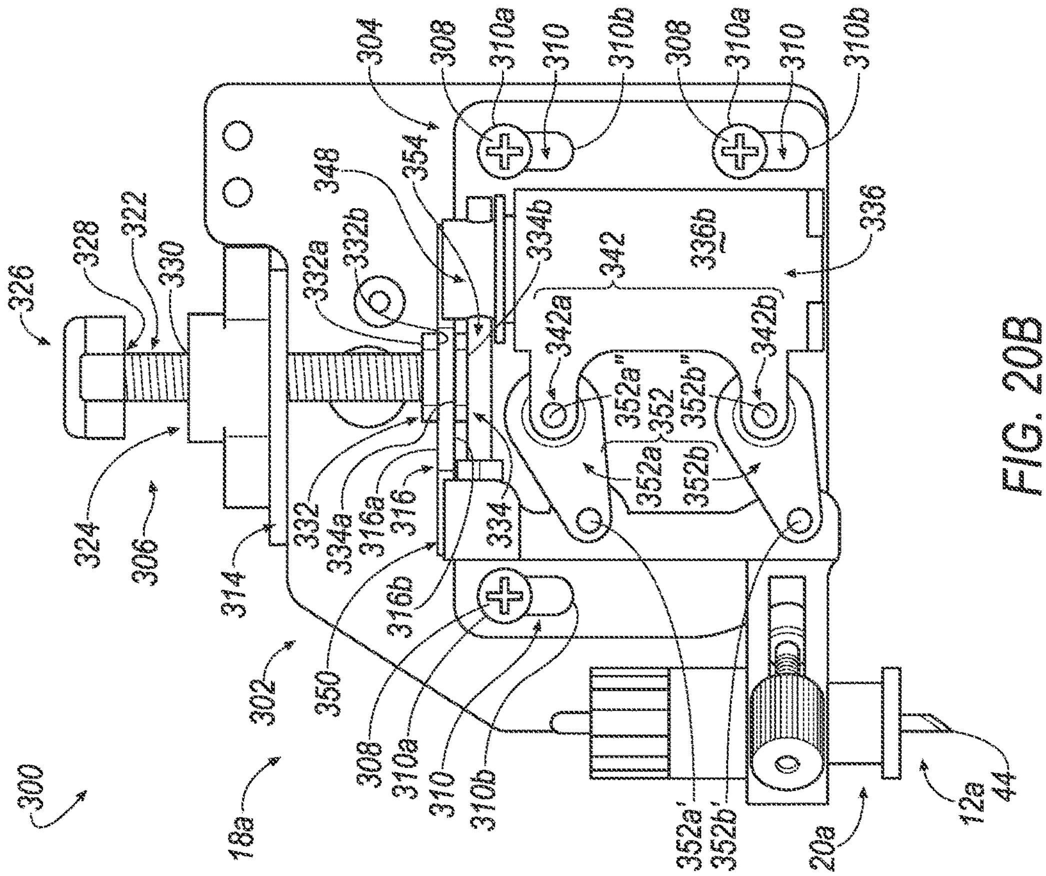
FIGS. 20A-21B illustrate assembled side views of the sub-substructure of FIG. 19 in accordance with an exemplary embodiment of the invention.
Figure 20A:
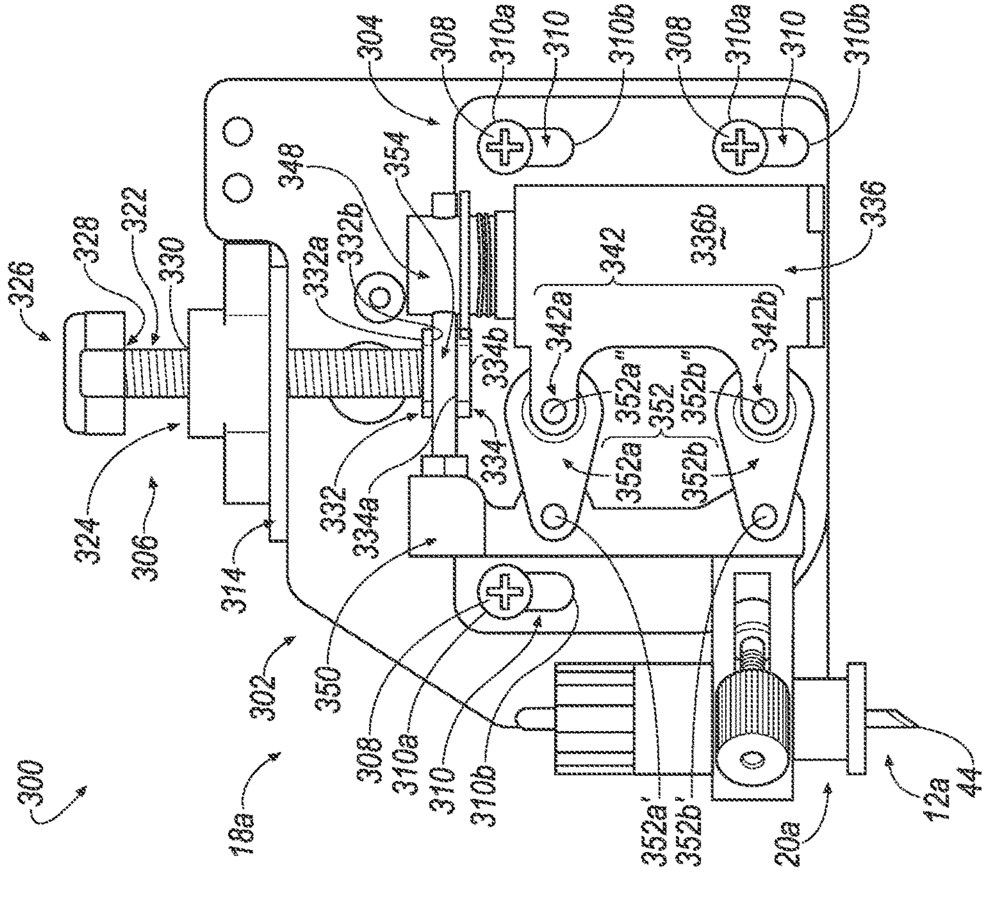
Figure 21A:
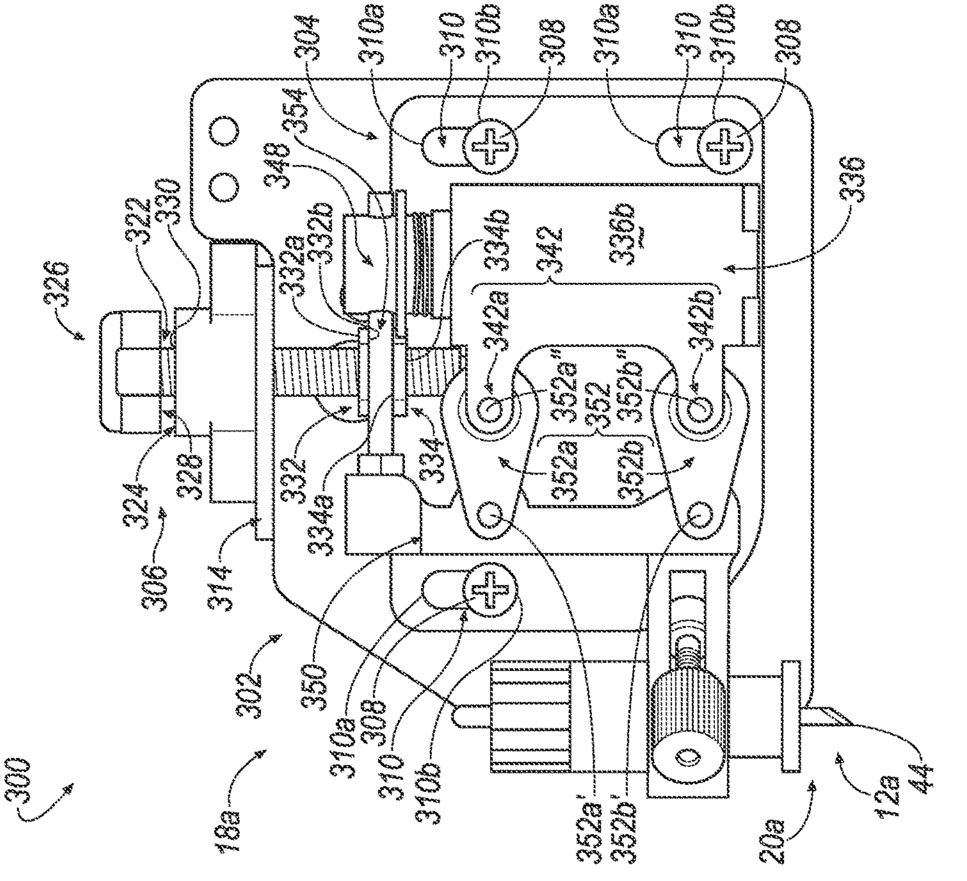
Figure 21B:
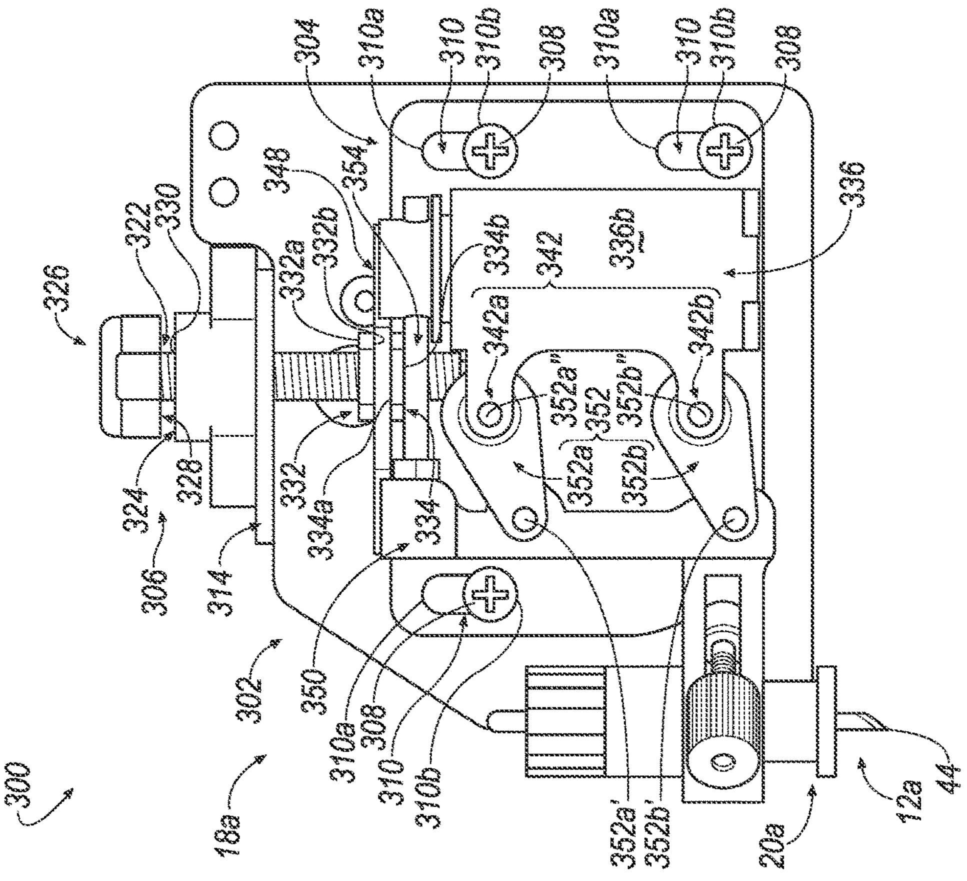
Figure 22A:
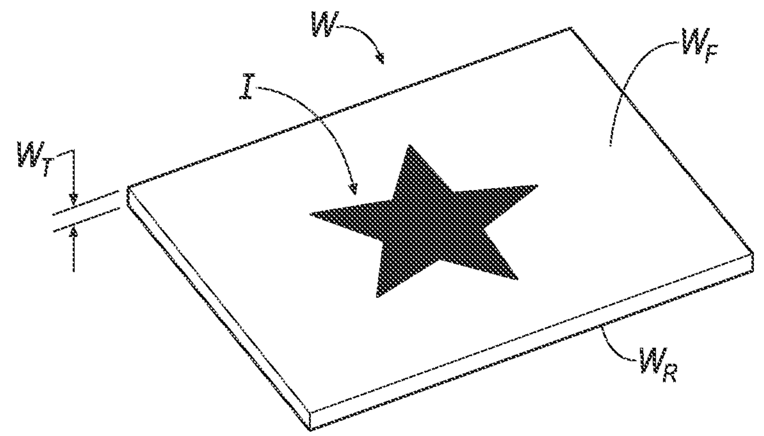
FIGS. 22A-22E illustrate workpieces that are modified by the crafting apparatus of FIGS. 1-21B in accordance with an exemplary embodiment of the invention.
Figure 22B:
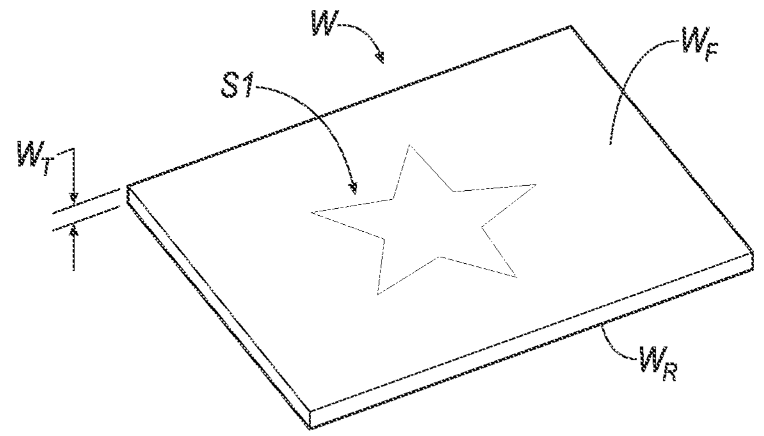
Figure 22C:
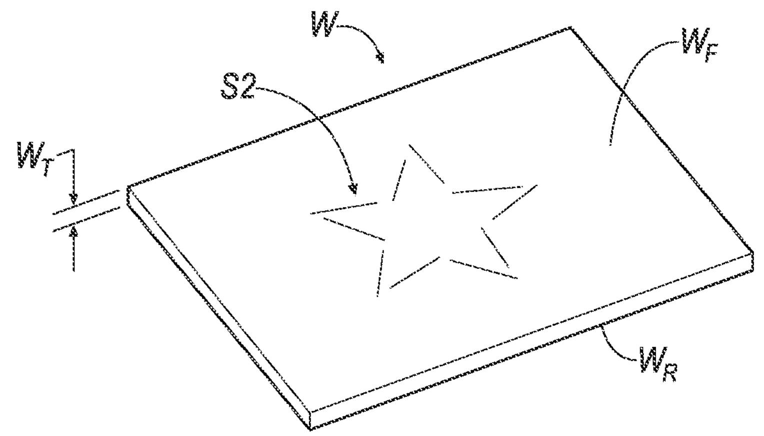
Figure 22D:
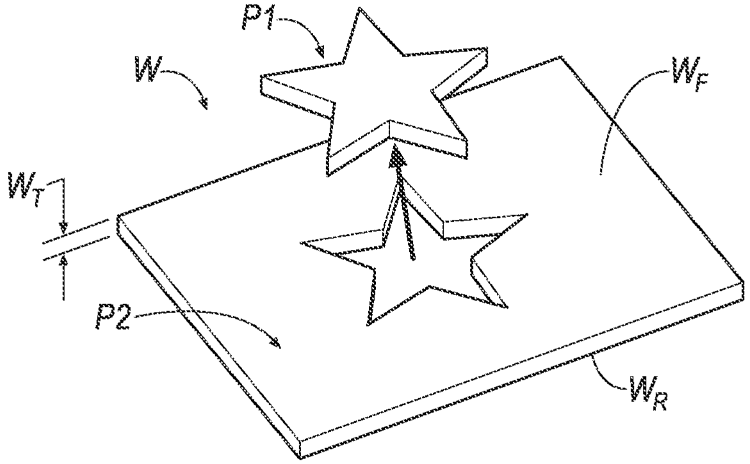
Figure 22E:
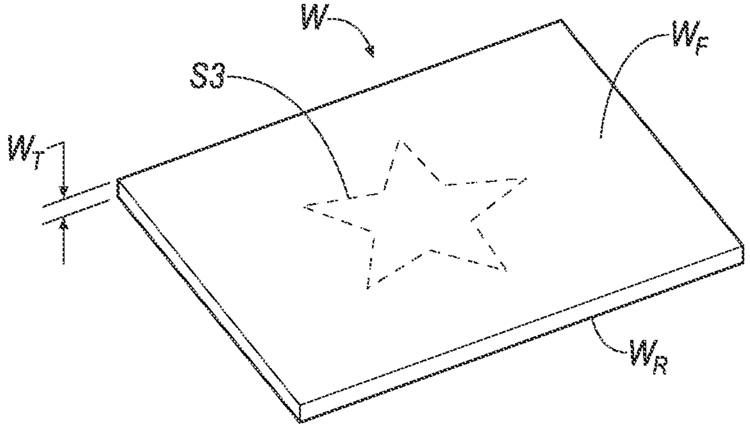

Referring to FIGS. 20A-20B, the vertically-adjustable plunging bracket 304 may be arranged in an "up orientation" relative the fixed base bracket 302 whereas, in FIGS. 21A-21B, the vertically-adjustable plunging bracket 304 may be arranged in a "down orientation" relative the fixed base bracket 302. In an embodiment, in order to change the orientation of the vertically-adjustable plunging bracket 304 relative the fixed base bracket 302, a user rotates the head portion 326 in one of a clockwise and counter-clockwise direction such that the threaded stem 322 may cause the first threaded nut 332 to push the vertically-adjustable plunging bracket 304 toward the "down orientation," or, alternatively, to cause the second threaded nut 334 to pull the vertically-adjustable plunging bracket 304 toward the "up orientation."

In an embodiment, the travel of the vertically-adjustable plunging bracket 304 may be limited according to the length of the vertical adjustment slots 310. Referring to FIGS. 20A-20B, when the vertically-adjustable plunging bracket 304 may be arranged in an "up orientation," the one or more fasteners 308 are located at an upper end 310*a* of the vertical adjustment slots 310; conversely, as seen in FIGS. 21A-21B, when the vertically-adjustable plunging bracket 304 may be arranged in an "down orientation," the one or more fasteners 308 are located at a lower end 310*b* of the vertical adjustment slots 310.

Figure 19:
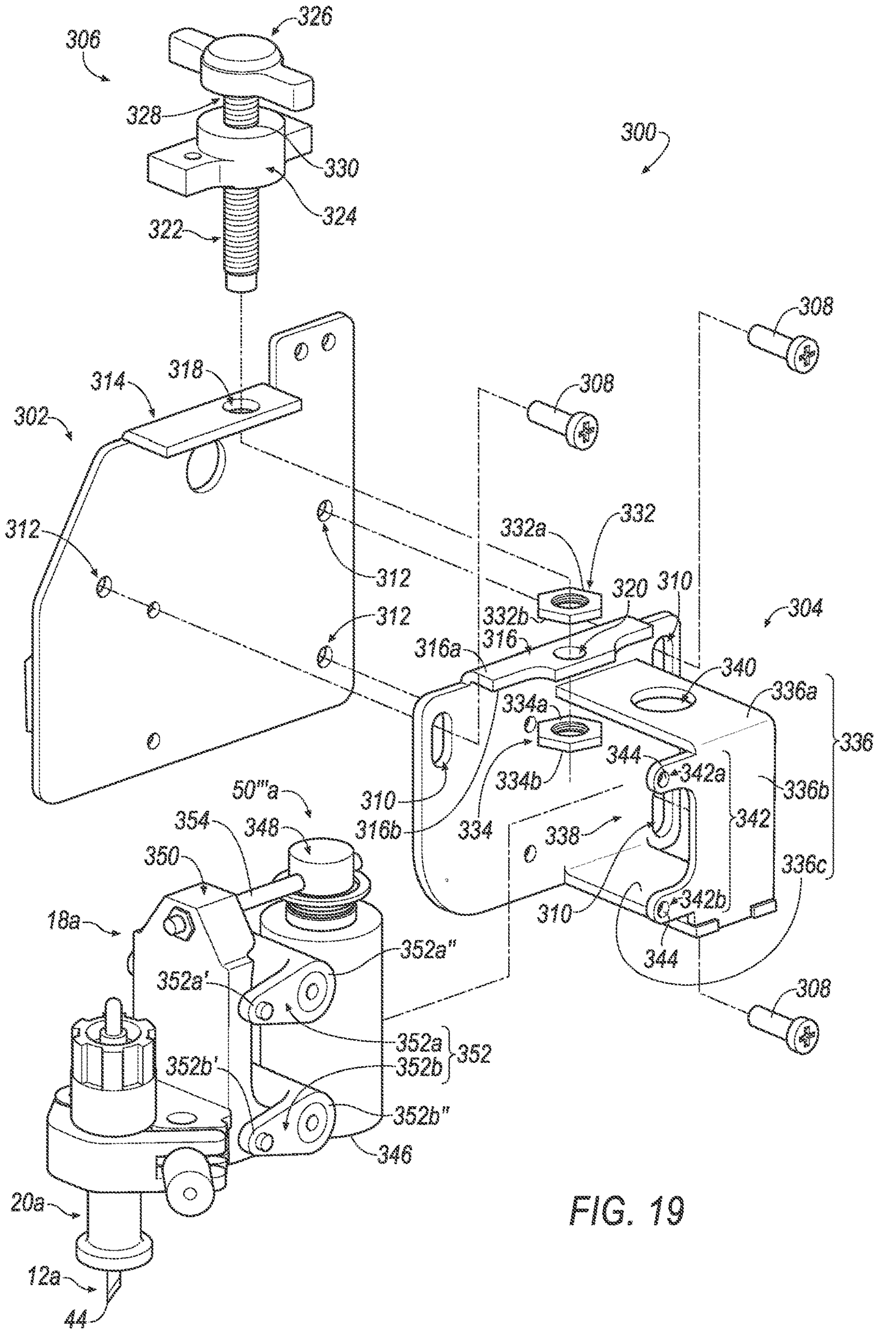
FIG. 19 illustrates an exploded perspective view of a sub-structure of a crafting apparatus in accordance with an exemplary embodiment of the invention.

Referring to FIG. 19, in an embodiment, the vertically-adjustable plunging bracket 304 includes several flanges 336*a*-336*c* that forms a cradle 336 that defines a cavity 338. In an embodiment, the flange 336*a* forms a passage 340. In an embodiment, the flange 336*b* includes a pair of support arms 342. In an embodiment, each arm 342*a*, 342*b* of the pair of support arms 342 includes a passage 344.

In an embodiment, the adjustment assembly 50"*a* may be disposed within cavity 338. In an embodiment, a distal end 346 of the adjustment assembly 50" may be supported by the flange 336*c*. In an embodiment, an actuator 348 of the adjustment assembly 50" may extend through the passage 340 formed by the flange 336*a*.

In an embodiment, the first working assembly 18*a* includes a carrier 350 and a pair of pivot brackets 352. In an embodiment, the pair of pivot brackets 352 includes a first pivot bracket 352*a* and a second pivot bracket 352*b*. In an embodiment, each of the first and second pivot brackets 352*a*, 352*b* includes a first distal end 352*a*', 352*b*' and a second distal end 352*a*", 352*b*". In an embodiment, the first distal end 352*a*', 352*b*' are pivotably-connected to the carrier 350 whereas the second distal end 352*a*", 352*b*" are pivotably-connected to the pair of support arms 342. In an embodiment, a pin (not shown) may be extended from the second distal end 352*a*", 352*b*" and through the passage 344 for pivotably connecting the pair of pivot brackets 352 to the pair of support arms 342.

In an embodiment, a shaft 354 couples the actuator 348 of the adjustment assembly 50"*a* to the carrier 350. Referring to FIGS. 20A and 21A, when the actuator 348 of the adjustment assembly 50"*a* may be arranged in an "up orientation," the shaft 354 maintains the carrier 350 in an up or neutral orientation such that the first working component 20*a* including the blade 12*a* that may be connected to the first working assembly 18*a* may also be arranged in an up or neutral orientation. However, referring to FIGS. 20B and 21B, when the actuator 348 of the adjustment assembly 50"*a* may be arranged in a "down orientation," the shaft 354 moves the carrier 350 downwardly to a down or actuated orientation such that the first working component 20*a* including the blade 12*a* that may be connected to the first working assembly 18*a* may also be arranged in a down or actuated orientation; movement to the down or actuated orientation may be permitted due to the pivotable connection of the pair of pivot brackets 352 to the pair of support arms 342.

As described above, an implementation of the crafting apparatus 10 may conduct work upon (e.g., perform a cutting/printing operation to) a workpiece, W, including, for example, an edible foodstuff material, an editable foodstuff ink, or the like. Foodstuff material, W, may be defined as any type of material that may be consumable by animalia (e.g., human beings, animals or the like) in order to provide nutritional value to the animalia. Accordingly, it will be appreciated that although some types of workpiece materials, W (e.g., paper, cork or the like), could be (but should not be) consumed by animalia, and, as such, could be broadly construed as "foodstuff" workpiece material, the limitation "foodstuff," in some circumstances, may not be applicable to certain types of workpiece materials, W (e.g., paper, cork or the like). Accordingly, when the limitation, "foodstuff," precedes the limitation, "workpiece," in the following disclosure, the limitation "foodstuff" may be construed by one skilled in the art to specifically exclude certain types of workpieces, W (e.g., paper, cork or the like), due to the fact that such types of workpieces, W (e.g., paper, cork or the like), do not have the quality of providing nutritional value when consumed and subsequently digested by animalia (e.g., human beings, animals or the like).

Exemplary foodstuff workpieces, W, may include, but are not limited to, for example: fondant, gum paste, sheet icing, liquorices, tortillas, cheeses or the like. Further, the crafting apparatus 10 may conduct work (e.g., perform a printing operation) by depositing foodstuff dye/foodstuff coloring/foodstuff ink, I (see, e.g., FIG. 22A), upon one or more of a first, front surface, $W_F$, and a second, rear surface, $W_R$, of the edible foodstuff material, W. An exemplary crafting apparatus 10 that performs/conducts work as described above may be sold under the trade name, CRICUT CAKE® and may be commercially available from PROVO CRAFT®. Accordingly, in the following description, the crafting apparatus 10 may hereinafter be referred to as a "foodstuff crafting apparatus." Although the term "foodstuff" may precede the term "crafting apparatus," the following description is directed to an implementation of the crafting apparatus 10, and, as such, the use of a particular workpiece, W (i.e., a non-foodstuff workpiece), and/or an ink, I (i.e., a non-foodstuff ink), should not otherwise limit the scope of the described structure/methodologies associated with the apparatus 10.

Because an implementation of the crafting apparatus 10 may conduct work upon a foodstuff workpiece, W, and/or foodstuff ink, I, it will be appreciated that the foodstuff crafting apparatus 10 is not limited to including one or more working assemblies 18 having one or more working components 20 including one or more of a cutting head 20*a* and a printing head 20*b*. For example, as will be explained in the following disclosure, the foodstuff crafting apparatus 10 is not limited to including one or more of a cutting and/or printing head 20*a*, 20*b* and may include, for example, one or more other working heads 20*c*-20*f*, which are shown and described in the following disclosure at FIGS. 23, 26, 30 and 33.

Figure 23:
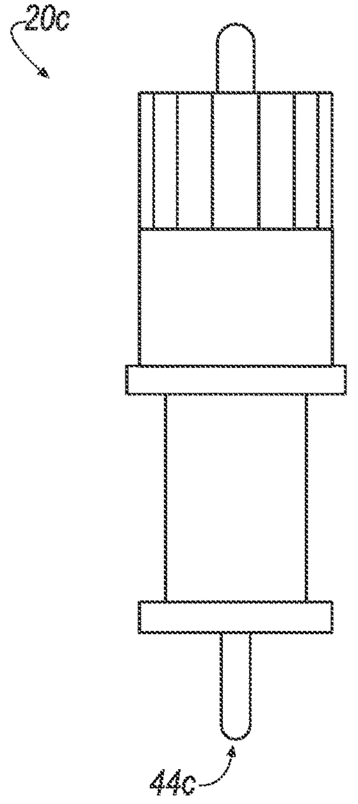
FIG. 23 is a view of a working head of a crafting apparatus in accordance with an exemplary embodiment of the invention.

Referring to FIG. 23, the one or more other working heads 20*c*-20*f* may include a shaping head 20*c*. In an embodiment, the shaping head 20*c* may be substantially similar to the function of that of the cutting head 20*a* (i.e., the cutting head 20*a* and the shaping head 20*c* may aesthetically change the shape of a foodstuff workpiece, W); however, it will be appreciated that a distal end 44*c* of the shaping head 20*c* is different from that of the distal end 44 of the cutting head 20*a* in that the distal end 44*c* of the shaping head 20*c* does not include a sharp edge or surface but, rather, a blunt surface. In an embodiment, the "bluntness" of the distal end 44*c* of the shaping head 20*c* may arise from a substantially rounded or dome-shaped surface contour such that a plunging or dragging motion of the shaping head 20*c* relative a foodstuff workpiece, W, does not shear or cut the foodstuff workpiece, W.

Figure 24:
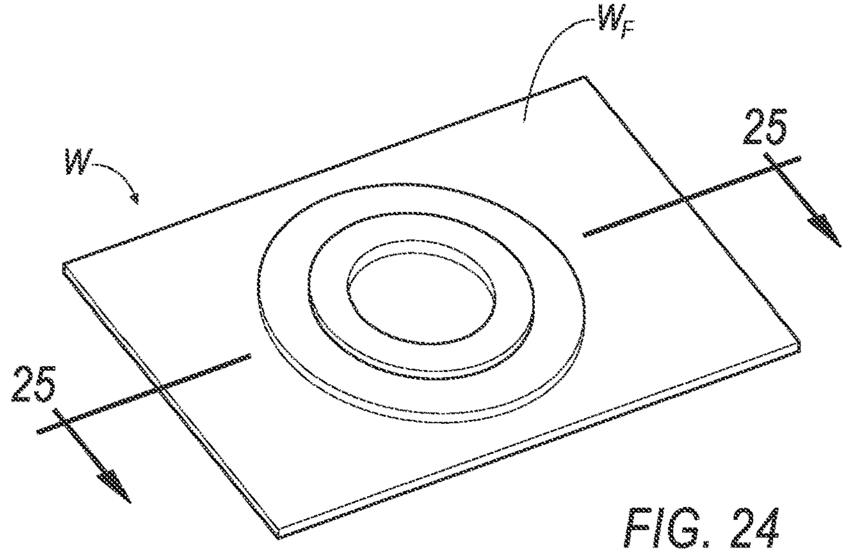
FIG. 24 is a perspective view of a workpiece in accordance with an exemplary embodiment of the invention.
Figure 25:
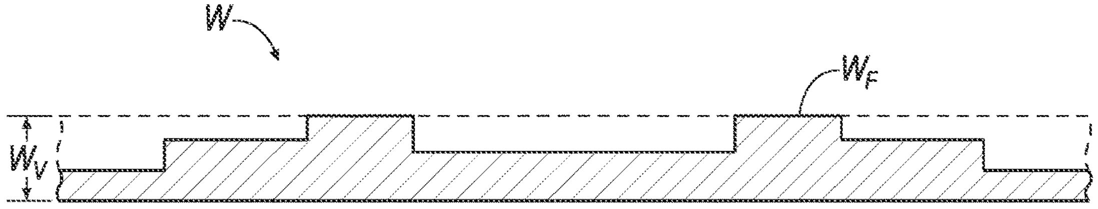
FIG. 25 is a cross-sectional view of the workpiece according to line 25-25 of FIG. 24 in accordance with an exemplary embodiment of the invention.

In an embodiment, the shaping head 20*c* may be coupled to any desirable structure of the foodstuff crafting apparatus 10 (e.g., the sub-structure 300) for the purpose of causing the distal end 44*c* of the shaping head 20*c* to engage foodstuff workpiece, W (see, e.g., FIGS. 24-25). For example, in an embodiment, the sub-structure 300 may manipulate the orientation of the shaping head 20*c* relative the surface, $W_F$, of the foodstuff workpiece, W, in order to permit the distal end 44*c* of the shaping head 20*c* to conduct "work" upon the foodstuff workpiece, W. In an embodiment, the "work" conducted upon the foodstuff workpiece, W, may include, for example, a "shaping operation." In an embodiment, the "shaping operation" may include a "debossing operation." In an embodiment, "debossing" may include deforming the foodstuff workpiece, W, such that the shaping head 20*c* is permitted to press down on upon, indent, or be dragged upon the surface, $W_F$, of the foodstuff workpiece, W.

In an embodiment, as seen in FIGS. 24-25, the shaping head 20*c* may deboss the foodstuff workpiece, W, in a manner such that the surface, $W_F$, of the foodstuff workpiece, W, is shaped to include a pair of concentric rings encompassing a central depression. In an embodiment, the material forming the foodstuff workpiece, W, may be compressed such that the material forming the foodstuff workpiece, W, is displaced, or, alternatively, is compacted such that the material forming the foodstuff workpiece includes a greater density. Alternatively, as will be described in the following disclosure, if material forming the foodstuff workpiece is removed, the material may fall into or otherwise be deposited into a tray (see, e.g., FIGS. 37-38).

In an embodiment, contact of the shaping head 20*c* with the foodstuff workpiece, W, during the shaping operation permits the shaping head 20*c* to aesthetically deform a foodstuff workpiece, W, into an aesthetically-desired shape. In an embodiment, the foodstuff crafting apparatus 10 may include a processor (e.g., such as the processor 76) that causes movement of the shaping head 20*c* relative the foodstuff workpiece, W, and/or movement of the foodstuff workpiece, W, relative the shaping head 20*c* in order to permit the shaping head 20*c* to execute the shaping operation for shaping the foodstuff workpiece, W, into the aesthetically-desired shape. In an embodiment, a user may select/create an aesthetically-desired shape and inform the processor to execute a program for causing the shaping operation to be carried out for forming the foodstuff workpiece, W, into the selected/created aesthetically-desired shape.

In an embodiment, the shaping head 20*c* may engage a "virgin foodstuff workpiece" in order to shape the virgin foodstuff workpiece into an aesthetically-desired shape. In an embodiment, a virgin foodstuff workpiece may include, for example, a substantially flat sheet of material having a substantially uniform geometry (see, e.g., $W_V$, of FIG. 25).

In an embodiment, the "uniform geometry," $W_V$, may include a uniform thickness such that the aesthetically-desired shape is formed to include a "non-uniform geometry"/"non-uniform thickness."

It will be appreciated, however, that an embodiment of a "uniform geometry" associated with a virgin foodstuff workpiece as described above may not necessarily be limited to foodstuff workpieces having a substantially uniform thickness, $W_V$. For example, a virgin foodstuff workpiece may be defined as a pre-manufactured piece of material already including a non-uniform thickness, and, as such, a "virgin foodstuff workpiece" may alternatively mean that the foodstuff workpiece may include a non-uniform thickness that has not been upset or worked on by a person, machine or device.

In an embodiment, the foodstuff workpiece, W, associated with FIGS. 23-38 may include any desirable material; however, in an embodiment, it will be appreciated that the foodstuff workpiece, W, may include a relatively soft or low density material, such as, for example, a foamed material or an edible material. If, for example, the foodstuff workpiece, W, includes an edible material, the foodstuff workpiece, W, may include, for example, fondant that may be subsequently attached to, for example, a baked good, such as, for example, a cake, cup-cake or the like.

Figure 26:
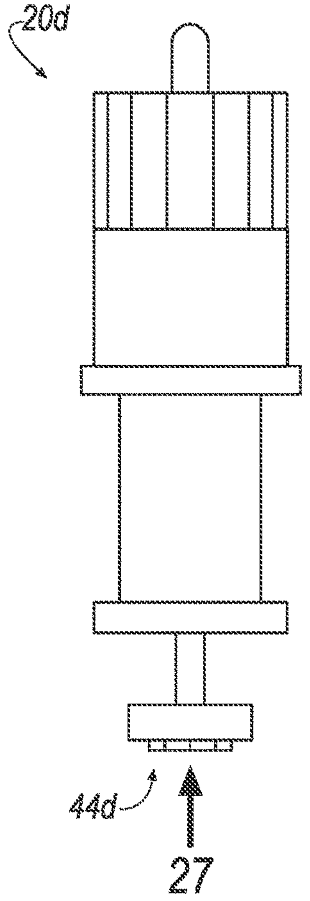
FIG. 26 is a view of a working head of a crafting apparatus in accordance with an exemplary embodiment of the invention.
Figure 27:
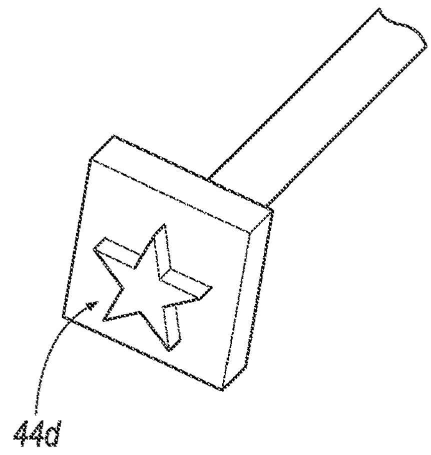
FIG. 27 is a view of the working head of according to line 27 of FIG. 26 in accordance with an exemplary embodiment of the invention.

Referring to FIG. 26, the one or more other working heads 20*c*-20*f* may include another shaping head 20*d*. In an embodiment, the shaping head 20*d* may be substantially similar to the function of that of the cutting head 20*a* (i.e., the cutting head 20*a* and the shaping head 20*d* may aesthetically change the shape of a foodstuff workpiece, W); however, it will be appreciated that a distal end 44*d* of the shaping head 20*d* is different from that of the distal end 44 of the cutting head 20*a* in that the distal end 44*d* of the shaping head 20*d* does not include a sharp edge or surface but, rather, a blunt surface. In an embodiment, the distal end 44*d* of the shaping head 20*d* may be further characterized to include a design or pattern (e.g. as seen in FIG. 27, that includes a configuration of a star) such that the shaping head 20*d* may be used as a stamp and therefore be referred to as a "stamping head."

Figure 28:
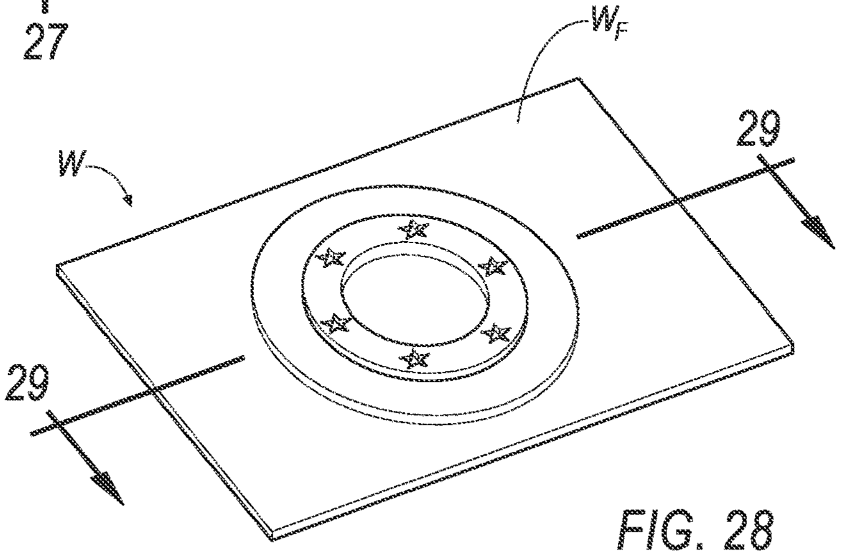
FIG. 28 is a perspective view of a workpiece in accordance with an exemplary embodiment of the invention.
Figure 29:
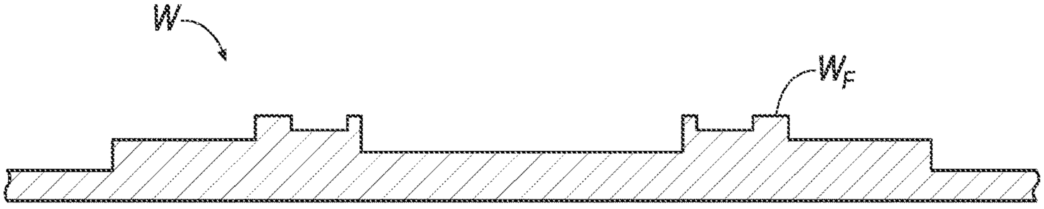
FIG. 29 is a cross-sectional view of the workpiece according to line 29-29 of FIG. 28 in accordance with an exemplary embodiment of the invention.

In an embodiment, the shaping head 20*d* may be coupled to any desirable structure of the foodstuff crafting apparatus 10 (e.g., the sub-structure 300) for the purpose of causing the distal end 44*d* of the shaping head 20*d* to engage a foodstuff workpiece, W (see, e.g., FIGS. 28-29). For example, in an embodiment, the sub-structure 300 may manipulate the orientation of the shaping head 20*d* relative the surface, $W_F$, of the foodstuff workpiece, W, in order to permit the distal end 44*d* of the shaping head 20*d* to conduct "work" upon the foodstuff workpiece, W. In an embodiment, the "work" conducted upon the foodstuff workpiece, W, may include, for example, a "shaping operation." In an embodiment, the "shaping operation" may include a "debossing operation." In an embodiment, "debossing" may include deforming the foodstuff workpiece, W, such that the shaping head 20*d* is permitted to press down on upon, indent, or stamp the surface, $W_F$, of the foodstuff workpiece, W, so as to transpose the design or pattern of the distal end 44*d* into the surface, $W_F$, of the foodstuff workpiece, W (e.g., as seen in FIGS. 28-29, the foodstuff workpiece, W, is deformed to include one or more star-shaped debossings from the distal end 44*d*).

In an embodiment, contact of the shaping head 20*d* with the foodstuff workpiece, W, during the shaping operation permits the shaping head 20*d* to aesthetically deform a foodstuff workpiece, W, into an aesthetically-desired shape.

In an embodiment, the foodstuff crafting apparatus 10 may include a processor (e.g., such as the processor 76) that causes movement of the shaping head 20*d* relative the foodstuff workpiece, W, in order to permit the shaping head 20*d* to execute the shaping operation for shaping the foodstuff workpiece, W, into the aesthetically-desired shape. In an embodiment, a user may select/create an aesthetically-desired shape and inform the processor to execute a program for causing the shaping operation to be carried out for forming the foodstuff workpiece, W, into the selected/created aesthetically-desired shape.

Figure 30:
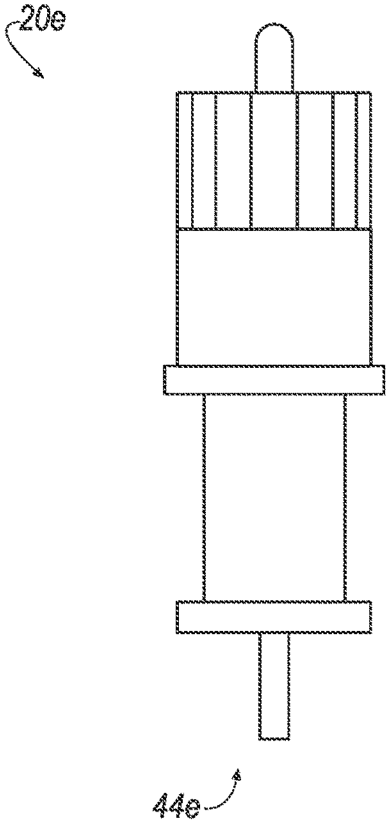
FIG. 30 is a view of a working head of a crafting apparatus in accordance with an exemplary embodiment of the invention.

Referring to FIG. 30, the one or more other working heads 20*c*-20*f* may include another shaping head 20*e*. In an embodiment, the shaping head 20*e* may be substantially similar to the function of that of the cutting head 20*a* (i.e., the cutting head 20*a* and the shaping head 20*e* may aesthetically change the shape of a foodstuff workpiece, W); however, it will be appreciated that a distal end 44*e* of the shaping head 20*e* is different from that of the distal end 44 of the cutting head 20*a* in that the distal end 44*e* of the shaping head 20*d* does not include a sharp edge or surface but, rather, a blunt surface. In an embodiment, however, unlike the distal end 44*c* of the shaping head 20*c*, the distal end 44*e* of the shaping head 20*e* does not include a rounded or dome-shaped surface contour, but, rather, a substantially flat/planar surface contour.

Figure 31:
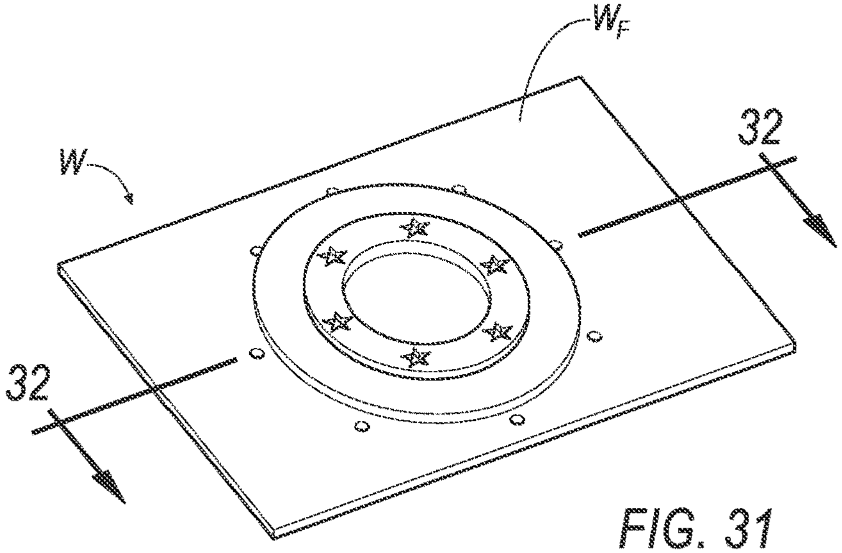
FIG. 31 is a perspective view of a workpiece in accordance with an exemplary embodiment of the invention.
Figure 32:
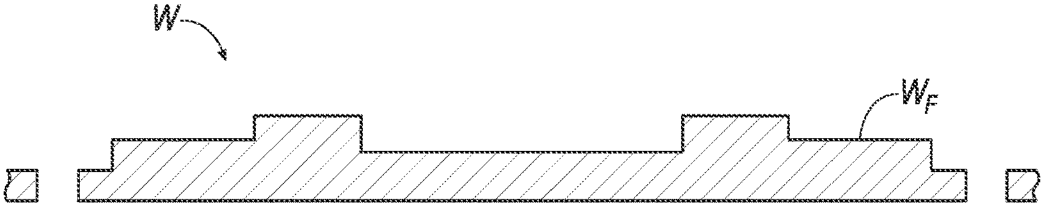
FIG. 32 is a cross-sectional view of the workpiece according to line 32-32 of FIG. 31 in accordance with an exemplary embodiment of the invention.

In an embodiment, the shaping head 20*e* may be coupled to any desirable structure of the foodstuff crafting apparatus 10 (e.g., the sub-structure 300) for the purpose of causing the distal end 44*e* of the shaping head 20*e* to engage a foodstuff workpiece, W (see, e.g., FIGS. 31-32). For example, in an embodiment, the sub-structure 300 may manipulate the orientation of the shaping head 20*e* relative the surface, $W_F$, of the foodstuff workpiece, W, in order to permit the distal end 44*e* of the shaping head 20*e* to conduct "work" upon the foodstuff workpiece, W. In an embodiment, the "work" conducted upon the foodstuff workpiece, W, may include, for example, a "shaping operation." In an embodiment, the "shaping operation" may include a "debossing operation." In an embodiment, "debossing" may include deforming the foodstuff workpiece, W, such that the shaping head 20*e* is permitted to press down on upon, indent, or be dragged upon the surface, $W_F$, of the foodstuff workpiece, W.

In an embodiment, contact of the shaping head 20*e* with the foodstuff workpiece, W, during the shaping operation permits the shaping head 20*e* to aesthetically deform a foodstuff workpiece, W, into an aesthetically-desired shape. In an embodiment, the foodstuff crafting apparatus 10 may include a processor (e.g., such as the processor 76) that causes movement of the shaping head 20*e* relative the foodstuff workpiece, W, and/or movement of the foodstuff workpiece, W, relative the shaping head 20*e* in order to permit the shaping head 20*e* to execute the shaping operation for shaping the foodstuff workpiece, W, into the aesthetically-desired shape. In an embodiment, a user may select/create an aesthetically-desired shape and inform the processor to execute a program for causing the shaping operation to be carried out for forming the foodstuff workpiece, W, into the selected/created aesthetically-desired shape.

In an embodiment, it will be appreciated that the shaping heads 20*c*, 20*e* are substantially similar with the exception of the geometry/design of the distal end 44*c*, 44*e*. Further, it will be appreciated that processor may cause a different plunging stroke of each of the shaping head 20*c*, 20*e* relative the surface, $W_F$, of the foodstuff workpiece, W, such that the shaping head 20*c* may penetrate a partial thickness of a foodstuff workpiece, W, whereas the shaping head 20*e* may be permitted to penetrate an entire thickness of a foodstuff workpiece, W; accordingly, as a result of one or more of the geometry of the distal end 20*e* and the plunging stroke of the shaping head 20*e*, in an embodiment, the shaping head 20*e* may be referred to as a "punching head" that punches out one or portions of a thickness of a foodstuff workpiece, W, as seen in FIGS. 31-32.

In an embodiment, at least a portion of the distal end 44, 44*c*, 44*d*, 44*e* of each of the shaping heads 20*a*, 20*c*, 20*d*, 20*e* may form a food-contacting surface; as such, at least the distal end 44, 44*c*, 44*d*, 44*e* may be formed to include a food-grade material such as, for example, stainless steel. In an implementation, the stainless steel may include Type 420 as characterized by the 400 Series of stainless steel grade designations by the Society of Automotive Engineers (SAE).

In an embodiment, at least a portion of one or more of the workpiece-engaging rollers 54 and the substantially cylindrical shaft 55, 155, 255 may form a food-contacting surface; as such, at least a portion of one or more of the workpiece-engaging rollers 54 and the substantially cylindrical shaft 55, 155, 255 may be formed to include a food-grade material such as, for example, stainless steel. In an implementation, the stainless steel may include Type 420 as characterized by the 400 Series of stainless steel grade designations by the SAE.

Although at least a portion of one or more of the workpiece-engaging rollers 54 and the substantially cylindrical shaft 55, 155, 255 may be formed to include a food-grade material, in some instances, it may not be desirable to have any portion of one or more of the workpiece-engaging rollers 54 and the substantially cylindrical shaft 55, 155, 255 contacting the foodstuff workpiece, W (e.g., the workpiece-engaging rollers 54 may undesirably streak/deform/depress the foodstuff workpiece, W). Accordingly, in an implementation, the substantially cylindrical shaft 55, 155, 255 may be formed to not include one or more of the workpiece-engaging rollers 54.

In some implementations, the substantially cylindrical shaft 55, 155, 255 may obstruct a foodstuff workpiece, W, having a relatively large thickness, $W_T$; as such, some implementations of the foodstuff crafting apparatus 10 may not include the substantially cylindrical shaft 55, 155, 255. When the foodstuff crafting apparatus 10 does not include the substantially cylindrical shaft 55, 155, 255, the foodstuff workpiece, W, may be disposed upon a mat 36 that is moved by a first upper mat-engaging roller and a second lower mat-engaging roller that are shown similarly at 156*a*, 156*b* in FIG. 16 (i.e., without the presence of the substantially cylindrical shaft 155 shown in FIG. 16); accordingly, in such an implementation, the rollers 156*a*, 156*b* may engage only the mat 36 and not the foodstuff workpiece, W.

Because the substantially cylindrical shaft 55, 155, 255 may or may not be included in a particular implementation of the foodstuff crafting apparatus 10, the foodstuff crafting apparatus 10 may be designed to be selectively-configurable at a user's discretion. For example, the substantially cylindrical shaft 55, 155, 255 may be selectively attached to the body 14 of the foodstuff crafting apparatus 10 as desired by the user. In addition to providing the user with the ability to selectively attach the substantially cylindrical shaft 55, 155, 255 to the body 14, selective removal of the substantially cylindrical shaft 55, 155, 255 permits the user to easily wash the substantially cylindrical shaft 55, 155, 255 if foodstuff particles become attached to the substantially cylindrical shaft 55, 155, 255.

Figure 33:
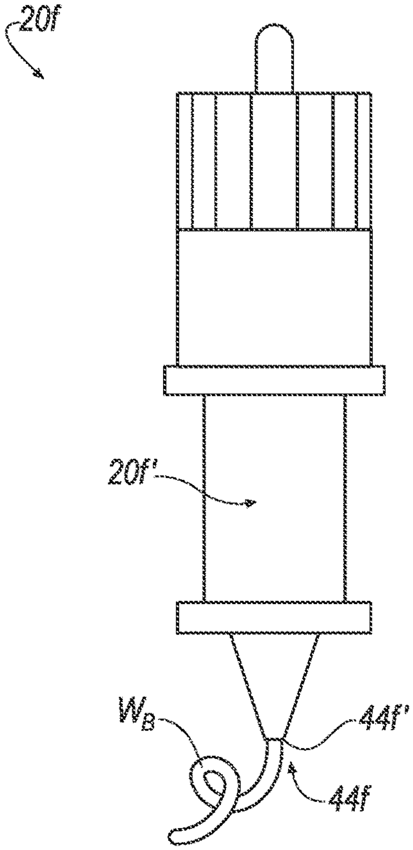
FIG. 33 is a view of a working head of a crafting apparatus in accordance with an exemplary embodiment of the invention.

Referring to FIG. 33, the one or more other working heads 20*c*-20*f* may include another shaping head 20*f*. In an embodiment, the shaping head 20*f* may not share the same function as that of the earlier-described shaping heads 20*a* and 20*c*-20*e*; rather, the shaping head 20*f* may be substantially similar to that of the function of the printing head 20*b* in that the shaping head 20*f* deposits material onto the foodstuff workpiece, W (see, e.g., FIGS. 34-35). In an embodiment, however, unlike the distal end 46 of the printing head 20*b*, a distal end 44*f* of the shaping head 20*f* does not deposit foodstuff ink onto the foodstuff workpiece, W, but, rather, the distal end 44*f* of the shaping head 20*f* deposits a three-dimensional bead of material, $W_B$, onto the surface, $W_F$, of the foodstuff workpiece, W. In an embodiment, the three-dimensional bead of material, $W_B$, may include, for example, confectionary icing or frosting that is deposited onto a foodstuff workpiece, W, that may include, for example, fondant; as such, the shaping head 20*f* may be alternatively referred to as an "icing head." Alternatively, the three-dimensional bead of material, $W_B$, may include, for example foodstuff dye/foodstuff coloring (i.e., foodstuff ink, I). Although the bead of material, $W_B$, is illustrated to include a substantially solid body that curls, if, for example, the bead of material, $W_B$, is foodstuff ink, I, the bead of material, $W_B$, may not necessarily be discharged as a substantially solid body that curls, but, rather, may be spritzed/sprayed in a substantially liquid form.

In an embodiment, a body 20*f'* of the shaping head 20*f* may include a reservoir that houses a supply of depositing material that forms the bead of material, $W_B$, that is selectively-evacuated through an orifice 44*f'* of the distal end 44*f* of the shaping head 20*f*. In an embodiment, a valve (not shown) may be located proximate the orifice 44*f'* of the distal end 44*f* in order to permit or deny evacuation of the bead of material, $W_B$, onto the surface, $W_F$, of the foodstuff workpiece, W. In an embodiment, the valve may be de/actuated by the processor in response to an aesthetically-desired shape selected/created by a user. In an embodiment, because the valve is a movable component, the shaping head 20*f* may be characterized as a non-passive head whereas the other working heads 20*a*, 20*c*-20*e* may be characterized as passive heads.

Figure 36A:
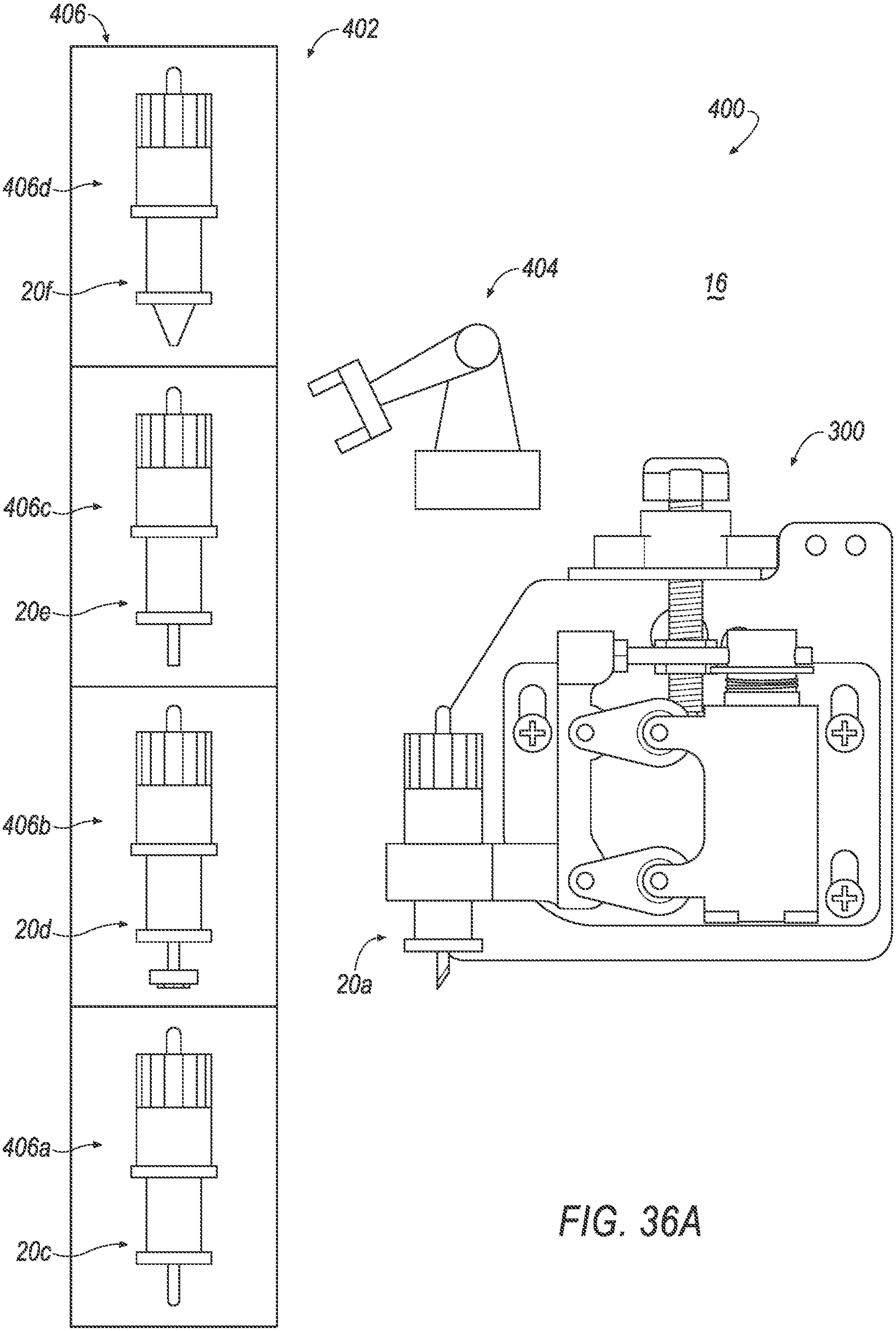
FIG. 36A is a view of a system associated with a crafting apparatus in accordance with an exemplary embodiment of the invention.
Figure 36B:
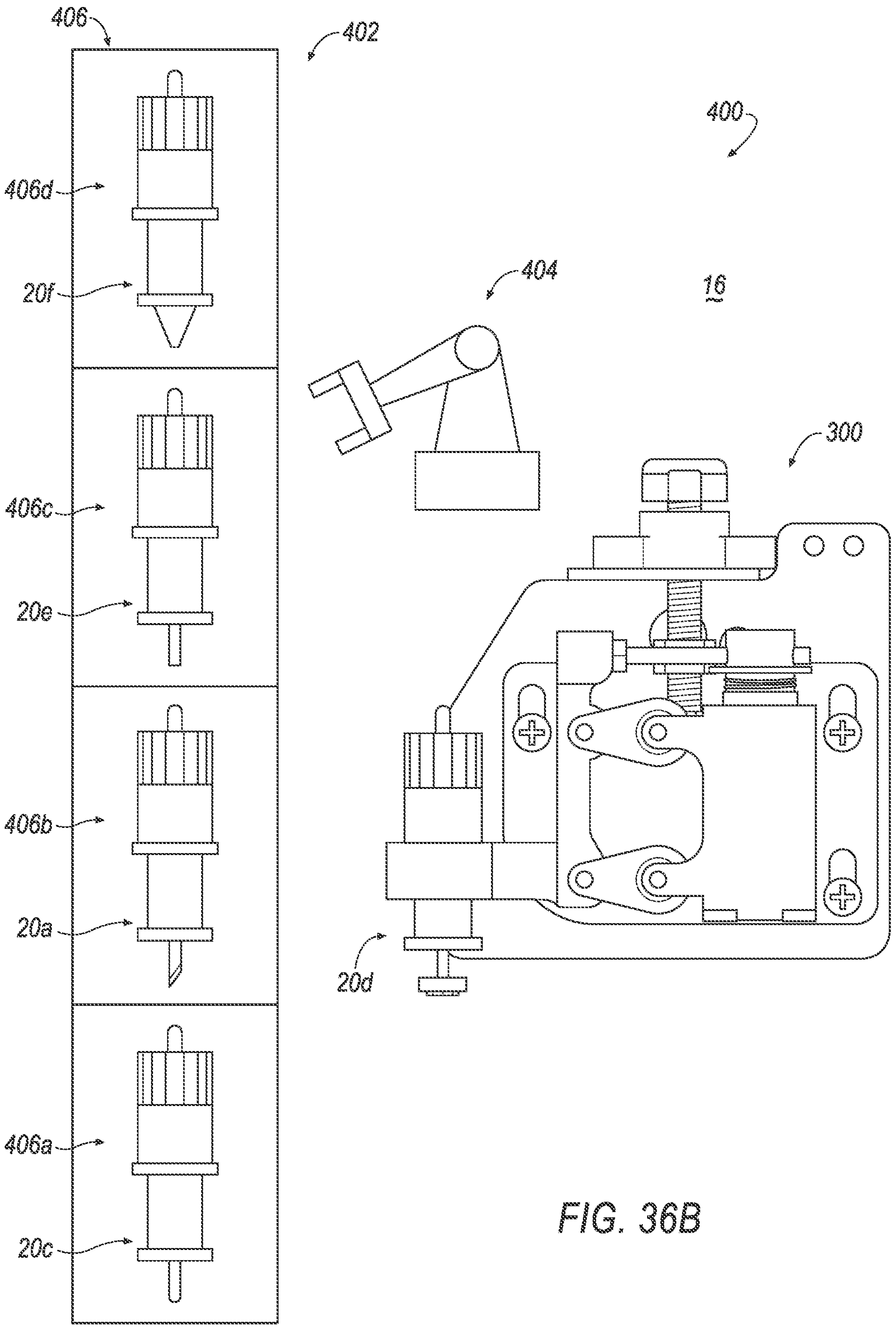
FIG. 36B is another view of the system associated with a crafting apparatus of FIG. 36A in accordance with an exemplary embodiment of the invention.

Referring to FIGS. 36A-36B, the foodstuff crafting apparatus 10 may further comprise a system 400 including a cache 402 of working heads 20*a*, 20*c*-20*f*. In an embodiment, the system 400 may further include a retriever 404 that selects a working head from the cache 402 of working heads 20*a*, 20*c*-20*f* and then transports the selected working head from the cache 402 toward from the sub-structure 300 for subsequent coupling of the selected working head with the sub-structure 300. In an embodiment, the cache 402 and retriever 404 may be disposed within the interior compartment 16 of the foodstuff crafting apparatus 10 and proximate the one or more assemblies 18, 18' in order to permit the working heads 20*a*, 20*c*-20*f* to be interchangeably-coupled with the sub-structure 300.

In an embodiment, the working heads 20*a*, 20*c*-20*f* of the cache 402 may be retained within a depot 406. In an embodiment, the depot 406 may include a plurality of storage wells 406*a*-406*d* that each stores a working head of the cache 402 of working heads 20*a*, 20*c*-20*f*.

In an embodiment, the depot 406 may be rotatably adjustable such that a storage well of the plurality of storage wells 406*a*-406*d* may be arranged proximate the sub-structure 300 such that the retriever 404 may select a working head from the depot 404 for subsequent attachment to the sub-structure 300. In an embodiment, the depot 406 may alternatively be referred to as a turret or a carousel.

Figure 34:
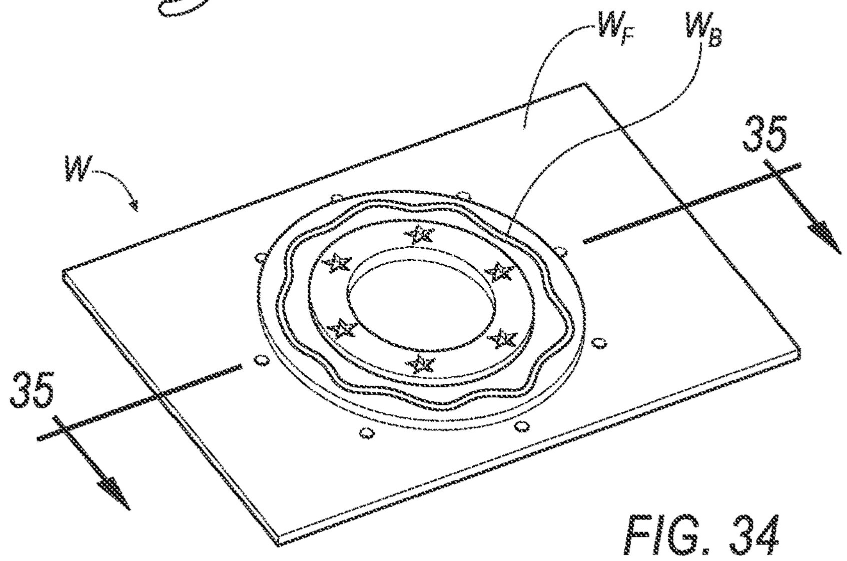
FIG. 34 is a perspective view of a workpiece in accordance with an exemplary embodiment of the invention.
Figure 35:
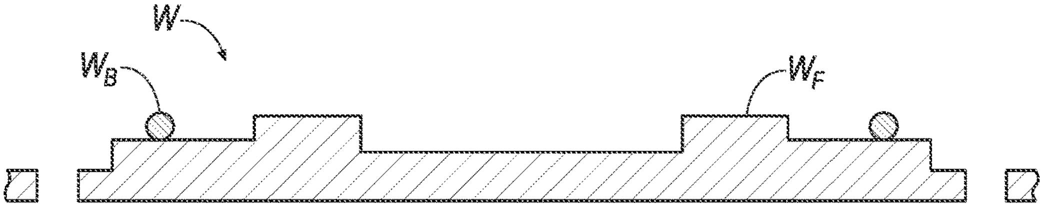
FIG. 35 is a cross-sectional view of the workpiece according to line 35-35 of FIG. 34 in accordance with an exemplary embodiment of the invention.

In an embodiment, the system 400 may be utilized to shape a foodstuff workpiece, W, such that the foodstuff crafting apparatus 10 does not have to be formed with a plurality of sub-structures 300 each including a dedicated working head 20*a*, 20*c*-20*f*. For example, in an embodiment, retriever 404 may firstly select, from the depot 406, then attach the shaping head 20*c* to the sub-structure 300 for shaping the foodstuff workpiece, W, as shown in FIG. 24. Then, the retriever 404 may disconnect the shaping head 20*c* from the sub-structure 300 and return the shaping head 20*c* back to the depot 406. Afterward, the retriever 404 may select, from the depot 406, then attach the shaping head 20*d* to the sub-structure 300 for shaping the foodstuff workpiece, W, as shown in FIG. 28. Then, the retriever 404 may disconnect the shaping head 20*d* from the sub-structure 300 and return the shaping head 20*d* back to the depot 406. Afterward, the retriever 404 may select, from the depot 406, then attach the shaping head 20*e* to the sub-structure 300 for shaping the foodstuff workpiece, W, as shown in FIG. 31. Then, the retriever 404 may disconnect the shaping head 20*e* from the sub-structure 300 and return the shaping head 20*e* back to the depot 406. Afterward, the retriever 404 may select, from the depot 406, then attach the shaping head 20*f* to the sub-structure 300 for shaping the foodstuff workpiece, W, as shown in FIG. 34.

Figure 37:
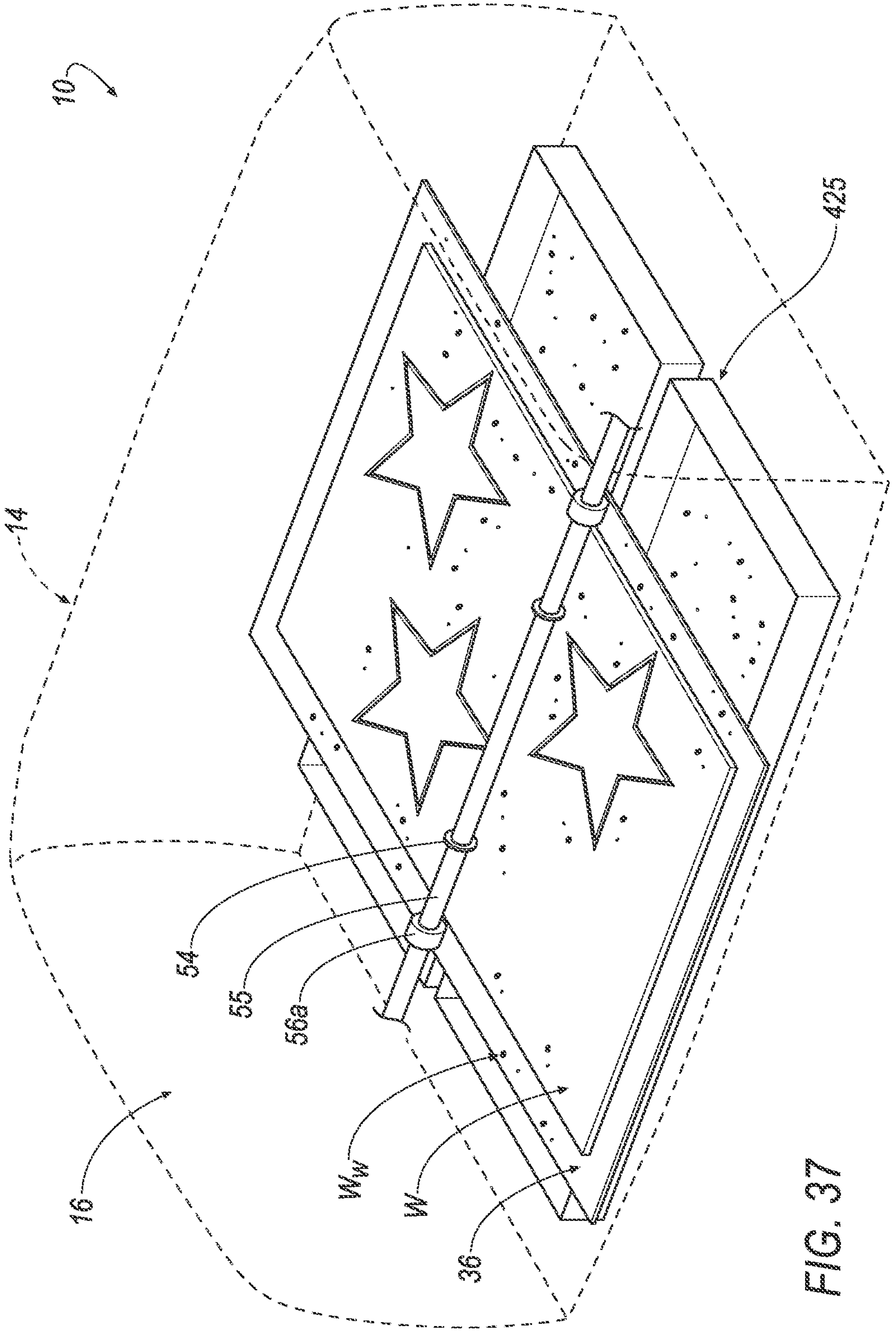
FIG. 37 is a view of a crafting apparatus in accordance with an exemplary embodiment of the invention.

Referring now to FIG. 37, a body 14 forming a crafting apparatus 10 is shown in phantom in order to illustrate contents of an interior compartment 16 of the crafting apparatus 10 according to an embodiment. In an embodiment, a substantially cylindrical shaft 55 is shown including one or more foodstuff workpiece-engaging rollers 54 and one or more mat-engaging rollers 56*a* that may contact one or more of the mat 36 and foodstuff workpiece, W.

As described above, the crafting apparatus 10 may include one or more working heads 20*a*, 20*c*-20*f* that shape the foodstuff workpiece, W; accordingly, in an embodiment, it will be appreciated that foodstuff workpiece waste, $W_W$, may be created as the one or more working heads 20*a*, 20*c*-20*f* conduct work on the foodstuff workpiece, W. As such, in an embodiment, the crafting apparatus 10 may further include one or more trays 425 arranged below one or more of the may 36 and foodstuff workpiece, W, for collecting the foodstuff workpiece waste, $W_W$, that falls away from one or more of the mat 36 and foodstuff workpiece, W. In an embodiment, a user may remove the one or more trays 425 from the interior compartment 16 for disposing or recycling of the foodstuff workpiece waste, $W_W$.

Figure 38:
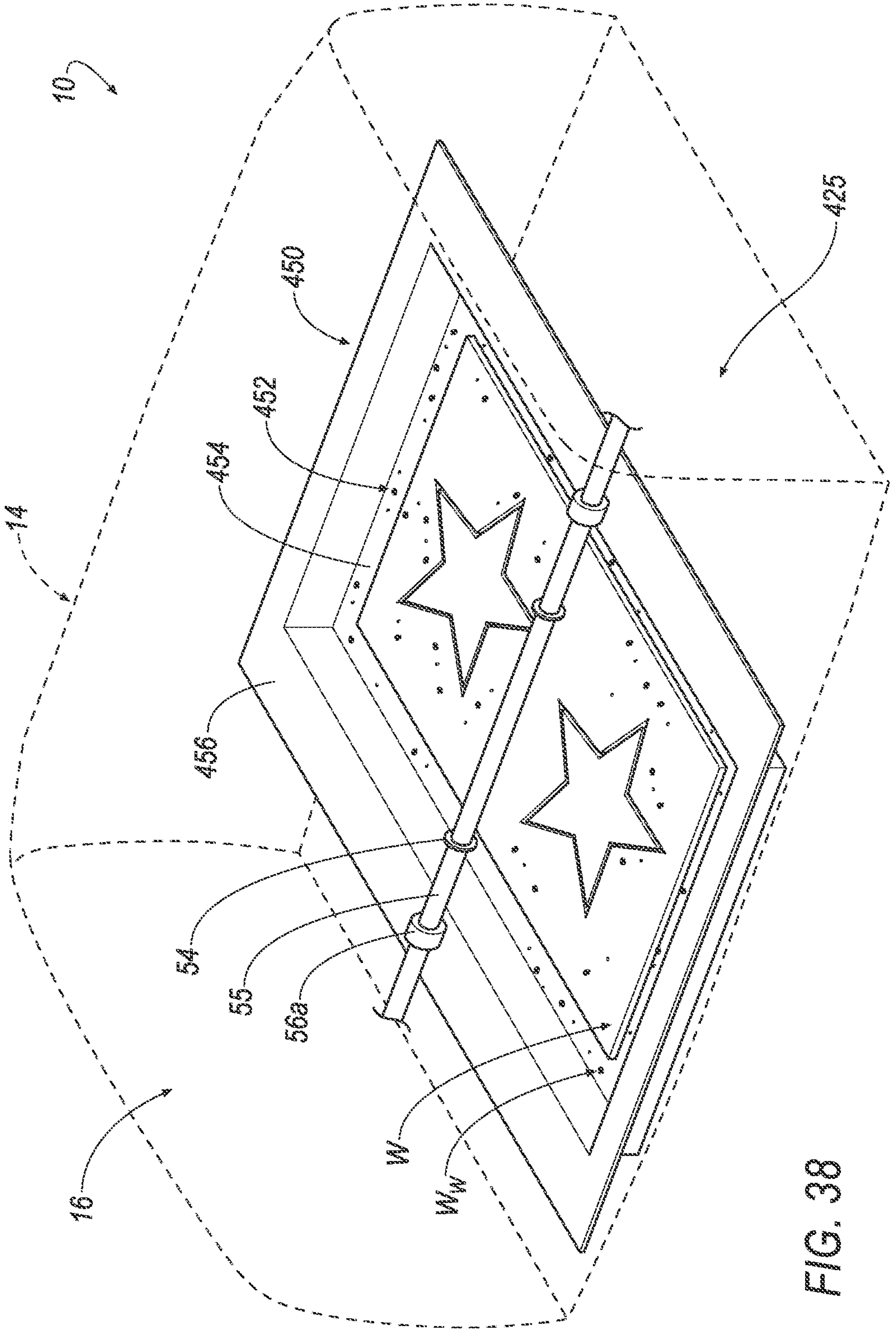
FIG. 38 is a view of a crafting apparatus in accordance with an exemplary embodiment of the invention.

Referring now to FIG. 38, a body 14 forming a crafting apparatus 10 is shown in phantom in order to illustrate contents of an interior compartment 16 of the crafting apparatus 10 according to an embodiment. In an embodiment, a substantially cylindrical shaft 55 is shown including one or more foodstuff workpiece-engaging rollers 54 and one or more mat-engaging rollers 56*a*. In an embodiment, the crafting apparatus 10 may further include a tray 450.

In an embodiment, the foodstuff workpiece, W, is arranged relative the tray 450 in a different fashion as compared to that of the tray 425 of FIG. 37. In an embodiment, one or more of the mat 36 and foodstuff workpiece, W, of FIG. 37 may be disposed upon a support assembly (not shown) that may be similar to that of the support assembly 40. However, as seen in FIG. 38, the foodstuff workpiece, W, may be disposed within a recess 452 formed by the tray 450; accordingly, in an embodiment, the foodstuff workpiece, W, may be said to be disposed upon a bottom surface 454 of the tray 450. In an embodiment, the bottom surface 454 of the tray 450 may or may not include a mat for supporting the foodstuff workpiece, W.

In an embodiment, because the foodstuff workpiece, W, is disposed within the recess 452 of the tray 450, the one or more workpiece-engaging rollers 54 and one or more mat-engaging rollers 56*a* may not contact one or more of the mat and foodstuff workpiece, W. Accordingly, in an embodiment, the one or more workpiece-engaging rollers 54 and one or more mat-engaging rollers 56*a* may contact and engage an upper rim or lip 456 of the tray 450; by contacting the upper rim 456 of the tray 450, one or more of the rollers 54, 56*a* may advance the tray 450 and foodstuff workpiece, W, within the interior compartment 10 as the one or more working heads 20*a*, 20*c*-20*f* conduct work on the foodstuff workpiece, W. Further, it will be appreciated that as the work is conducted on the foodstuff workpiece, W, the recessed orientation of the foodstuff workpiece, W, within the recess 452 further assists in the retaining of foodstuff workpiece waste, $W_W$, such that the foodstuff workpiece waste, $W_W$, is not permitted to be evacuated from the tray 450 during the working operation.

Figure 38A:
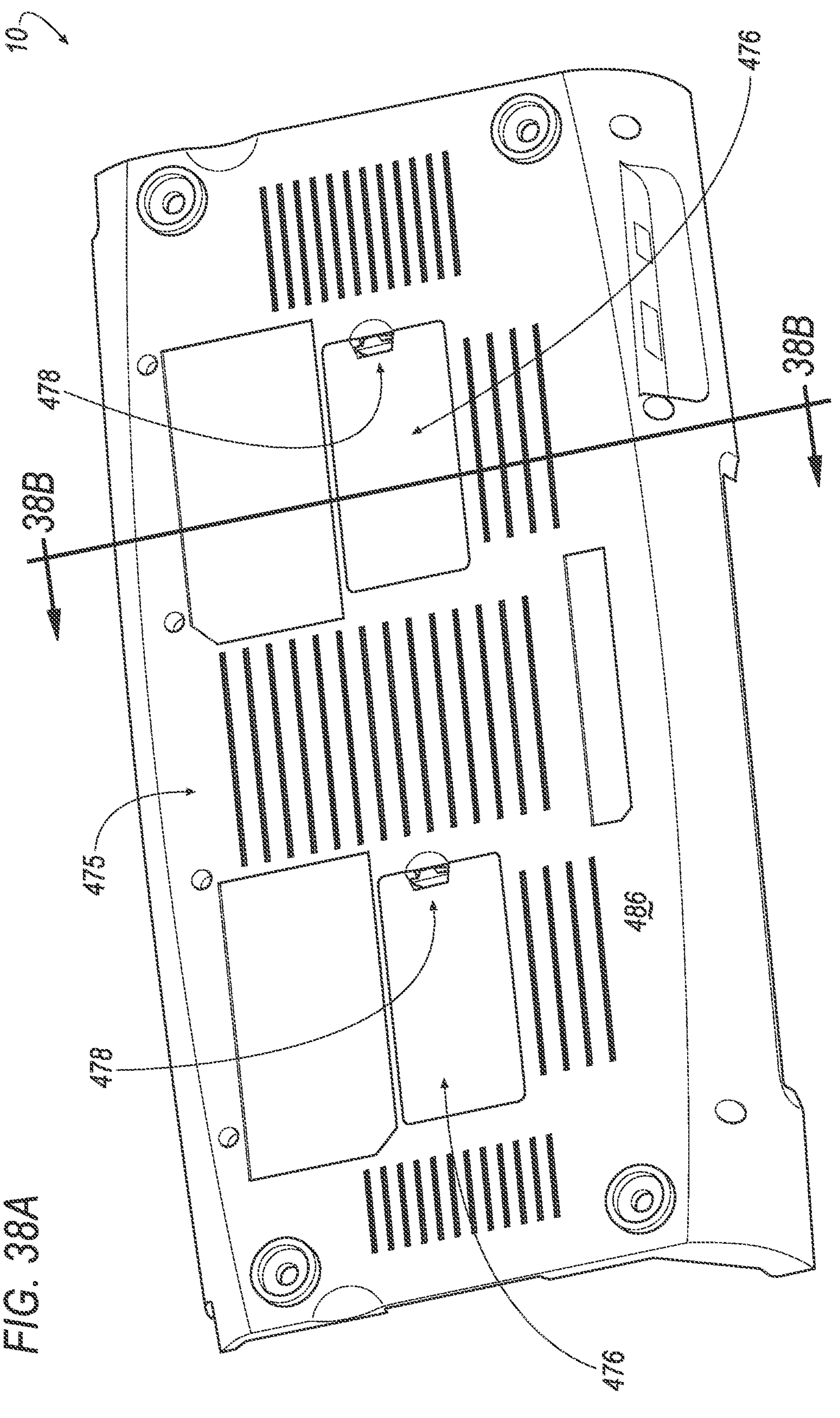
FIG. 38A is a bottom partial perspective view of a crafting apparatus in accordance with an exemplary embodiment of the invention.
Figure 38B:
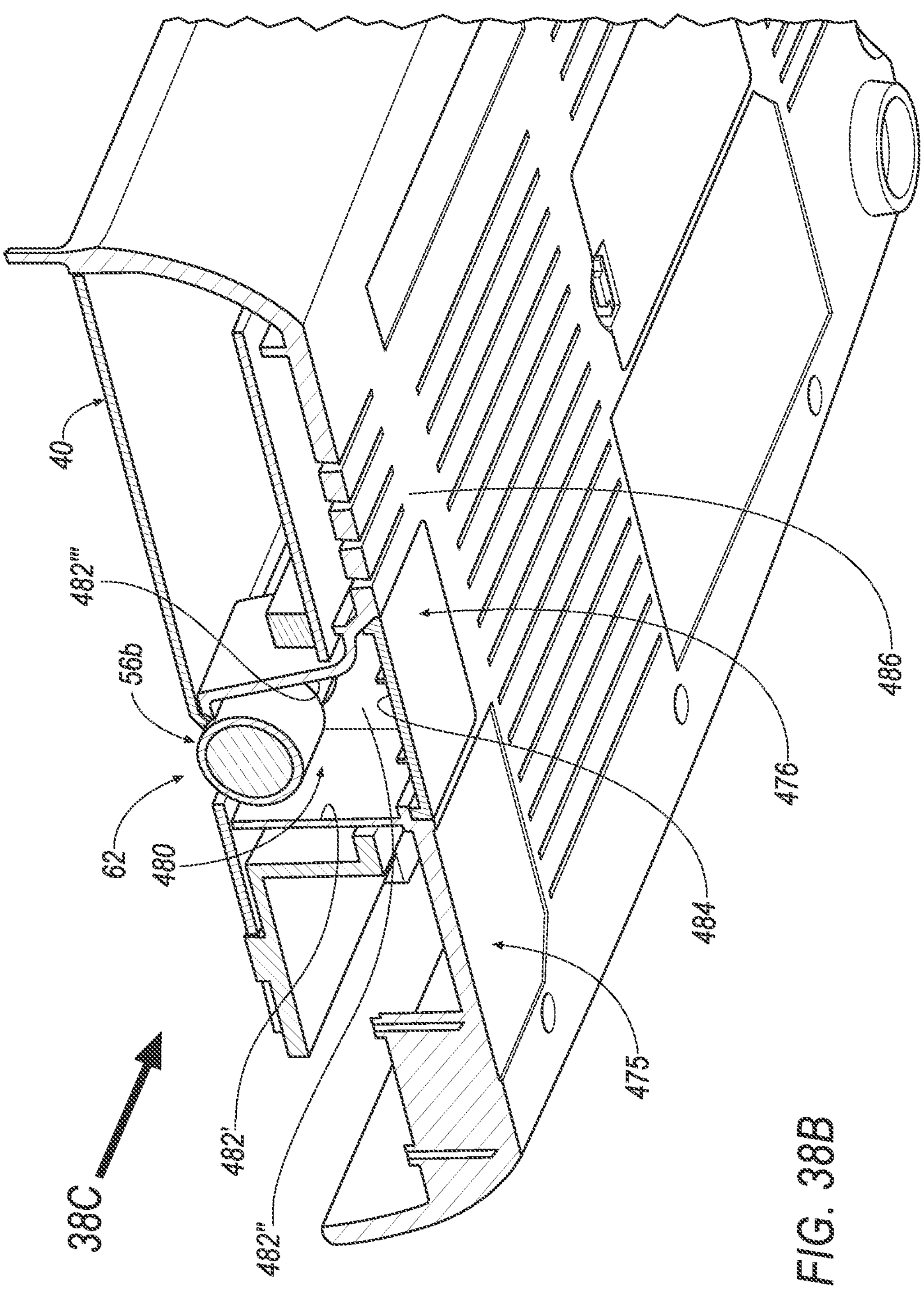
FIG. 38B is a cross-sectional, side perspective view of the crafting apparatus according to line 38B-38B of FIG. 38A in accordance with an exemplary embodiment of the invention.

Referring to FIG. 38A, a bottom partial perspective view of a foodstuff crafting apparatus 10 is shown according to an embodiment. As seen in FIG. 38A, the foodstuff crafting apparatus 10 may include a bottom panel 475 including one or more access doors 476 having a tab latch 478 in order to permit the access door 476 to be selectively un/latched and de/coupled with the bottom panel 475 such that the access door 476 may be arranged in one of a closed orientation (see, e.g., FIGS. 38A-38C") and an opened orientation (see, e.g., FIG. 38C"') relative to the bottom panel 475.

Figure 38C:
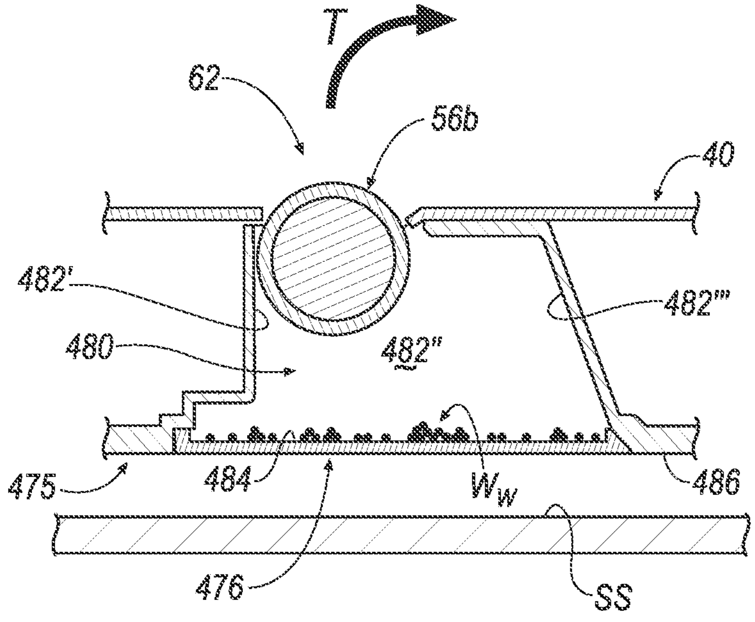
FIG. 38C' is a cross-section view according to arrow 38C of FIG. 38B showing the crafting apparatus in a first orientation in accordance with an exemplary embodiment of the invention.
Figure 38C:
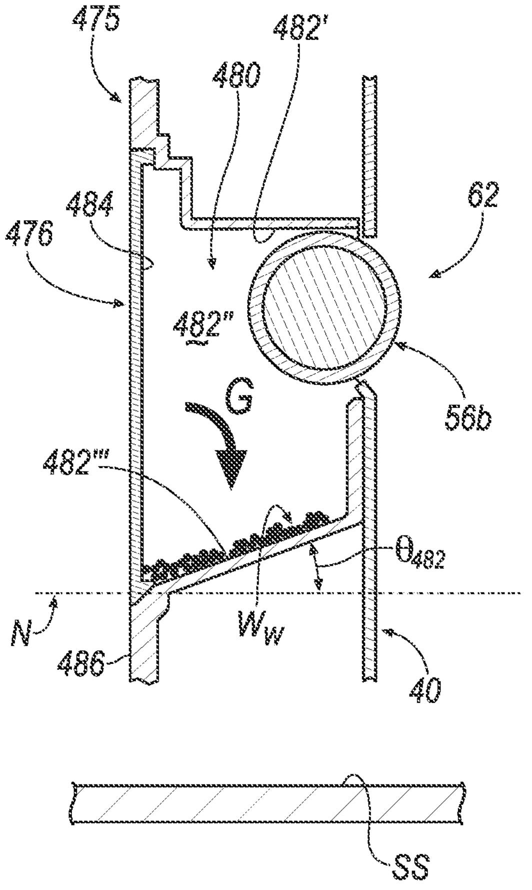
Figure 38C:
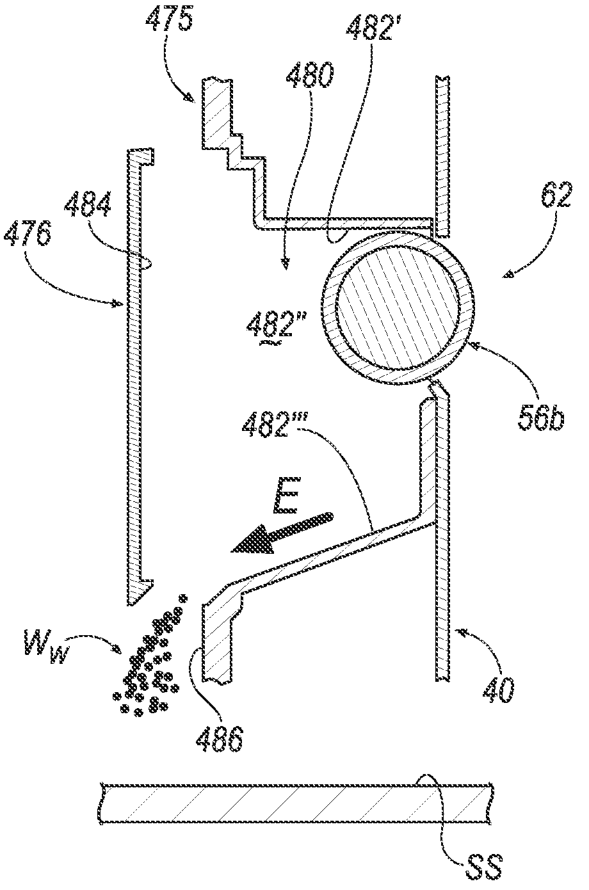

As described above in FIGS. 37 and 38, when work is conducted upon a foodstuff workpiece, W, the work may result in the creation of foodstuff workpiece waste, $W_W$ (see, e.g., FIGS. 38C'-38C"'). In some circumstances, the foodstuff workpiece waste, $W_W$, may pass through one or more passages 62 (see FIGS. 38B, 38C'-38C"') formed in the support assembly 40. As described above, the one or more passages 62 may permit the first upper mat-engaging roller 56*a* to be in direct/indirect communication with the second lower mat-engaging roller 56*b* as described above.

Referring to FIG. 38C', the foodstuff workpiece waste, $W_W$, is shown having previously passed-through the one or more passages 62. As a result of the foodstuff workpiece waste, $W_W$, having previously passed through the one or more passages 62, the foodstuff workpiece waste, $W_W$, is permitted to be deposited into a cavity 480 (see, e.g., FIGS. 38B-38C"') that is formed, at least in part, by one or more flange surfaces 482', 482", 482"' extending from the bottom panel 475 and a back surface 484 of the access door 476.

As seen in FIG. 38C', the foodstuff crafting apparatus 10 is shown in an "upright, use orientation." The upright use orientation is such that an exterior side surface 486 of the bottom panel 475 is arranged in an opposing relationship relative to a support surface, SS, that the foodstuff crafting apparatus 10 rests upon.

Referring to FIG. 38C", the user may elect to perform maintenance on the foodstuff crafting apparatus 10. In an example, a maintenance task may include the removal of foodstuff workpiece waste, $W_W$, from the cavity 480. In order to remove the foodstuff workpiece waste, $W_W$, from the cavity 480, the user may tilt, T (see, e.g., FIG. 38C'), or rotate the foodstuff crafting apparatus 10 such that the exterior side surface 486 of the bottom panel 475 is no longer arranged in an opposing relationship relative to the support surface, SS. As seen in FIG. 38C", upon tilting or rotating the foodstuff crafting apparatus 10, the foodstuff workpiece waste, $W_W$, may shift/move, with the assistance of gravity (see arrow, G). The movement with the assistance of gravity, G, results in the foodstuff workpiece waste, $W_W$, no longer being collected/arranged substantially adjacent the back surface 484 of the access door 476 (as seen in FIG. 38C') such that the foodstuff workpiece waste, $W_W$, subsequently becomes collected/arranged substantially adjacent the flange surface 482"' extending from the bottom panel 475 (as seen in FIG. 38C").

As seen in FIG. 38C", the flange surface 482"' extending from the bottom panel 475 is arranged at an angle, $\theta_{482}$, which is referenced from a reference line, N, that is normal to the surfaces 484, 486 of the bottom panel 475 and the access door 476. The pitch of the angle, $\theta_{482}$, may result in the flange surface 482"' extending from the bottom pane 475 in a manner to functionally behave as a ramp or slide such that the foodstuff workpiece waste, $W_W$, may be easily evacuated (see, e.g., arrow E in FIG. 38C"') from the cavity 480 upon unlatching the access door 476 from the bottom panel 475 and pivoting or removing the access door 476 relative to the bottom panel 475.

Figure 40A:
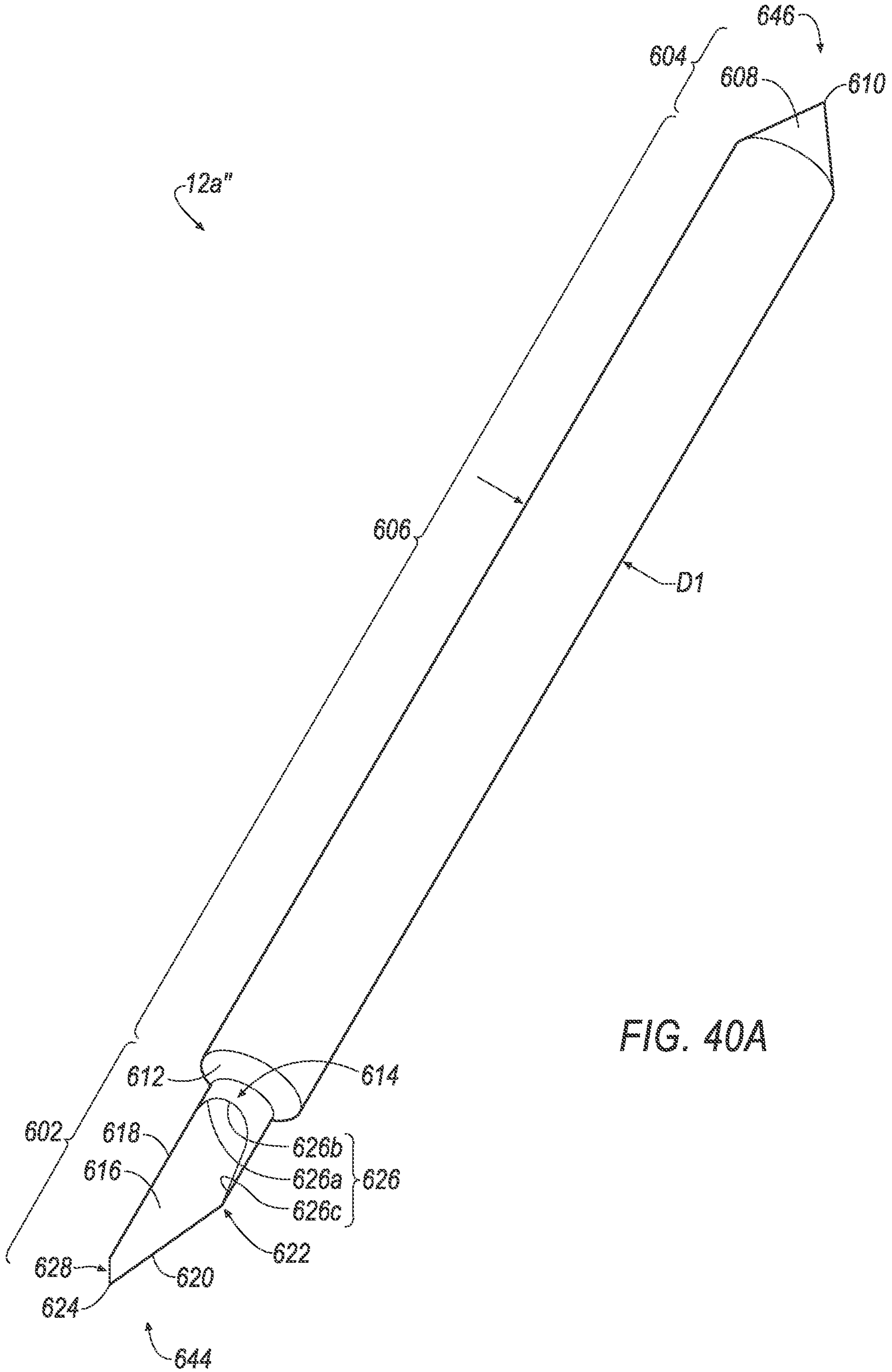
FIG. 40A is a perspective view of a blade in accordance with an exemplary embodiment of the invention.
Figure 40B:
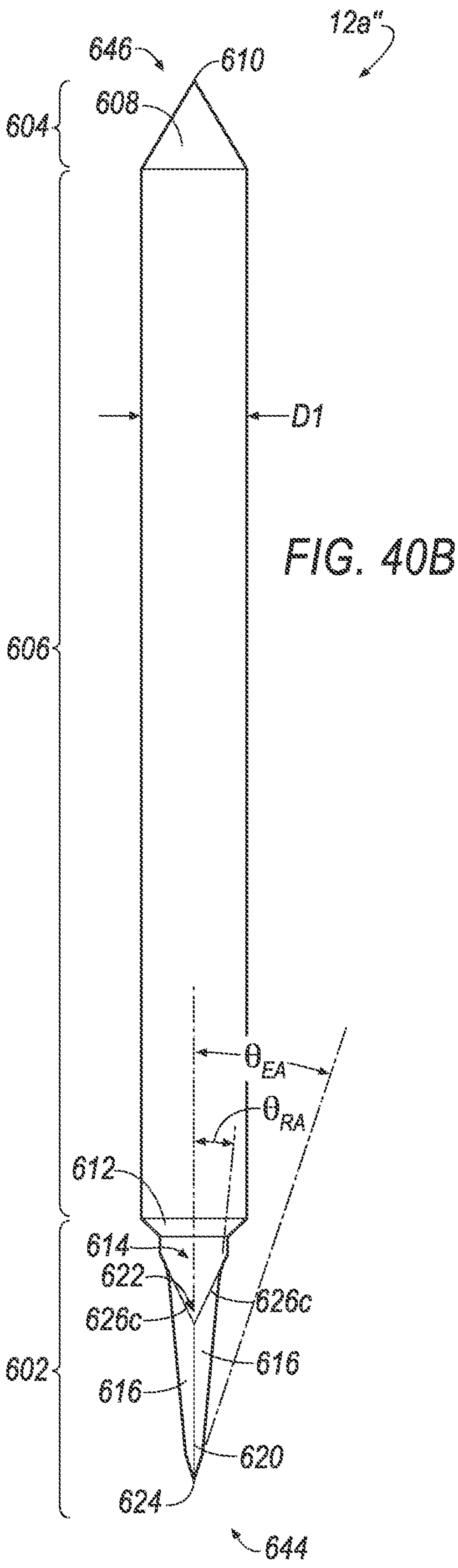
FIG. 40B is a bottom view of the blade of FIG. 40A in accordance with an exemplary embodiment of the invention.
Figure 40C:
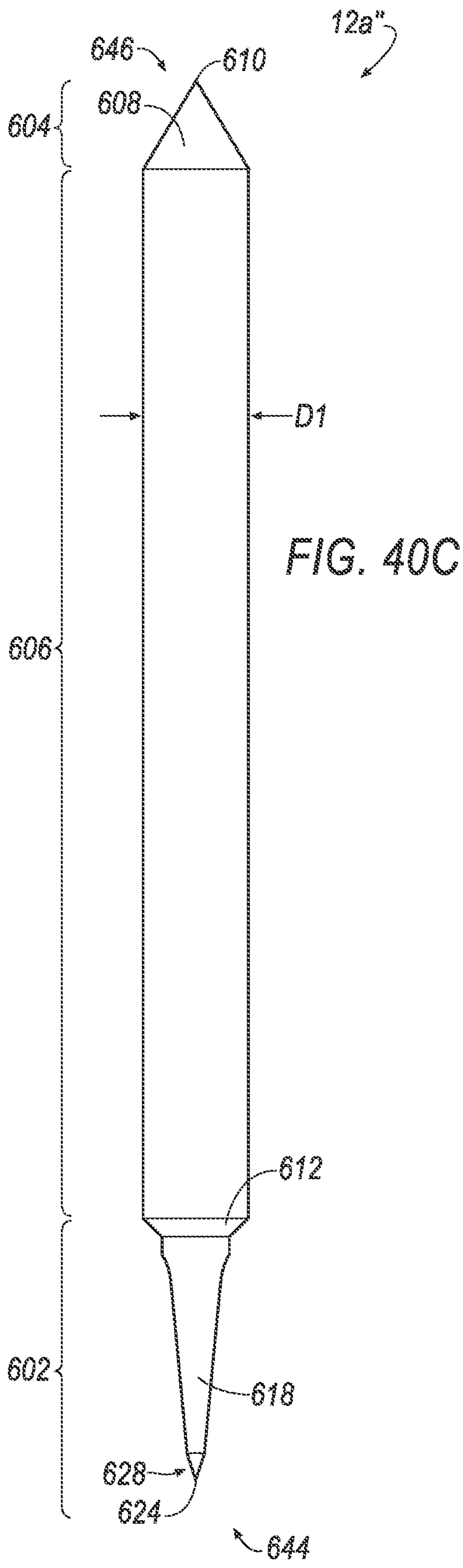
FIG. 40C is a top view of the blade of FIG. 40A in accordance with an exemplary embodiment of the invention.
Figure 40D:
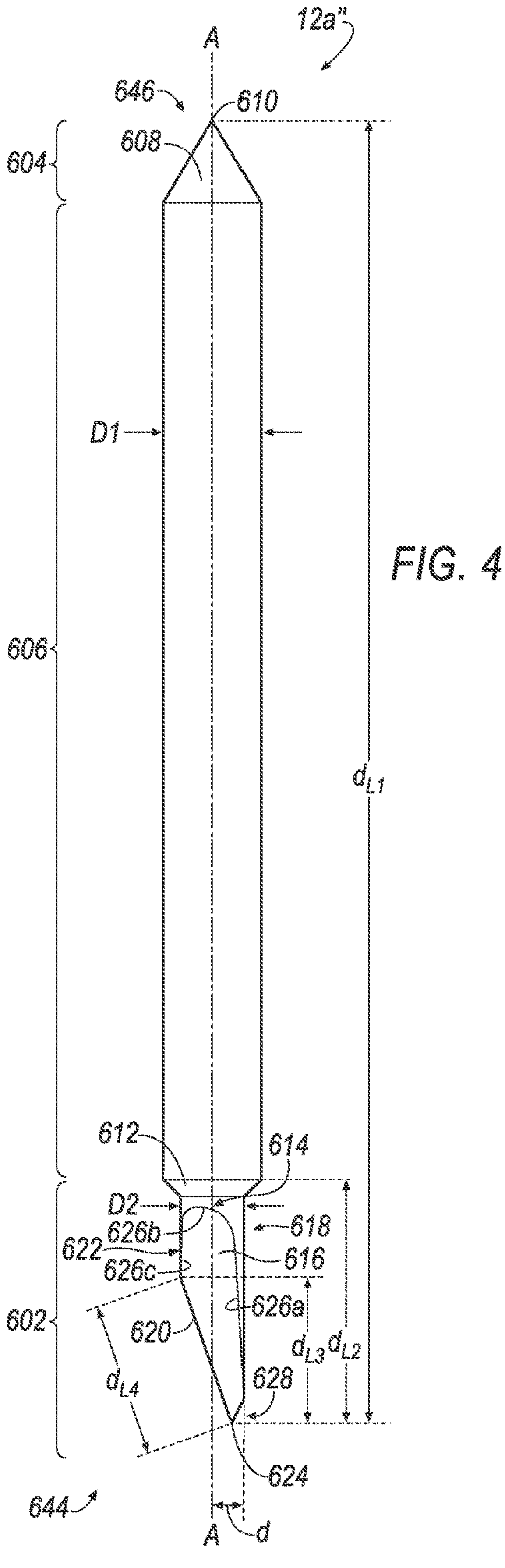
FIG. 40D is a right side view of the blade of FIG. 40A in accordance with an exemplary embodiment of the invention.
Figure 40E:
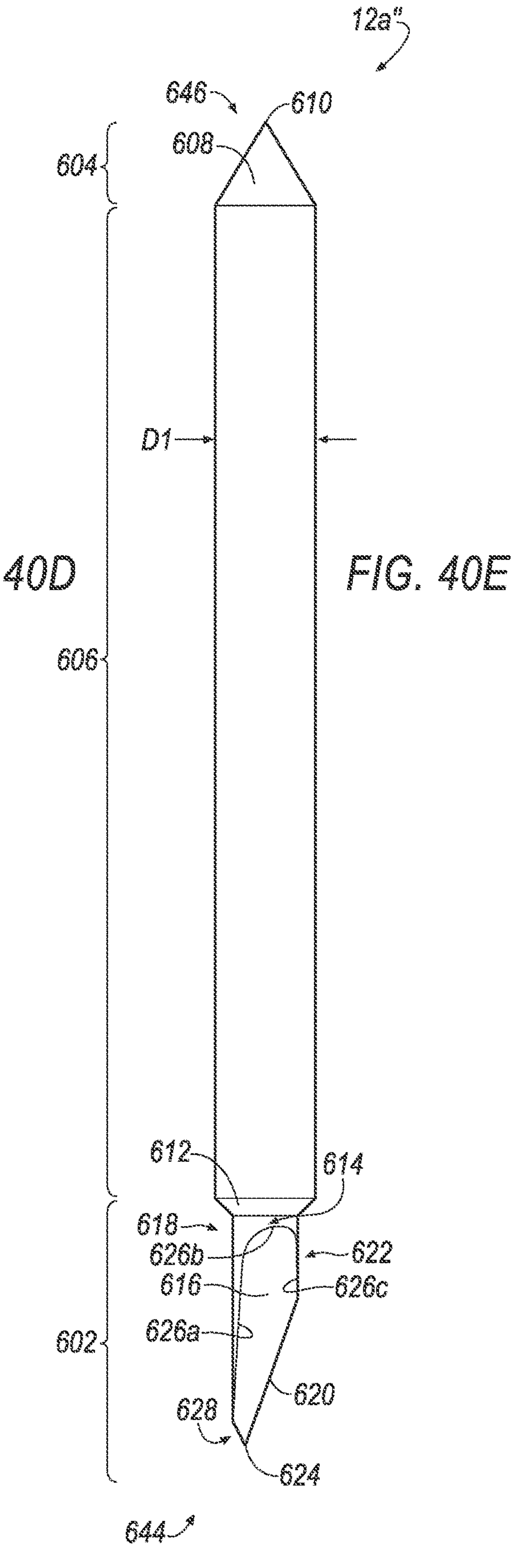
FIG. 40E is a left side view of the blade of FIG. 40A in accordance with an exemplary embodiment of the invention.
Figure 40F:
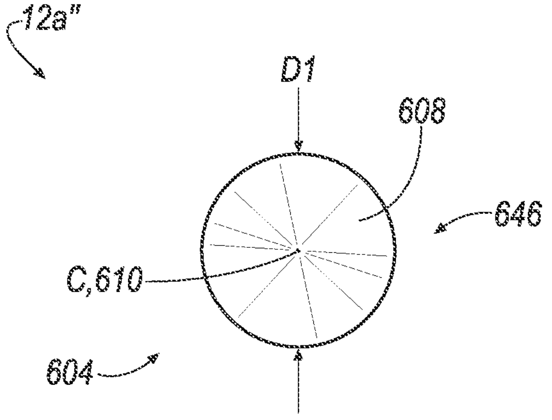
FIG. 40F is a proximal end view of the blade of FIG. 40A in accordance with an exemplary embodiment of the invention.
Figure 40G:
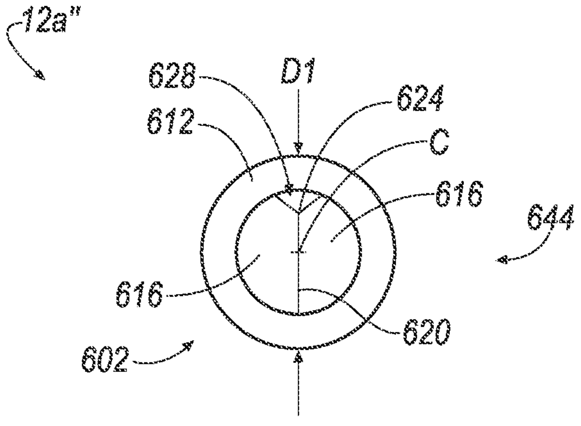
FIG. 40G is a distal end view of the blade of FIG. 40A in accordance with an exemplary embodiment of the invention.
Figure 41A:
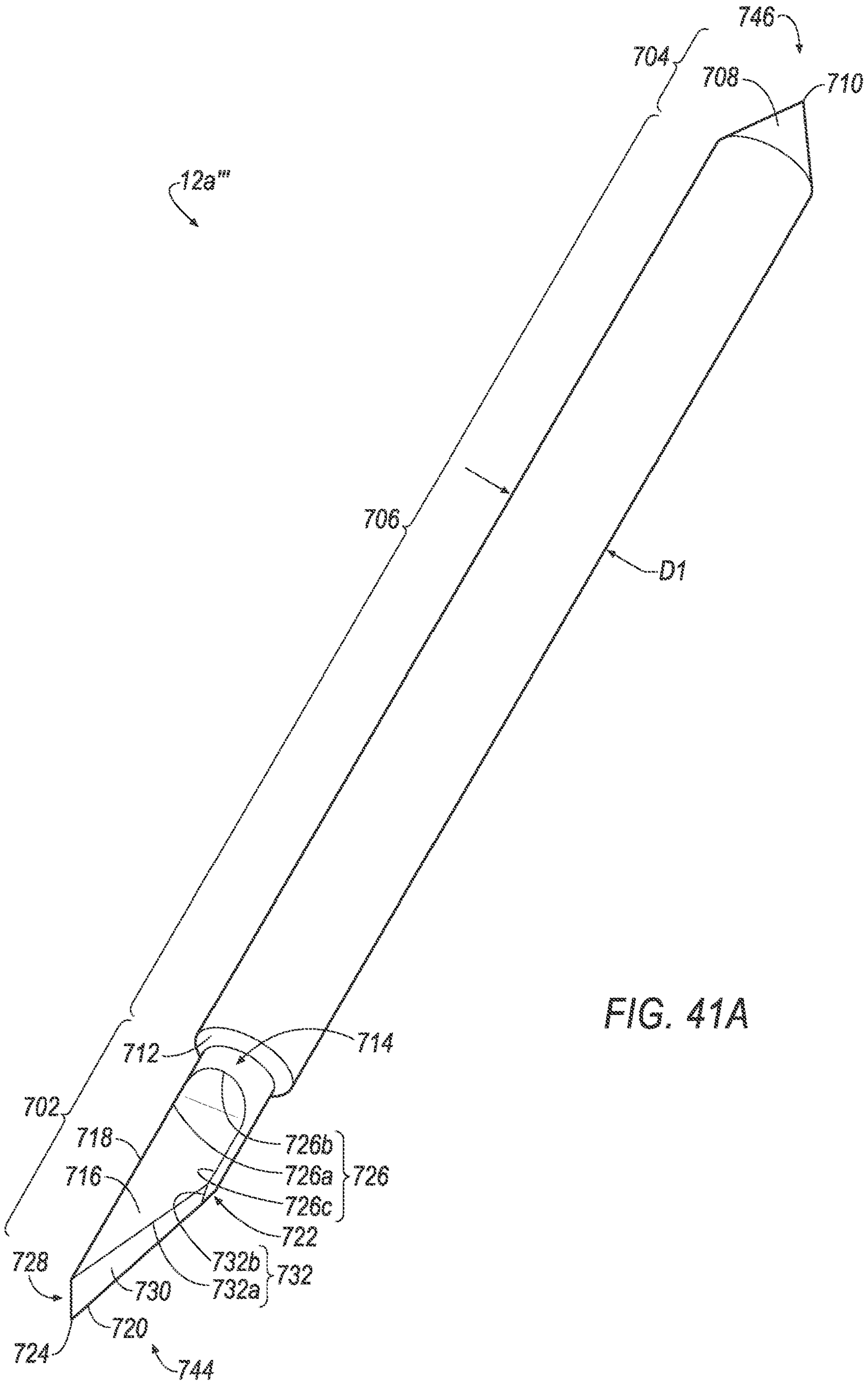
FIG. 41A is a perspective view of a blade in accordance with an exemplary embodiment of the invention.
Figure 41B:
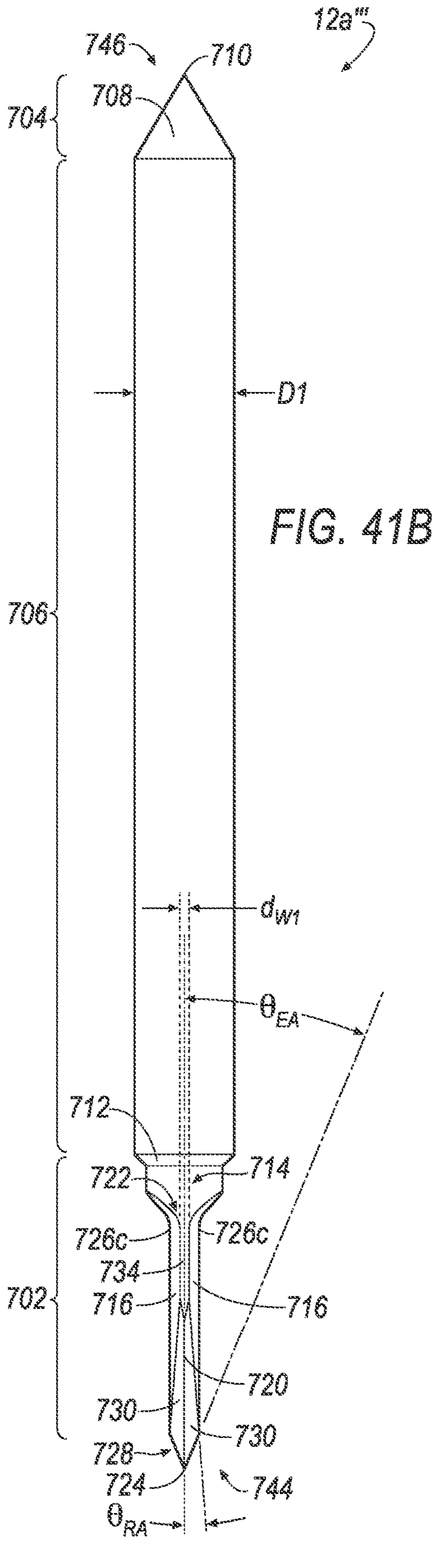
FIG. 41B is a bottom view of the blade of FIG. 41A in accordance with an exemplary embodiment of the invention.
Figure 41C:
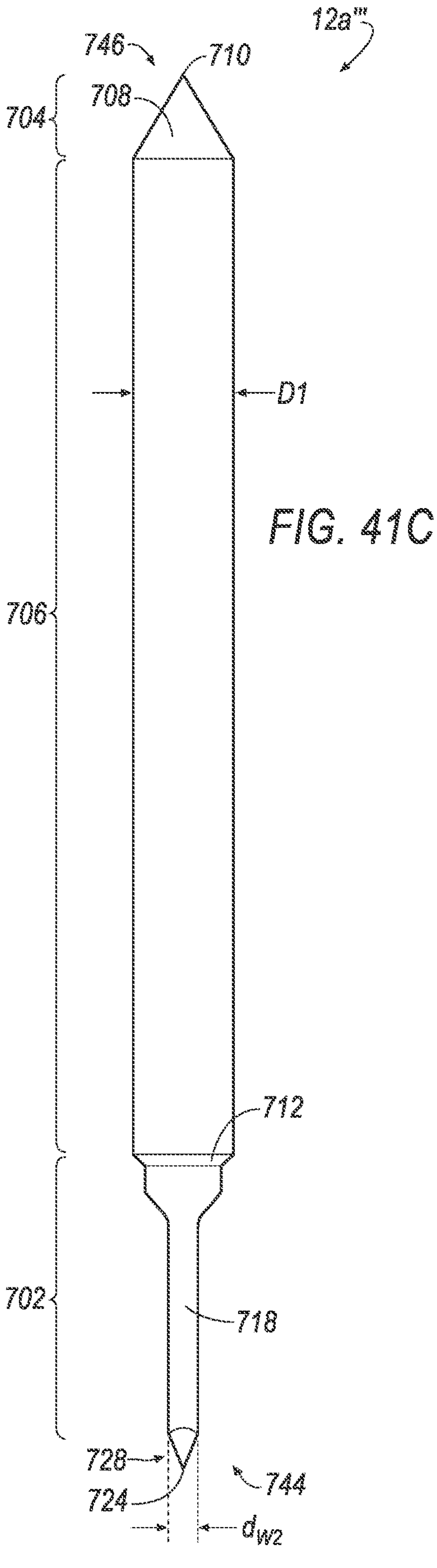
FIG. 41C is a top view of the blade of FIG. 41A in accordance with an exemplary embodiment of the invention.
Figure 41D:
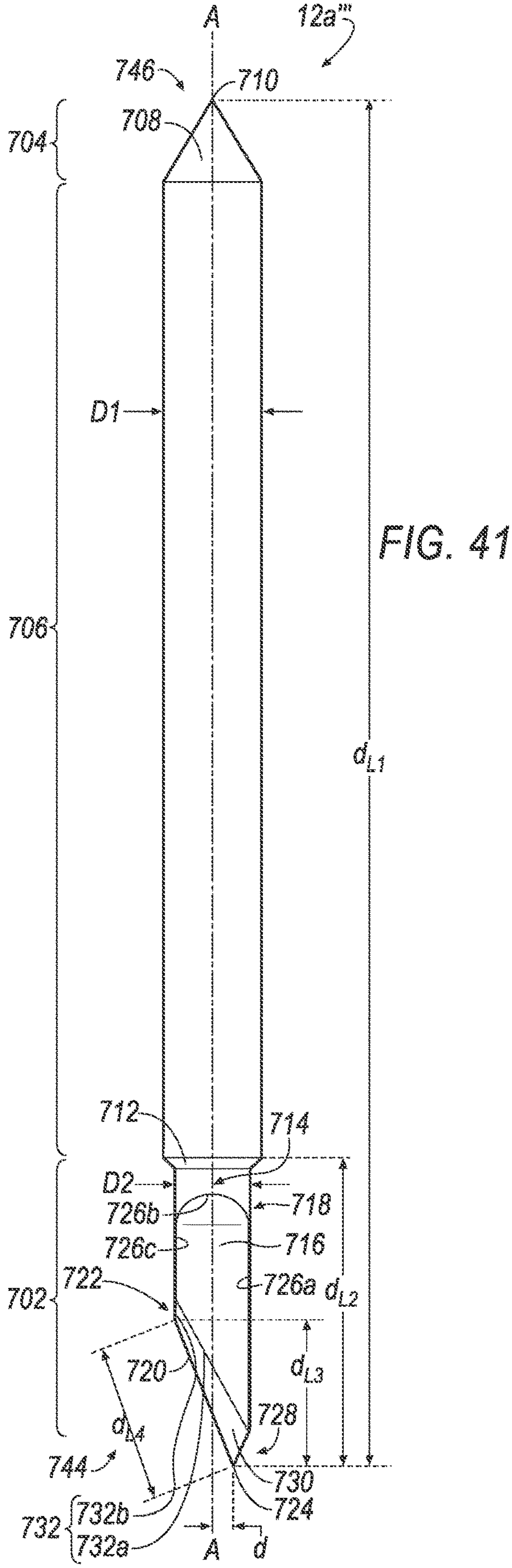
FIG. 41D is a right side view of the blade of FIG. 41A in accordance with an exemplary embodiment of the invention.
Figure 41E:
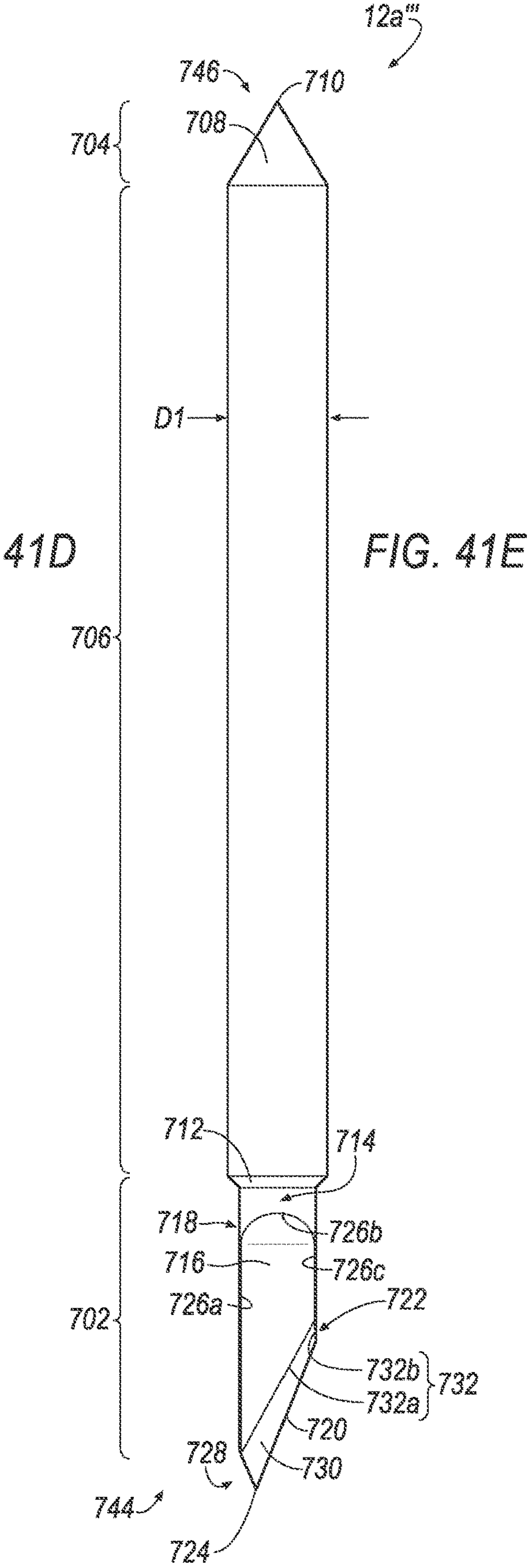
FIG. 41E is a left side view of the blade of FIG. 41A in accordance with an exemplary embodiment of the invention.
Figure 41F:
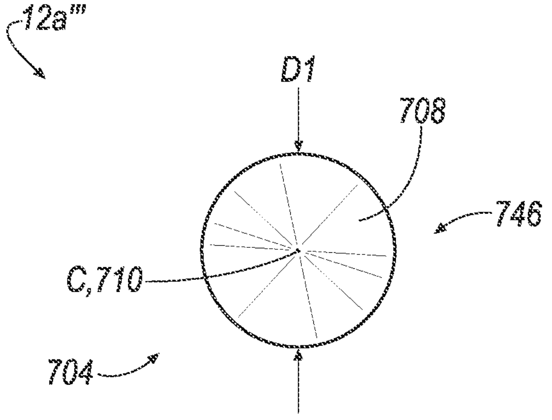
FIG. 41F is a proximal end view of the blade of FIG. 41A in accordance with an exemplary embodiment of the invention.
Figure 41G:
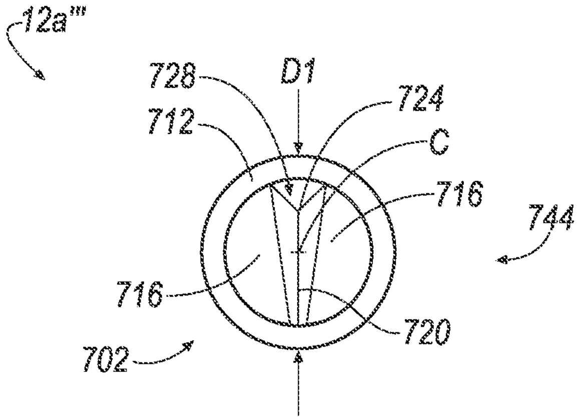
FIG. 41G is a distal end view of the blade of FIG. 41A in accordance with an exemplary embodiment of the invention.
Figure 42A:
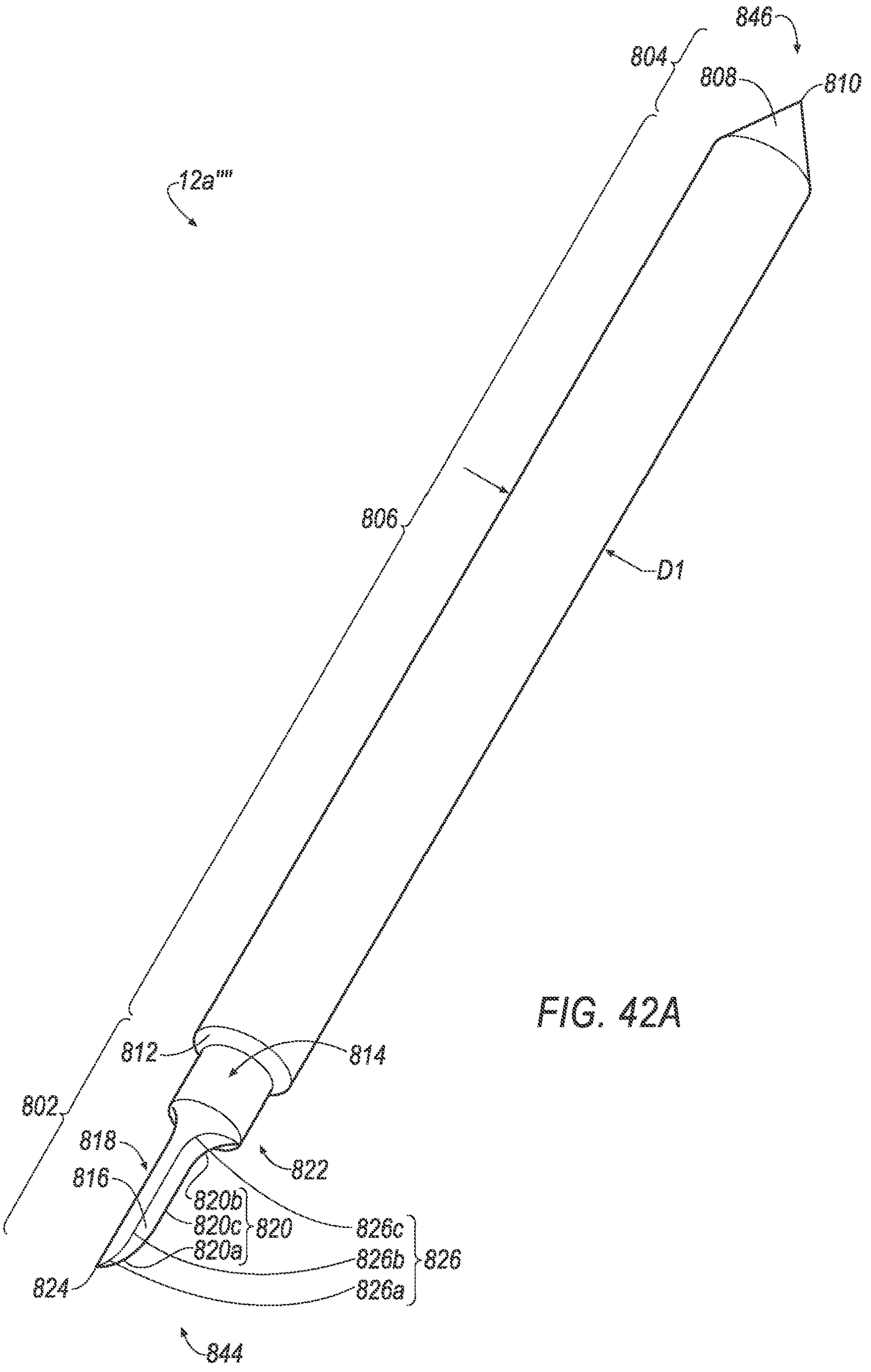
FIG. 42A is a perspective view of a blade in accordance with an exemplary embodiment of the invention.

Referring to FIGS. 39A-42G, alternative embodiments of the blade 12*a* are shown generally at 12*a*' (see, e.g., FIG. 39A), 12*a*" (see, e.g., FIG. 40A), 12*a*"' (see, e.g., FIG. 41A) and 12*a*"" (see, e.g., FIG. 42A). Each of the blades 12*a*'-12*a*"" include a different geometry that results different degrees of sharpness/flexibility/cutting capability. Each of the blades 12*a*'-12*a*"" may include any desirable food-grade material such as, for example, a food grade plastic (e.g., polyvinyl chloride (PVC)), a food grade metal (e.g., stainless steel) or the like.

Figure 39A:
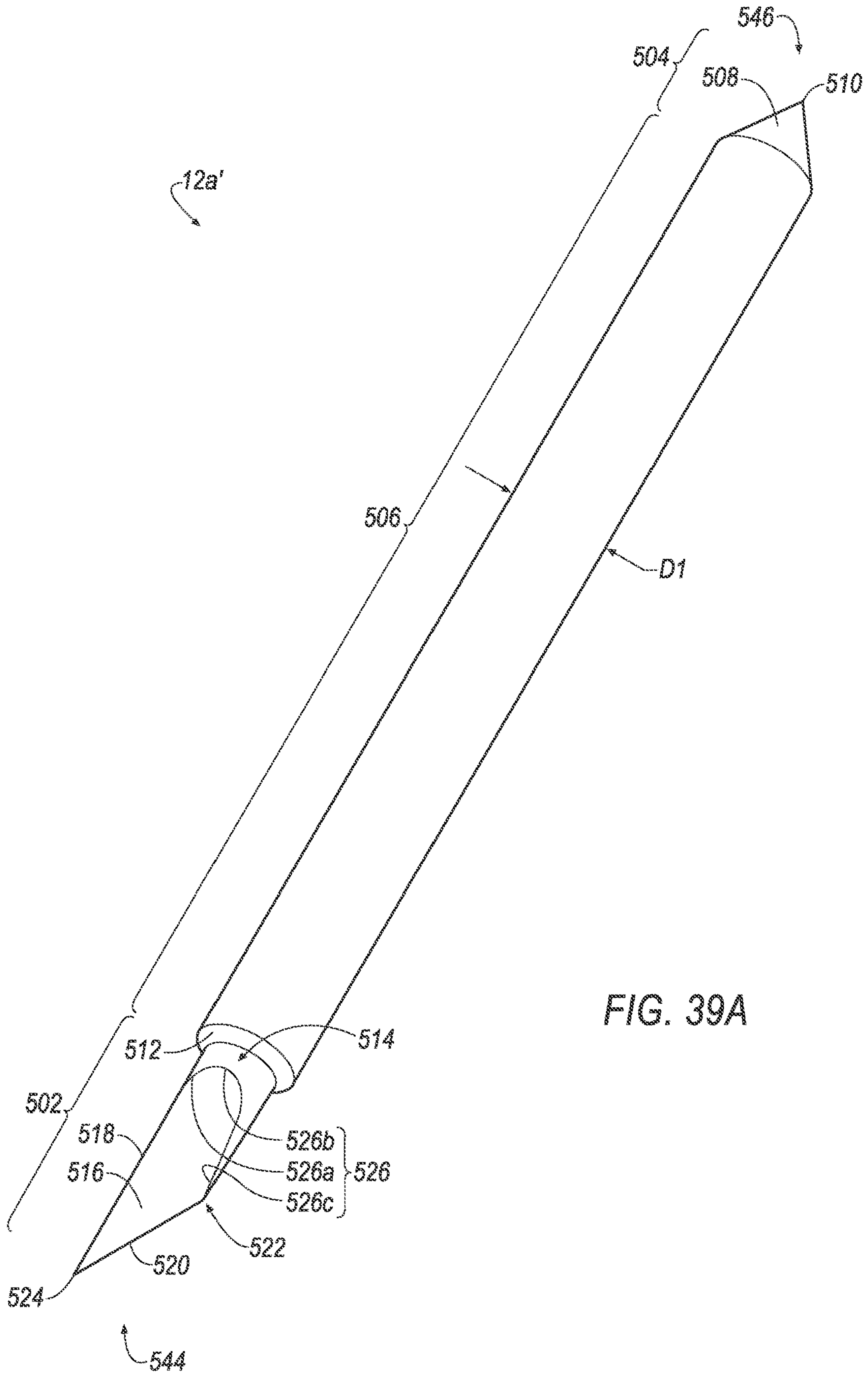
FIG. 39A is a perspective view of a blade in accordance with an exemplary embodiment of the invention.

Referring to FIGS. 39A-39G, the blade 12*a*' is shown according to an embodiment. As seen in FIG. 39A, the blade 12*a*' includes a distal end 544 and a proximal end 546. The distal end 544 includes a blade portion 502 and the proximal end 546 includes a conical bearing portion 504.

A stem portion 506 extends between the blade portion 502 and the conical bearing portion 504. The stem portion 506 includes a substantially cylindrical body having a diameter, D1. At least a portion of each of the blade portion 502 and the conical bearing portion 504 may include a geometry that is less than the diameter, D1.

The conical bearing portion 504 generally includes a cone-shaped body defined by a bearing surface 508 that terminates at a tip 510. The conical bearing portion 504 may be integrally-formed with and extend from the stem portion 506; alternatively, the conical bearing portion 504 may be formed separate from and attached to the stem portion 506.

The blade portion 502 includes a collar portion 512 connected to the stem portion 506. The blade portion 502 further includes a ricasso 514 that extends from the collar portion 512. The blade portion 502 further includes symmetrically-arranged grinds 516. In an implementation, the grinds 516 may be shaped to form "flat grinds." However, the grinds 516 are not limited to "flat grinds" and may alternatively include other geometries such as, for example, "tapered grinds," "hollow grinds," "sabre grinds," "chisel grinds," "double/compound bevel grinds" or "convex grinds."

The blade portion 502 further includes a back 518 and a cutting edge 520. The back 518 may be, for example, rounded, and, therefore, is not sharp whereas the cutting edge 520 is arranged to function as a sharp, cutting profile. The cutting edge 520 extends between a choil 522 and a point 524.

The ricasso 514 and flat grinds 516 cooperate to form a grind line 526. The grind line 526 is further characterized by: a grind lead-off 526*a,* a grind termination radius 526*b* and a grind termination 526*c*. The grind lead-off 526*a* originates proximate the back 518. The grind termination radius 526*b* is located proximate the ricasso 514 and trails/leads/bends toward the collar 512. The grind termination 526*c* originates proximate the choil 522.

Figure 39B:
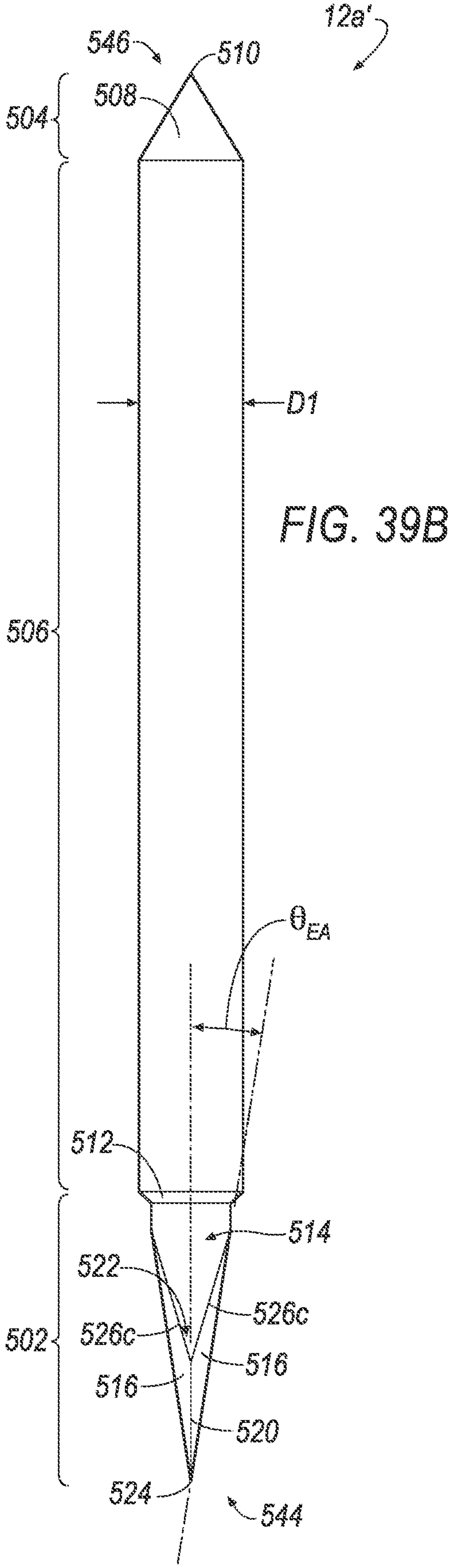
FIG. 39B is a bottom view of the blade of FIG. 39A in accordance with an exemplary embodiment of the invention.
Figure 39C:
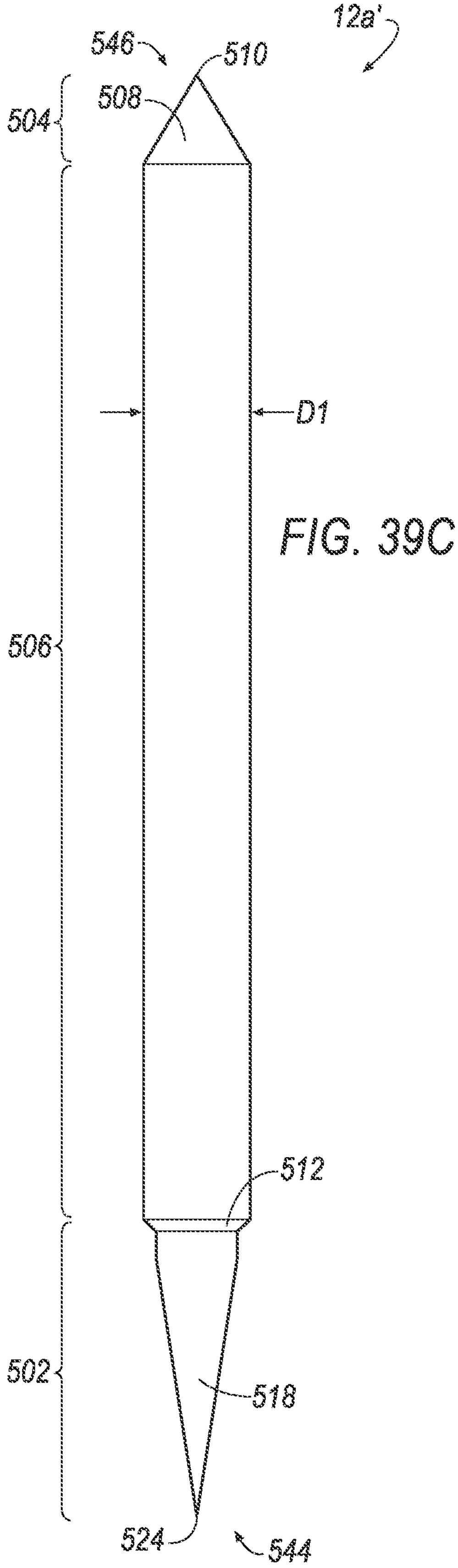
FIG. 39C is a top view of the blade of FIG. 39A in accordance with an exemplary embodiment of the invention.

Referring to FIG. 39B, the flat grinds 516 are formed relative to the cutting edge 520 at an edge angle, $\theta_{EA}$. In an embodiment, the edge angle, $\theta_{EA}$ may be approximately about 7°.

Figure 39D:
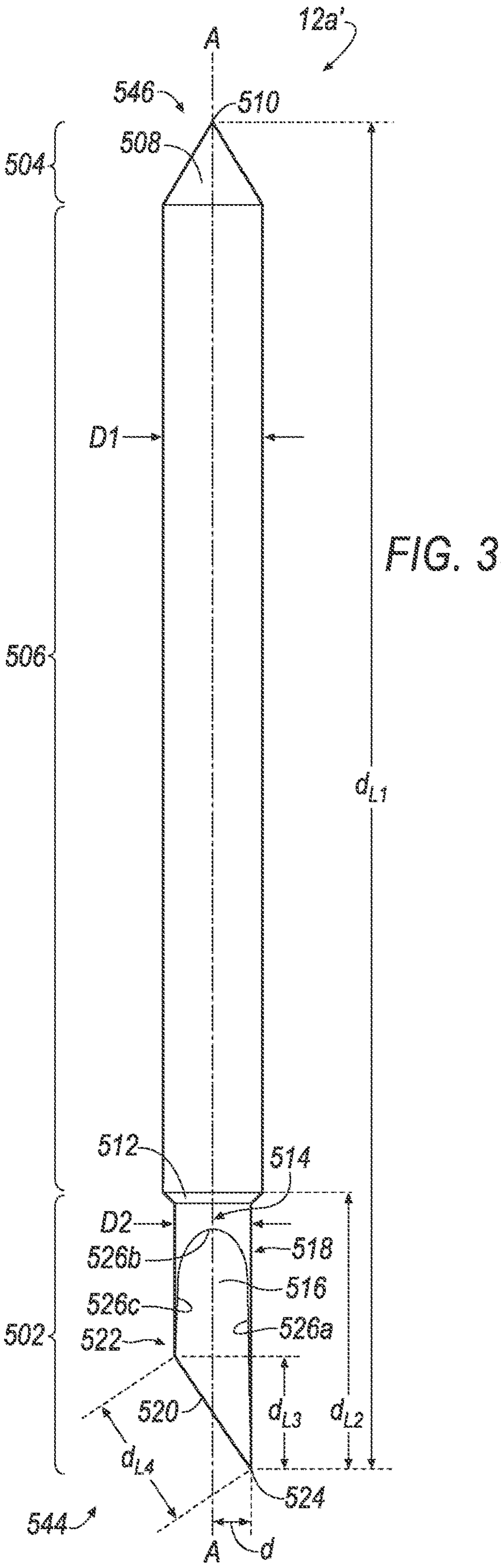
FIG. 39D is a right side view of the blade of FIG. 39A in accordance with an exemplary embodiment of the invention.
Figure 39E:
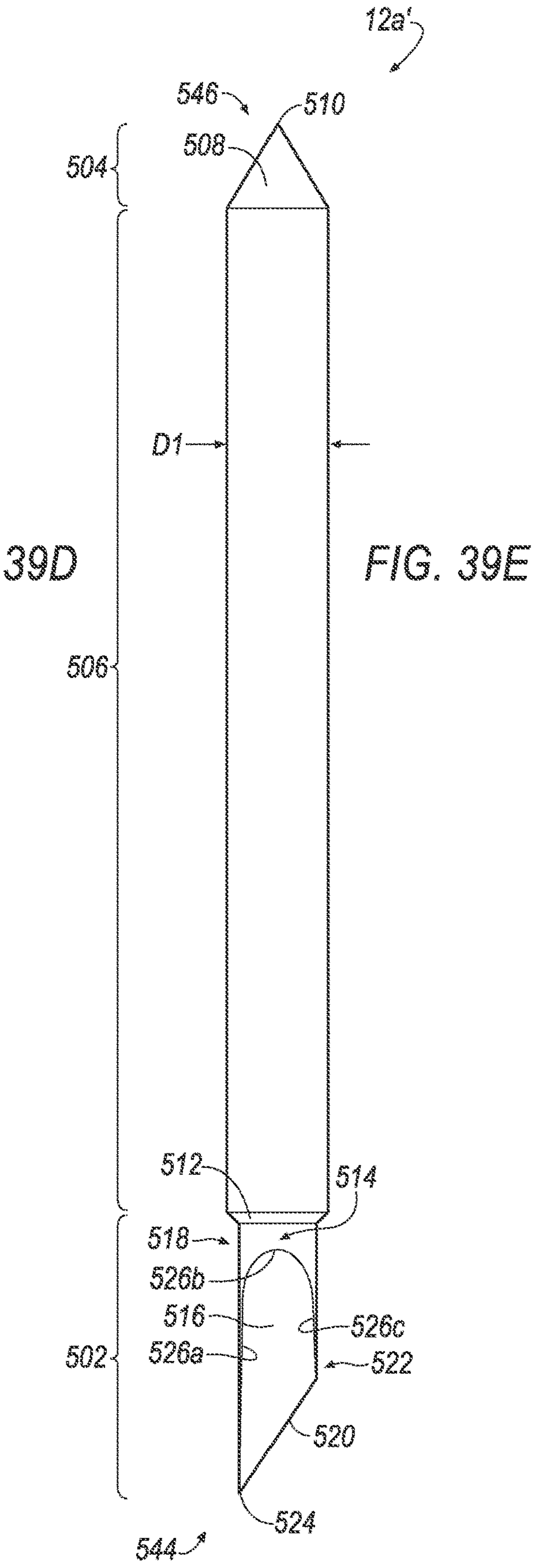
FIG. 39E is a left side view of the blade of FIG. 39A in accordance with an exemplary embodiment of the invention.
Figure 39F:
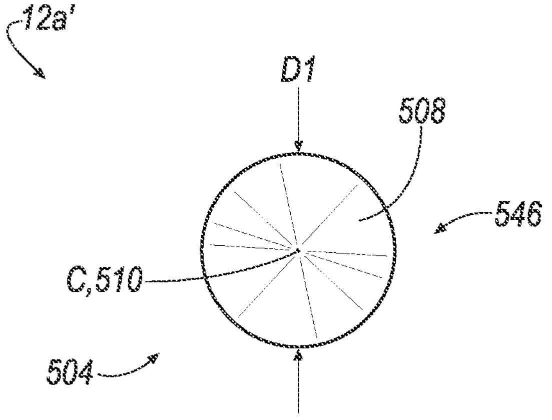
FIG. 39F is a proximal end view of the blade of FIG. 39A in accordance with an exemplary embodiment of the invention.
Figure 39G:
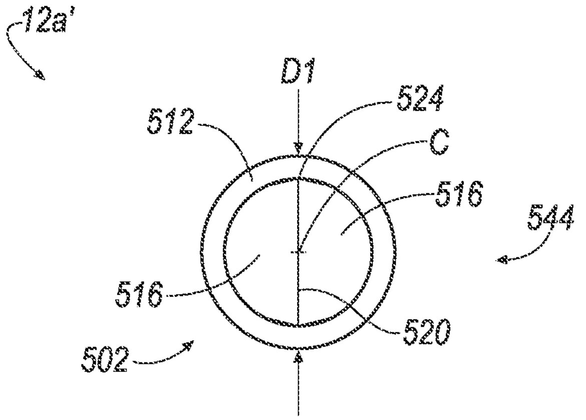
FIG. 39G is a distal end view of the blade of FIG. 39A in accordance with an exemplary embodiment of the invention.

Referring to FIGS. 39D and 39E, the point 524 of the blade portion 502 is offset at a distance, d, from a pivot axis, A-A, that extends through an axial center, C (see, e.g., FIGS. 39F, 39G), of the blade 12*a*'. The offset distance, d, permits the blade 12*a*' to pivot upon the point 524 in a manner such that the blade 12*a*' behaves substantially similarly to that of a caster wheel; as such, the blade 12*a*' may alternatively be referred to as a "caster blade." Functionally, the caster blade 12*a*' self-aligns/automatically aligns the cutting edge 520 in a cutting direction as a result of (a) force(s) imparted to the blade 12*a*' resulting from: (1) lateral travel of the working component 20*a* relative to the body 14 and (2) fore/aft travel of the mat 36 relative to the body 14.

With continued reference to FIG. 39D, an embodiment of the blade 12*a*' may include the following dimensions. It will be appreciated, however, that the blade 12*a*' is not limited to the following dimensions, but, rather, may include any desirable dimension, geometry or configuration.

In an embodiment, the blade 12*a*' may include a length dimension, $d_{L1}$, approximately equal to about 27.45 mm that is measured from the tip 510 to the point 524. In an embodiment, the diameter, D1, of the stem portion 506 may be approximately equal to about 2.0 mm. In an embodiment, the blade portion 502 may include a length dimension, $d_{L2}$, approximately equal to about 5.00 mm that is measured from the point 524 to the meeting of the collar portion 512 and the stem portion 506.

In an embodiment, a portion of the ricasso 514 proximate the collar portion 512 may define a diameter, D2, or width approximately equal to about 1.50 mm. In an embodiment, a vertical length dimension, $d_{L3}$, measured from the choil 522 to the point 524 may be approximately about 3.00 mm. A length dimension, $d_{L4}$, of the cutting edge 520 measured from the choil 522 to the point 524 may be approximately about 3.35 mm.

Referring to FIGS. 40A-40G, the blade 12*a*" is shown according to an embodiment. As seen in FIG. 40A, the blade 12*a*" includes a distal end 644 and a proximal end 646. The distal end 644 includes a blade portion 602 and the proximal end 646 includes a conical bearing portion 604.

A stem portion 606 extends between the blade portion 602 and the conical bearing portion 604. The stem portion 606 includes a substantially cylindrical body having a diameter, D1. At least a portion of each of the blade portion 602 and the conical bearing portion 604 may include a geometry that is less than the diameter, D1.

The conical bearing portion 604 generally includes a cone-shaped body defined by a bearing surface 608 that terminates at a tip 610. The conical bearing portion 604 may be integrally-formed with and extend from the stem portion 606; alternatively, the conical bearing portion 604 may be formed separate from and attached to the stem portion 606.

The blade portion 602 includes a collar portion 612 connected to the stem portion 606. The blade portion 602 further includes a ricasso 614 that extends from the collar portion 612. The blade portion 602 further includes symmetrically-arranged grinds 616. In an implementation, the grinds 616 may be shaped to form "flat grinds." However, the grinds 616 are not limited to "flat grinds" and may alternatively include other geometries such as, for example, "tapered grinds," "hollow grinds," "sabre grinds," "chisel grinds," "double/compound bevel grinds" or "convex grinds."

The blade portion 602 further includes a back 618 and a cutting edge 620. The back 618 may be rounded, and, therefore, is not sharp whereas the cutting edge 620 is arranged to function as a sharp, cutting profile. The cutting edge 620 extends between a choil 622 and a point 624.

The ricasso 614 and flat grinds 616 cooperate to form a grind line 626. The grind line 626 is further characterized by: a grind lead-off 626*a,* a grind termination radius 626*b* and a grind termination 626*c*. The grind lead-off 626*a* originates proximate the back 618. The grind termination radius 626*b* is located proximate the ricasso 614 and trails/leads/bends toward the collar 612. The grind termination 626*c* originates proximate the choil 622.

Comparatively, the blade 12*a*" is similar to the blade 12*a*' with the exception of a swage or top grind 628 formed on the back 618 that is proximate the point 624. Further, referring to FIG. 40B, in addition to the flat grinds 616 and the cutting edge 620 forming an edge angle, $\theta_{EA}$, the top grind 628 forms the blade portion 602 to include an absence of blade material resulting in what is referred to as a "relief," as a result of the relief, the blade portion 602 further includes a relief angle, $\theta_{RA}$.

In an embodiment, the edge angle, $\theta_{EA}$, may be between approximately about 7°. In an embodiment, the relief angle, $\theta_{RA}$, may be between approximately about 5° to 20°.

Referring to FIGS. 40D and 40E, the point 624 of the blade portion 602 is offset at a distance, d, from a pivot axis, A-A, that extends through an axial center, C (see, e.g., FIGS. 40F, 40G), of the blade 12*a*". The offset distance, d, permits the blade 12*a*" to pivot upon the point 624 in a manner such that the blade 12*a*" behaves substantially similarly to that of a caster wheel; as such, the blade 12*a*" may alternatively be referred to as a "caster blade." Functionally, the caster blade 12*a*" self-aligns/automatically aligns the cutting edge 620 in a cutting direction as a result of (a) force(s) imparted to the blade 12*a*" resulting from: (1) lateral travel of the working component 20*a* relative to the body 14 and (2) fore/aft travel of the mat 36 relative to the body 14.

With continued reference to FIG. 40D, an embodiment of the blade 12*a*" may include the following dimensions. It will be appreciated, however, that the blade 12*a*" is not limited to the following dimensions, but, rather, may include any desirable dimension, geometry or configuration.

In an embodiment, the blade 12*a*" may include a length dimension, $d_{L1}$, approximately equal to about 27.45 mm that is measured from the tip 610 to the point 624. In an embodiment, the diameter, D1, of the stem portion 606 may be approximately equal to about 2.0 mm. In an embodiment, the blade portion 602 may include a length dimension, $d_{L2}$, approximately equal to about 2.50 mm that is measured from the point 624 to the meeting of the collar portion 612 and the stem portion 606.

In an embodiment, a portion of the ricasso 614 proximate the collar portion 612 may define a diameter, D2, or width approximately equal to about 1.00 mm. In an embodiment, a vertical length dimension, $d_{L3}$, measured from the choil 622 to the point 624 may be approximately about 1.20 mm.

A length dimension, $d_{L4}$, of the cutting edge 620 measured from the choil 622 to the point 624 may be approximately about 1.56 mm.

Referring to FIGS. 41A-41G, the blade 12*a*''' is shown according to an embodiment. As seen in FIG. 41A, the blade 12*a*''' includes a distal end 744 and a proximal end 746. The distal end 744 includes a blade portion 702 and the proximal end 746 includes a conical bearing portion 704.

A stem portion 706 extends between the blade portion 702 and the conical bearing portion 704. The stem portion 706 includes a substantially cylindrical body having a diameter, D1. At least a portion of each of the blade portion 702 and the conical bearing portion 704 may include a geometry that is less than the diameter, D1.

The conical bearing portion 704 generally includes a cone-shaped body defined by a bearing surface 708 that terminates at a tip 710. The conical bearing portion 704 may be integrally-formed with and extend from the stem portion 706; alternatively, the conical bearing portion 704 may be formed separate from and attached to the stem portion 706.

The blade portion 702 includes a collar portion 712 connected to the stem portion 706. The blade portion 702 further includes a ricasso 714 that extends from the collar portion 712. The blade portion 702 further includes symmetrically-arranged grinds 716. In an implementation, the grinds 716 may be shaped to form "flat grinds." However, the grinds 716 are not limited to "flat grinds" and may alternatively include other geometries such as, for example, "tapered grinds," "hollow grinds," "sabre grinds," "chisel grinds," "double/compound bevel grinds" or "convex grinds."

The blade portion 702 further includes a back 718 and a cutting edge 720. The back 718 may be rounded, and, therefore, is not sharp whereas the cutting edge 720 is arranged to function as a sharp, cutting profile. The cutting edge 720 extends between a choil 722 and a point 724.

The ricasso 714 and flat grinds 716 cooperate to form a grind line 726. The grind line 726 is further characterized by: a grind lead-off 726*a*, a grind termination radius 726*b* and a grind termination 726*c*. The grind lead-off 726*a* originates proximate the back 718. The grind termination radius 726*b* is located proximate the ricasso 714 and trails/leads/bends toward the collar 712. The grind termination 726*c* originates proximate the choil 722.

Comparatively, the blade 12*a*' is similar to the blade 12*a*'' and includes a swage or top grind 728. However, the blade 12*a*''' is further distinguished from the 12*a*'' in that the blade 12*a*''' further includes second flat grinds 730 located between the cutting edge 720 and the flat grinds 716. Further, the second flat grinds 730 extend from the choil 722 and toward the top grind 728.

As a result of the inclusion of the second flat grinds 730, a second grind line 732 is formed. The second grind line 732 is further characterized by: a grind lead-off 732*a* and a grind termination 732*b*. The grind lead-off 732*a* originates proximate the back 718 proximate the top grind 728. The grind termination 732*b* originates proximate the choil 722 and meets with the grind lead-off 732*a* and the grind termination 726*c* of the first grind line 726.

As a result of the inclusion of the second flat grinds 730, the second flat grinds 730 and the cutting edge 720 cooperate to form the edge angle, $\theta_{E4}$ (see FIG. 41B). As similarly described above, the top grind 728 forms the blade portion 702 to include an absence of blade material resulting in what is referred to as a "relief," as a result of the relief, the blade portion 702 further includes a relief angle, $\theta_{R4}$.

In an embodiment, the edge angle, $\theta_{E4}$, may be between approximately about 7°. In an embodiment, the relief angle, $\theta_{R4}$, may be between approximately about 5° to 20°.

Referring to FIGS. 41D and 41E, the point 724 of the blade portion 702 is offset at a distance, d, from a pivot axis, A-A, that extends through an axial center, C (see, e.g., FIGS. 41F, 41G), of the blade 12*a*'''. The offset distance, d, permits the blade 12*a*''' to pivot upon the point 724 in a manner such that the blade 12*a*''' behaves substantially similarly to that of a caster wheel; as such, the blade 12*a*''' may alternatively be referred to as a "caster blade." Functionally, the caster blade 12*a*''' self-aligns/automatically aligns the cutting edge 720 in a cutting direction as a result of (a) force(s) imparted to the blade 12*a*''' resulting from: (1) lateral travel of the working component 20*a* relative to the body 14 and (2) fore/aft travel of the mat 36 relative to the body 14.

With continued reference to FIG. 41D, an embodiment of the blade 12*a*''' may include the following dimensions. It will be appreciated, however, that the blade 12*a*''' is not limited to the following dimensions, but, rather, may include any desirable dimension, geometry or configuration.

In an embodiment, the blade 12*a*''' may include a length dimension, $d_{L1}$, approximately equal to about 27.45 mm that is measured from the tip 710 to the point 724. In an embodiment, the diameter, D1, of the stem portion 706 may be approximately equal to about 2.0 mm. In an embodiment, the blade portion 702 may include a length dimension, $d_{L2}$, approximately equal to about 2.50 mm that is measured from the point 724 to the meeting of the collar portion 712 and the stem portion 706.

In an embodiment, a portion of the ricasso 714 proximate the collar portion 712 may define a diameter, D2, or width approximately equal to about 1.00 mm. In an embodiment, a vertical length dimension, $d_{L3}$, measured from the choil 722 to the point 724 may be approximately about 1.20 mm. A length dimension, $d_{L4}$, of the cutting edge 720 measured from the choil 722 to the point 724 may be approximately about 1.56 mm.

Referring to FIG. 41B, the ricasso 714 may extend along the blade portion 702 and form a non-sharpened belly 734 located between the flat grinds 716. In an embodiment, the belly 734 may include a width dimension, $d_{W1}$, that may be approximately between about 0.2 mm-0.4 mm. Referring to FIG. 41C, the back 718 of the blade portion 702 may include a width dimension, $d_{W2}$, located between the flat grinds 716. The width dimension, $d_{W2}$, of the back 718 may be approximately between about 0.6 mm-0.8 mm.

Referring to FIGS. 42A-42G, the blade 12*a*'''' is shown according to an embodiment. As seen in FIG. 42A, the blade 12*a*'''' includes a distal end 844 and a proximal end 846. The distal end 844 includes a blade portion 802 and the proximal end 846 includes a conical bearing portion 804.

A stem portion 806 extends between the blade portion 802 and the conical bearing portion 804. The stem portion 806 includes a substantially cylindrical body having a diameter, D1. At least a portion of each of the blade portion 802 and the conical bearing portion 804 may include a geometry that is less than the diameter, D1.

The conical bearing portion 804 generally includes a cone-shaped body defined by a bearing surface 808 that terminates at a tip 810. The conical bearing portion 804 may be integrally-formed with and extend from the stem portion 806; alternatively, the conical bearing portion 804 may be formed separate from and attached to the stem portion 806.

The blade portion 802 includes a collar portion 812 connected to the stem portion 806. The blade portion 802 further includes a ricasso 814 that extends from the collar portion 812. The blade portion 802 further includes symmetrically-arranged grinds 816. In an implementation, the grinds 816 may be shaped to form "hollow grinds." However, the grinds 816 are not limited to "hollow grinds" and may alternatively include other geometries such as, for example, "tapered grinds," "flat grinds," "sabre grinds," "chisel grinds," "double/compound bevel grinds" or "convex grinds."

The blade portion 802 further includes a back 818 and a cutting edge 820. The back 818 may be rounded, and, therefore, is not sharp whereas the cutting edge 820 is arranged to function as a sharp, cutting profile. The cutting edge 820 extends between a choil 822 and a point 824.

The cutting edge 820 is further characterized to include an S-shaped profile. The S-shaped profile of the cutting edge 820 includes, for example, a first, curved trailing portion 820*a* extending from the point 824 and a second, curved trailing portion 820*b* extending from the choil 822. The first, curved trailing portion 820*a* is arranged to be substantially concave-up whereas the second, curved trailing portion 820*b* is arranged to be substantially concave-down. The S-shaped profile of the cutting edge 820 further includes a substantially straight edge 820*c* extending between and connecting the first and second curved trailing portions 820*a*, 820*b*.

The ricasso 814 and flat grinds 816 cooperate to form a grind line 826. The grind line 826 is further characterized by: a grind lead-off 826*a*, a grind extension 826*b* and a grind termination 826*c*. The grind lead-off 826*a* originates proximate the tip 824. The grind extension 826*b* is located proximate the back 818 and extends from the grind lead-off 826*a*. The grind termination 826*c* extends from the grind extension 826*b* and terminates proximate the choil 822.

Figure 42B:
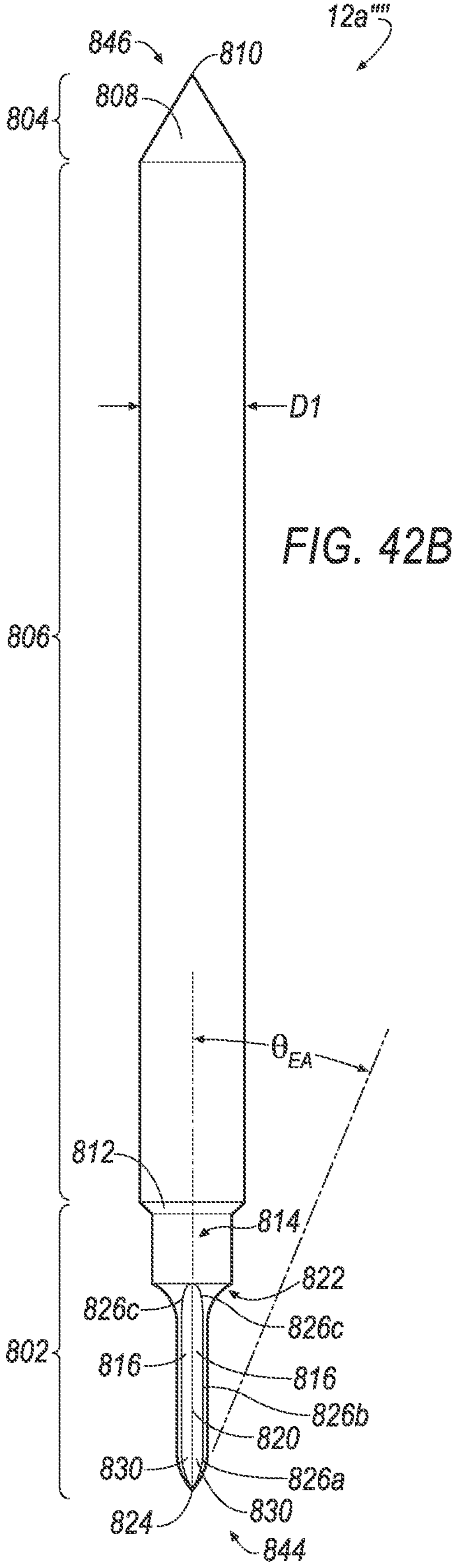
FIG. 42B is a bottom view of the blade of FIG. 42A in accordance with an exemplary embodiment of the invention.
Figure 42C:
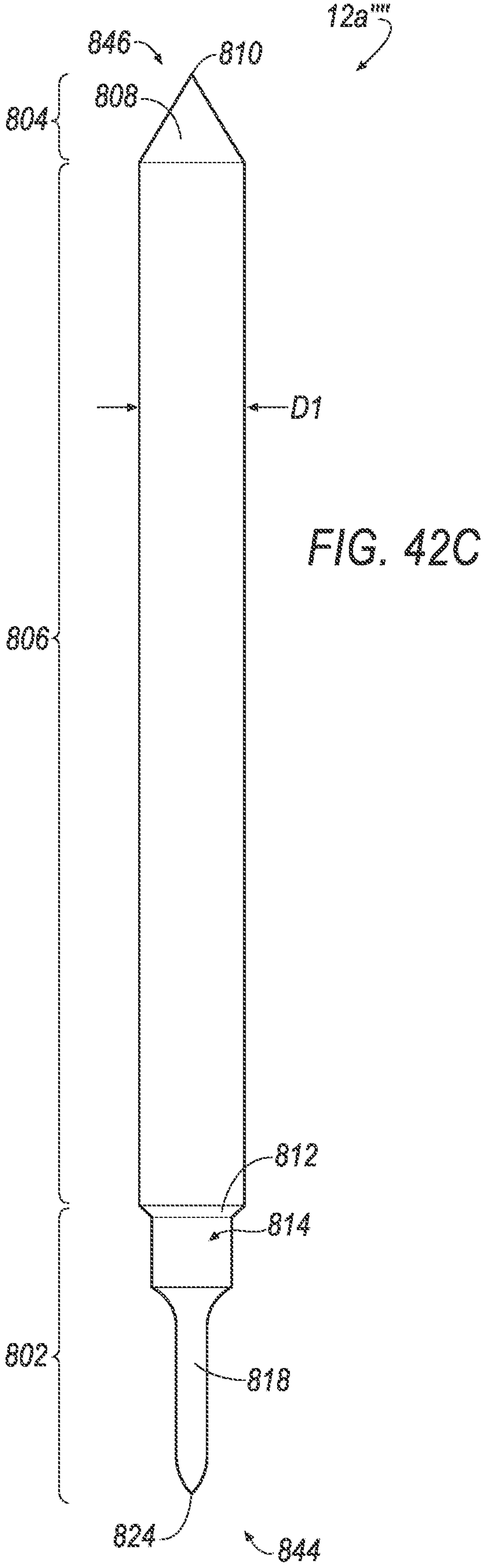
FIG. 42C is a top view of the blade of FIG. 42A in accordance with an exemplary embodiment of the invention.

Referring to FIG. 42B, the flat grinds 816 are formed relative to the cutting edge 820 at an edge angle, $\theta_{EA}$. In an embodiment, the edge angle, $\theta_{EA}$ may be approximately about 7°.

Figure 42D:
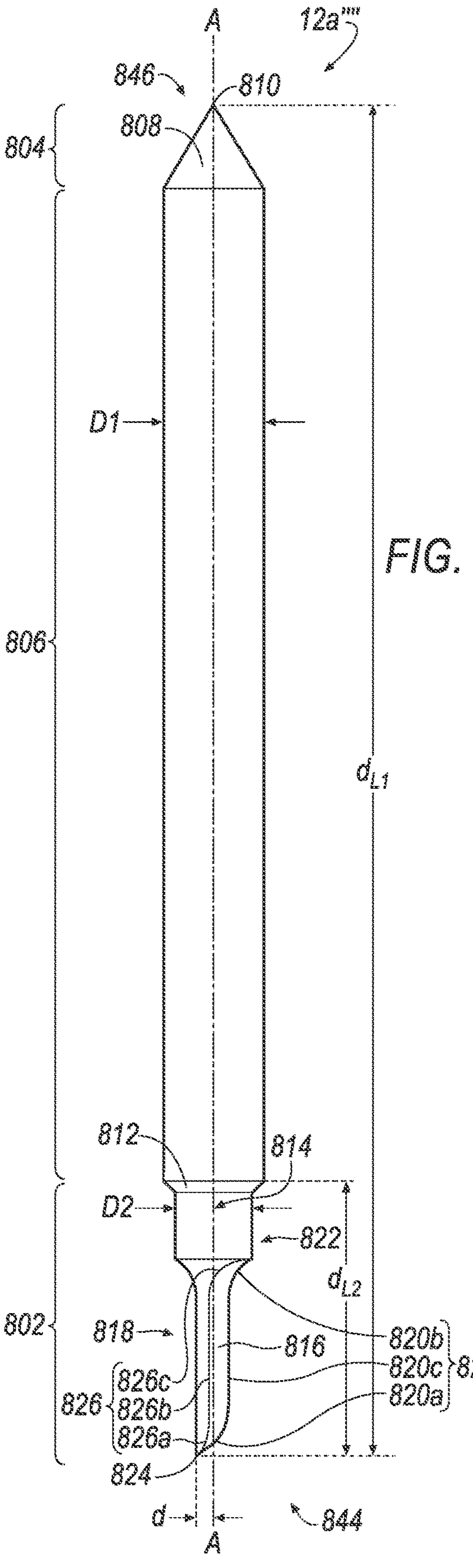
FIG. 42D is a right side view of the blade of FIG. 42A in accordance with an exemplary embodiment of the invention.
Figure 42E:
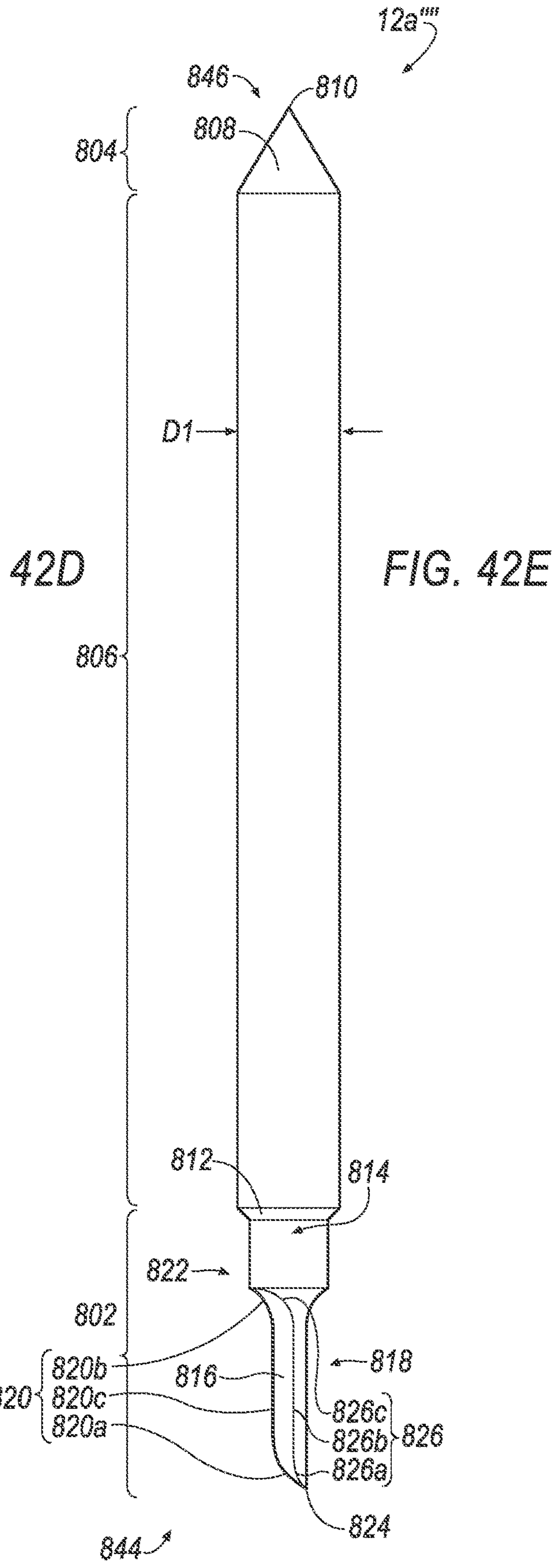
FIG. 42E is a left side view of the blade of FIG. 42A in accordance with an exemplary embodiment of the invention.
Figure 42F:
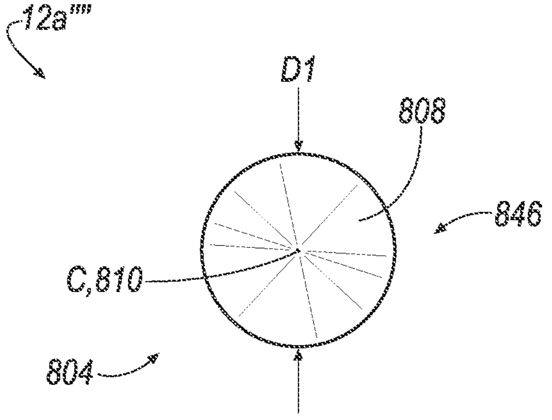
FIG. 42F is a proximal end view of the blade of FIG. 42A in accordance with an exemplary embodiment of the invention.
Figure 42G:
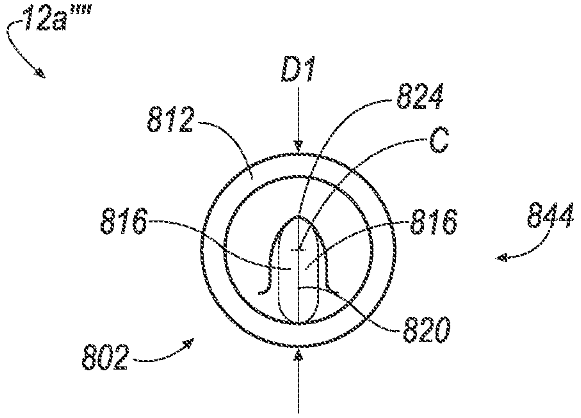
FIG. 42G is a distal end view of the blade of FIG. 42A in accordance with an exemplary embodiment of the invention.

Referring to FIGS. 42D and 42E, the point 824 of the blade portion 802 is offset at a distance, d, from a pivot axis, A-A, that extends through an axial center, C (see, e.g., FIGS. 42F, 42G), of the blade 12*a*"". The offset distance, d, permits the blade 12*a*"" to pivot upon the point 824 in a manner such that the blade 12*a*"" behaves substantially similarly to that of a caster wheel; as such, the blade 12*a*"" may alternatively be referred to as a "caster blade." Functionally, the caster blade 12*a*"" self-aligns/automatically aligns the cutting edge 820 in a cutting direction as a result of (a) force(s) imparted to the blade 12*a*"" resulting from: (1) lateral travel of the working component 20*a* relative to the body 14 and (2) fore/aft travel of the mat 36 relative to the body 14.

With continued reference to FIG. 42D, an embodiment of the blade 12*a*"" may include the following dimensions. It will be appreciated, however, that the blade 12*a*"" is not limited to the following dimensions, but, rather, may include any desirable dimension, geometry or configuration.

In an embodiment, the blade 12*a*"" may include a length dimension, $d_{L1}$, approximately equal to about 27.45 mm that is measured from the tip 810 to the point 824. In an embodiment, the diameter, D1, of the stem portion 806 may be approximately equal to about 2.0 mm. In an embodiment, the blade portion 802 may include a length dimension, $d_{L2}$, approximately equal to about 2.50 mm that is measured from the point 824 to the meeting of the collar portion 812 and the stem portion 806.

In an embodiment, a portion of the ricasso 814 proximate the collar portion 812 may define a diameter, D2, or width approximately equal to about 1.00 mm. In an embodiment, a vertical length dimension, $d_{L3}$, measured from the choil 822 to the point 824 may be approximately about 1.20 mm. A length dimension, $d_{L4}$, of the cutting edge 820 measured from the choil 822 to the point 824 may be approximately about 1.56 mm.

Figure 43:
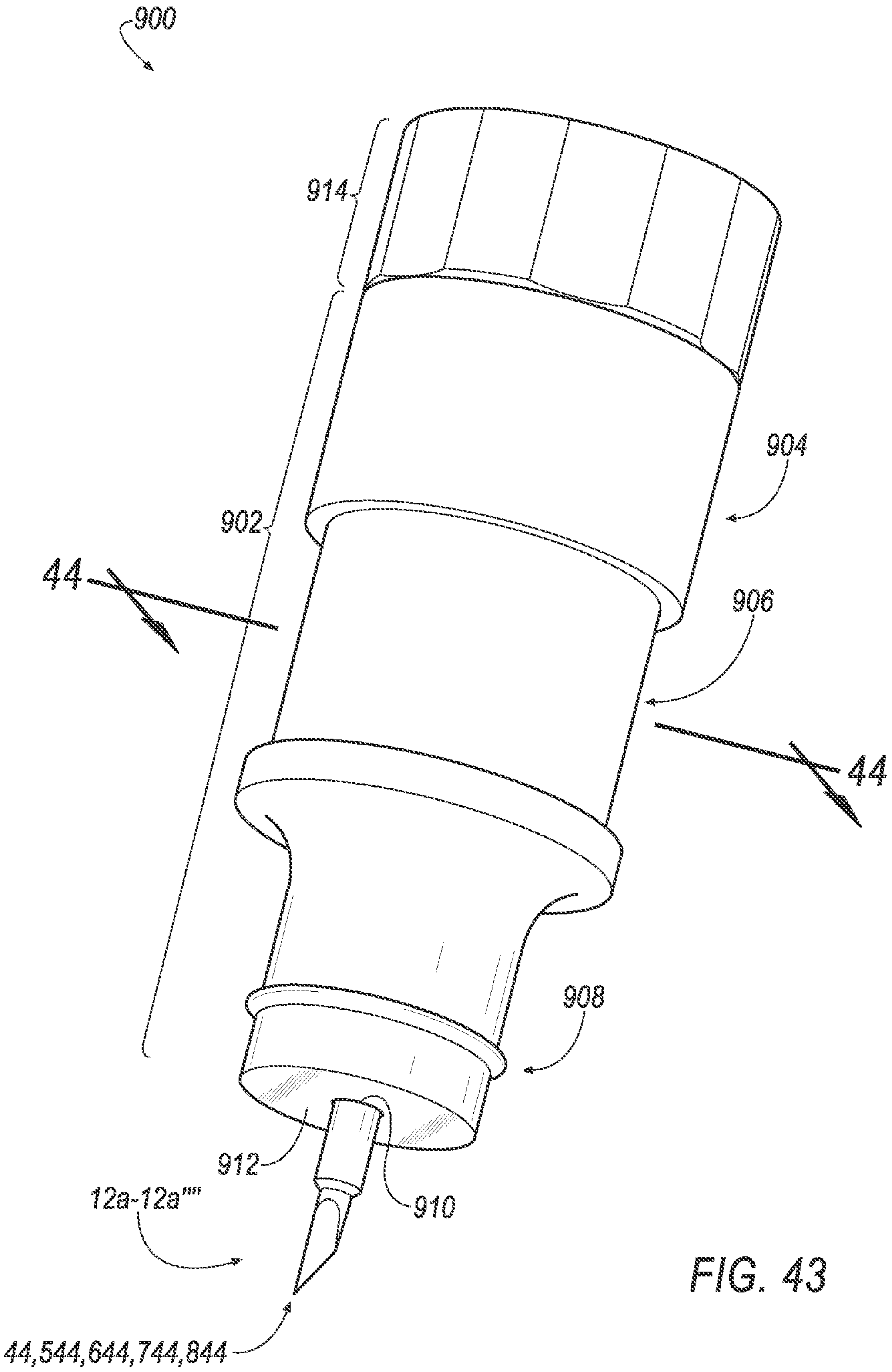
FIG. 43 is a perspective view of a blade carrier housing in accordance with an exemplary embodiment of the invention.

Referring to FIG. 43, a blade carrier housing is shown generally at 900 according to an embodiment. The blade carrier housing 900 includes a body portion 902 having an outer surface 904. The outer surface 904 forms a recessed portion 906 and a circumferential rib 908. The recessed portion 906 provides an attachment surface that permits the blade carrier housing 900 to be attached to the carrier 350 (see, e.g., FIGS. 19-21B) of the first working assembly 18*a*. The functionality of the circumferential rib 908 is described later in the following disclosure.

The blade carrier housing 900 functionally retains/houses/carries one of the blades 12*a*-12*a*"". The distal end 44, 544, 644, 744, 844 is permitted to project out of an opening 910 formed in an end surface 912 of the body portion 902.

The blade carrier housing 900 further includes a cap portion 914 that is rotatably-connected to the body portion 902. The cap portion 914 prevents the blade 12*a*-12*a*"" from being ejected out of and being disconnected from the blade carrier housing 900. Further, upon rotation of the cap portion 914 relative to the body portion 902, the distance that the distal end 44, 544, 644, 744, 844 may project out of the opening 910 may be selectively controlled by the user.

Figure 44A:
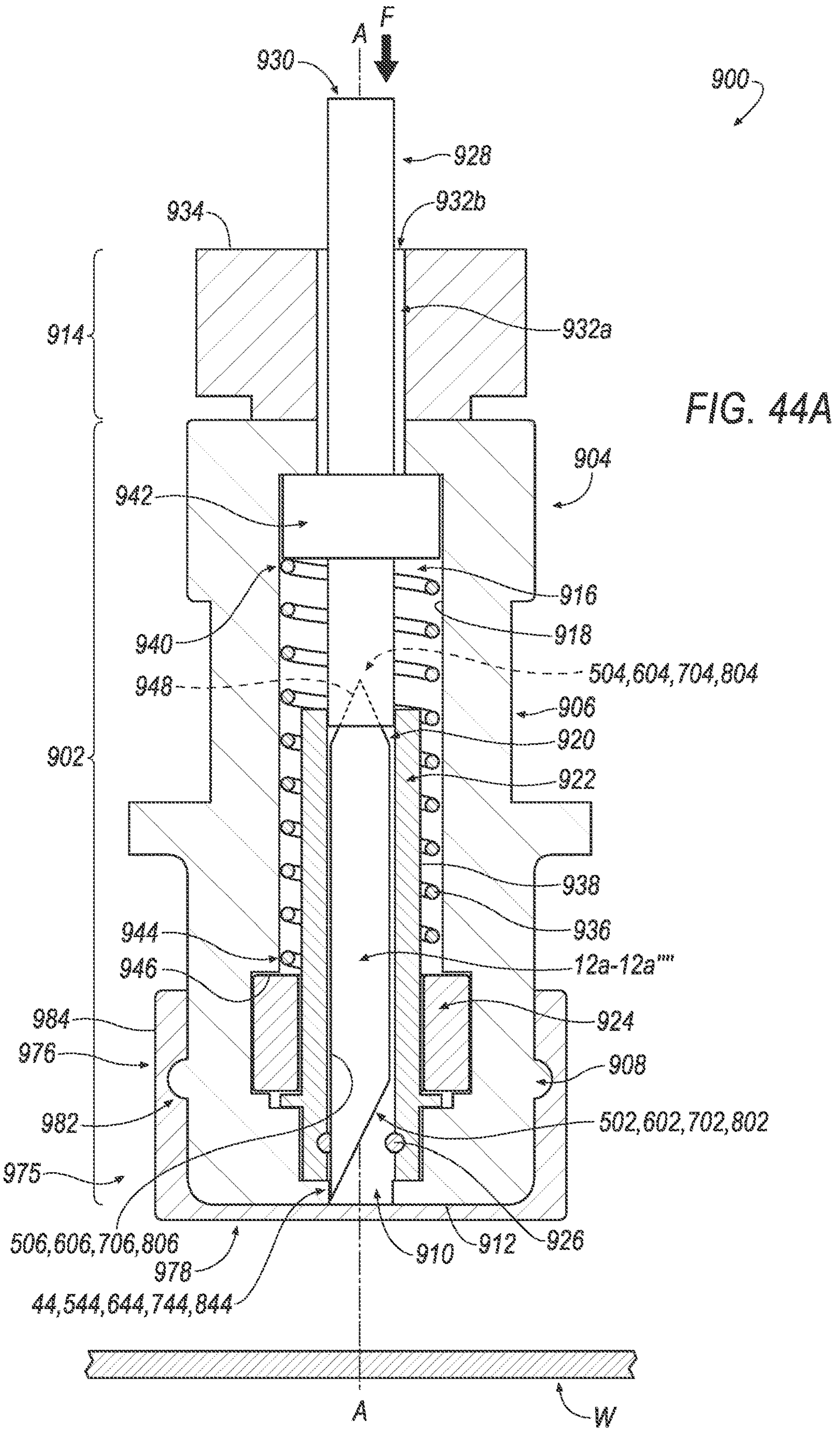
FIG. 44A is a cross-sectional view of the blade carrier housing according to line 44-44 of FIGS. 43 and 46 in accordance with an exemplary embodiment of the invention.
Figure 44B:
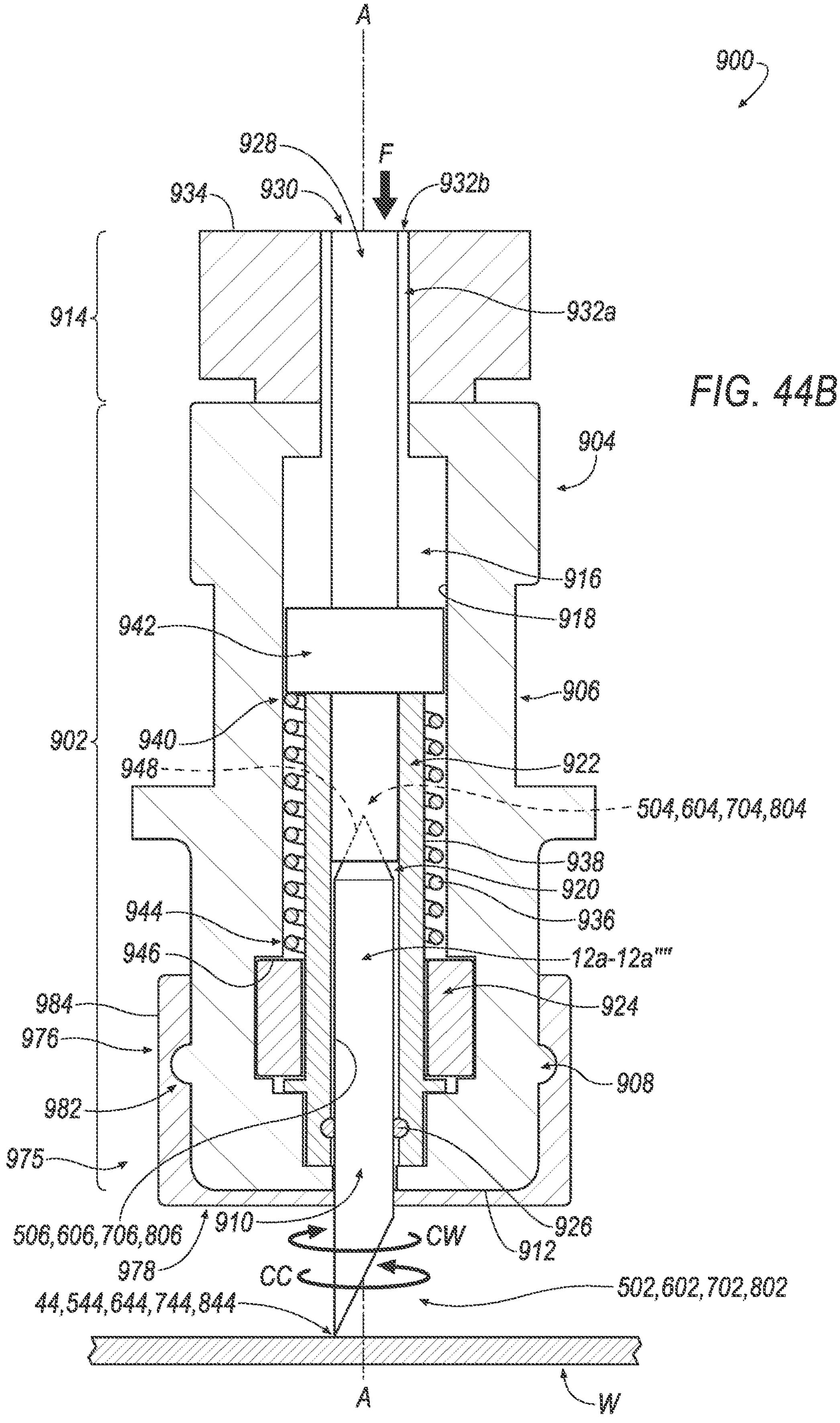
FIG. 44B is another cross-sectional view of the blade carrier housing according to line 44-44 of FIGS. 43 and 46 in accordance with an exemplary embodiment of the invention.

Referring to FIGS. 44A, 44B, components disposed within the blade carrier housing 900 are shown according to an embodiment. The body portion 902 includes a central bore 916 formed by an inner surface 918 of the body portion 902 that permits disposal of components within the blade carrier housing 900.

The blade 12*a*-12*a*"" is disposed within a bore 920 formed by an inner housing 922. The inner housing 922 is disposed within the central bore 916 of the body portion 902.

The inner housing 922 includes an outer bearing 924 that contacts the inner surface 918 of the body portion 902 that defines the central bore 916. An inner bearing 926 is disposed within the bore 920 of the inner housing 922 and contacts the stem portion 506, 606, 706, 806 of the blade 12*a*-12*a*"".

A plunger 928 extends at least partially into each of the central bore 916 of the body portion 902 and the bore 920 of the inner housing 922. An actuator end 930 of the plunger 928 may extend beyond the body portion 902 and into a passage 932*a* formed by the cap portion 914. The actuator end 930 of the plunger 928 may further extend out of the passage 932*a* and through an opening 932*b* formed in an outer end surface 934 of the cap 914 in order to permit at least a portion of the actuator end 930 of the plunger 928 to be in communication with an actuator (not shown).

A spring 936 is disposed within the central bore 916 and may at least partially circumscribe a portion of an outer surface 938 of the inner housing 922. A first end 940 of the spring 936 engages a flange 942 of the plunger 928. A second end 944 of the spring 936 engages an upper surface 946 of the outer bearing 924.

The conical bearing portion 504, 604, 704, 804 of the blade 12*a*-12*a*"" is arranged within a corresponding receiving end 948 of the plunger 928. In an embodiment, the conical bearing portion 504, 604, 704, 804 and the receiving end 948 may be magnetically connected.

When an actuator (not shown) exerts a force, F (see, e.g., FIG. 44A), upon the actuator end 930 of the plunger 928, the blade 12*a*-12*a*"" is moved in a corresponding direction with the plunger 928 such that the distal end 44, 544, 644, 744, 844 of the blade 12a-12a'''' is moved from a retracted, biased orientation (see, e.g., FIG. 44A) within the body portion 902 to an extended orientation (see, e.g., FIG. 44B) beyond the end surface 912 of the body portion 902 in order to permit the blade 12a-12a'''' to cut a foodstuff workpiece, W. As described above, the blade 12a-12a'''' may be a "caster blade;" as such, when the blade 12a-12a'''' is located in the extended orientation and is cutting the foodstuff workpiece, W, the blade 12a-12a'''' is free to rotate clockwise, CW (see, e.g., FIG. 44B), or counter-clockwise, CC (see, e.g., FIG. 44B). Free rotation in the clockwise, CW, or count-clockwise, CC, directions is assisted by contacting the stem portion 506, 606, 706, 806 of the blade 12a-12a'''' with the inner bearing 926.

Referring to FIG. 44B, when arranged in the extended orientation, the spring 936 is compressed and stores energy; accordingly, referring to FIG. 44A, when the actuator (not shown) no longer/does not exert a force, F, upon the actuator end 930, the spring 936 expands and releases the energy such that the first end 940 of the spring 936 pushed the flange 942 of the plunger 928 in order to correspondingly move the blade 12a-12a'''' with the plunger 928 (as a result of, for example, the magnetic coupling described above) for retracting the distal end 544, 644, 744, 844 of the blade 12a-12a'''' into the body portion 902.

When the blade 12a-12a'''' is retracted into the body portion 902 as seen in FIG. 44A, the inner bearing 926 may further function by wiping foodstuff particles off of one of more of the stem portion 506, 606, 706, 806 and blade portion 502, 602, 702, 802 of the blade 12a-12a''''. However, when the blade 12a-12a'''' is wiped multiple times, the foodstuff particles may undesirably be drawn into one or more of the bore 920 formed by an inner housing 922 and the central bore 916 of the body portion 902; accordingly, in such a circumstance, the foodstuff particles may impede axial movement along the axis, A-A, and/or clockwise, CW, or count-clockwise, CC, rotation of one or more of the plunger 928 and blade 12a-12a'''' within the body portion 902.

Figure 45:
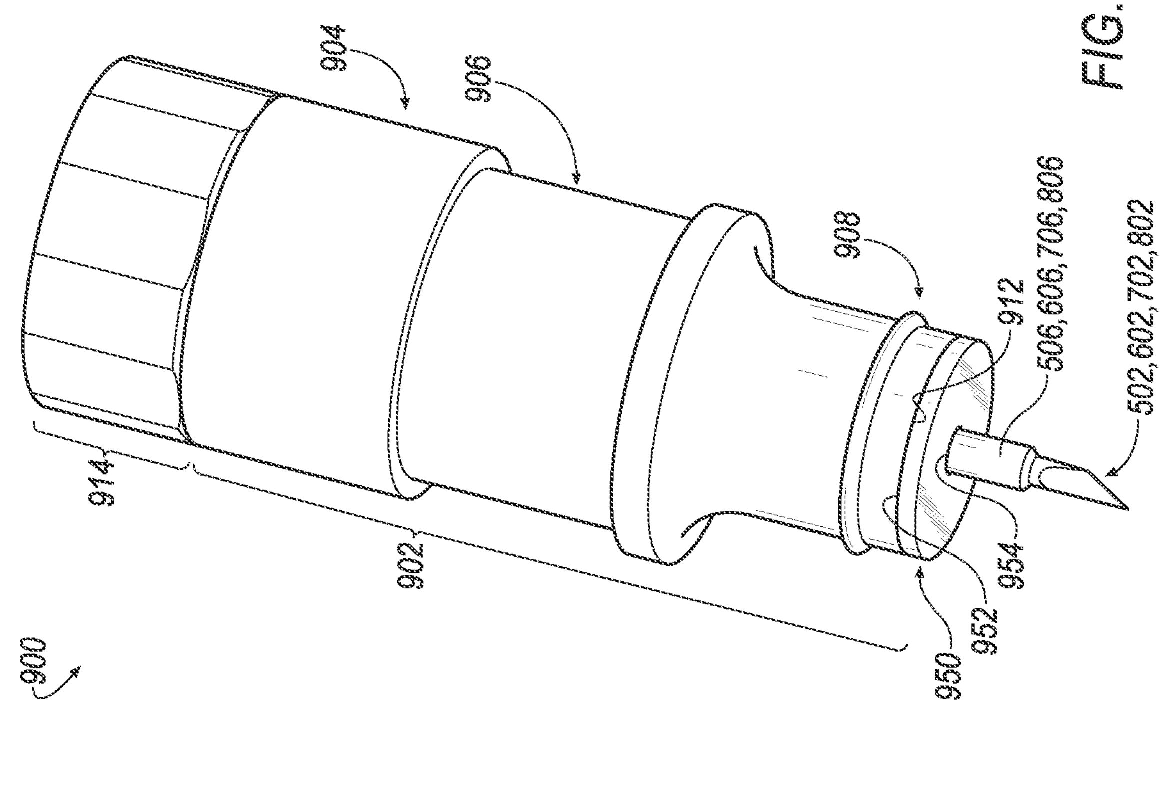
FIG. 45 is a perspective view of a blade carrier housing and an outer seal in accordance with an exemplary embodiment of the invention.

In order to mitigate foodstuff particles from being drawn into one or more of the bore 920 formed by an inner housing 922 and the central bore 916 of the body portion 902, an outer seal 950 (see, e.g., FIG. 45), 975 (see, e.g., FIG. 46) may be arranged upon one or more of the outer surface 904 and the end surface 912 of the body portion 902. As seen in FIG. 45, the outer seal 950 may include a substantially flat, disk-shape that substantially covers the end surface 912, whereas, as seen in FIG. 46, the outer seal 975 may formed to include a cap that substantially covers all of the end surface 912 and extends axially toward the cap 914 in order to at least partially cover a portion of the outer surface 904 proximate and just beyond the end surface 912.

Referring to FIG. 45, the outer seal 950 includes an attachment surface 952 that is disposed substantially adjacent the end surface 912 of the body portion 902. The outer surface 950 further includes a passage 954 that is aligned with the opening 910 (that is shown in FIG. 43) formed in the end surface 912 of the body portion 902. In an implementation, the passage 954 may be substantially the same as, but slightly less than the dimension of the opening 910 in order to permit the outer seal 950 to tightly contact one of more of the stem portion 506, 606, 706, 806 and blade portion 502, 602, 702, 802 of the blade 12a-12a'''' for the purpose of wiping the foodstuff particles off of the blade 12a-12a'''' when the blade 12a-12a'''' is moved to/from the extended or retracted orientations.

The attachment surface 952 may be attached to the end surface 912 of the body portion 902 with any desirable methodology. For example, an adhesive may be deposited upon the attachment surface 952 to adhesively fix the outer seal 950 to the body portion 902.

Figure 46:
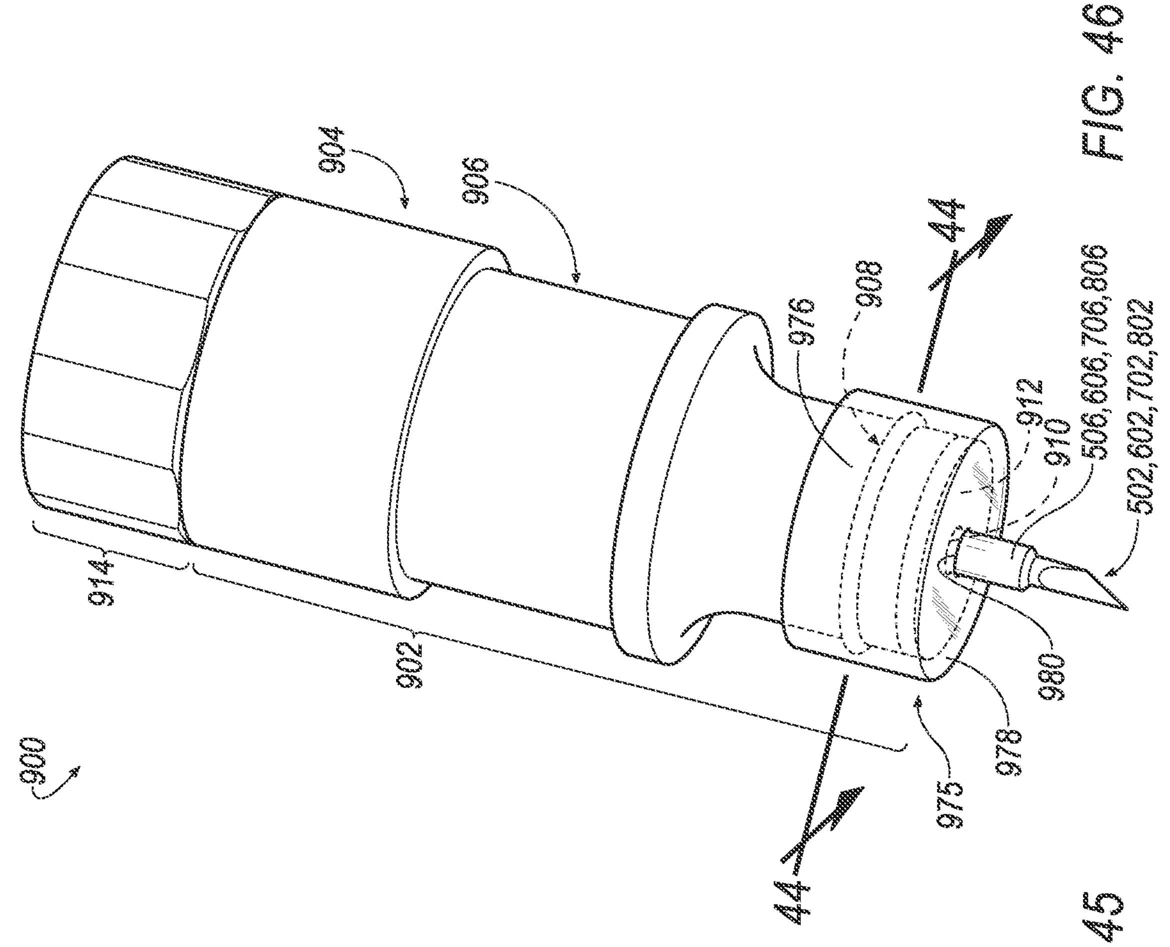
FIG. 46 is a perspective view of a blade carrier housing and an outer seal in accordance with an exemplary embodiment of the invention.

Referring to FIG. 46, the outer seal 975 includes a circumferential flange side portion 976 connected to a disk-shaped base portion 978. The circumferential flange side portion 976 is arranged at least a portion of the outer surface 904 proximate the end surface 912 of the body portion 902 whereas the disk-shaped base portion 978 covers all of the end surface 912 of the body portion 902. The disk-shape base portion 978 includes a passage 980 that is aligned with the opening 910 formed in the end surface 912 of the body portion 902. In an implementation, the passage 980 may be substantially the same as, but slightly less than the dimension of the opening 910 in order to permit the outer seal 975 to tightly contact one of more of the stem portion 506, 606, 706, 806 and blade portion 502, 602, 702, 802 of the blade 12a-12a'''' for the purpose of wiping the foodstuff particles off of the blade 12a-12a''''.

Referring to FIGS. 44A, 44B, in an implementation, the outer seal 975 may include a circumferential recess 982 formed on an inner surface 984 of the circumferential flange portion 976 of the outer seal 975. Upon arranging the outer seal 975 upon the body portion 902, the circumferential recess 982 may receive the circumferential rib 908 formed on the outer surface 904 of the body portion 902 for removably-attaching the outer seal 975 to the body portion 902. Accordingly, if a user wishes to clean foodstuff particles from the outer seal 975, the user may simply pull the outer seal 975 off of the body portion 902 such that the flange portion 976 may flex away from the rib 908 in order to de-couple the outer seal 975 from the body portion 902.

Although the outer seal 975 may include structure to permit removable-attachment to the body portion 902, the outer seal 975 may be adhesively-attached to the body portion in a substantially similar manner as described with respect to the outer seal 950. Accordingly, the structure of the outer seal 975 may provide a structural, mechanical attachment that may be further complemented by an adhesive attachment should an adhesive be utilized.

Although the outer seals 950, 975 have been described to be (1) adhesively, (2) mechanically or (3) adhesively & mechanically attached to the body portion 902, the outer seals 950, 975 may be (A) formed with or (B) formed over the body portion 902. For example, in an implementation, the body portion 902 may be formed in a first forming procedure, and, subsequently, the outer seal 950, 975 may be formed (e.g., molded, extruded or sprayed) over the material comprising the body portion 902 in order to chemically bond the outer seal 950, 975 to the body portion 902. In another example, the body portion 902 and the outer seal 950, 975 may be formed concurrently (e.g., within a mold tool during a "two shot" molding procedure) in order to chemically bond a material comprising the body portion 902 with a material comprising the outer seal 950, 975.

The outer seals 950, 975 may be made from any desirable material. In an embodiment, the outer seals 950, 975 may be made from, for example, a soft material (e.g., a silicon membrane). Although the outer seals 950, 975 may include a soft material, the outer seals 950, 975 may include harder/rigid materials including but not limited to any desirable hard/rigid plastic material.

Figure 47:
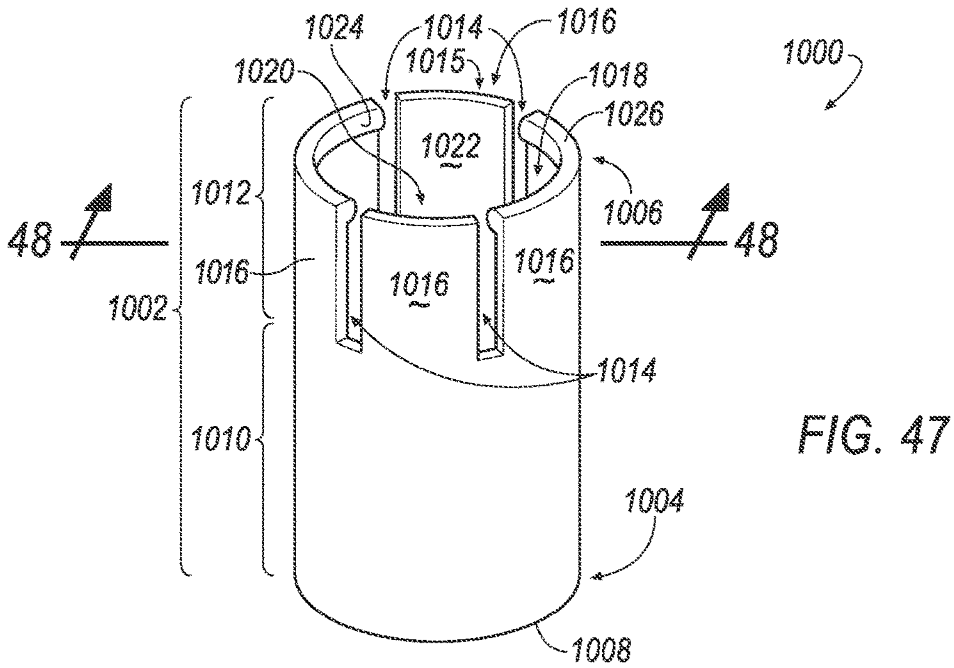
FIG. 47 is a perspective view of a removable covering for a blade carrier housing in accordance with an exemplary embodiment of the invention.
Figure 48:
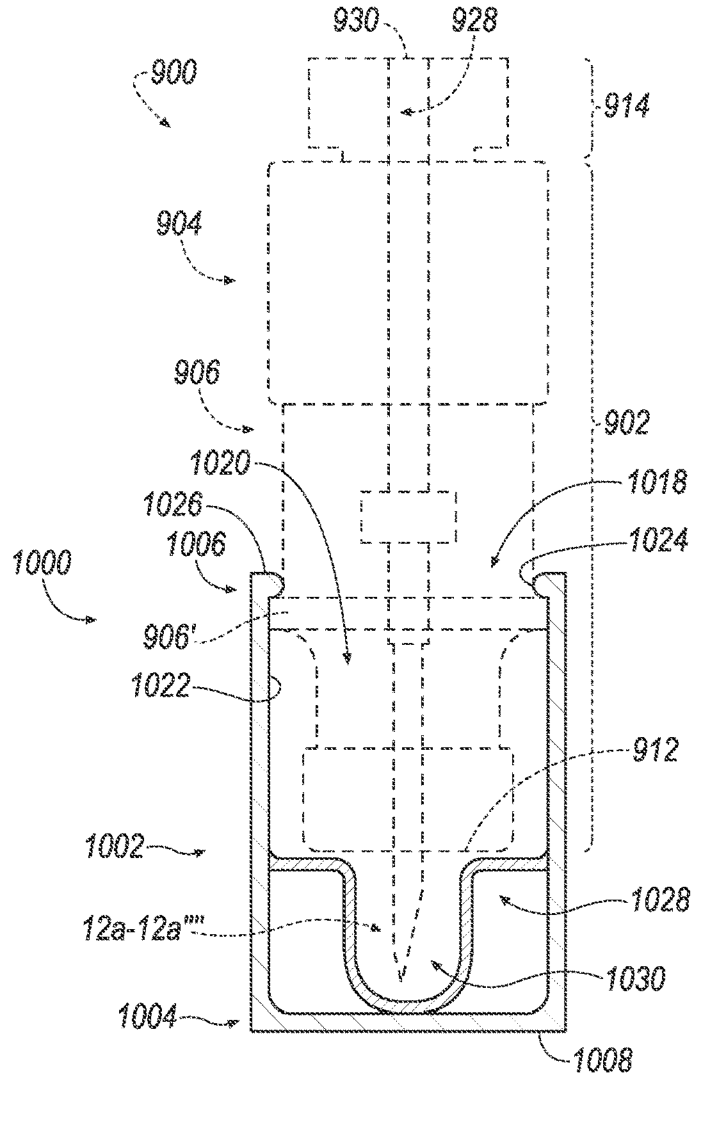
FIG. 48 is a cross-sectional view of the removable covering for a blade carrier housing according to line 48-48 of FIG. 47 in accordance with an exemplary embodiment of the invention.

Referring to FIGS. 47 and 48, a removable covering 1000 is shown according to an embodiment. The removable covering 1000 may be attached to the blade carrier housing 900. Functionally, the removable covering 1000 obscures the end surface 912 of the body portion 902 of the blade carrier housing 900. Accordingly, in the event that a user depresses the actuator end 930 of the plunger 928 and the blade 12*a*-12*a*'''' is moved from a retracted, biased orientation within the body portion 902 to an extended orientation, the removable covering 1000 prevents the blade 12*a*-12*a*'''' to come into contact with objects proximate the blade 12*a*-12*a*''''.

Referring to FIG. 47, the removable covering 1000 includes a substantially cylindrical body 1002 having a first end 1004 and a second end 1006. The first end 1004 is enclosed by an end portion 1008.

The substantially cylindrical body 1002 includes an uninterrupted circumferential portion 1010 connected to the end portion 1008. The uninterrupted circumferential portion 1010 extends toward the second end 1006.

The substantially cylindrical body 1002 further includes an interrupted circumferential portion 1012 connected to the uninterrupted circumferential portion 1010. The interrupted circumferential portion 1012 is located proximate the second end 1006.

The interrupted circumferential portion 1012 is differentiated from the uninterrupted circumferential portion 1010 by the inclusion of a plurality of slots 1014. The plurality of slots 1014 define the interrupted circumferential portion 1012 to include a plurality of flexible fingers 1016. Further, each finger of the plurality of flexible fingers 1016 define the second end 1006 to include an opening 1018. The opening 1018 permits communication with a cavity 1020 extending into both of the interrupted and uninterrupted circumferential portions 1010, 1012. The cavity 1020 is formed by an inner surface 1022 of the cylindrical body 1002.

At the second end 1006, the inner surface 1022 includes an inwardly-projecting rib 1024 that is formed proximate a tip 1026 of each finger of the plurality of flexible fingers 1016. Functionally, each inwardly-projecting rib 1024 extends toward and contacts the outer surface 904 of the body portion 902 to permit the removable covering 1000 to be removably-attached to the blade carrier housing 900; further, in an implementation, each inwardly-projecting rib 1024 is permitted to flex over and cling to a shoulder 906' that at least partially forms the recessed portion 906 of the body portion 902.

Referring to FIG. 48, near the first end 1004, a safety flange 1028 extends across the cavity 1020 such that the safety flange 1028 creates a bridge that connects opposing portions of the inner surface 1022. The safety flange 1028 includes a channel 1030 that receives the blade 12*a*-12*a*'''' should the actuator end 930 of the plunger 928 be depressed.

The removable covering 1000 may be made from any desirable material. In an embodiment, the removable covering 1000 may include a soft material (e.g., a silicon material). In an embodiment, the removable covering 1000 may include a hard/rigid material (e.g., a plastic material). In an embodiment, the removable covering 1000 may include more than one material, and, as such, the removable covering 1000 may be made, for example, in a two-shot or multi-shot molding procedure. In an embodiment, the substantially cylindrical body 1002 may be made in a first step and may include a rigid material whereas the safety flange 1028 may be made in a second step and may include a soft material such that if, for example, the blade 12*a*-12*a*'''' impinges into the soft material comprising the safety flange 1028, the blade 12*a*-12*a*'''' may not be damaged as a result of impinging into what could otherwise be a substantially rigid material that could otherwise compromise the safety flange 1028.

Figure 50:
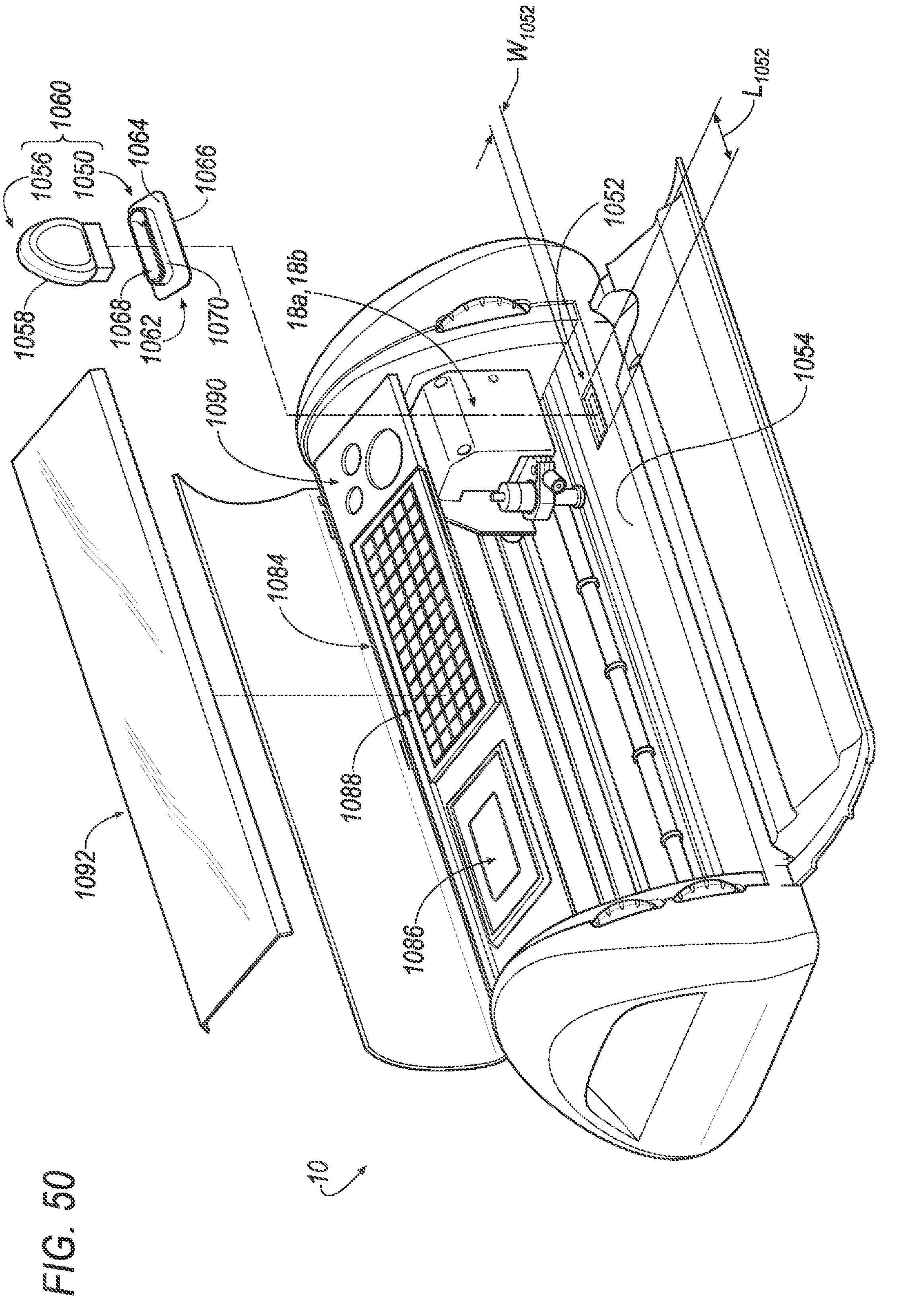
FIG. 50 is a view of a crafting apparatus, memory cartridge and the removable covering of FIGS. 49A-49B in accordance with an exemplary embodiment of the invention.

Referring to FIGS. 49A-50, a removable covering 1050 is shown according to an embodiment. Functionally, the removable covering 1050 mitigates entry of foodstuff particles into a data port 1052 (see, e.g., FIG. 50) formed in a floor surface 1054 of the foodstuff crafting apparatus 10.

The data port 1052 receives a memory cartridge 1056 (see, e.g., FIGS. 49A, 50) that may be programmed to include "work instructions" (e.g., cutting instructions/embossing instructions/ink spraying instructions, or the like) to be conducted by one or more of the first and second working assemblies 18*a*, 18*b*. Although the memory cartridge 1056 may be selectively interfaced with and at least partially cover the data port 1052, some foodstuff particles may find entry into the data port 1052.

In view of the drawback of foodstuff particles potentially finding entry into the data port 1052, the removable covering 1050 may be connected to and sealingly-circumscribe/-engage an outer surface 1058 of the memory cartridge 1056 in order to form a sub-assembly 1060 (see, e.g., 49A). The sub-assembly 1060 may then be interfaced with the data port 1052 in order to permit the memory cartridge 1056 to be in communication with the foodstuff crafting apparatus 10 at the data port 1052 while also mitigating entry of foodstuff particles into the data port 1052.

As seen in FIG. 49A, the removable covering 1050 includes a body 1062 having an upper surface 1064 and a lower surface 1066. The upper surface 1064 functions as a skirt that includes a length dimension, $L_{1050}$, and a width dimension, $W_{1050}$, that is greater than a length dimension, $L_{1052}$ (see, e.g., FIG. 50), and a width dimension, $W_{1052}$ (see, e.g., FIG. 50), of the data port 1052. Because the length dimension, $L_{1050}$, and the width dimension, $W_{1050}$, of the upper surface 1064 of the body 1062 are greater than the length dimension, $L_{1052}$, and the width dimension, $W_{1052}$, of the data port 1052, foodstuff particles are less likely/not able to find entry into the data port 1052.

The removable covering 1050 also includes a passage 1068 that extends through the body 1062 from the upper surface 1064 to the lower surface 1066. The passage 1068 permits the memory cartridge 1056 to be inserted through the removable covering 1050 for forming the sub-assembly 1060.

Each of the upper and lower surfaces 1064, 1066 of the removable covering 1050 may further include a sealing bead 1070, 1072. In an embodiment, the sealing bead 1070 may be referred to as an upper sealing bead that sealingly-circumscribes/-engages the outer surface 1058 of the memory cartridge 1056. The sealing bead 1072 may be referred to as a lower sealing bead that sealingly-circumscribes/-engages the length dimension, $L_{1052}$, and the width dimension, $W_{1052}$, of the data port 1052. Accordingly, although the upper surface 1064 of the body 1062 provides a surface area that covers/closes out a peripheral opening/passage that may at least partially provide access of the foodstuff particles to the data port 1052, the sealing beads 1070, 1072 may sealingly-engage a periphery of one or more of the memory cartridge 1056 and data port 1052 in order to further seal and close-out passages or crevasses that may be formed upon attachment of the removable covering 1050 to one or more of the memory cartridge 1056 and data port 1052.

Figure 51A:
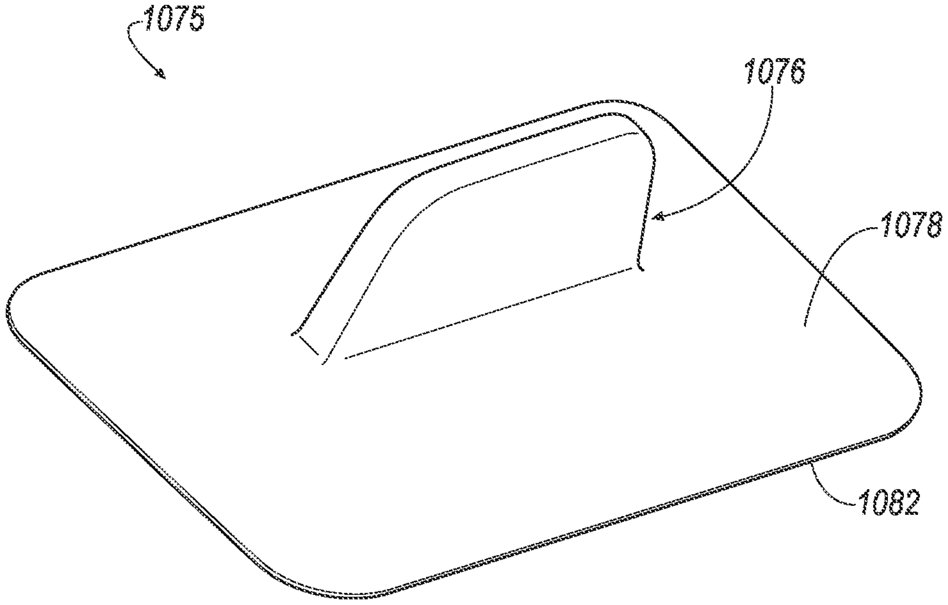
FIG. 51A is a top perspective view of a removable covering for a data port of a crafting apparatus in accordance with an exemplary embodiment of the invention.
Figure 51B:
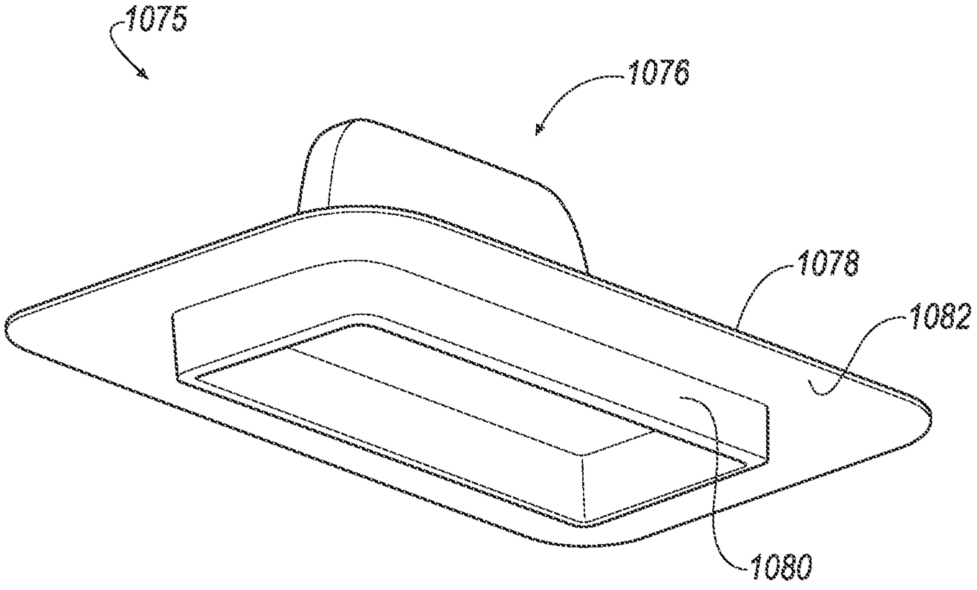
FIG. 51B is a bottom perspective view of the removable covering for a data port of a crafting apparatus of FIG. 51A in accordance with an exemplary embodiment of the invention.
Figure 52:
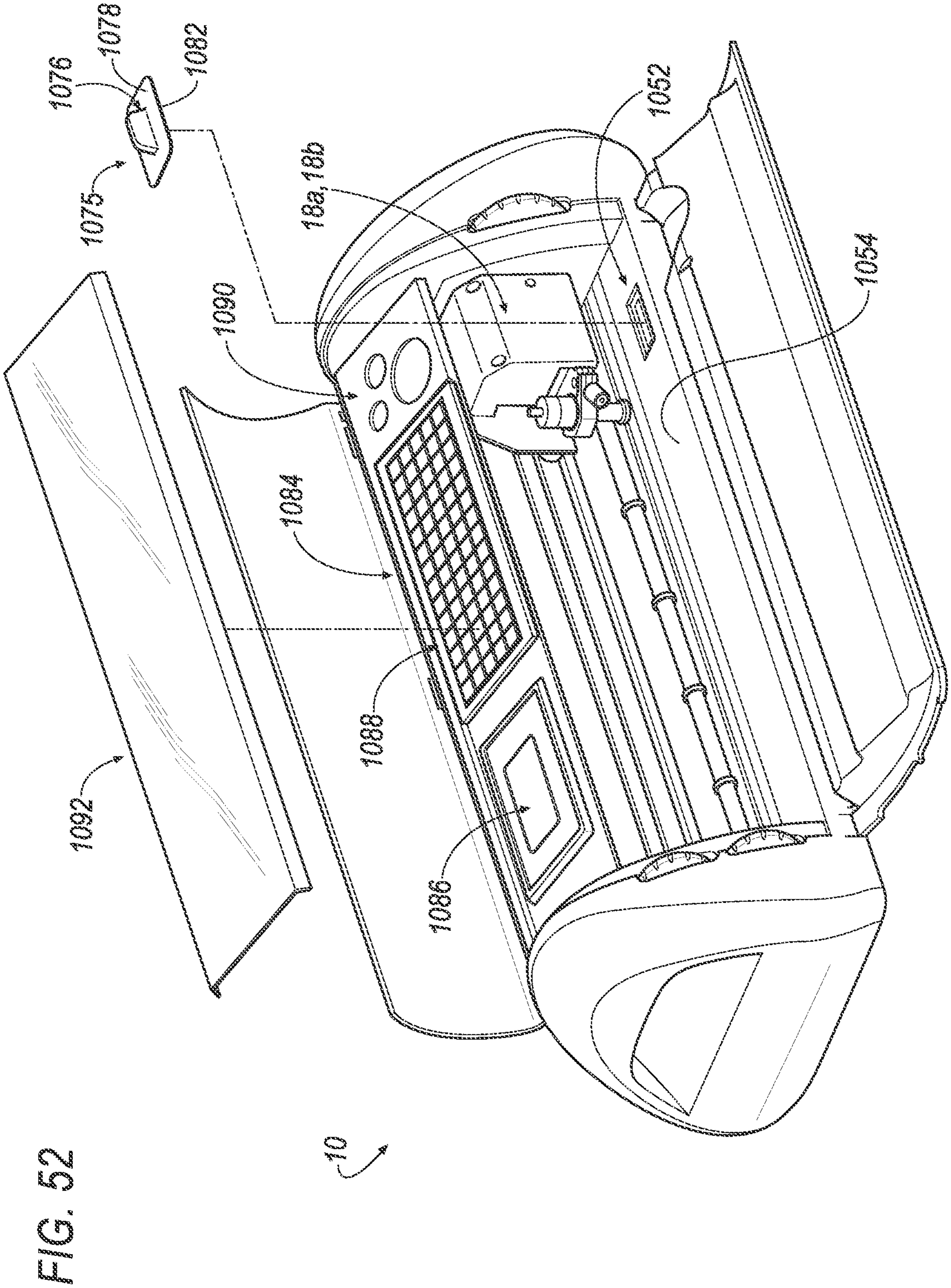
FIG. 52 is a view of a crafting apparatus having a data port and the removable covering of FIGS. 51A-51B in accordance with an exemplary embodiment of the invention.

Referring to FIGS. 51A-52, a removable covering 1075 is shown according to an embodiment. Functionally, the removable covering 1075 is substantially similar to that of the removable covering 1050 in that the removable covering 1075 mitigates entry of foodstuff particles into a data port 1052 (see, e.g., FIG. 52) formed in a floor surface 1054 of the foodstuff crafting apparatus 10.

As explained above, the data port 1052 may receive a memory cartridge 1056 that may be programmed to include "work instructions" (e.g., cutting instructions/embossing instructions/ink spraying instruction or the like) to be conducted by one or more of the first and second working assemblies 18*a*, 18*b*. However, in some circumstances, the foodstuff crafting apparatus 10 may be pre-programmed with or receive the work instructions (e.g., by communicating with a computer or via a wireless connection); accordingly, in such circumstances, the memory cartridge 1056 may not be interfaced with and at least partially cover the data port 1052.

Further, because the removable covering 1050 includes the passage 1068, the removable covering 1050, when used alone without the memory cartridge 1056, may not be sufficient in covering/closing-out access to the data port 1052 in order to prevent foodstuff particles from finding entry into the data port 1052. Accordingly, as seen in FIGS. 51A-51B, the removable covering 1075 may be provided to cover and close-out access to the data port 1052 when a memory cartridge 1056 is not interfaced with the data port 1052. In an implementation, the removable covering 1075 does not include the passage 1068, and, therefore, the removable covering 1075 may prevent foodstuff particles from finding entry into the data port 1052 due to the absence of the 1068.

To assist a user in grasping the removable covering 1075, the removable covering 1075 may include a tab 1076 that extends away from the upper surface 1078 of the removable covering 1075. Further, once the removable covering 1075 is disposed upon/within the data port 1052, a lower bead 1080 (see, e.g., FIG. 51B) extending from a lower surface 1082 of the removable covering 1075 may be sealingly-disposed adjacent and/or be interfaced with the data port 1052.

Referring to FIGS. 50 and 52, although a mitigation of entry of foodstuff particles into the data port 1052 has been described, foodstuff particles may also find entry into a user-interface region 1084 of the foodstuff crafting apparatus 10. The user-interface region 1084 may include, for example, a display monitor 1086 that may display text and/or graphics, a keyboard 1088, dials/buttons 1090 and the like. Accordingly, in an embodiment, a user-interface covering 1092 may be provided in order to sealingly-engage the user-interface region 1084 in order to mitigate the contact of foodstuff particles with one or more of the components of the user-interface region 1084.

The removable coverings 1050, 1075 and user-interface covering 1092 may be made from any desirable material. In an embodiment, the removable coverings 1050, 1075 and user-interface covering 1092 may be made from, for example, a soft material (e.g., a silicon membrane). Although the removable coverings 1050, 1075 and user-interface covering 1092 may include a soft material, the removable coverings 1050, 1075 and user-interface covering 1092 may include harder/rigid materials including but not limited to any desirable hard/rigid plastic material.

Figure 53B:
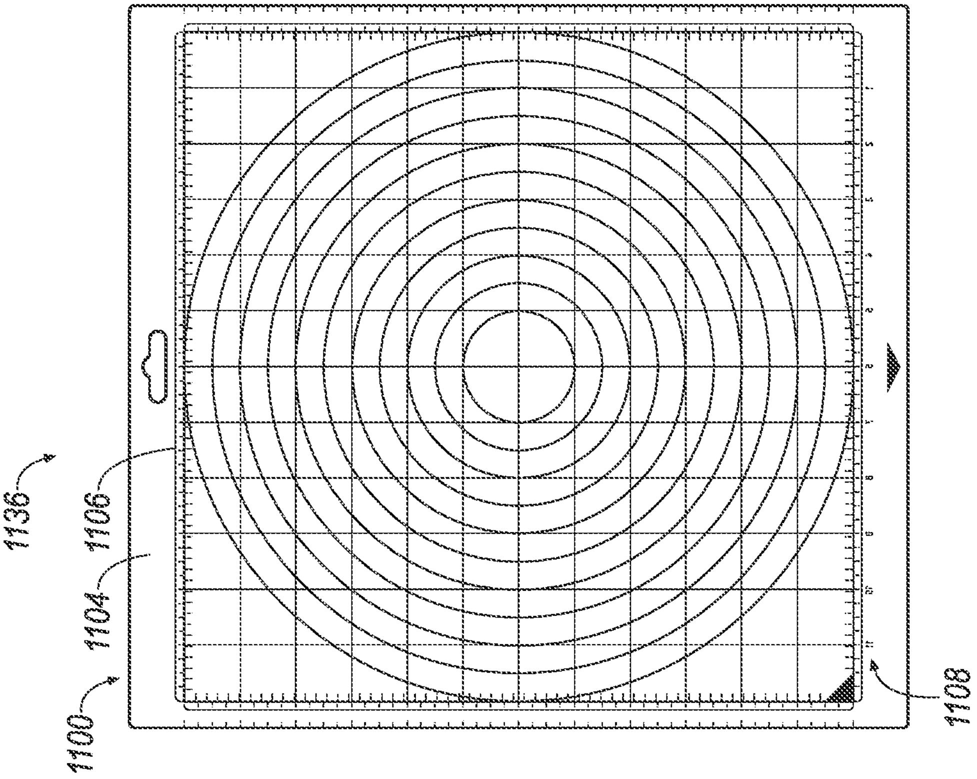
FIG. 53B is a bottom view of a foodstuff workpiece support mat in accordance with an exemplary embodiment of the invention.
Figure 53A:
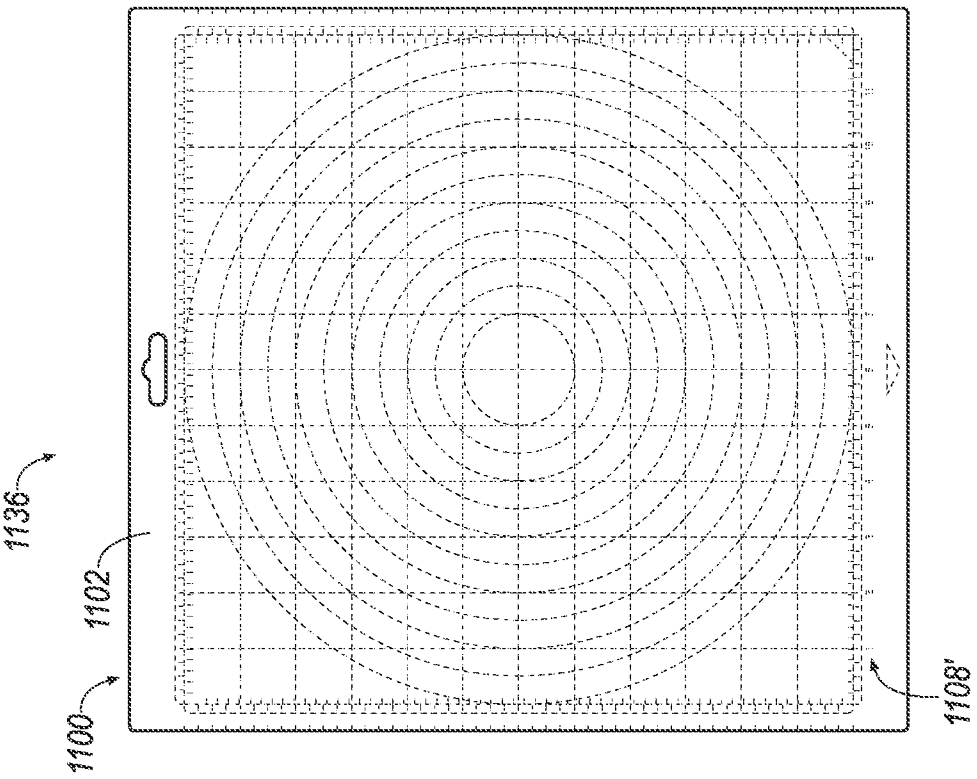
FIG. 53A is a top view of a foodstuff workpiece support mat in accordance with an exemplary embodiment of the invention.
Figure 53C:
FIG. 53C is a side view of a foodstuff workpiece support mat in accordance with an exemplary embodiment of the invention.

Referring to FIGS. 53A-53C, a foodstuff workpiece support mat 1136 is shown according to an embodiment. Functionally, the foodstuff workpiece support 1136 is similar to that of the mat 36 in that the foodstuff workpiece mat 1136 supportably-carries the foodstuff workpiece, W, as the foodstuff crafting apparatus 10 conducts work upon the foodstuff workpiece, W.

The foodstuff workpiece mat 1136 includes a body 1100 having a front surface 1102 (see, e.g., FIG. 53A) and a rear surface 1104 (see, e.g., FIG. 53B). The front surface 1102 is substantially flat/planar and includes no printed ink (that may otherwise form, for example, indicia (e.g., alignment patterns/grids/lines or the like). The rear surface 1104, however, may include printed ink 1106 that forms the indicia. Alternatively, rather than using printed ink 1106, either of the front or rear surfaces 1102, 1104 may include an embossed (i.e. raised out) or imbossed (i.e., pushed in) pattern in order to visually provide the indicia. In an implementation, the embossed or imbossed pattern may be created during a molding procedure of the foodstuff workpiece mat 1136. Accordingly, costs may be reduced by obviating the use of the ink 1106 and the time needed to dispose the ink 1106 upon the rear surface 1104 as a result of a single molding procedure.

The foodstuff workpiece mat 1136 includes a food-grade plastic (e.g., polyvinyl chloride (PVC)). The material comprising the foodstuff workpiece mat 1136 may not include a coloring or dye. Further, in an embodiment, the material comprising the foodstuff workpiece mat 1136 may be substantially transparent in order to permit the ink 1106 disposed on the rear surface 1104 to be visible (i.e., as represented by phantom lines in FIG. 53A) to a user that is looking directly at the front surface 1102.

In an embodiment, the printed ink 1106 may include a food-grade ink, and, as such, although the rear surface 1104 is not intended to come into contact with a foodstuff workpiece, W, such contact may nevertheless be permitted due to the food-grade quality of the printed ink 1106. To further insinuate to a user that the rear surface 1104 is not intended to provide a support surface for directly contacting the foodstuff workpiece, W, any indicia that includes, for example, letters, numbers or the like that is formed by the ink 1106 may be printed in an inverted fashion 1108 (see, e.g., FIG. 53B) upon the rear surface 1104 such that a user looking directly at the rear surface 1104 will easily notice the inverted nature of the letters, numbers or the like; accordingly, due to the transparent quality of the material comprising the foodstuff workpiece mat 1136, when a user is looking directly at the front surface 1102 and sees the ink 1106 printed on the rear surface 1104, the letters, numbers or the like does not appear to be inverted 1108' (see, e.g., FIG. 53A). Because the letters, numbers or the like does not appear to be inverted 1108' when a user is directly viewing the front surface 1102, the user would be more likely to intuitively utilize the front surface 1102 (see, e.g., FIGS. 54C, 54D) as a contacting surface for directly engaging and supporting the foodstuff workpiece, W, when the foodstuff crafting apparatus 10 conducts work upon the foodstuff workpiece, W.

Figure 54A:
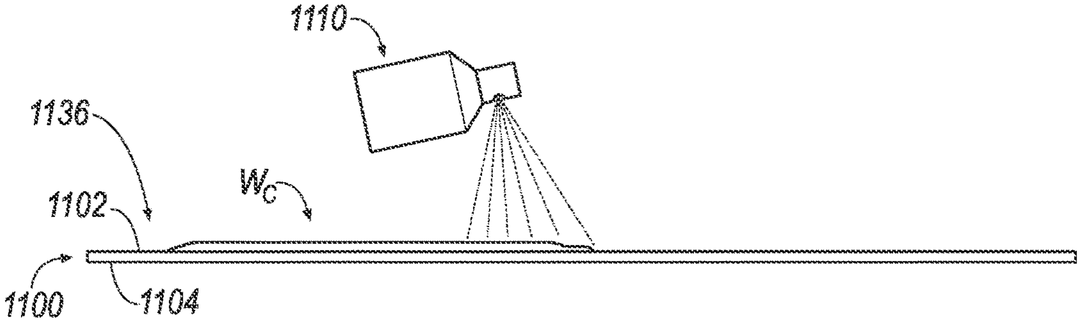
FIGS. 54A-54D are side views of the foodstuff workpiece support mat in various states of use includes one or more of a foodstuff workpiece coating and a foodstuff workpiece disposed thereupon in accordance with an exemplary embodiment of the invention.
Figure 54B:
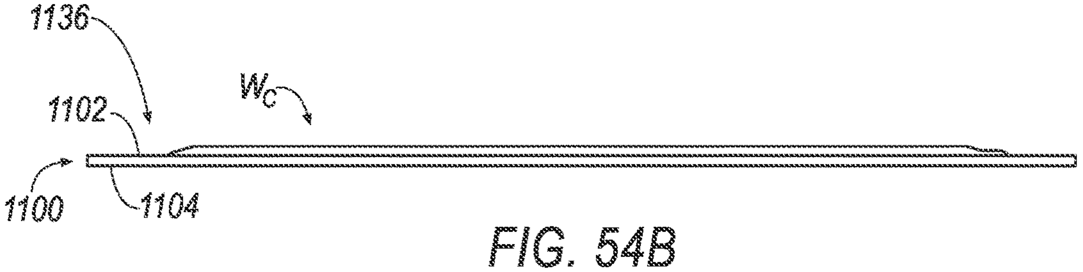

Referring to FIG. 53C, a side view of the foodstuff workpiece mat 1136 is shown. Referring to FIG. 54A-54B, when it is desired to apply the foodstuff workpiece, W, to the front surface 1102 of the foodstuff workpiece mat 1136, the front surface 1102 may be treated/coated with a workpiece foodstuff coating, $W_C$ (see, e.g., FIG. 54A), prior to placement of the foodstuff workpiece, W, upon the front surface 1102.

As seen in FIG. 54A, in an embodiment, the foodstuff workpiece coating, $W_C$, may be sprayed upon the front surface 1102 from a spray can 1110. Although the foodstuff workpiece coating, $W_C$, is shown being applied to the front surface 1102 from a spray can 1110, the foodstuff workpiece coating, $W_C$, may be deposited upon the front surface 1102 in liquid form and spread about the front surface 1102 by a roller/a rolling applicator or the like. In another implementation, the foodstuff workpiece coating, $W_C$, may be provided in a solid, preformed sheet of material that is deposited upon the front surface 1102.

The foodstuff workpiece coating, $W_C$, may include any desirable foodstuff material such as, for example, shortening, oil, honey or the like. If the foodstuff workpiece coating, $W_C$, includes, for example shortening, honey or the like, the shortening, honey or like may act as an adhesive for retaining the foodstuff workpiece, W, to the front surface 1102 of the foodstuff workpiece mat 1136.

Figure 54C:
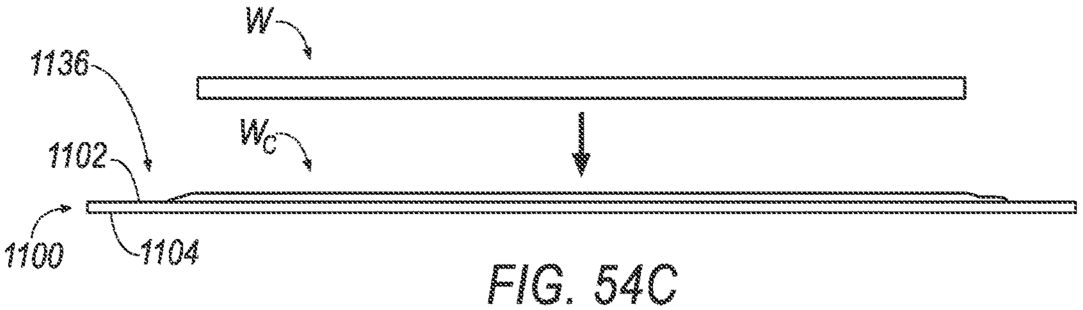
Figure 54D:
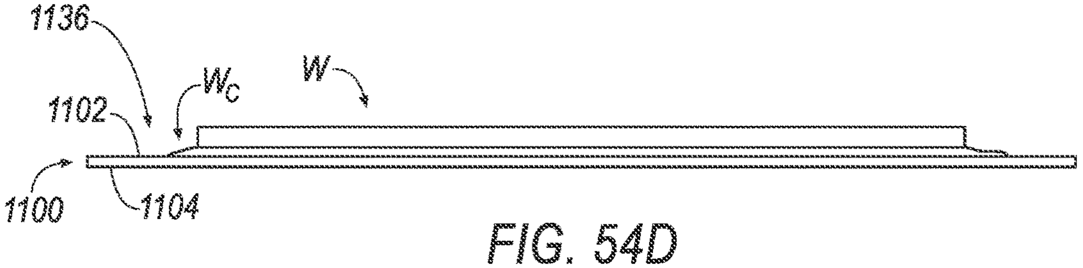

Referring to FIGS. 54C-54D, once the foodstuff workpiece coating, $W_C$, is applied to the front surface 1102 of the foodstuff workpiece mat 1136, the user may deposit the foodstuff workpiece, W, upon the foodstuff workpiece coating, $W_C$, such that the front surface 1102 of the foodstuff workpiece mat 1136 supports both of the foodstuff workpiece, W, and the foodstuff workpiece coating, $W_C$. As mentioned above, the foodstuff workpiece, W, may include any desirable foodstuff material such as, for example, fondant, gum paste, sheet icing, liquorices, dried fruit, fruit leather (FRUIT ROLL-UPS®, FRUIT WINDERS®, FRUIT BY THE FOOT®), tortillas, cheese or the like.

Figure 55:
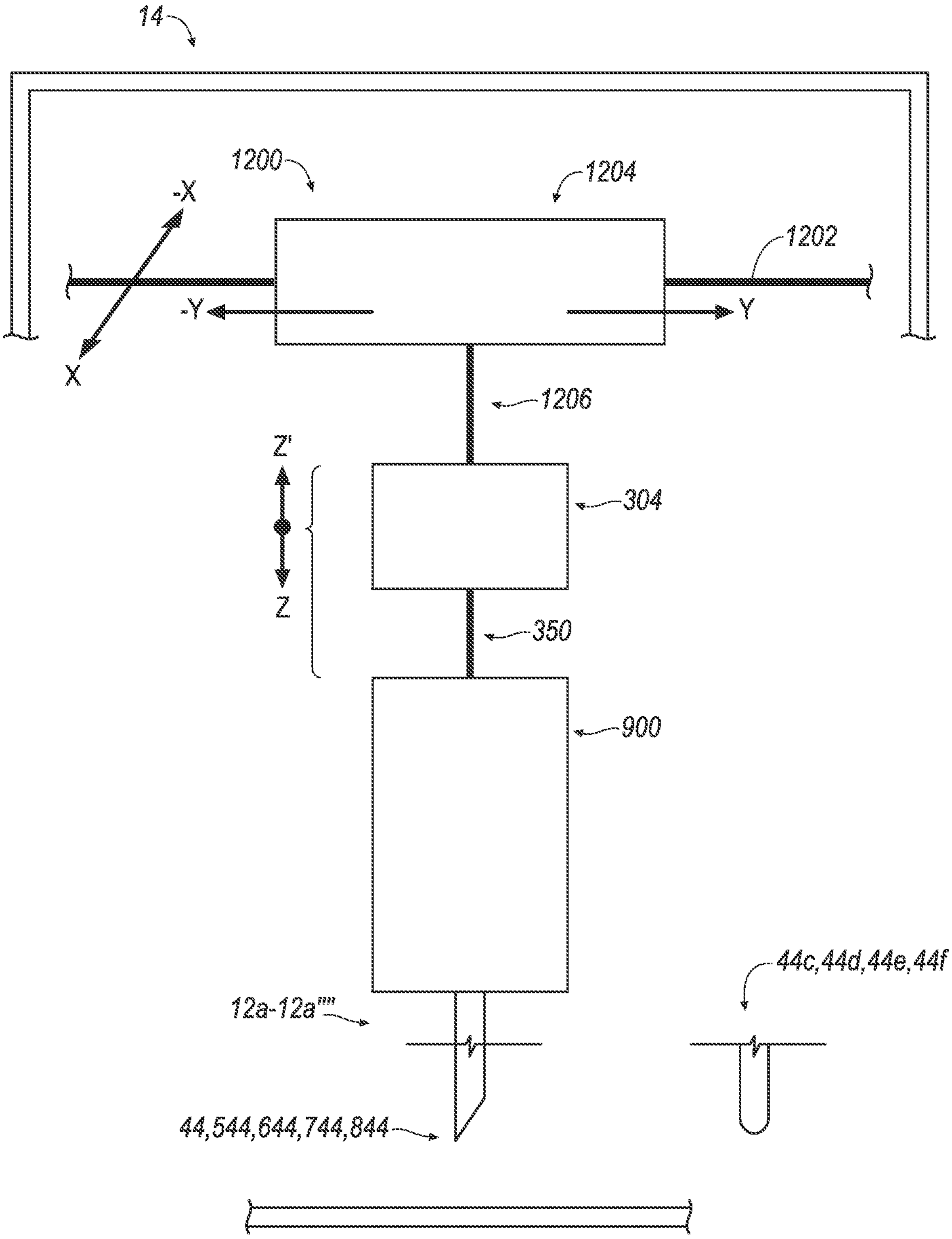
FIG. 55 is a side view of a shuttle system of a crafting apparatus in accordance with an exemplary embodiment of the invention.

Once the foodstuff workpiece, W, has been disposed upon the front surface 1102 of the mat 1136, the user places the foodstuff workpiece mat 1136 within the foodstuff crafting apparatus 10 so that the foodstuff crafting apparatus 10 can conduct the work upon the foodstuff workpiece, W. However, prior to conducting the work upon the foodstuff workpiece, W, a preliminary treatment of the distal end 44, 544, 644, 744, 844 of the blade 12*a*-12*a*"" may be conducted. Treatment of the distal end 44, 544, 644, 744, 844 of the blade 12*a*-12*a*"" may result in the distal end 44, 544, 644, 744, 844 of the blade 12*a*-12*a*"" being moved to a location within the body 14 by way of, for example, a shuttle system 1200 (see, e.g., FIG. 55).

The shuttle system 1200 may include a rail 1202 that supports a taxi 1204. The rail 1202 may be arranged in the body 14 in a fixed orientation, or, alternatively, the rail 1202 may be movably-disposed within the body 14 for movement in an X direction/−X direction. The taxi 1204 may be arranged upon the rail 1202 for movement in a Y direction/−Y direction.

The shuttle system 1200 may further include, for example, a plunging bracket; in an implementation, the plunging bracket may include, for example, the vertically adjustable plunging bracket 304 that is shown, for example, in FIGS. 19-21B). The vertically adjustable plunging bracket 304 may be connected to the taxi 1204 by a linkage 1206.

The vertically-adjustable plunging bracket 304 is connected to blade carrier housing 900. In an implementation, the carrier 350 (see, e.g., FIGS. 19-21B) may couple the blade carrier housing 900 to the vertically-adjustable plunging bracket 304. One or more of the vertically-adjustable plunging bracket 304 and carrier 350 may permit movement of the blade carrier housing 900 in a Z direction/−Z direction relative to the taxi 1204. Accordingly, the shutting system 1200 may ultimately result in one or more of an "X/Y/Z" movement of the distal end 44, 544, 644, 744, 844 of the blade 12*a*-12*a*"" in order to, for example, perform the preliminary treatment of the distal end 44, 544, 644, 744, 844 of the blade 12*a*-12*a*"".

Although a preliminary treatment of the distal end 44, 544, 644, 744, 844 of the blade 12*a*-12*a*"" is discussed above, the preliminary treatment is not limited to the distal end 44, 544, 644, 744, 844 of the blade 12*a*-12*a*"". For example, the shuttle system 1200 may be operated so as to conduct a preliminary treatment on any one of the distal ends 44*c*, 44*d*, 44*e*, 44*f* of the shaping heads 20*c*, 20*d*, 20*e*, 20*f*.

Figure 56C:
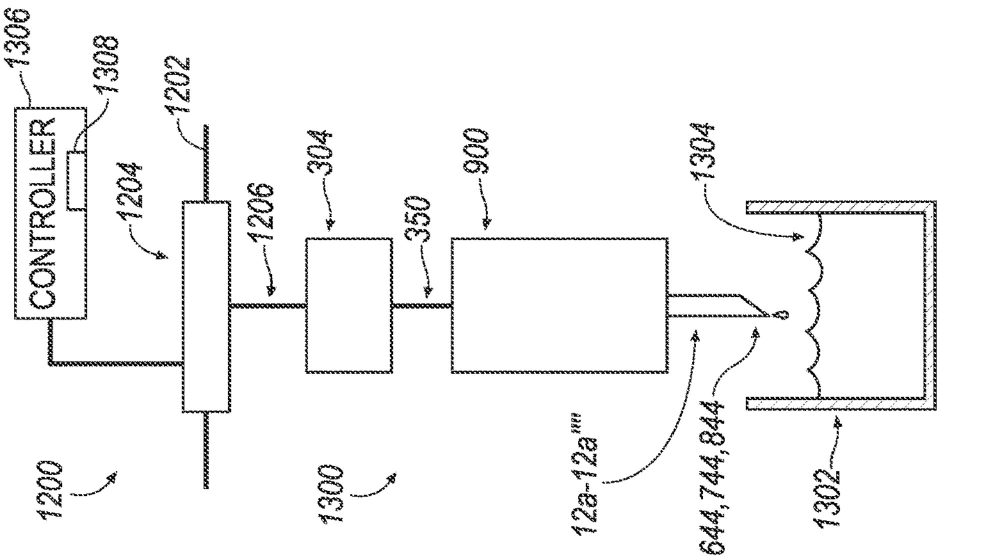
FIGS. 56A-56C illustrate side views of a preliminary treatment system of the crafting apparatus in accordance with an exemplary embodiment of the invention.
Figure 56B:
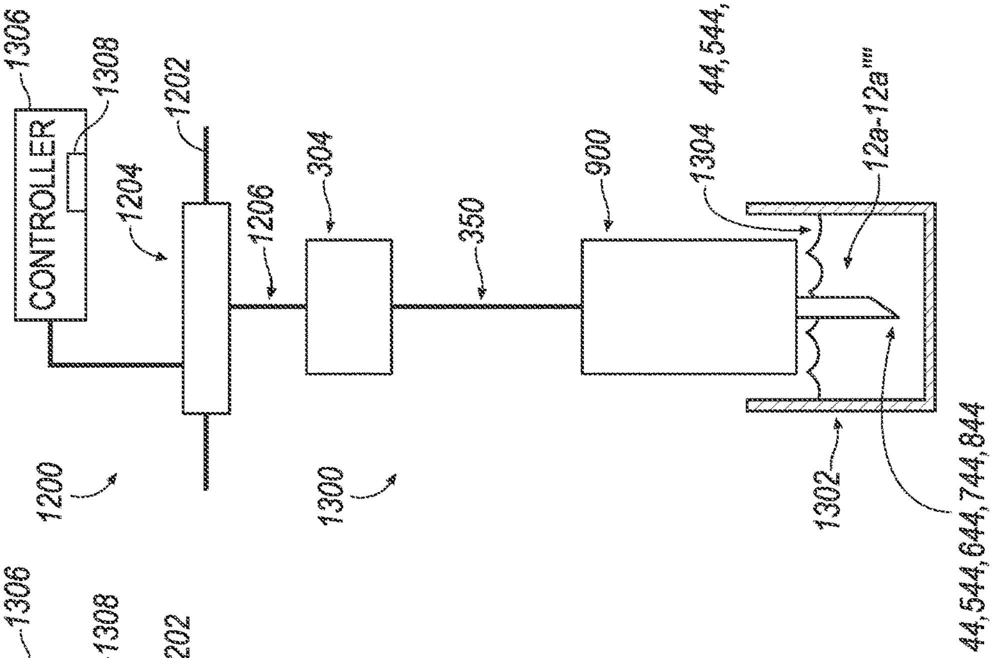
Figure 56A:
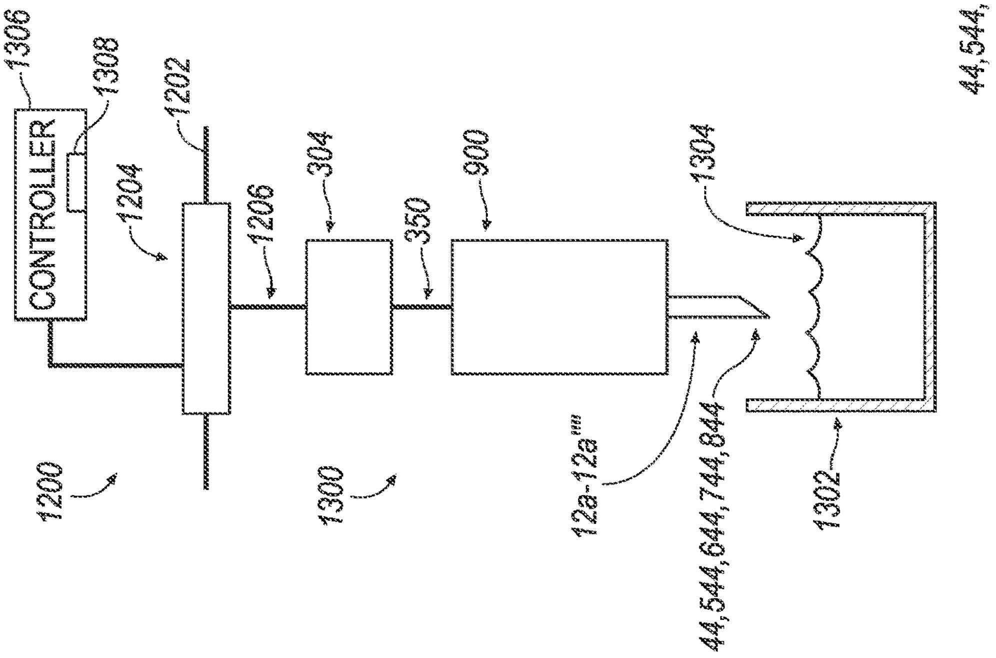
Figure 56D:
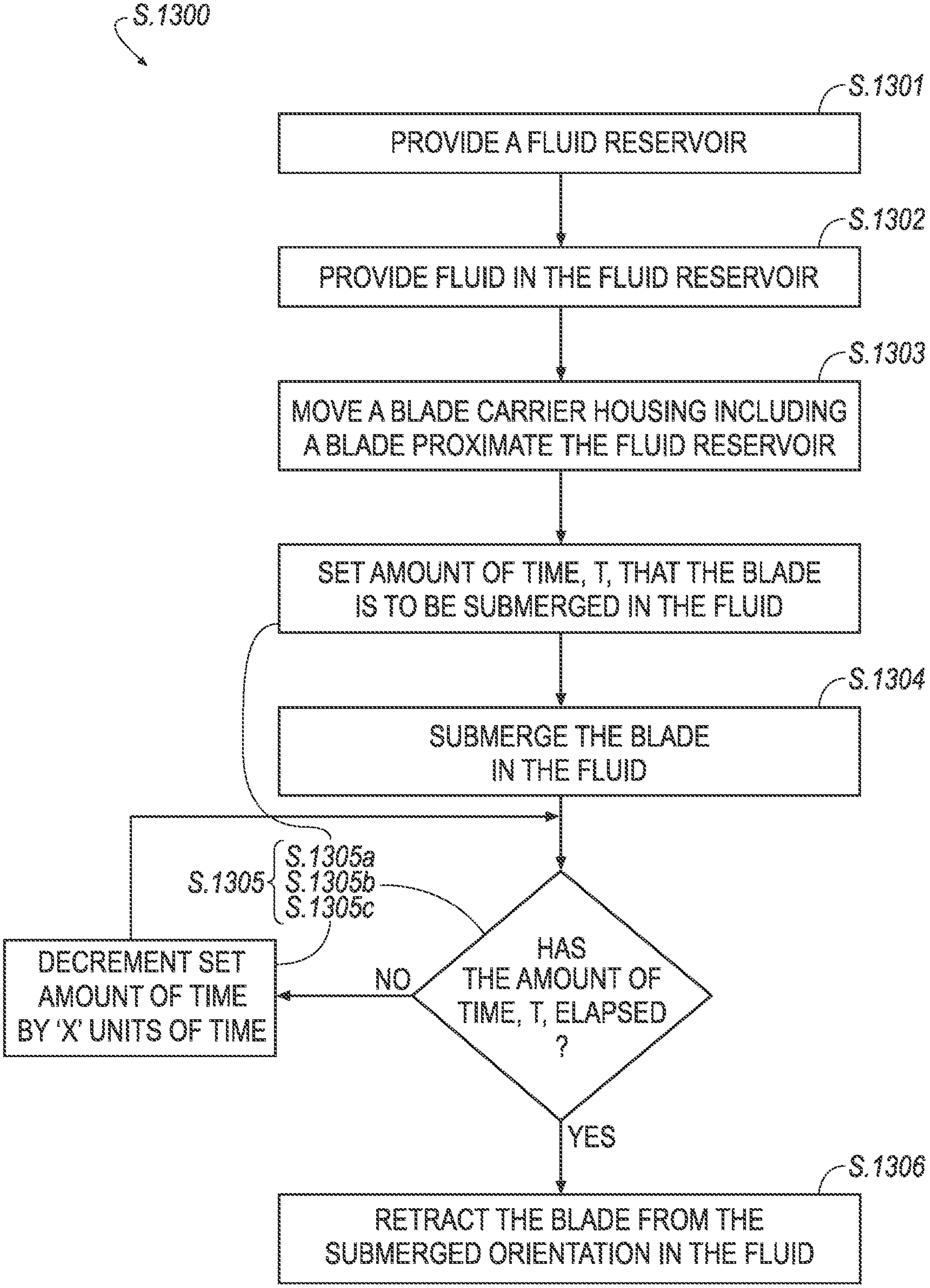
FIG. 56D illustrates a method for utilizing the preliminary treatment system of FIGS. 56A-56C in accordance with an exemplary embodiment of the invention.

Referring to FIGS. 56A-56C, a preliminary treatment system 1300 of the distal end 44, 544, 644, 744, 844 of the blade 12*a*-12*a*"" is shown according to an embodiment. The preliminary treatment system 1300 includes a reservoir 1302 (see, e.g., step S.1301 in FIG. 56D of method S.1300) and fluid 1304 in the reservoir 1302 (see, e.g., step S.1302 in FIG. 56D).

As seen in FIG. 56A, the shuttle system 1200 is utilized to move (see, e.g., step S.1303 in FIG. 56D) the blade carrier housing 900 proximate the reservoir 1302 that retains the fluid 1304. As seen in FIG. 56B, the shuttle system 1200 submerges/plunges (see, e.g., step S.1304 in FIG. 56D) the distal end 44, 544, 644, 744, 844 of the blade 12*a*-12*a*"" into the fluid 1304.

The preliminary treatment system 1300 may further include a controller 1306 having, for example, timer circuitry 1308 for controlling (see, e.g., step S.1305 in FIG. 56D) an amount of time that the blade 12*a*-12*a*"" is to be submerged in the fluid 1304. The controlling step, S.1305, may include, for example, setting (see, e.g., steps S.1305*a* in FIG. 56D) an end time, n, for a timer such that the blade 12*a*-12*a*"" may be submerged for an amount of time, T=n. The setting step S.1305*a* may occur prior to the plunging step S.1304.

The controlling step, S.1305, may further include the step of determining (see, e.g., steps S.1305*b* in FIG. 56D) if the set amount of time, T, has elapsed (e.g., T=0?). If it is determined that the set amount of time has not elapsed (i.e., T≠0), the method S.1300 is advanced to step S.1305*c* of the controlling step S.1305 where the set amount of time is decremented by an amount of time, x (e.g., T=n−x). After the decrementing step, S.1305*c*, the controlling steps, S.1305 may be looped back to step S.1305*b*.

Upon determining (see, e.g., step S.1305*b* in FIG. 56D) that the set amount of time, T, has elapsed, the method S.1300 exits the controlling step loop (i.e., steps S.1305*b*, S.1305*c*) and is advanced to step, S.1306. As seen in FIG. 56C, step S.1306 includes the step of utilizing the shuttle system 1200 to retract the distal end 44, 544, 644, 744, 844 of the blade 12*a*-12*a*"" from being submerged in the fluid 1304, which concludes the methodology 1300 in order to subsequently conduct the work upon the foodstuff workpiece, W.

Functionally, the fluid 1304 acts as a wetting or lubricating agent and may include, for example, water, oil or the like. Once the distal end 44, 544, 644, 744, 844 of the blade 12*a*-12*a*"" is plunged into the fluid 1304, the fluid 1304 may wet and/or lubricate the distal end 44, 544, 644, 744, 844 of the blade 12*a*-12*a*"" such that the distal end 44, 544, 644, 744, 844 of the blade 12*a*-12*a*"" may cut into the foodstuff workpiece, W, with, for example, less resistance and/or impart an improved cut line into the foodstuff workpiece, W, without shearing and/or tearing the foodstuff workpiece, W, apart.

Although the methodology S.1300 has been described to include one cycle of wetting/lubricating the blade 12*a*-12*a*"", the methodology S.1300 may be conducted more than one time if, for example, the foodstuff workpiece, W, is worked upon for a period of time that may result in the loss of the wetting/lubricating agent that coated the blade 12*a*-

12a''''. For example, the controller 1306 may cause the blade 12a-12a'''' to be wetted/lubricated periodically (e.g., every "x" seconds), or, after the blade 12a-12a'''' contacts the foodstuff workpiece, W, for a period of time (e.g., the blade 12a-12a'''' contacts the foodstuff workpiece, W, for "x" seconds).

Referring to FIGS. 57A-57D, a methodology S.1400 and preliminary treatment system 1400 of the distal end 44, 544, 644, 744, 844 of the blade 12a-12a'''' is shown according to an embodiment. The methodology S.1400 and preliminary treatment system 1400 is substantially similar to the methodology S.1300 and preliminary treatment system 1300 with the exception that the methodology S.1400 and preliminary treatment system 1400 further includes a fluid heating device 1410 (see, e.g., step S.1403 in FIG. 57D) that is attached to/positioned proximate the reservoir 1402 for the purpose of increasing the temperature (see, e.g., step S.1405) of the fluid 1404.

The fluid heating device 1410 may include any desirable feature that emits heat; in an implementation, the fluid heating device 1410 may include an electrical circuit 1412 having a heating coil 1414 that becomes hot upon flowing current though the electrical circuit 1412. The heating coil 1414 may be located proximate or substantially adjacent the reservoir 1402 in order to pass heat from the heating coil 1414 to the fluid 1404 contained in the reservoir 1402.

Figure 57C:
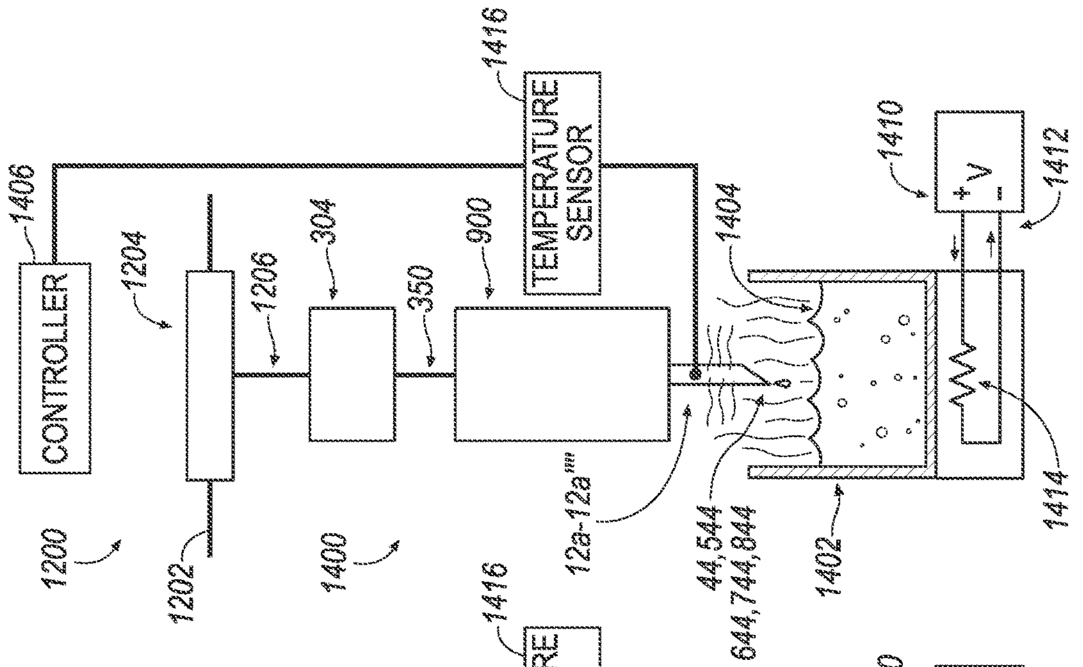
FIGS. 57A-57C illustrate side views of a preliminary treatment system of the crafting apparatus in accordance with an exemplary embodiment of the invention.
Figure 57B:
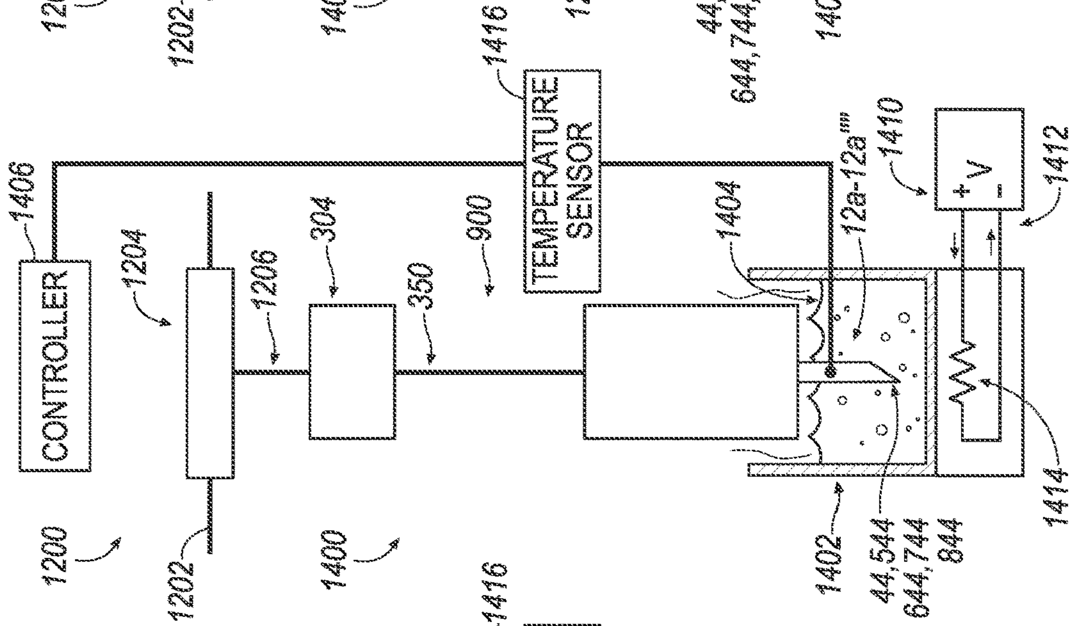
Figure 57A:
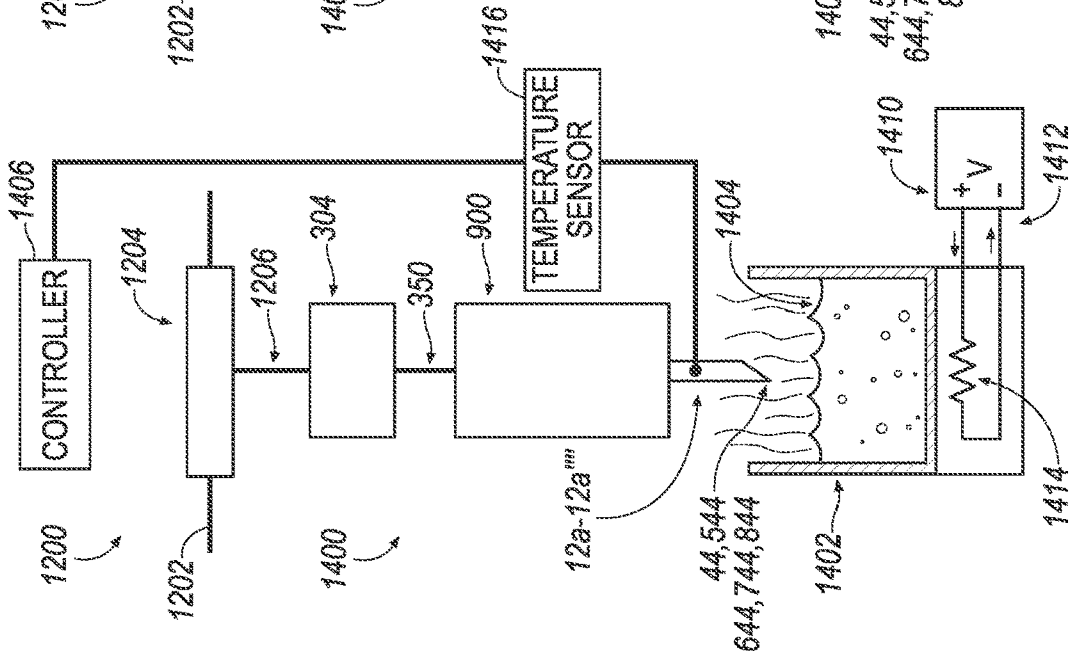
Figure 57D:
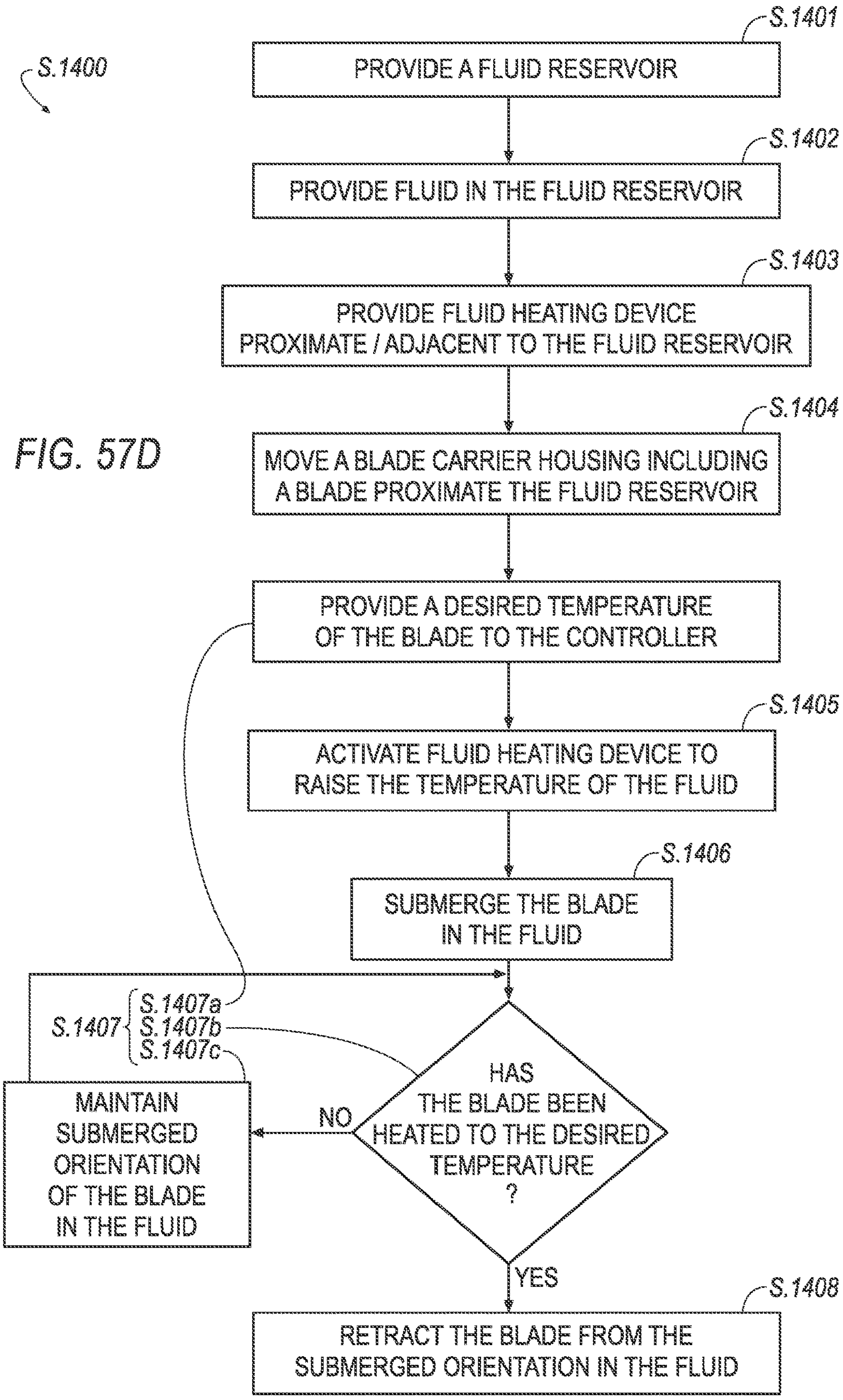
FIG. 57D illustrates a method for utilizing the preliminary treatment system of FIGS. 57A-57C in accordance with an exemplary embodiment of the invention.

As a result of the fluid 1404 being heated upon activation of the fluid heating device 1410, the distal end 44, 544, 644, 744, 844 of the blade 12a-12a'''' may also be heated upon contacting the blade 12a-12a'''' with the fluid 1404 as seen in FIG. 57B. As a result of heating the distal end 44, 544, 644, 744, 844 of the blade 12a-12a'''', a physical state of the foodstuff workpiece, W, may be modified (e.g., changed from a substantially solid state to at least a partially liquefied state, by, for example, melting/softening the foodstuff workpiece, W) upon interfacing the distal end 44, 544, 644, 744, 844 of the blade 12a-12a'''' with the foodstuff workpiece, W. By modifying the physical state of the foodstuff workpiece, W, the heated blade 12a-12a'''' may thereby improve the cutting capability through the foodstuff workpiece, W, while also mitigating the likelihood of the foodstuff workpiece, W, being uncontrollably sheared, ripped, distorted or the like during a cutting procedure. Additionally, the fluid 1404 may also wet and/or lubricate the distal end 44, 544, 644, 744, 844 of the blade 12a-12a'''' and yield similar benefits as described above.

Further, rather than including controlling steps S.1305 as described in the methodology S.1300 for submerging the blade 12a-12a'''' in the fluid 1304 for a period of time, the methodology S.1400 may include temperature controlling steps S.1407 for selectively determining/controlling the temperature of the blade 12a-12a''''. Accordingly, in an implementation, the preliminary treatment system 1400 may further include a blade temperature sensor 1416 that communicates temperature of the blade 12a-12a''' to the controller 1406.

Because of the inclusion of the temperature sensor 1416, in an implementation, the temperature controlling steps S.1407 may include the step of providing (see, e.g., step S.1407a in FIG. 57D) a desired temperature of the blade 12a-12a'''' to the controller 1406. The desired temperature of the blade 12a-12a'''' may be provided to the controller 1406 on the basis of any number of situations or circumstances, such as, for example: (1) direct entry of the desired temperature to the controller 1406 as a result of a user entering/keying-in a specific temperature, (2) automatic entry of a predetermined, factory-setting temperature upon, for example, powering-on/turning on the foodstuff crafting apparatus 10, or (3) indirect entry of a factory-setting temperature to the controller 1406 from a look-up table (see, e.g., FIG. 57E) as a result of a user entering a variable, such as, for example, a type of foodstuff workpiece, W, being crafted/worked on.

As seen in FIG. 57E, in the third situation described above, the user may provide to the controller 1406 an indication of a type of foodstuff material, W, that the foodstuff crafting apparatus 10 is going to conduct work on, and, in view of the entry of the foodstuff workpiece, W, the controller 1406 may utilize the look-up table that may be, for example, programmed in the controller 1406, for locating a particular blade temperature 12a-12a'''' that corresponds to the entered foodstuff material, W. Accordingly, in the event that the foodstuff crafting apparatus 10 may include a look-up table, the foodstuff crafting apparatus 10 may be said to include a "smart controller" (i.e., the controller 1406) such that if the foodstuff crafting apparatus 10 is going to conduct work on "foodstuff material X" based upon a user entry/input, then the foodstuff crafting apparatus 10 will know that the blade 12a-12a'''' should be heated to a corresponding temperature of for example, "x1°".

Although a "smart controller" has been described to set temperature of the blade 12a-12a'''' in response to a user entry/input of foodstuff material, X, the functionality of the smart controller (by way of, e.g., a look-up table) is not limited to setting blade temperature. For example, the controller 1306 may also include the functionality of a "smart controller" (by way of e.g., a look-up table) in that the foodstuff crafting apparatus 10 will have intelligence in order to know when the blade 12a-12a'''' may have to be re-submerged in the fluid 1304 on a repetitive base. In an example, the blade 12a-12a'''' may be re-submerged on a "periodic basis" (e.g., after "x1" seconds of time that the blade 12a-12a'''' is in contact with/cutting a user-entered foodstuff workpiece, W). In another example, the blade 12a-12a'''' may be re-submerged on a "distance basis" (e.g., after cutting the user-entered workpiece, W, "x1 inches").

Although a "smart controller" has been described to set temperature of the blade 12a-12a'''' and/or re-submerge the blade 12a-12a'''' in fluid 1304 in response to a user entry/input of foodstuff material, X, the functionality of the smart controller is not limited to setting blade temperature or re-submerging the blade 12a-12a'''' in fluid 1304. For example, the controller 1306, 1406 may also include the functionality of a "smart controller" (by way of e.g., a look-up table) in that the foodstuff crafting apparatus 10 will have intelligence in order to set a blade cutting speed (e.g., the blade 12a-12a'''' may be moved "x1 inches/second" during a cutting procedure responsive to user entry of a particle foodstuff workpiece, W, being crafted/worked upon). In another example, the controller 1306, 1406 may also include the functionality of a "smart controller" (by way of, e.g., a look-up table) in that the foodstuff crafting apparatus 10 will have intelligence in order to select a particle blade geometry/style (e.g., any of the blades 12a-12'''' described above) responsive to user entry of a particle foodstuff workpiece, W, being crafted/worked upon.

Referring back to FIG. 57D, once the desired temperature is provided to the controller 1406 at step S.1407a, the temperature controlling steps S.1407 may include the steps of determining (see, e.g., step S.1407b in FIG. 57D) if the blade 12a-12a'''' has been heated to the desired temperature. If the blade 12a-12a'''' has not been heated to the desired temperature, the blade 12a'''' remains submerged/plunged (see, e.g., step S.1407c in FIG. 57D) within the fluid 1404 and is further looped to step S.1407*b*. However, once the blade 12*a*-12*a*"" has been heated to the desired temperature, the methodology S.1400 is advanced from step S.1407*b* to step S.1408 where the blade 12*a*-12*a*"" is retracted from the submerged orientation in the fluid 1404 in order to subsequently conduct the work upon the foodstuff workpiece, W.

Figures 58A, 58B, 58C, 58D, 58E, 58F:
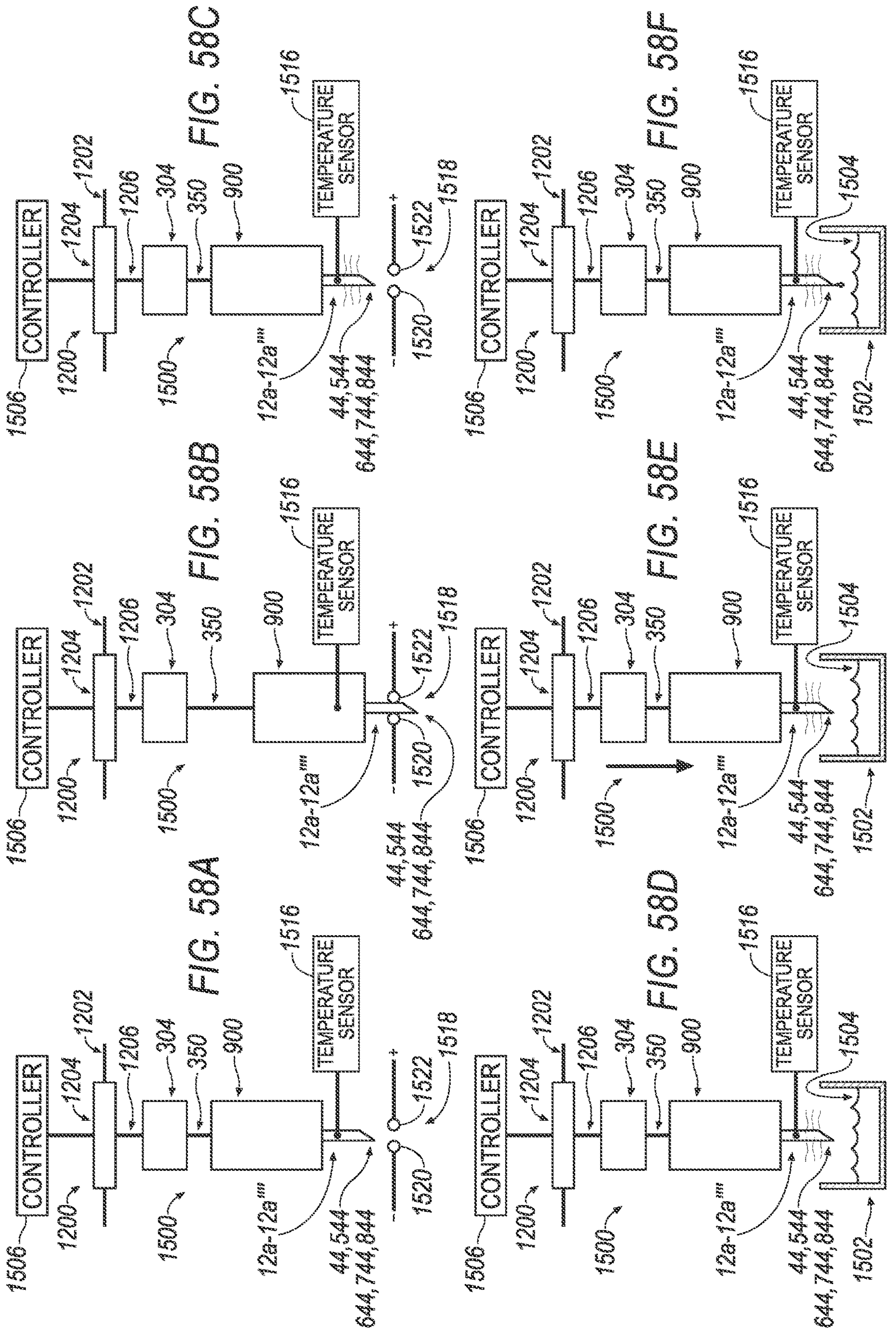
FIGS. 58A-58F illustrate side views of a preliminary treatment system of the crafting apparatus in accordance with an exemplary embodiment of the invention.
Figure 58G:
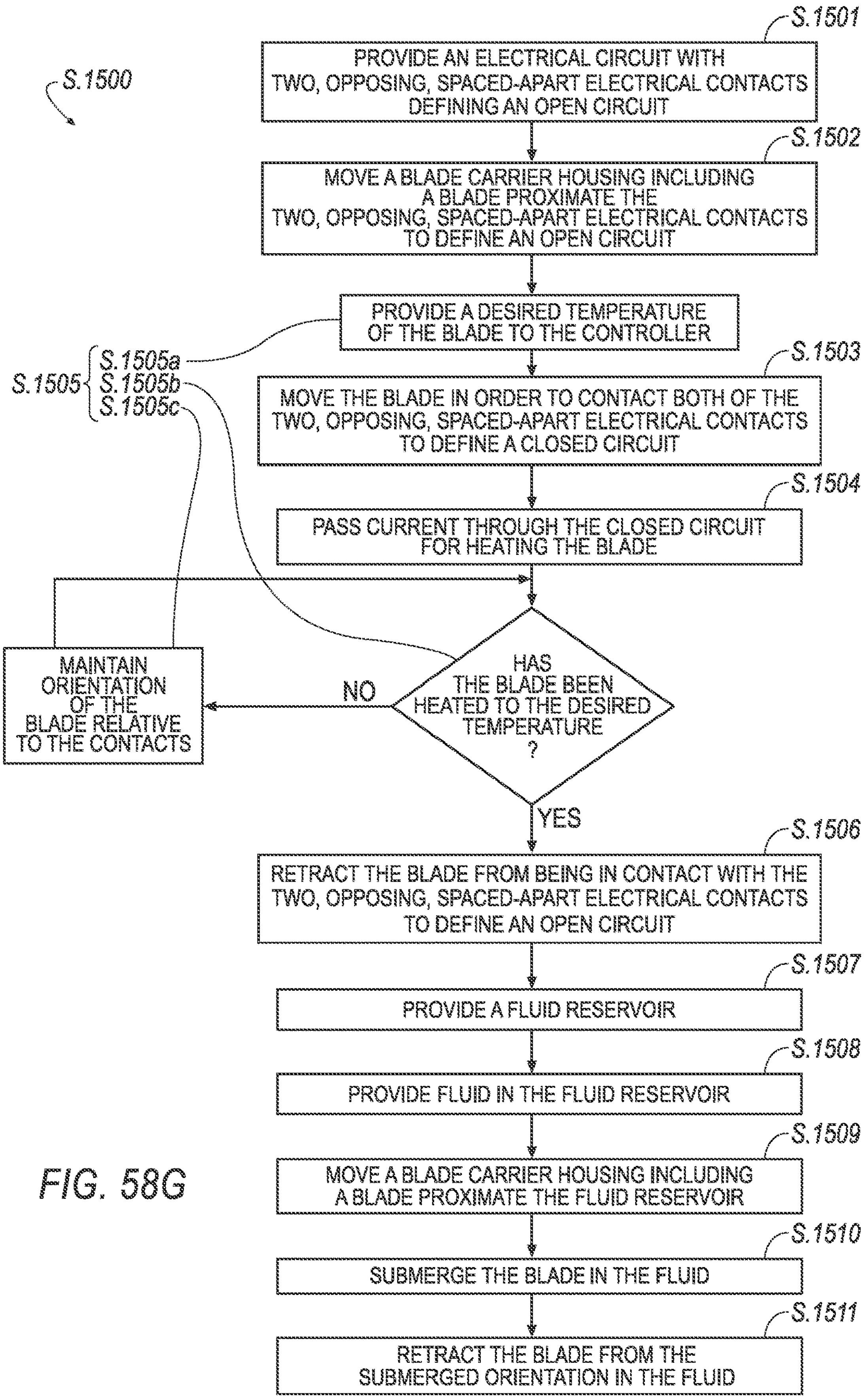
FIG. 58G illustrates a method for utilizing the preliminary treatment system of FIGS. 58A-58F in accordance with an exemplary embodiment of the invention.

Referring to FIGS. 58A-58C, rather than submerging the distal end 44, 544, 644, 744, 844 of the blade 12*a*-12*a*"" within a heated fluid 1404 as described above, the distal end 44, 544, 644, 744, 844 of the blade 12*a*-12*a*"" may be heated in an alternative fashion that does not include heated fluid 1404. For example, as seen in FIGS. 58A-58C and 58G, a methodology S.1500 and a preliminary treatment system 1500 includes an electrical circuit 1518 (see, e.g., step S.1501 in FIG. 58G) having two, opposing, spaced-apart electrical contacts 1520, 1522.

As seen in FIG. 58A, the distal end 44, 544, 644, 744, 844 of the blade 12*a*-12*a*"" is moved proximate (see, e.g., step S.1502 in FIG. 58G) the electrical circuit 1518 in a retracted, but spaced-away orientation relative to the spaced-apart contacts 1520, 1522 of the electrical circuit 1518, and, as a result, the electrical circuit 1518 may be said to be in an open circuit configuration. Subsequently, the shuttle system 1200 may plunge (see, e.g., step S.1503 in FIG. 58G) the blade 12*a*-12*a*"" toward the spaced apart contacts 1520, 1522 such that at least the distal end 44, 544, 644, 744, 844 of the blade 12*a*-12*a*"" may positively engage both of the spaced-apart contacts 1520, 1522 as shown in FIG. 58B. As a result of at least the distal end 44, 544, 644, 744, 844 of the blade 12*a*-12*a*"" being in contact with the electrical circuit 1518, the electrical circuit 1518 may be said to be in a closed circuit configuration; current is then permitted to flow (see, e.g., step S.1504 in FIG. 58G) through the distal end 44, 544, 644, 744, 844 of the blade 12*a*-12*a*"" and thereby electrically heat the distal end 44, 544, 644, 744, 844 of the blade 12*a*-12*a*"".

As similarly described above, the methodology S.1500 may include temperature controlling steps, which are shown at S.1505 and includes steps S.1505*a*, S.1505*b*, S.1505*c*. The distal end 44, 544, 644, 744, 844 of the blade 12*a*-12*a*"" may then be retracted away (see, e.g., step S.1506 in FIG. 58G) from the electrical circuit 1506 to define an open circuit, and, shortly before, after or simultaneously with the retracting of the blade 12*a*-12*a*"", the current flow may cease. The blade 12*a*-12*a*"" may then be moved away from the electrical circuit 1518 and be said to be adequately heated for conducting the work upon the foodstuff workpiece, W.

Referring to FIGS. 58D-58F, the preliminary treatment system 1500 may yet even further treat the distal end 44, 544, 644, 744, 844 of the blade 12*a*-12*a*"". In a substantially similar manner as described above in FIGS. 56A-56C, the distal end 44, 544, 644, 744, 844 of the blade 12*a*-12*a*"" may be submerged/plunged (see, e.g., steps S.1507-S.1510 in FIG. 58G) into a fluid 1504 contained within a reservoir 1502 for wetting and/or lubricating the distal end 44, 544, 644, 744, 844 of the blade 12*a*-12*a*"". In an embodiment, the distal end 44, 544, 644, 744, 844 of the blade 12*a*-12*a*"" may be quickly plunged (see, e.g., step S.1510 in FIG. 58G) into and retracted from (see, e.g., step S.1511 in FIG. 58G) the fluid 1504 so as to refrain from cooling the distal end 44, 544, 644, 744, 844 of the blade 12*a*-12*a*"" after being heated by the electrical circuit 1518 as shown and described at FIGS. 58A-58C. In addition to what is described above regarding the methodology S.1500 and preliminary treatment system 1500, the controller 1506 may also function as a "smart controller" as similarly described above with respect to the controllers 1306, 1406.

Figure 59A:
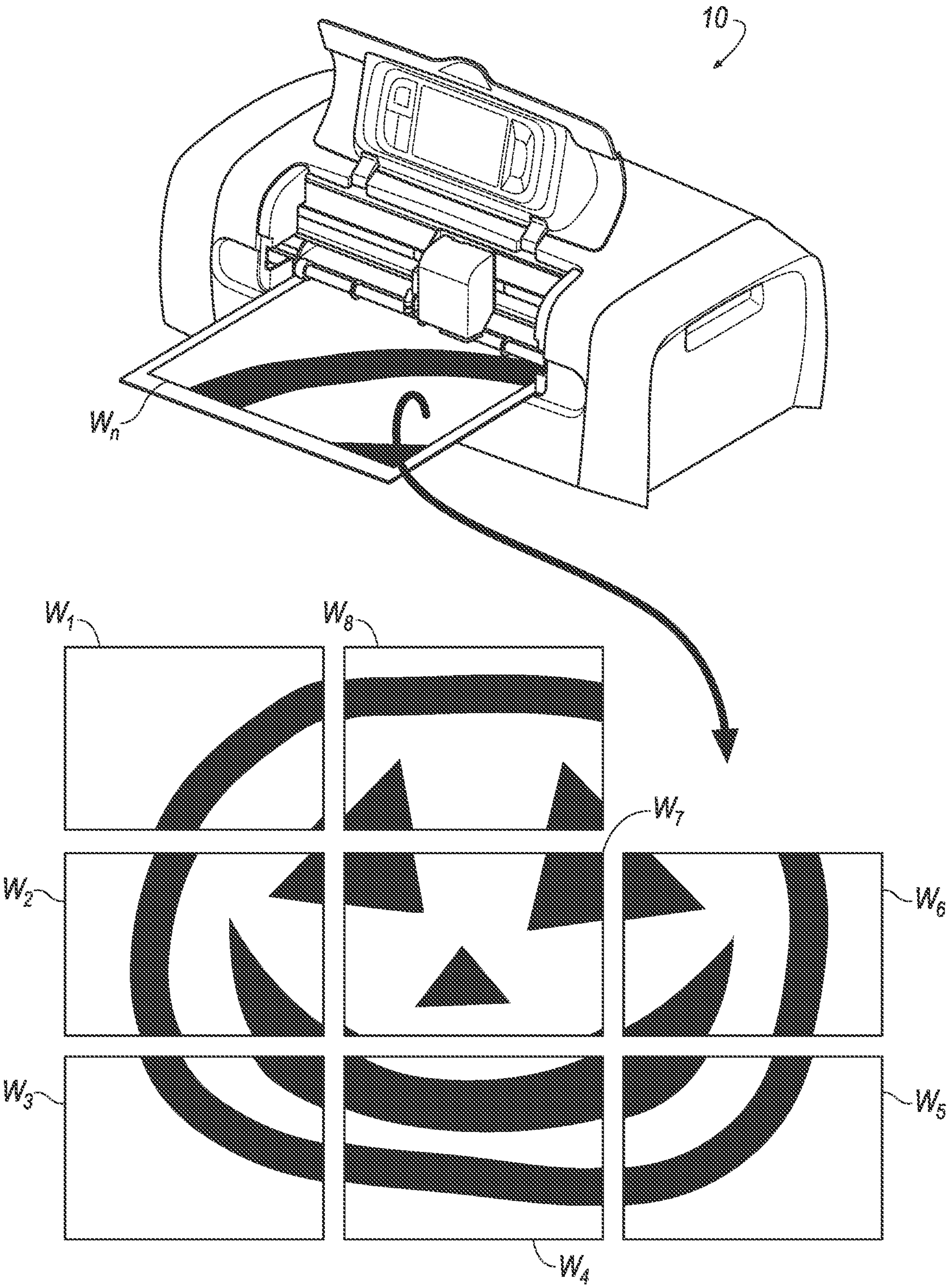
FIG. 59A illustrates a crafting apparatus and a plurality of individual foodstuff workpieces that, when arranged in a particular configuration, collectively forms a large image in accordance with an exemplary embodiment of the invention.

Referring to FIG. 59A, the foodstuff crafting apparatus 10 and foodstuff workpieces, $W_1$-$W_n$, are shown according to an embodiment. Foodstuff workpieces, $W_1$-$W_8$, have been previously worked-on by the foodstuff crafting apparatus 10 and are shown away from but proximate the foodstuff crafting apparatus 10 whereas the foodstuff workpiece, $W_n$, is shown being partially ejected from the foodstuff crafting apparatus 10.

Figure 59B:
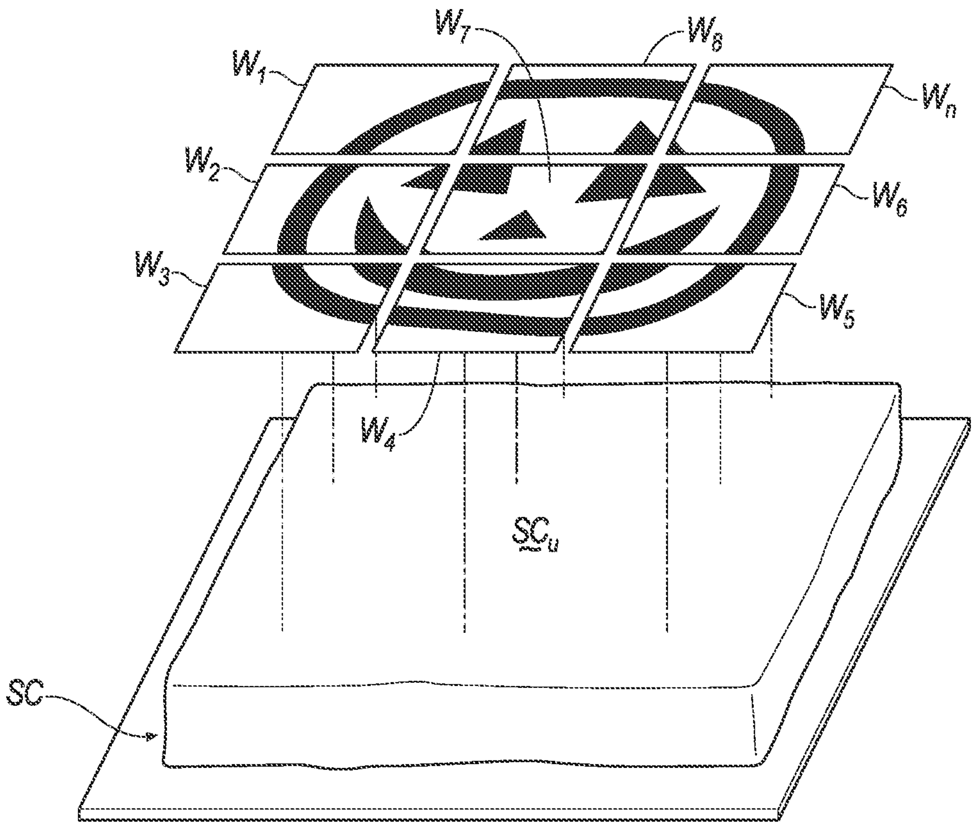
FIGS. 59B-59C illustrates a sheet cake and the plurality of individual foodstuff workpieces collectively forming the large image of FIG. 59A in accordance with an exemplary embodiment of the invention.
Figure 59C:
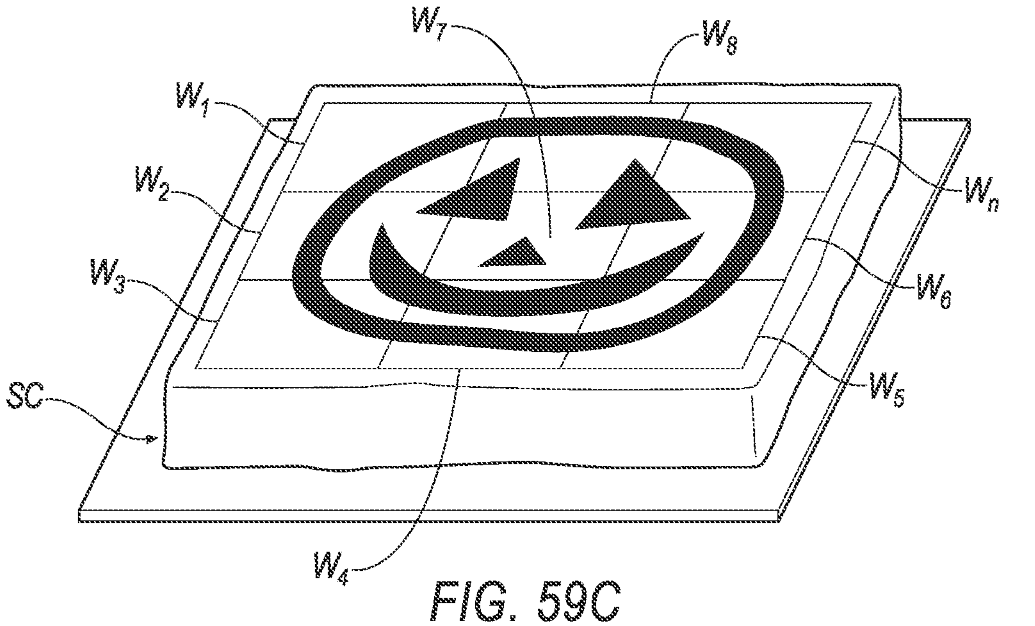

The crafting apparatus 10 may include logic or receive logic instructions from, for example, the memory cartridge 1056, in order to produce a plurality of individual foodstuff workpieces, $W_1$-$W_n$, that, when arranged in a particular configuration, collectively forms a larger image (e.g., a carved pumpkin or "jack-o-lantern" as seen in FIGS. 59B-59C). In order to collectively form the larger image, each of the foodstuff workpieces, $W_1$-$W_n$, may be worked upon (e.g., cut, embossed, printed with foodstuff ink, or the like) individually by the foodstuff crafting apparatus 10 and subsequently tiled-together by a user in predetermined configuration.

Accordingly, in an implementation, a user may wish to decorate a relatively large sheet cake, SC (see, e.g., FIGS. 59B-59C), with a top layer of fondant derived from the foodstuff workpiece, W; in some circumstances, a sheet cake, SC, may include a dimension that is significantly larger than that of a maximum dimension of a foodstuff workpiece, W, that may be worked upon by the foodstuff crafting apparatus 10. Accordingly, the user may instruct the foodstuff crafting apparatus 10 to invoke a program that will result in the foodstuff crafting apparatus 10 conducting work upon a plurality of individual foodstuff workpieces, $W_1$-$W_n$, that, when tiled together, may cooperate in a sufficient manner to cover substantially all of an upper surface, $SC_U$, of the sheet cake, SC. Thus, when the individual foodstuff workpieces, $W_1$-$W_n$, are arranged together, the collective dimension of the plurality of individual foodstuff workpieces, $W_1$-$W_n$, may correspond to the dimension of the upper surface, $SC_U$, of the sheet cake, SC.

Figure 59D:
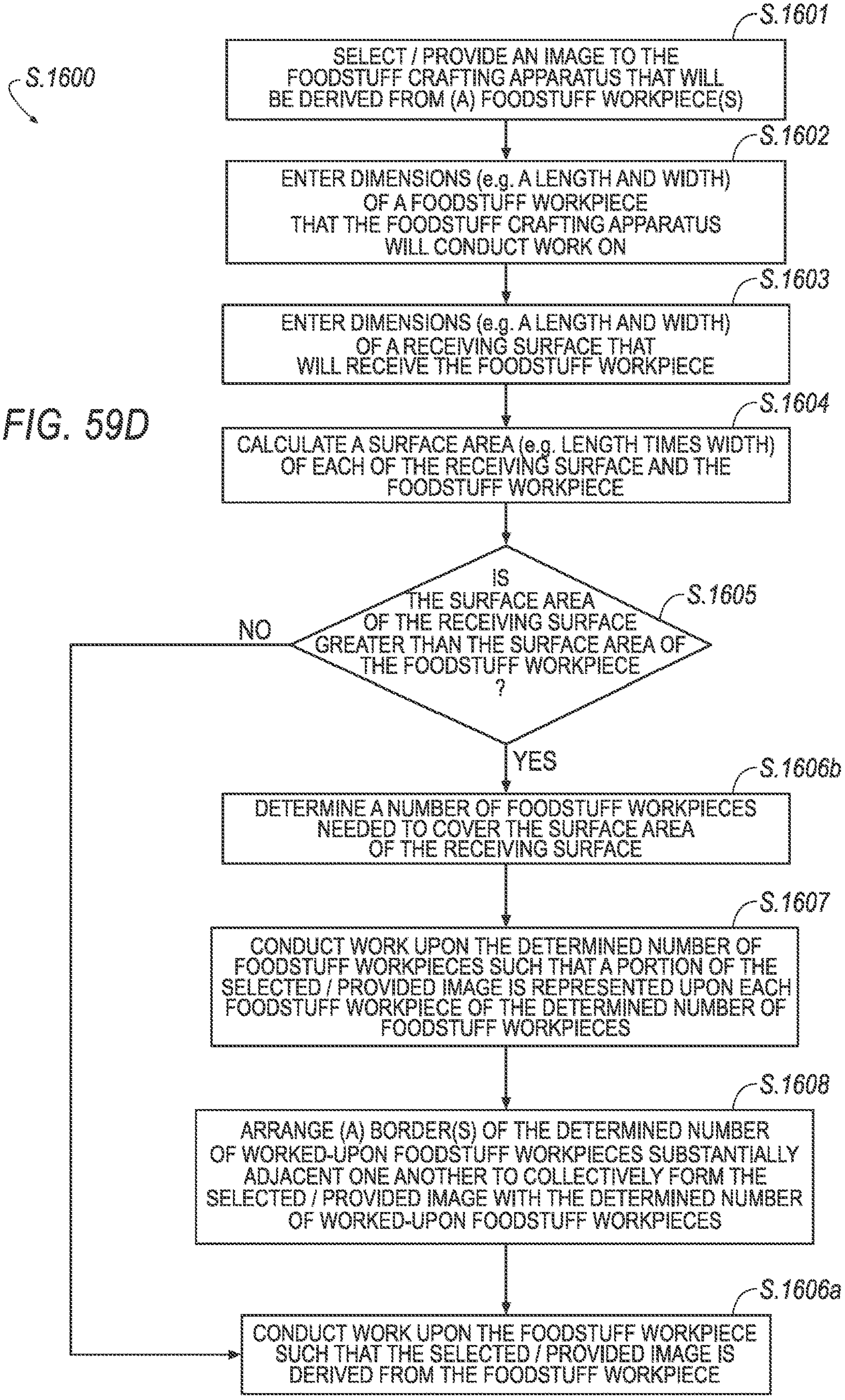
FIG. 59D illustrates a methodology associated with FIGS. 59A-59C.

Referring to FIG. 59D, a methodology S.1600 associated with an embodiment described in FIGS. 59A-59C is shown according to an embodiment. At step S.1601, a user may firstly select/provide an image to the foodstuff crafting apparatus 10 that will be derived from (a) foodstuff workpiece(s), $W_1$-$W_n$. Then, at step S.1602, the user will enter dimensions (e.g., a length and width) of a foodstuff workpiece, $W_1$-$W_n$, that the foodstuff crafting apparatus 10 will conduct work upon. At step S.1603, the user will enter dimensions (e.g. a length and width) of a receiving surface (e.g., the upper surface, $SC_U$) that will receive the entered dimension of a foodstuff workpiece, $W_1$-$W_n$.

At step S.1605, the foodstuff crafting apparatus 10 will determine if the surface area of the receiving surface, $SC_U$, is greater than the surface area of the dimension of the foodstuff workpiece, $W_1$-$W_n$. If the surface area of the receiving surface, SCu, is less than the surface area of the dimension of the foodstuff workpiece, $W_1$-$W_n$, the methodology S.1600 is advanced from step S.1605 to step S.1606*a* where the foodstuff crafting apparatus 10 conducts work upon the foodstuff workpiece, $W_1$-$W_n$, such that the selected/provided image is derived from the foodstuff workpiece, $W_1$-$W_n$. However, if the surface area of the receiving surface, $SC_U$, is greater than the surface area of the dimension of the foodstuff workpiece, $W_1$-$W_n$, the methodology is advanced from step S.1605 to step S.1606*b* where the foodstuff crafting apparatus 10 determines a number of foodstuff workpieces, $W_1$-$W_n$, needed to cover the surface area of the receiving surface, $SC_U$.

From step S.1606*b,* the methodology S.1600 is advanced to step S.1607 where the foodstuff crafting apparatus 10 conducts work upon the determined number of foodstuff workpieces such that unique portions of the selected/provided image is represented upon each foodstuff workpiece, $W_1$-$W_n$, of the determined number of foodstuff workpieces, $W_1$-$W_n$. At step S.1608, the user may arrange (a) border(s) of the determined number of worked-upon foodstuff workpieces, $W_1$-$W_n$, substantially adjacent one another to collectively form the selected/provided image with the determined number of worked-upon foodstuff workpieces, $W_1$-$W_n$, each having the unique portion of the selected/provided image.

Figure 60A:
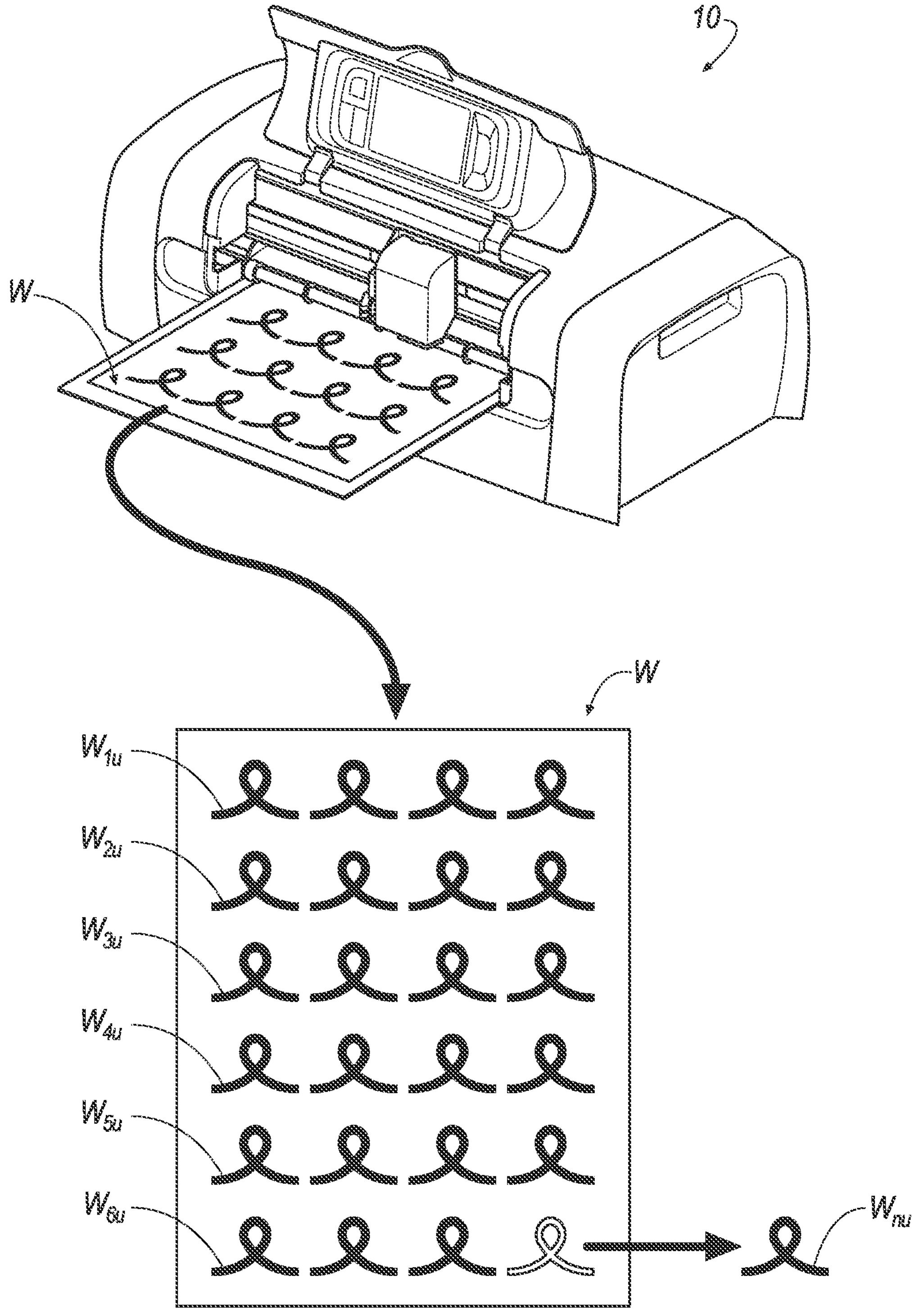
FIG. 60A illustrates a foodstuff crafting apparatus and a plurality of individual foodstuff units derived from the foodstuff workpiece in accordance with an exemplary embodiment of the invention.

Referring to FIG. 60A, the foodstuff crafting apparatus 10 and a foodstuff workpiece, W, are shown according to an embodiment. The foodstuff crafting apparatus 10 may include logic or receive logic instructions from, for example, the memory cartridge 1056, in order to conduct work (e.g., cut and/or print with foodstuff ink) a plurality of individual foodstuff units, $W_{1u}$-$W_{nu}$, that are derived from the foodstuff workpiece, W.

Figure 60B:
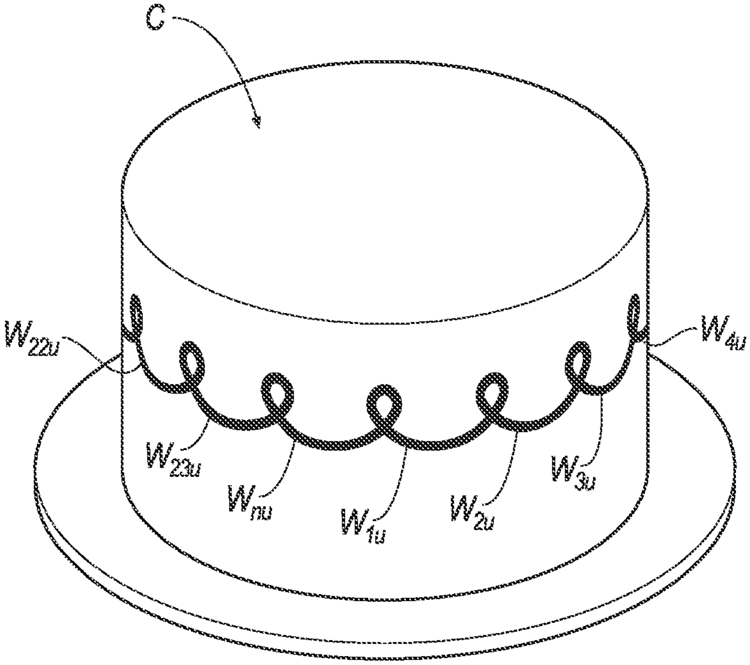
FIG. 60B illustrates a cake and the plurality of individual foodstuff units derived from the foodstuff workpiece of FIG. 60A in accordance with an exemplary embodiment of the invention.
Figure 60C:
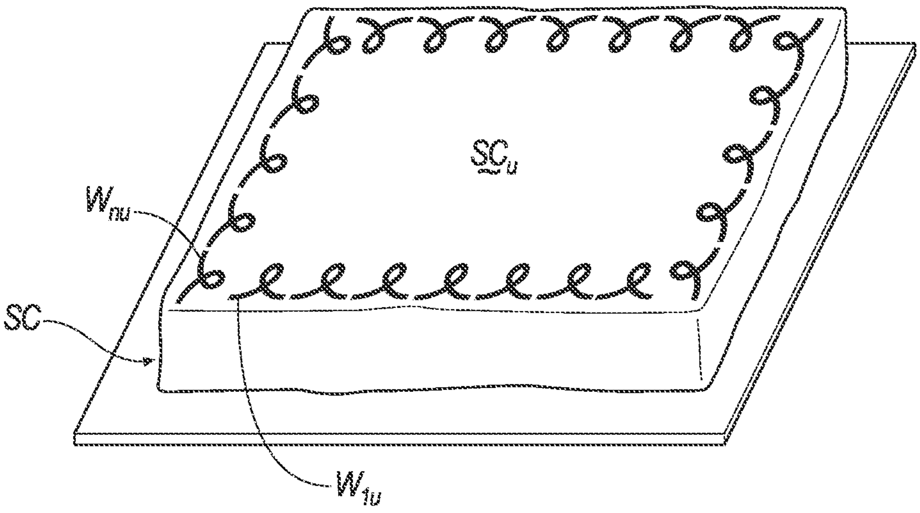
FIG. 60C illustrates a cake and the plurality of individual foodstuff units derived from the foodstuff workpiece of FIG. 60A in accordance with an exemplary embodiment of the invention.
Figure 60D:
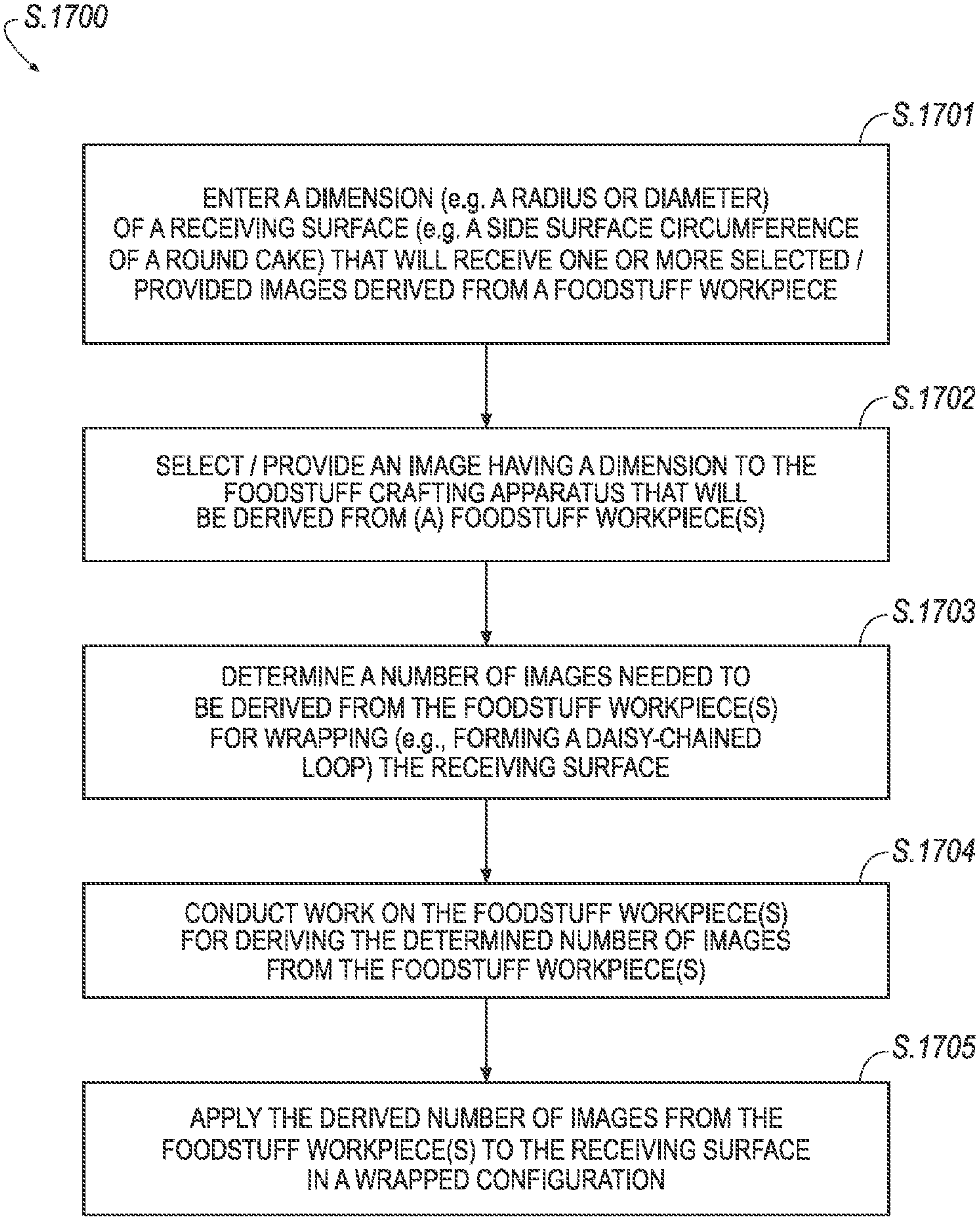
FIG. 60D illustrates a methodology associated with FIGS. 60A-60C.

Referring to FIGS. 60B-60D, the plurality of individual foodstuff units, $W_{1u}$-$W_{nu}$, may be disposed upon a cake, C (FIG. 60B), or upon a sheet cake, SC (FIG. 60C). In an implementation, the user may provide (see, e.g., step S.1701 of methodology S.1700 in FIG. 60D) the foodstuff crafting apparatus 10 with one or more dimensions (e.g., a diameter, radius, circumference, length, width, height or the like) of the cake, C, or the sheet cake, SC, and, subsequently, the user may provide (see, e.g., step S.1702 of methodology S.1700 in FIG. 60D) the foodstuff crafting apparatus 10 with a selection of at least one foodstuff unit (see, e.g., $W_{1u}$-$W_{nu}$) to be placed upon the cake, C, or sheet cake, SC.

As seen in FIG. 60B, in response to provided one or more dimension, the foodstuff crafting apparatus 10 will calculate (see, e.g., step S.1703 of methodology S.1700 in FIG. 60D) how many foodstuff units, $W_{1u}$-$W_{nu}$, may be needed to, for example, wrap an entire side surface of a round cake, C. Responsive to the calculation, foodstuff crafting apparatus 10 will conduct work (e.g., cut and/or print with food-grade ink) one or more individual foodstuff units, $W_{1u}$-$W_{nu}$, from the foodstuff workpiece, W (see, e.g., step S.1704 of methodology S.1700 in FIG. 60D). Referring to FIG. 60B, the calculated amount of the one or more foodstuff units, $W_{1u}$-$W_{nu}$, may be disposed upon (see, e.g., step S.1705 of methodology S.1700 in FIG. 60D) the side surface of the round cake, C, such that the one or more individual foodstuff units, $W_{1u}$-$W_{nu}$, is/are connected together (e.g., daisy-chained if more than one foodstuff unit, $W_{1u}$-$W_{nu}$, results from the calculation) in order to form, for example, an uninterrupted ring of decorative loops or "curly-cues" derived from the selected decorative loop or "curly-cue" design.

Alternatively, if desired, in response to a calculation for a substantially square or rectangular sheet cake, SC (see, e.g., FIG. 60C), the calculated amount of one or more foodstuff units, $W_{1u}$-$W_{nu}$, may be disposed upon an upper surface, $SC_U$ of the sheet cake, SC, in order to form a plurality in linear segments of decorative loops or "curly-cues." Although FIGS. 60A-60C illustrate a plurality of individual foodstuff units, $W_{1u}$-$W_{nu}$, defining individual decorative loops or "curly-cues," the foodstuff crafting apparatus 10 may conduct work upon the foodstuff workpiece, W, in order to form any desirable design for creating one or a plurality of individual foodstuff units, $W_{1u}$-$W_{nu}$, having any desirable design, dimension, characteristic or the like.

Figure 61A:
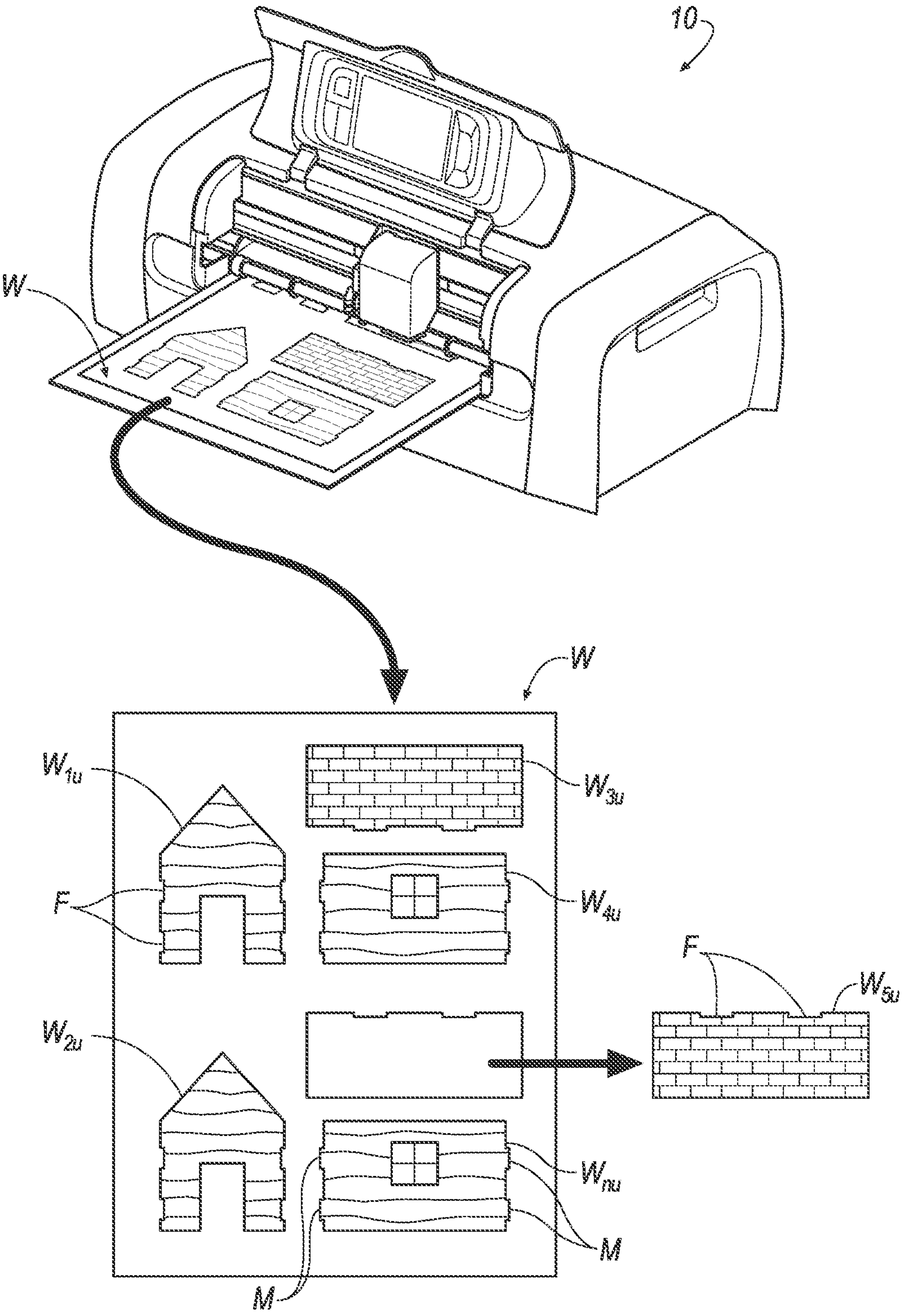
FIG. 61A illustrates a foodstuff crafting apparatus and a plurality of individual foodstuff units derived from the foodstuff workpiece in accordance with an exemplary embodiment of the invention.

Referring to FIG. 61A, the foodstuff crafting apparatus 10 and a foodstuff workpiece, W, are shown according to an embodiment. The crafting apparatus 10 may include logic or receive logic instructions from, for example, the memory cartridge 1056, in order to conduct work (e.g., cut and/or print with foodstuff ink) a plurality of individual foodstuff units, $W_{1u}$-$W_{nu}$, that are derived from the foodstuff workpiece, W.

Figure 61B:
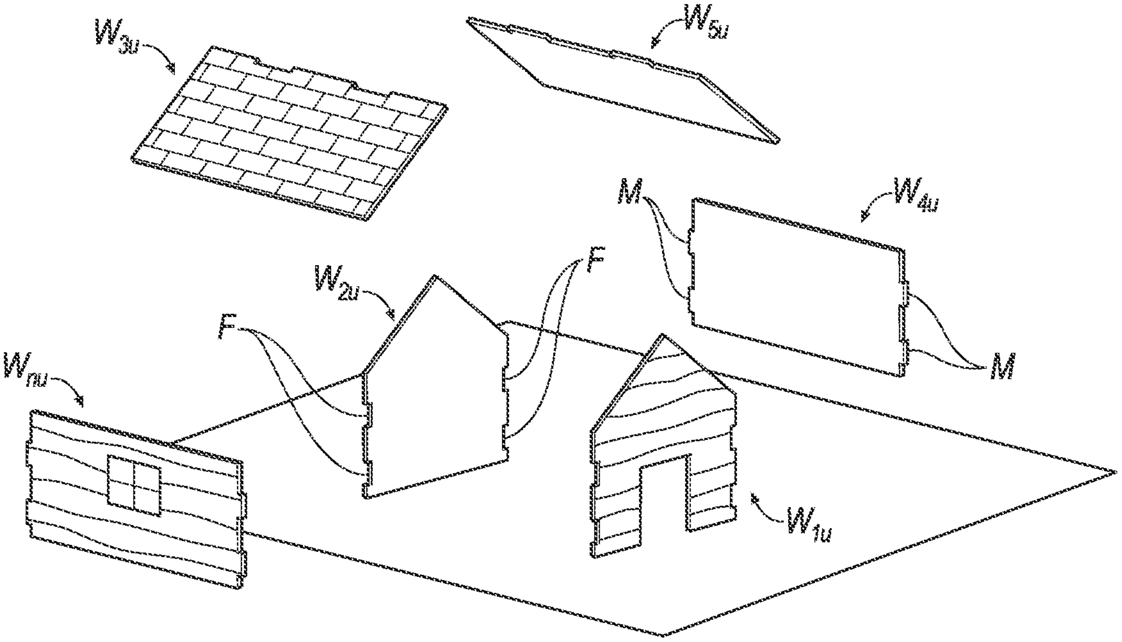
FIG. 61B illustrates the plurality of individual foodstuff units derived from the foodstuff workpiece of FIG. 61A spatially arranged relative to one another in accordance with an exemplary embodiment of the invention.
Figure 61C:
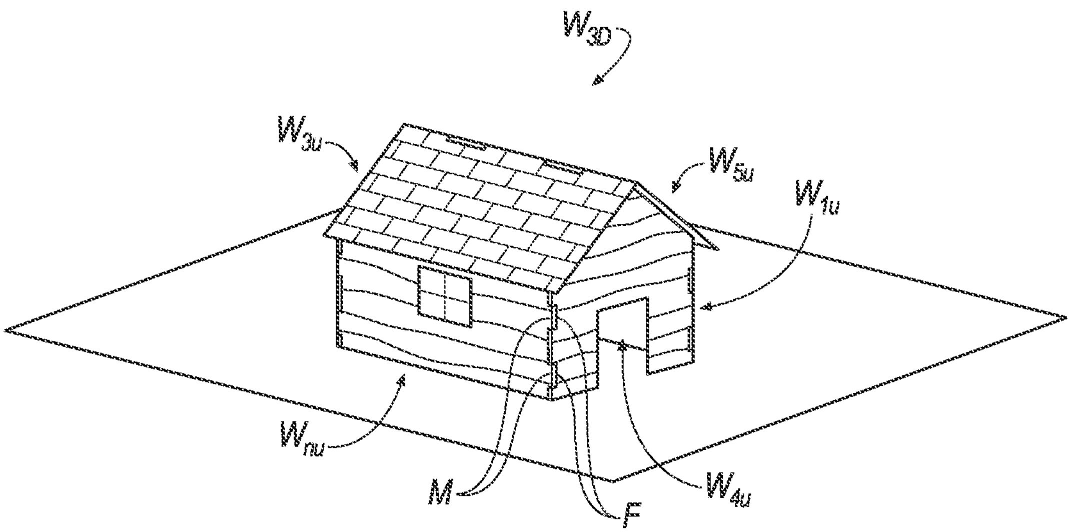
FIG. 61C illustrates the plurality of individual foodstuff units derived from the foodstuff workpiece of FIG. 61A spatially connected to one another in accordance with an exemplary embodiment of the invention.
Figure 61D:
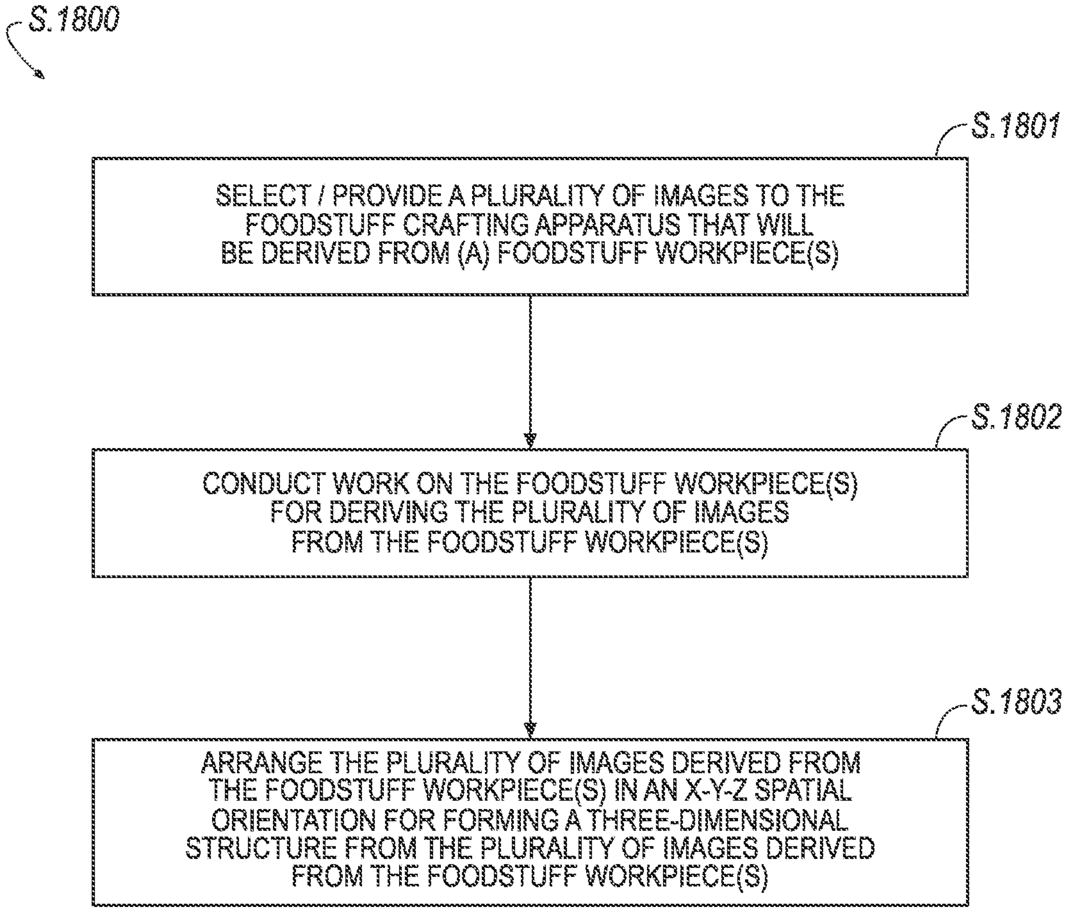
FIG. 61D illustrates a methodology associated with FIGS. 61A-61C.

Unlike the embodiment shown and described in FIGS. 60A-60C, the plurality of individual foodstuff units, $W_{1u}$-$W_{nu}$, are not intended to be disposed upon a cake, C, or sheet cake, SC; rather, the plurality of individual foodstuff units, $W_{1u}$-$W_{nu}$, are prepared for connection to one another in order to form a three-dimensional foodstuff structure, $W_{3D}$ (see, e.g., FIG. 61C). Accordingly, a user may first select/provide a three-dimensional image to a foodstuff crafting apparatus 10 (see, e.g., step S.1801 of methodology S.1800 in FIG. 61D). The foodstuff crafting apparatus 10 may then conduct work (see, e.g., FIG. 61A and step S.1802 of methodology S.1800 in FIG. 61D) on the foodstuff workpiece(s), W, in view of the selected/provided three-dimensional image.

Once the foodstuff crafting apparatus 10 has finished preparing individual foodstuff units, $W_{1u}$-$W_{nu}$, from one or more foodstuff workpieces, W, for forming the three-dimensional foodstuff structure, $W_{3D}$, the user may arrange (see, e.g., step S.1803 of methodology S.1800 in FIG. 61D) the individual foodstuff units, $W_{1u}$-$W_{nu}$, from one or more foodstuff workpieces, W, in a connected configuration for forming the three-dimensional foodstuff structure, $W_{3D}$. In an implementation, each of the individual foodstuff units, $W_{1u}$-$W_{nu}$, may include male, M,/female, F, structure (see, e.g., FIGS. 61A-61C) in order to mechanically attached the individual foodstuff units, $W_{1u}$-$W_{nu}$, for forming the three-dimensional foodstuff structure, $W_{3D}$; alternatively, or, in addition to the male, M,/female, F, structure, the user may apply a tacky foodstuff adhesive (e.g., frosting, honey or the like) to portions of one or more of the individual foodstuff units, $W_{1u}$-$W_{nu}$, in order to adhesively connect the individual foodstuff units, $W_{1u}$-$W_{nu}$, for forming the three-dimensional foodstuff structure, $W_{3D}$.

Figure 62:
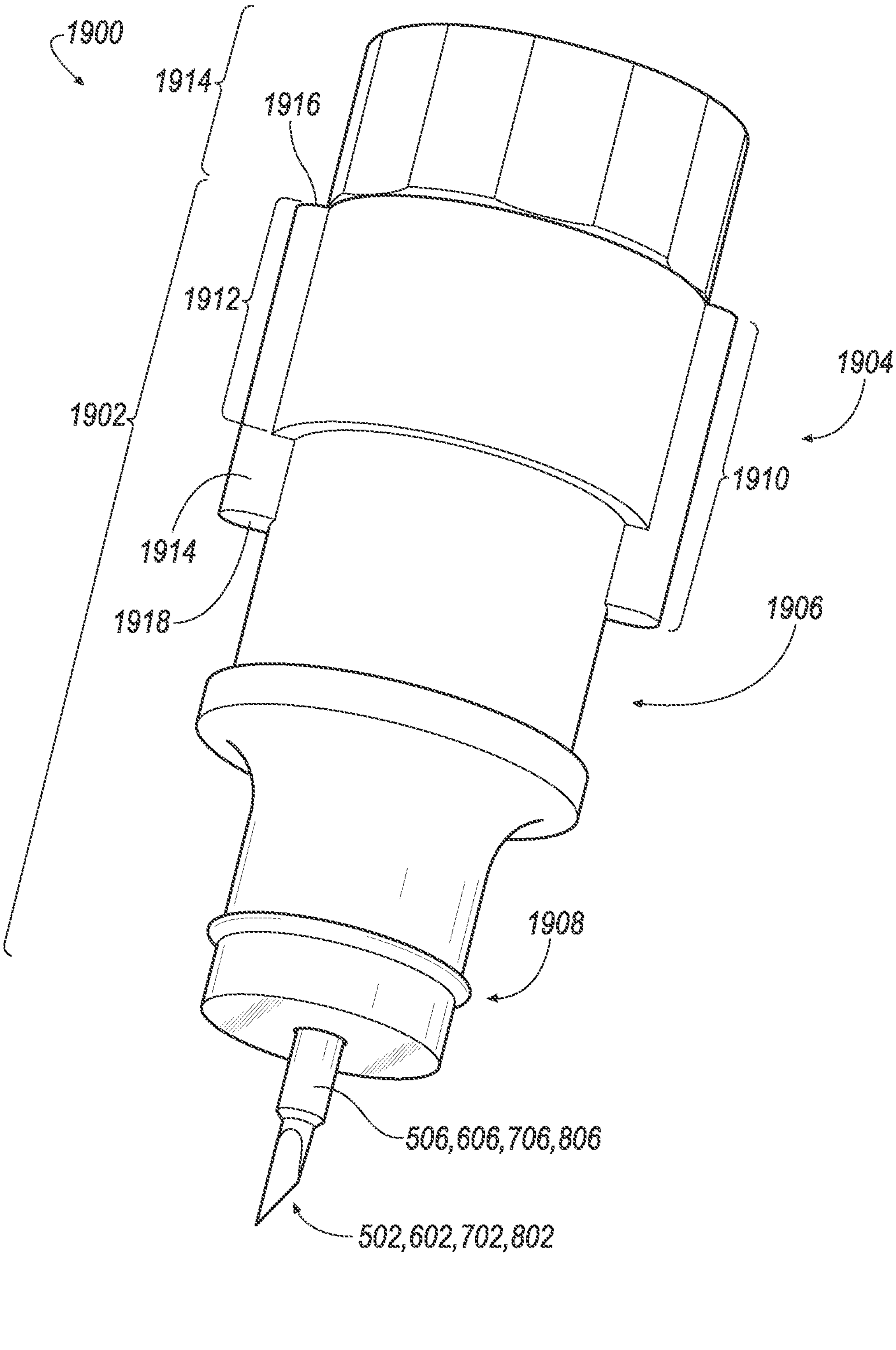
FIG. 62 is a perspective view of a blade carrier housing in accordance with an exemplary embodiment of the invention.

Referring to FIG. 62, a blade carrier housing is shown generally at 1900 according to an embodiment. The blade carrier housing 1900 includes a body portion 1902 having an outer surface 1904. The outer surface 1904 forms a recessed portion 1906 and a circumferential rib 1908. The recessed portion 1906 provides an attachment surface that permits the blade carrier housing 1900 to be attached to a carrier 1350 (see, e.g., FIGS. 63A-63B) of a first working assembly 18*a*. The functionality of the circumferential rib 1908 is substantially similar as described above in that the circumferential rib 1908 may assist in the attachment of the outer seal 975 to the blade carrier housing 1900.

The blade carrier housing 1900 may further include one or more ear portions/key portions 1910. In an implementation, the one or more key portions 1910 may integrally extend from and beyond the outer surface 1904 of the blade carrier housing 1900. In an implementation, the one or more key portions 1910 may integrally extend from and beyond the outer surface 1904 at one or more of the recessed portion 1906 and a head portion 1912 that is proximate the cap portion 1914. In an implementation the one or more key portions 1910 may integrally extend from and beyond the outer surface 1904 along a portion of a length of the recessed portion 1906 and substantially all of a length of the head portion 1912.

In an implementation, the one or more key portions 1910 may include an arcuate side surface 1914. Further, in an implementation, the one or more key portions 1910 may include a first end surface 1916 and a second end surface 1918. Although the one or more key portions 1910 may be formed as shown in FIG. 62 and as described above, the one or more key portions 1910 may be formed in any desirable manner or include any desirable geometry.

Figure 63A:
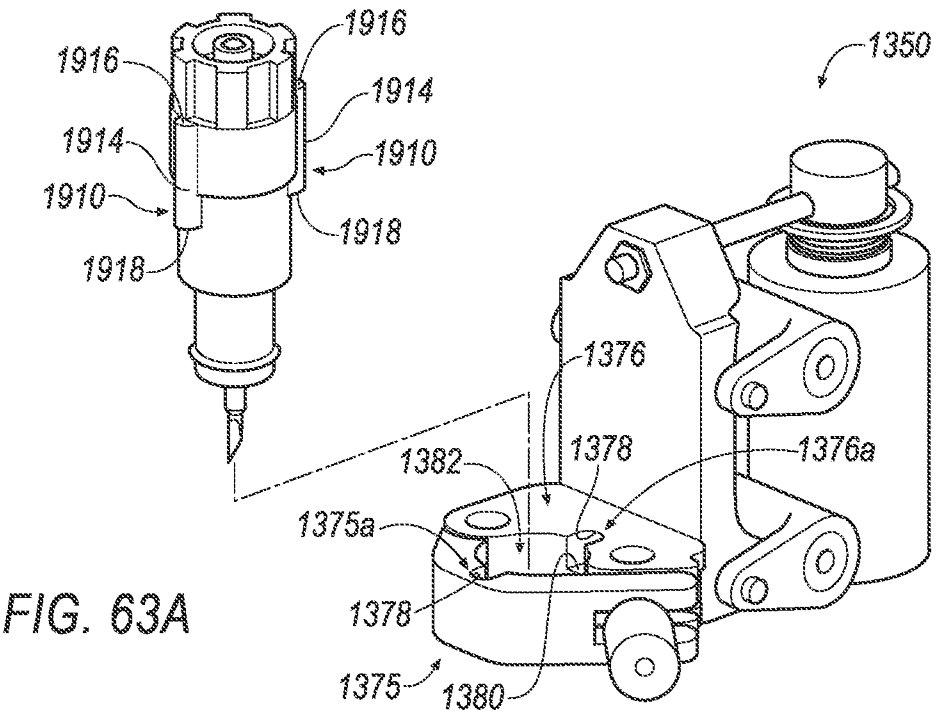
FIG. 63A is a perspective view of the blade carrier housing of FIG. 62 arranged proximate but not connected to a sub-structure of a crafting apparatus in accordance with an exemplary embodiment of the invention.

Referring to FIG. 63A, the carrier 1350 may include a rotatable, blade carrier housing clamping portion 1375 and a blade carrier housing supporting portion 1376. In an implementation, one or more of the blade carrier housing clamping portion 1375 and the blade carrier housing supporting portion 1376 may include a female receiving aperture 1375*a*, 1376*a* having a surface configuration/geometry that is configured to receive the blade carrier housing 1900 having the one or more key portions 1910. The one or more key portions 1910 functionally act as a male portion to be exclusively-received by the female receiving aperture 1375*a*, 1376*a*. In an implementation, the female receiving aperture 1375*a*, 1376*a* includes a side surface 1378 that corresponds to the arcuate side surface 1914 of the one or more key portions 1910 and a support surface 1380 that corresponds to the second end surface 1918 of the one or more key portions 1910. Further, it will be appreciated that although the one or more key portions 1910 extend from the blade carrier housing 1900 and the female receiving aperture 1375*a*, 1376*a* are formed by the blade carrier housing clamping portion 1375 and the blade carrier housing supporting portion 1376, the blade carrier housing clamping portion 1375 and the blade carrier housing supporting portion 1376 may alternatively include the one or more key portions 1910 whereas the blade carrier housing 1900 may form the female receiving aperture 1375*a*, 1376*a*.

Figure 63B:
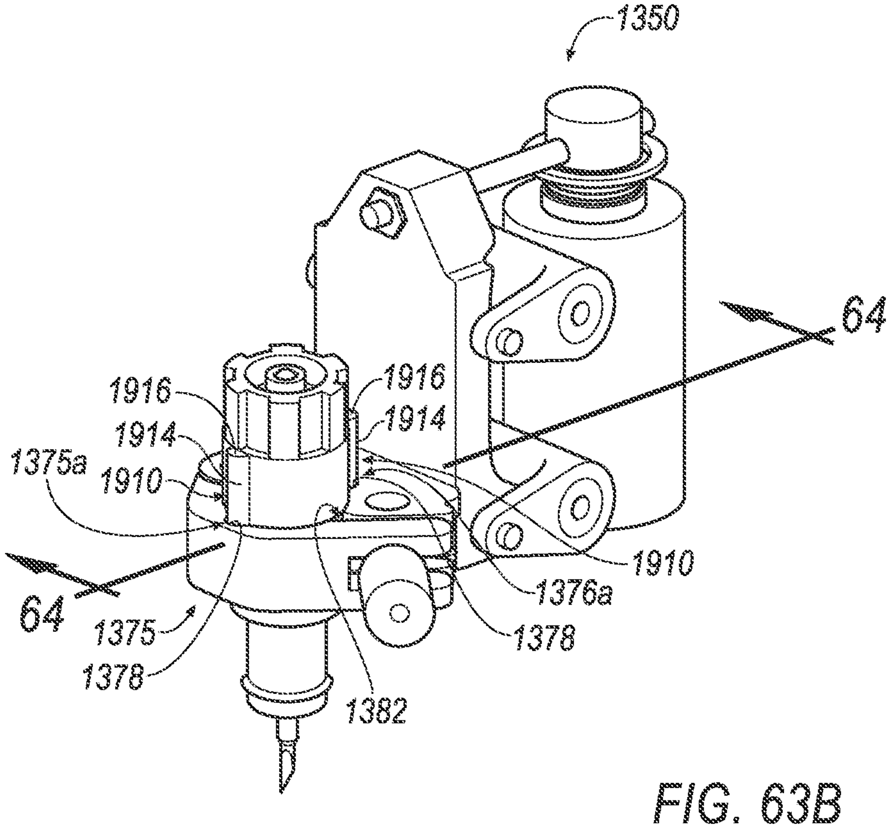
FIG. 63B is a perspective view of the blade carrier housing of FIG. 62 connected to the sub-structure of a crafting apparatus of FIG. 63A in accordance with an exemplary embodiment of the invention.
Figure 64:
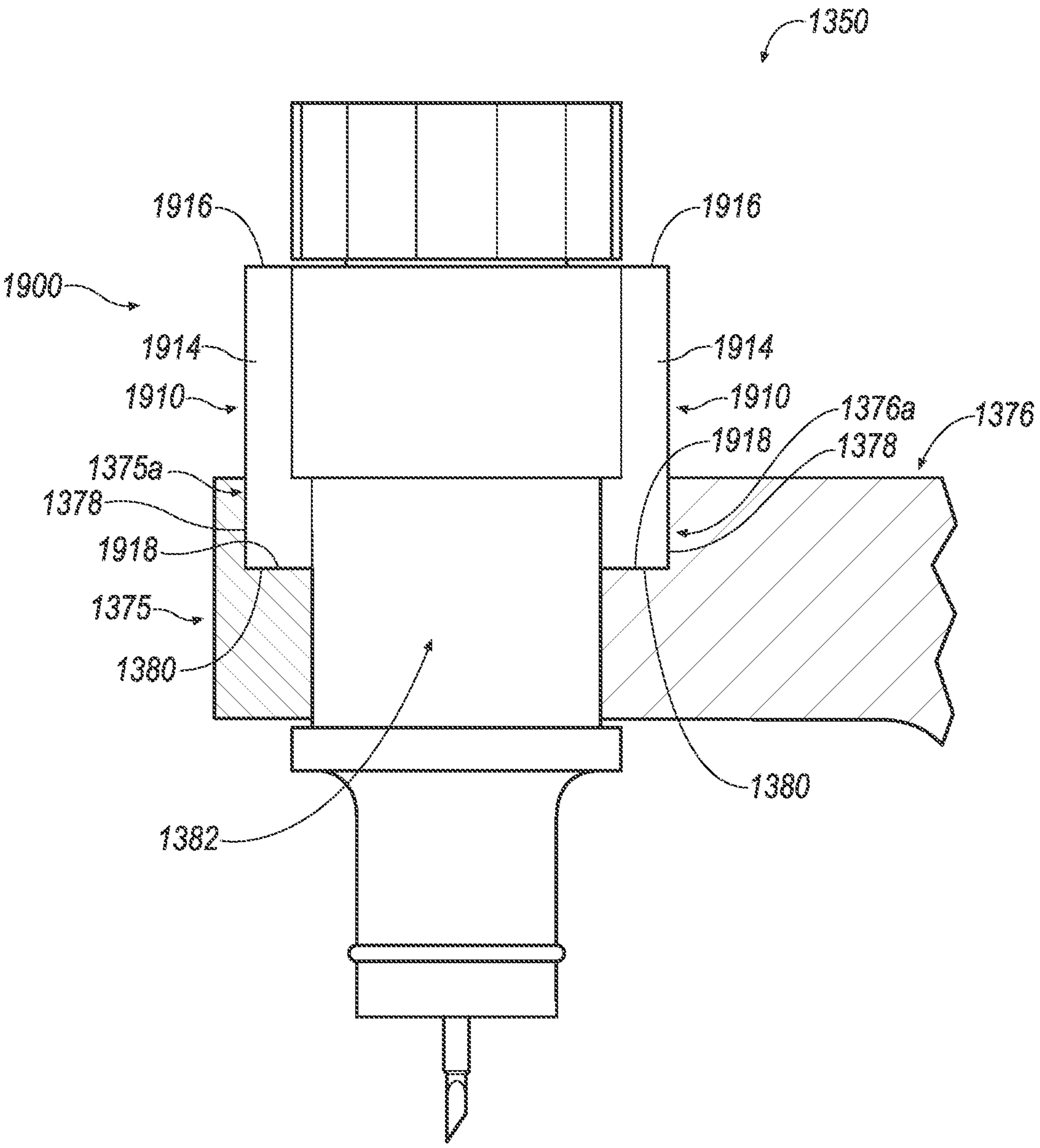
FIG. 64 is a cross-sectional view according to line 64-64 of FIG. 63B in accordance with an exemplary embodiment of the invention.

Referring to FIGS. 63B and 64, once the second end surface 1918 of the one or more key portions 1910 is disposed within female receiving aperture 1375*a*, 1376*a*, the user may engage the blade carrier housing clamping portion 1375 with the blade carrier housing supporting portion 1376 such that the blade carrier housing 1900 is permitted to be supportably-coupled to the carrier 1350. Further, as seen in FIG. 64 because the second end surface 1918 is supported by the support surface 1380, the blade carrier housing 1900 is prevented from dropping through a blade carrier housing receiving-passage 1382 (see, e.g., FIG. 63A) formed by both of the blade carrier housing clamping portion 1375 and the blade carrier housing supporting portion 1376.

Figure 65A:
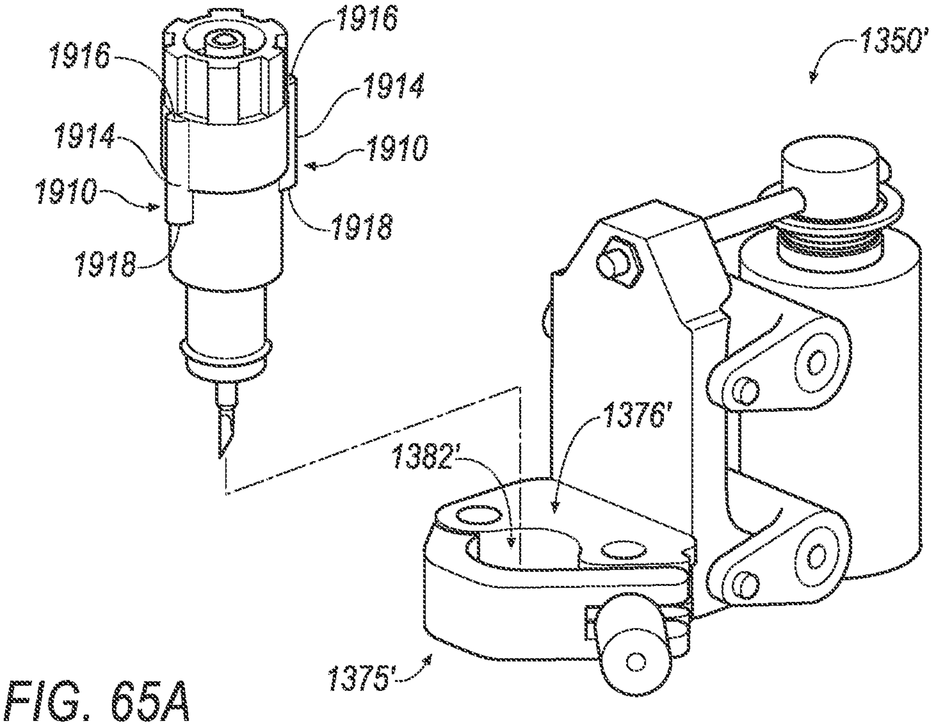
FIG. 65A is a perspective view of the blade carrier housing of FIG. 62 arranged proximate but not connected to a sub-structure of a crafting apparatus in accordance with an exemplary embodiment of the invention.
Figure 65B:
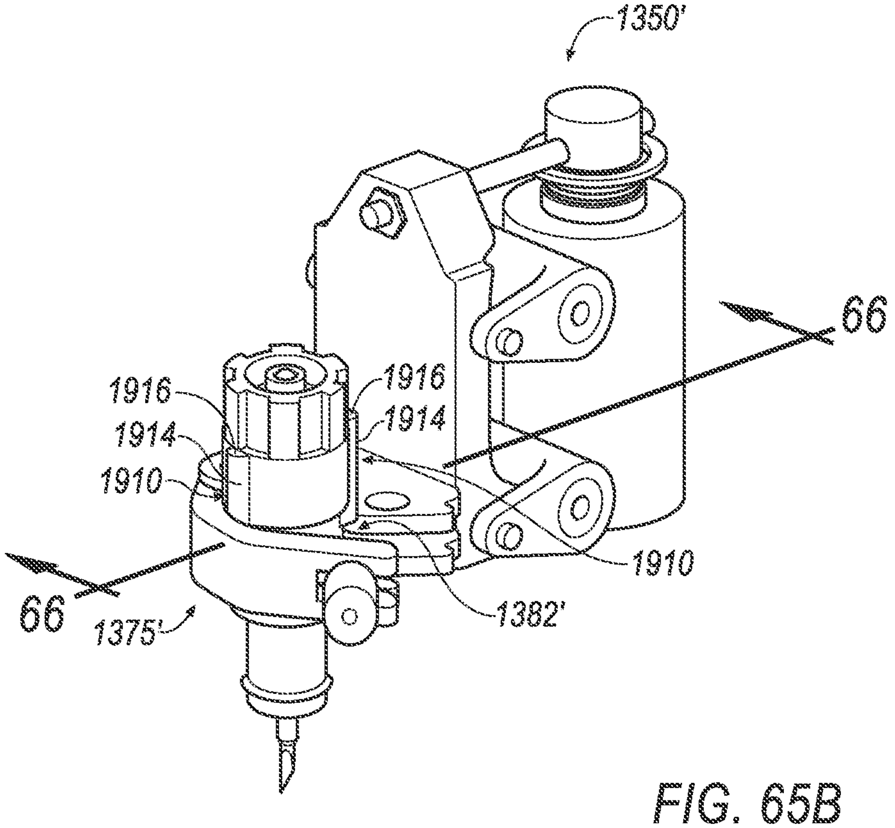
FIG. 65B is a perspective view of the blade carrier housing of FIG. 62 that is unable to be connected to the sub-structure of a crafting apparatus of FIG. 63A' in accordance with an exemplary embodiment of the invention.
Figure 66:
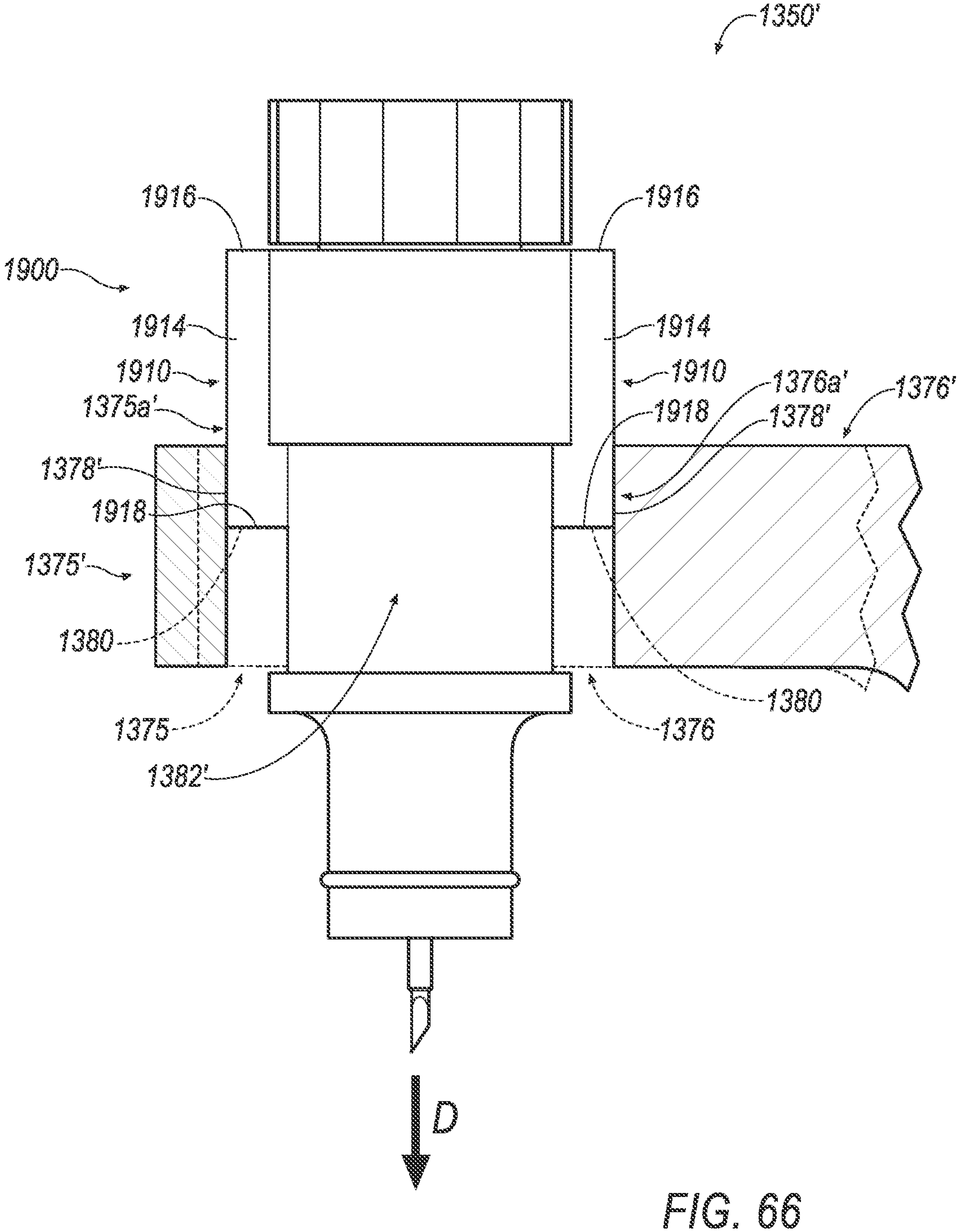
FIG. 66 is a cross-sectional view according to line 66-66 of FIG. 65B in accordance with an exemplary embodiment of the invention.

Due to the inclusion of one or more key portions 1910, if a user attempts to attach the blade carrier housing 1900 to a carrier 1350' (see, e.g., FIGS. 65A-65B and 66) that does not include female receiving aperture 1375*a*, 1376*a* formed in one or more of the blade carrier housing clamping portion 1375' of the carrier 1350' and the blade carrier housing supporting portion 1376' of the carrier 1350', the user will be unable to functionally attach the blade carrier housing 1900 with the carrier 1350'. For example, as seen in FIGS. 65B and 66, upon arranging the blade carrier housing 1900 within the blade carrier housing receiving-passage 1382' formed by the blade carrier housing clamping portion 1375' and the blade carrier housing supporting portion 1376', the one or more keys 1910 functionally interfere with the attachment of the blade carrier housing clamping portion 1375' to the blade carrier housing supporting portion 1376'. Further, as seen in FIG. 66, as a result of the interference caused by the one or more key portions 1910, the second end surface 1918 is unable to be engaged with a support surface (i.e., the support surface 1380), and, as such, the blade carrier housing 1900 drops (see, e.g., arrow D) through the blade carrier housing receiving-passage 1382'.

Figure 67A:
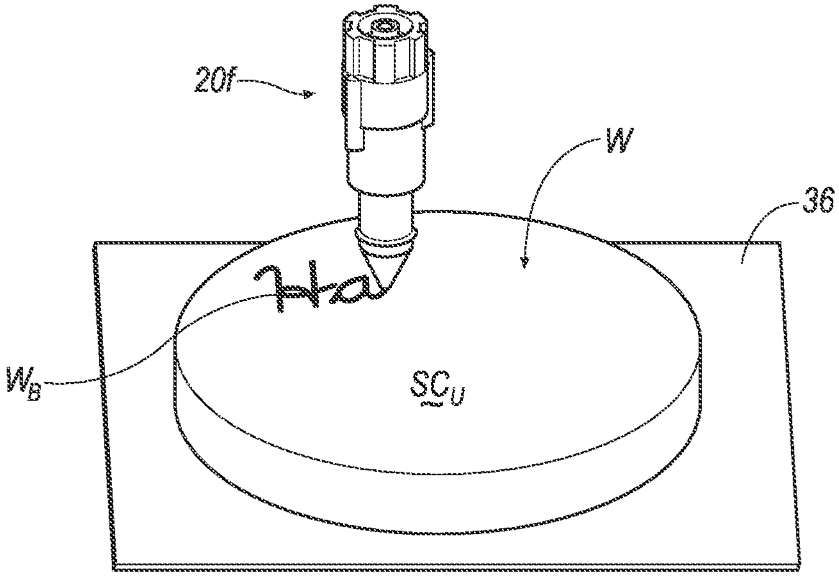
FIGS. 67A-67B illustrate an icing head conducting work directly upon a workpiece including a cake in accordance with an exemplary embodiment of the invention.
Figure 67B:
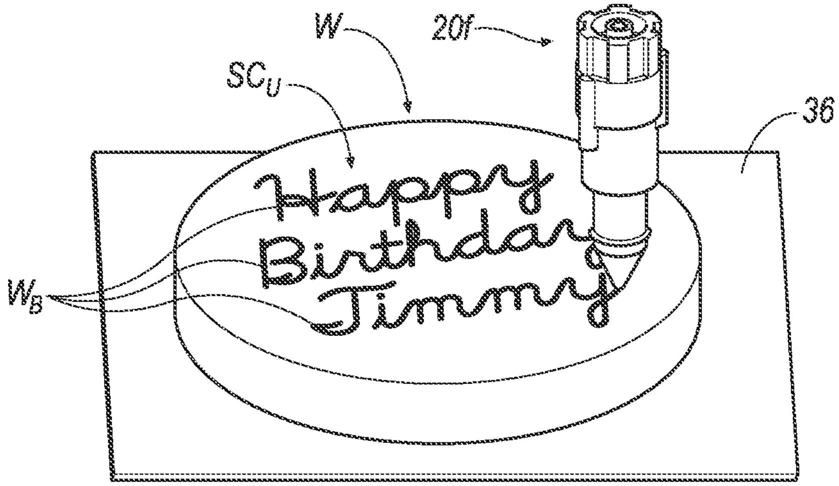

Referring to FIGS. 67A-67B, an icing head 20*f* is shown according to an embodiment. In order to clearly illustrate a workpiece, W (that may or may not be supported by a mat 36), the foodstuff crafting apparatus 10 (as well as components that retain/causes movement/causes de/actuation of the icing head 20*f*) is not shown at FIGS. 67A-67B. As shown in FIGS. 67A-67B, the icing head 20*f* is shown conducting work (e.g., depositing a bead of icing, $W_B$) directly onto an upper surface, $SC_U$, of a workpiece W. In an embodiment the workpiece, W, is a cake, cupcake or the like having a height approximately equal to, for example, six inches; accordingly, it will be appreciated that, in an embodiment, the foodstuff crafting apparatus 10 is not limited to conducting work on workpieces, W, having larger thicknesses than, for example, a thin sheet of fondant. In some circumstances, when, for example, a workpiece, W, is (in an embodiment) approximately six inches in height, the foodstuff crafting apparatus 10 may include a sensor that causes one or more of a working head (e.g., the icing head 20*f*) and a support surface (e.g. the upper support surface 38) to be raised or lowered in order to provide adequate clearance for work to be conducted upon the workpiece, W.

Figure 68A:
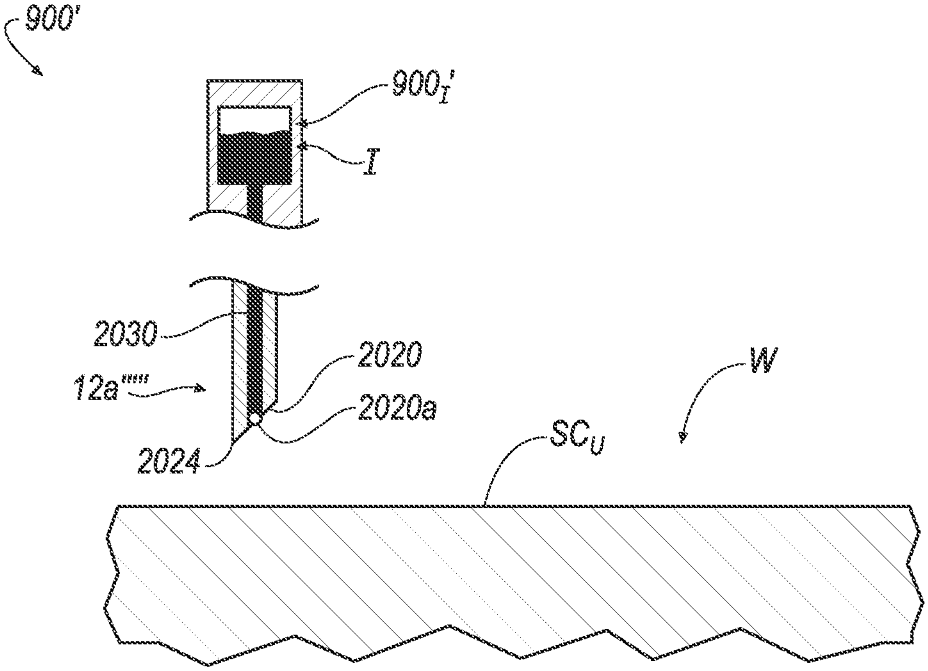
FIGS. 68A-68B illustrate a blade housing including an inking blade in accordance with an exemplary embodiment of the invention.
Figure 68B:
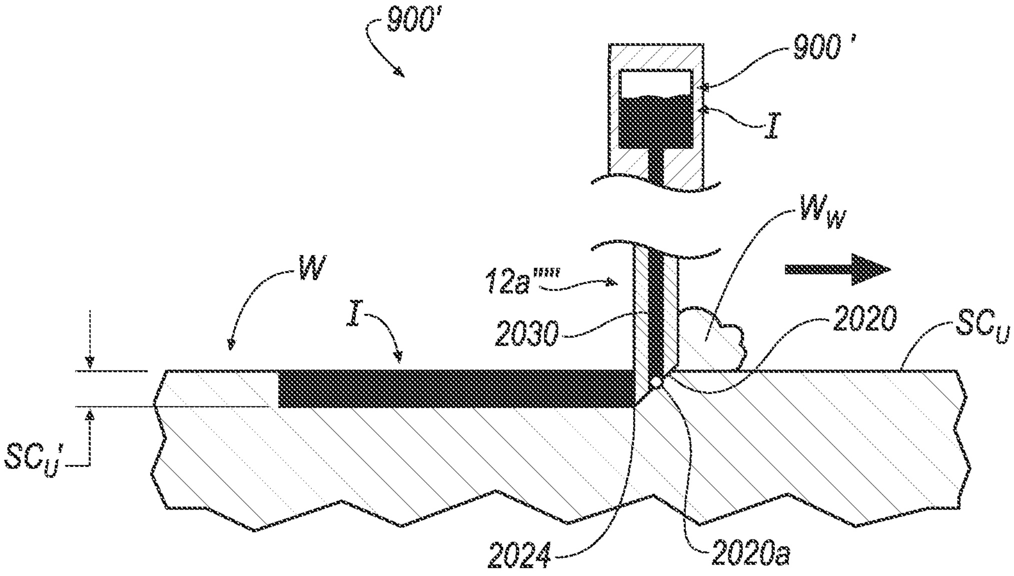

Referring to FIGS. 68A-68B, a blade housing 900' including an inking blade 12*a*''''' is shown according to an embodiment of the invention. The blade housing 900 includes an ink reservoir $900_I'$ that contains foodstuff ink, I. The inking blade 12*a*''''' includes a fluid channel 2030 and a valve portion 2020*a* arranged upon or at least proximate the cutting edge 2020. Functionally the fluid channel 2030 permits the foodstuff ink, I, to be communicated from the ink reservoir $900_I'$, through and out of the inking blade 12*a*'''' when the valve portion 2020*a* is moved from the closed orientation (as shown in FIG. 68A) to an open orientation (see FIG. 68B.)

Referring to FIG. 68B, the point 2024 of the inking blade 12*a*''''' may penetrate the upper surface, $SC_U$, of the foodstuff workpiece, W, such that a portion of the foodstuff workpiece, W, is removed (thereby forming workpiece waste, $W_W$). The removal of a portion, $W_W$, of the foodstuff workpiece, W, at the upper surface, $SC_U$, may result in the foodstuff workpiece, W, forming a valley, recess or channel having a depth, $SC_U'$. Accordingly, during movement of the blade across the upper surface, $SC_U$, the valve portion 2020*a* may be arranged in the open orientation in order to cause the foodstuff ink, I, to "bleed" from the inking blade 12*a*''''' such that the foodstuff ink, I, is deposited into the valley, recess or channel having a depth, $SC_U'$. In an embodiment, the inking blade 12*a*''''' may not necessarily remove a portion, $W_W$, of the foodstuff material, W, from the upper surface, $SC_U$; in such an implementation, the inking blade 12*a*''''' may merely deposit the foodstuff ink, I, upon the upper surface, $SC_U$; accordingly, irrespective of removal of the portion, $W_W$, of the foodstuff workpiece, W, inclusion of an inking blade 12*a*''''' with a foodstuff crafting apparatus 10 may result in the obviating, use, inclusion or incorporation of a printing head with the foodstuff crafting apparatus 10.

Figure 69:
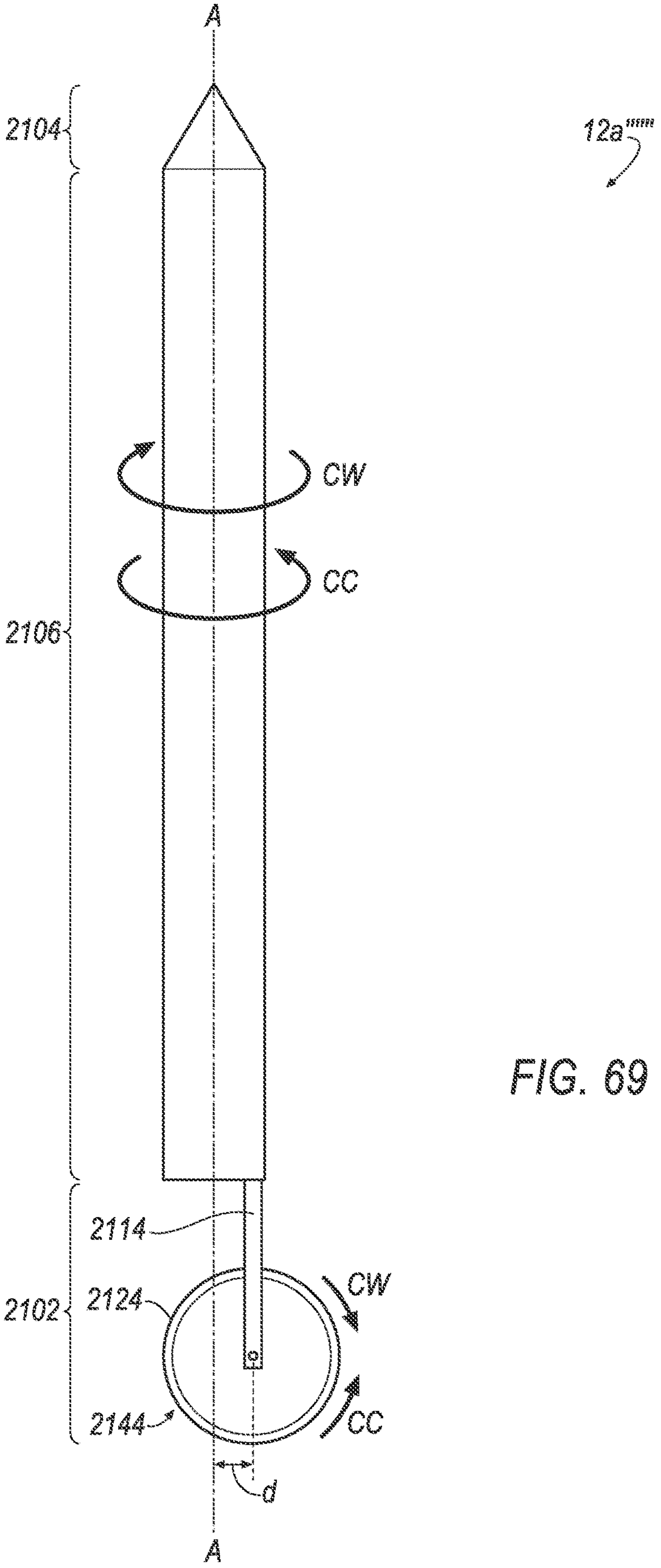

Referring to FIG. 69 a blade 12*a*'''''' is shown in accordance with an embodiment of the invention. The blade 12*a*'''''' includes a blade portion 2102, a conical bearing portion 2104 and a stem portion 2106 extending between and connecting the blade portion 2102 or the conical bearing portion 2104. The distal end 2144 of the blade portion 2102 includes a flange 2114 that carries a circularly-shaped, rotatable blade defined by a circular cutting edge 2124. The circularly-shaped, rotatable blade may rotate freely upon the flange 2114.

The blade portion 2102 is offset at a distance, d, from a pivot axis, A-A, that extends through an axial center of the blade 12*a*""""". The offset distance, d, permits the blade 12*a*"""""" to pivot (in a clockwise, CW, or counter-clockwise, CC, direction) upon the circular cutting edge 2124 in a manner such that the blade 12*a*""""" behaves substantially similarly to that of a caster wheel; as such, the blade 12*a*""""" may alternatively be referred to as a "caster blade." Functionally, the caster blade 12*a*"""""" self-aligns/automatically aligns the circular cutting edge 2124 in a cutting direction as a result of (a) force(s) imparted to the blade 12*a*""""" resulting from: (1) lateral travel of the working component 20*a* relative to the body 14 and (2) fore/aft travel of the mat 36 relative to the body 14.

Figure 70:
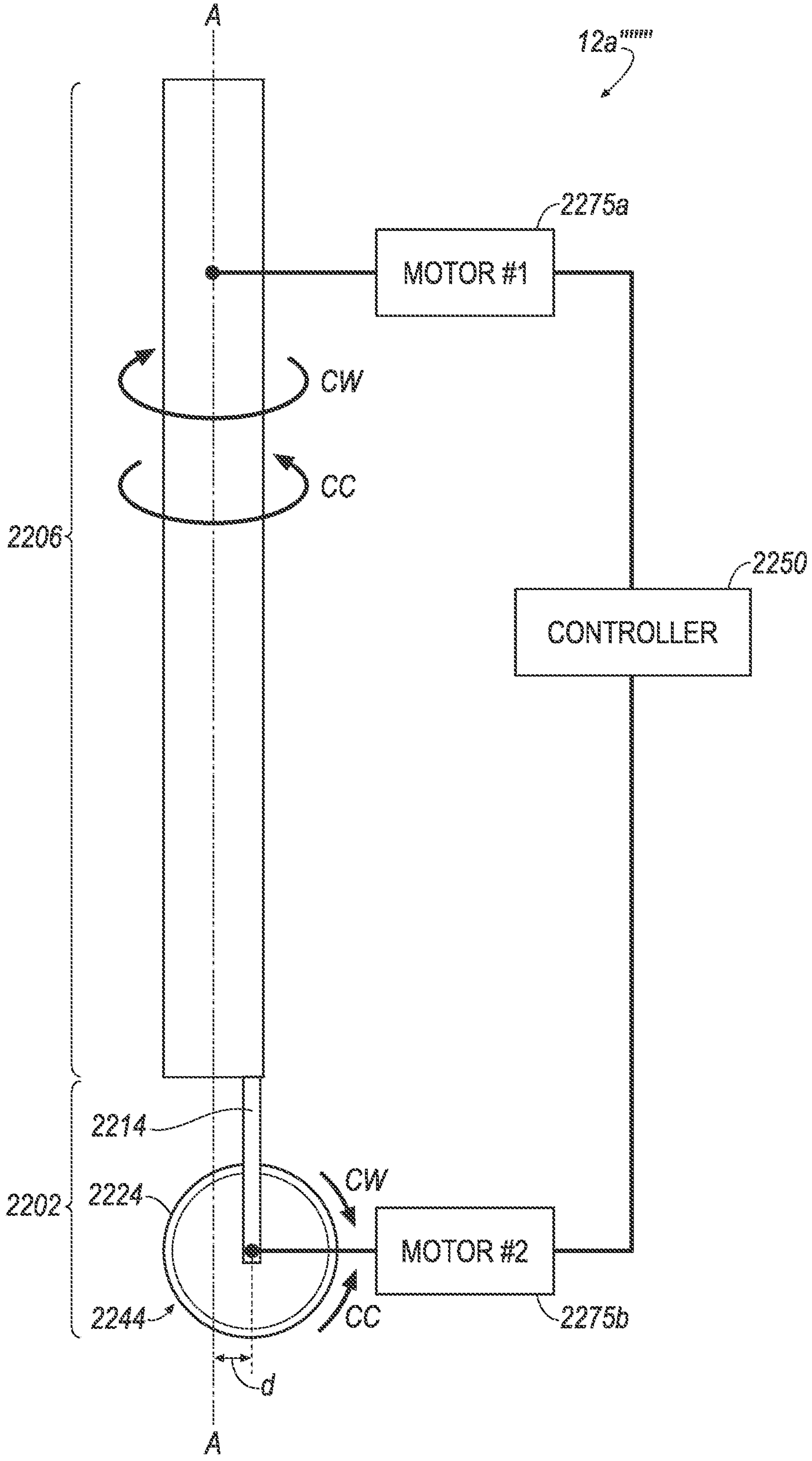

Referring to FIG. 70 a blade 12*a*""""" and a system for rotating one or more portions of the blade 12*a*"""""" is shown in accordance with an exemplary embodiment of the invention. The blade 12*a*"""""" includes a blade portion 2202 connected to a stem portion 2206. The distal end 2244 of the blade portion 2202 includes a flange 2214 that carries a circularly-shaped, rotatable blade defined by a circular cutting edge 2224.

Unlike the blade 12*a*""""" shown in FIG. 69, the blade 12*a*"""""" may be connected to one or more motors 2275*a*, 2275*b*. The one or more motors 2275*a*, 2275*b* may be connected to a controller 2250 for actuating the one or more motors 2275*a*, 2275*b*. Further, unlike the blade 12*a*""""" shown in FIG. 69, the blade 12*a*"""""" does not include a conical bearing portion as well as the ability to permit the circularly-shaped, rotatable blade to rotate freely upon the flange 2214. Accordingly, in an embodiment, the motor 2275*a* may cause rotation of the blade 12*a*"""""" about the axis, A-A, rather than permitting the blade 12*a*"""""" to freely caster; further, in an embodiment, the motor 2275*b* may cause rotation of circularly-shaped, rotatable blade in a substantially similar manner to a circular saw. Thus, the blade 12*a*""""" of FIG. 69 may be referred to as a "passive blade" having rotational movement in response to frictional forces whereas the blade 12*a*"""""" of FIG. 70 may be referred to as an "active blade" such that the one or more motors 2275*a*, 2275*b* may cause rotation of blade 12*a*"""""".

Figure 71:
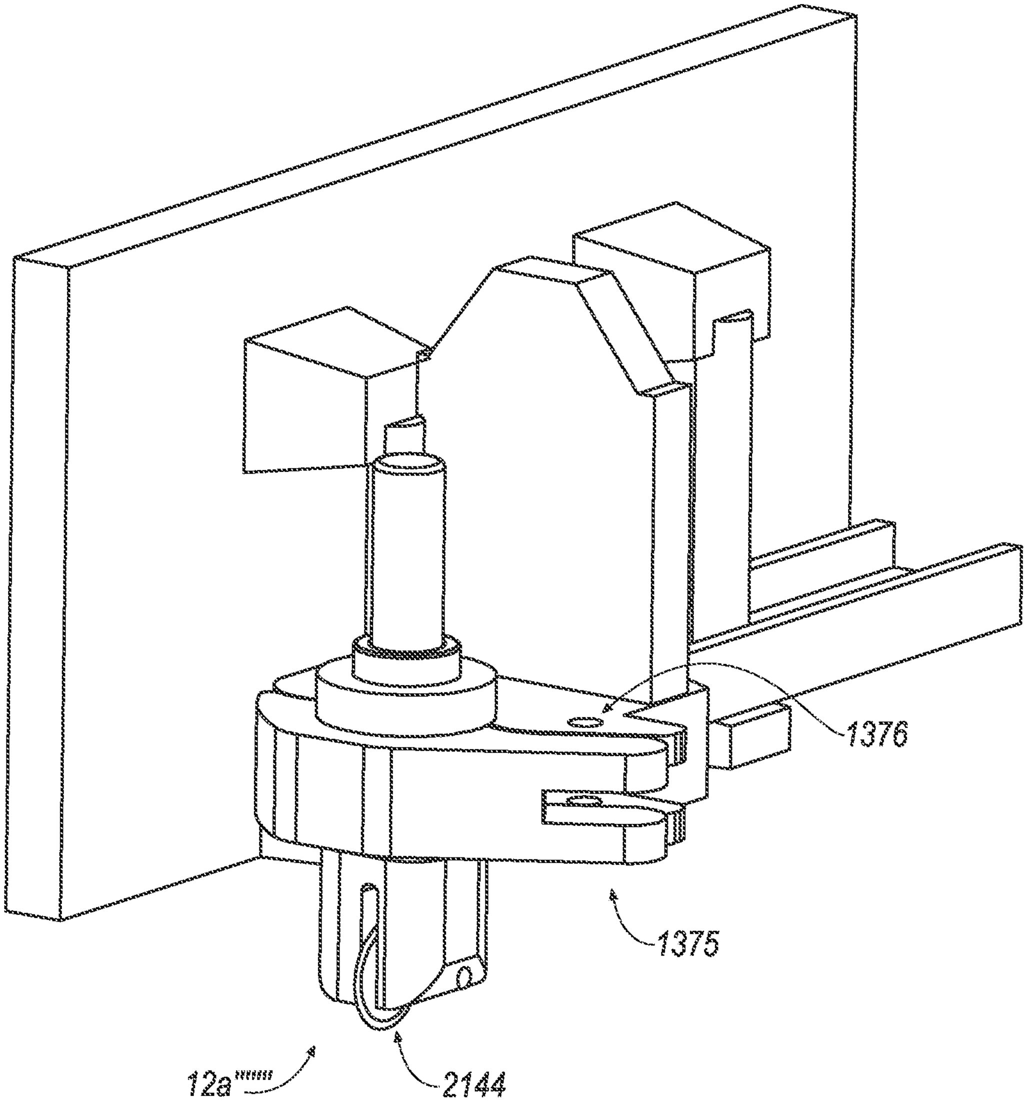
Figure 72:
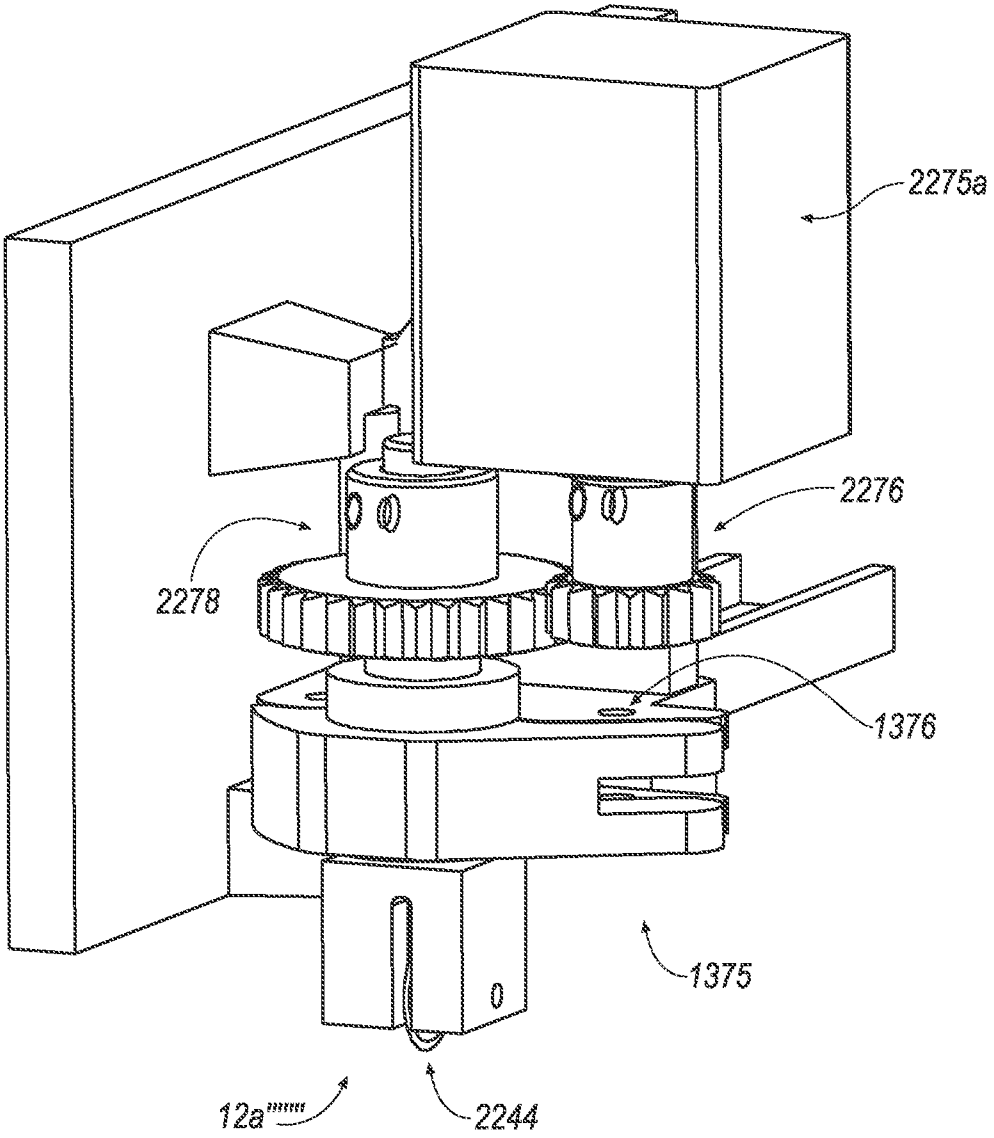

Referring to FIG. 71, an embodiment of a "passive blade" 12*a*""""" is shown connected to a carrier including a blade carrier housing clamping portion 1375 and a blade carrier housing supporting portion 1376. Referring to FIG. 72, an embodiment of an "active blade" 12*a*"""""" is shown connected to a carrier including a blade carrier housing clamping portion 1375 and a blade carrier housing supporting portion 1376. The carrier may also support a motor 2275*a*. The motor 2275*a* may drive a first gear 2276 that is connected to and further drives a second gear 2278. The second gear 2278 may be connected to the stem portion 2206 for causing rotation of the blade 12*a*"""""" about the axis, A-A.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A device for a crafting apparatus that performs work on a workpiece, the device comprising a shuttle system including:

a rail;

a taxi supported by the rail;

a blade carrier housing having a body portion formed by an outer surface and a plunger, wherein the blade carrier housing is configured to house a blade, wherein the outer surface includes a recessed portion, wherein the body portion includes an end surface that forms a blade portion opening, wherein the body portion includes a central bore formed by an inner surface of the body portion, and wherein the plunger is actuatable to adjust a position of the blade relative to the blade carrier housing;

a carrier;

a vertically adjustable plunging bracket connected to the taxi and connected to the carrier, wherein the vertically adjustable plunging bracket is movably-arrangeable to move vertically relative to the taxi;

a clamp configured to detachably secure the blade carrier housing to the carrier;

an actuator coupled to the vertically adjustable plunging bracket and configured to move the carrier vertically relative to the taxi; and a pivot bracket configured to pivotally couple movement of the actuator and the carrier, wherein the carrier moves vertically relative to the taxi as the pivot bracket rotates relative to the taxi.

2. The device for a crafting apparatus according to claim 1, wherein the rail is movable in an X direction/−X direction, wherein the taxi is movably-arranged upon the rail for movement in a Y direction/−Y direction, wherein the blade carrier housing is movably-arranged relative to the taxi in a Z direction/−Z direction.

3. The device for a crafting apparatus according to claim 1, wherein the shuttle system further includes a means for moving the blade carrier within a body of the crafting apparatus.

4. The device for a crafting apparatus according to claim 1, wherein the pivot bracket is configured to pivotally connect the carrier to the vertically adjustable plunging bracket.

5. A device for a crafting apparatus that performs work on a workpiece, the device comprising a preliminary treatment system including:

a shuttle system comprising:

a rail;

a taxi supported by the rail;

a blade carrier housing having a body portion formed by an outer surface and a plunger, wherein the blade carrier housing is configured to house a blade, wherein the outer surface includes a recessed portion, wherein the body portion includes an end surface that forms a blade portion opening, wherein the body portion includes a central bore formed by an inner surface of the body portion, and wherein the plunger is actuatable to adjust a position of the blade relative to the blade carrier housing;

a carrier;

a vertically adjustable plunging bracket connected to the taxi and connected to the carrier, wherein the vertically adjustable plunging bracket is movably-arrangeable to move vertically relative to the taxi;

a clamp configured to detachably secure the blade carrier housing to the carrier;

an actuator coupled to the vertically adjustable plunging bracket and configured to move the carrier vertically relative to the taxi; and a pivot bracket configured to pivotally couple movement of the actuator and the carrier, wherein the carrier moves vertically relative to the taxi as the pivot bracket rotates relative to the taxi;

a controller in communication with the shuttle system; and a reservoir containing fluid.

6. The device for a crafting apparatus according to claim 5, further comprising a fluid providing means for lubricating a distal end of the blade.

7. The device for a crafting apparatus according to claim 6, further comprising a temperature sensor in communication with both of the distal end of the blade and the controller.

8. The device for a crafting apparatus according to claim 7, wherein the controller is configured to:

select a predetermined temperature from a look-up table in response to an indication from a user of a type of foodstuff material to be worked-upon by the crafting apparatus; and maintain the distal end of the blade submerged in the fluid until the temperature sensor detects that the distal end of the blade is raised to at least the predetermined temperature.

9. The device for a crafting apparatus according to claim 5, wherein the pivot bracket is configured to pivotally connect the carrier to the vertically adjustable plunging bracket.

10. A device for a crafting apparatus that performs work on a workpiece, the device comprising a preliminary treatment system including:

a shuttle system comprising:

a rail;

a taxi supported by the rail;

a blade carrier housing having a body portion formed by an outer surface and a plunger, wherein the blade carrier housing is configured to house a blade, wherein the outer surface includes a recessed portion, wherein the body portion includes an end surface that forms a blade portion opening, wherein the body portion includes a central bore formed by an inner surface of the body portion, and wherein the plunger is actuatable to adjust a position of the blade relative to the taxi;

a carrier;

a vertically adjustable plunging bracket connected to the taxi and connected to the carrier, wherein the vertically adjustable plunging bracket is movably-arrangeable to move vertically relative to the taxi;

a clamp configured to detachably secure the blade carrier housing to the carrier;

an actuator coupled to the vertically adjustable plunging bracket and configured to move the carrier vertically relative to the taxi; and a pivot bracket configured to pivotally couple movement of the actuator and the carrier, wherein the carrier moves vertically relative to the taxi as the pivot bracket rotates relative to the taxi;

a controller in communication with the shuttle system; and an electrical circuit having two, opposing, spaced-apart electrical contacts.

11. The device for a crafting apparatus according to claim 10, wherein the electrical circuit is configured to heat a distal end of the blade in response to the distal end of the blade engaging both of the two, opposing, spaced-apart electrical contacts and current flowing through the electrical circuit.

12. The device for a crafting apparatus according to claim 11, further comprising a temperature sensor in communication with both of the distal end of the blade and the controller.

13. The device for a crafting apparatus according to claim 10, further comprising a reservoir containing fluid.

14. The device for a crafting apparatus according to claim 13, further comprising a fluid providing means for lubricating a distal end of the blade.

15. The device for a crafting apparatus according to claim 10, wherein the pivot bracket is configured to pivotally connect the carrier to the vertically adjustable plunging bracket.

* * * * *